US012354445B2

(12) United States Patent
Givant

(10) Patent No.: US 12,354,445 B2
(45) Date of Patent: Jul. 8, 2025

(54) SPECIALIZED SLOT MACHINE FOR CONDUCTING A WAGERING FANTASY SPORTS TOURNAMENT

(71) Applicant: Philip Paul Givant, Carmichael, CA (US)

(72) Inventor: Philip Paul Givant, Carmichael, CA (US)

( * ) Notice: Subject to any disclaimer, the term of this patent is extended or adjusted under 35 U.S.C. 154(b) by 350 days.

(21) Appl. No.: 18/097,259

(22) Filed: Jan. 15, 2023

(65) Prior Publication Data

US 2023/0215245 A1 Jul. 6, 2023

Related U.S. Application Data

(63) Continuation-in-part of application No. 17/102,923, filed on Nov. 24, 2020, now Pat. No. 11,557,179, which is a continuation-in-part of application No. 16/665,684, filed on Oct. 28, 2019, now Pat. No. 11,270,556, which is a continuation of application (Continued)

(51) Int. Cl.
*G07F 17/32* (2006.01)

(52) U.S. Cl.
CPC ...... *G07F 17/3288* (2013.01); *G07F 17/3209* (2013.01); *G07F 17/3213* (2013.01); *G07F 17/3223* (2013.01); *G07F 17/3227* (2013.01); *G07F 17/323* (2013.01); *G07F 17/3237* (2013.01); *G07F 17/3239* (2013.01); *G07F 17/3258* (2013.01); *G07F 17/3276* (2013.01)

(58) Field of Classification Search
None
See application file for complete search history.

(56) References Cited

U.S. PATENT DOCUMENTS 5,846,132 A 12/1998 Junkin
5,860,862 A 1/1999 Junkin (Continued)

FOREIGN PATENT DOCUMENTS

WO WO2014014492 1/2014
WO WO2017117065 7/2017

OTHER PUBLICATIONS

US 8,529,353 B2, 09/2013, Muller (withdrawn)

(Continued)

*Primary Examiner* — Jason T Yen
(74) *Attorney, Agent, or Firm* — Inventive Law Inc.; Jim H. Salter

(57) ABSTRACT

A specialized slot machine for conducting a game includes: a gaming system to transform the data processor and network interface into a specialized slot machine configured to implement a client version of a game using a virtual deck of cards, wherein each of the plurality of virtual cards comprise identifying information and real-life statistics related to a notable person's actions in real-life events; present the virtual card deck to a plurality of players with a visual aid indicative of whether the plurality of players are playing a game based on events from the past or events from the future, the visual aid including a placement or movement of the virtual card deck in a direction indicative of a game based on events from the past or events from the future; and deal, by use of the data processor, cards from the virtual card deck to the plurality of players.

22 Claims, 22 Drawing Sheets

Related U.S. Application Data

No. 15/437,125, filed on Feb. 20, 2017, now Pat. No. 10,460,568, which is a continuation of application No. 14/981,408, filed on Dec. 28, 2015, now Pat. No. 9,589,418, which is a continuation-in-part of application No. 14/684,160, filed on Apr. 10, 2015, now abandoned, which is a continuation-in-part of application No. 13/945,628, filed on Jul. 18, 2013, now abandoned, application No. 18/097,259 is a continuation-in-part of application No. 17/956,583, filed on Sep. 29, 2022, which is a continuation-in-part of application No. 17/588,329, filed on Jan. 30, 2022, now Pat. No. 11,861,987, which is a continuation of application No. 16/665,684, filed on Oct. 28, 2019, now Pat. No. 11,270,556, which is a continuation of application No. 15/437,125, filed on Feb. 20, 2017, now Pat. No. 10,460,568, which is a continuation of application No. 14/981,408, filed on Dec. 28, 2015, now Pat. No. 9,589,418, which is a continuation-in-part of application No. 14/684,160, filed on Apr. 10, 2015, now abandoned, which is a continuation-in-part of application No. 13/945,628, filed on Jul. 18, 2013, now abandoned.

(60) Provisional application No. 61/741,463, filed on Jul. 19, 2012.

(56) References Cited

U.S. PATENT DOCUMENTS

| | | | |
|---|---|---|---|
| 6,092,806 | A | 7/2000 | Follis |
| 6,135,881 | A | 10/2000 | Abbott |
| 6,204,862 | B1 | 3/2001 | Barstow |
| 6,319,123 | B1 | 11/2001 | Paludi |
| 6,321,128 | B1 | 11/2001 | Costin, IV |
| 6,347,086 | B1 | 2/2002 | Strachan |
| 6,371,855 | B1 | 4/2002 | Gavriloff |
| 6,527,270 | B2 | 3/2003 | Maksymec |
| 6,606,615 | B1 | 8/2003 | Jennings |
| 6,669,565 | B2 | 12/2003 | Liegey |
| 6,688,973 | B2 | 2/2004 | Satloff |
| 6,688,978 | B1 | 2/2004 | Herman |
| 6,760,595 | B2 | 7/2004 | Inselberg |
| 6,800,028 | B1 | 10/2004 | Paludi |
| 6,910,965 | B2 | 6/2005 | Downes |
| 7,001,279 | B1 | 2/2006 | Barber |
| 7,153,211 | B2 | 12/2006 | Campaigne |
| 7,225,233 | B1 | 5/2007 | Fenton |
| 7,303,472 | B2 | 12/2007 | Guagliardo |
| 7,351,150 | B2 | 4/2008 | Sanchez |
| 7,362,862 | B2 | 4/2008 | Schneier |
| 7,364,509 | B2 | 4/2008 | Slade |
| 7,364,510 | B2 | 4/2008 | Walker |
| 7,373,587 | B1 | 5/2008 | Barstow |
| 7,384,338 | B2 | 6/2008 | Rothschild |
| 7,445,550 | B2 | 11/2008 | Barney |
| 7,458,894 | B2 | 12/2008 | Danieli |
| 7,485,037 | B2 | 2/2009 | Penrice |
| 7,500,917 | B2 | 3/2009 | Barney |
| 7,507,169 | B2 | 3/2009 | Kamen |
| 7,522,554 | B2 | 4/2009 | Chan |
| 7,548,242 | B1 | 6/2009 | Hughes |
| 7,562,815 | B2 | 7/2009 | Page |
| 7,563,162 | B2 | 7/2009 | Lawson |
| 7,607,403 | B2 | 10/2009 | Walters |
| 7,614,944 | B1 | 11/2009 | Hughes |
| 7,637,809 | B2 | 12/2009 | Ghosh |
| 7,641,549 | B2 | 1/2010 | Asher |
| 7,641,553 | B2 | 1/2010 | Roush |
| 7,648,417 | B2 | 1/2010 | Sonn |
| 7,657,477 | B1 | 2/2010 | Chaffee |
| 7,666,084 | B2 | 2/2010 | Herrmann |
| 7,666,088 | B2 | 2/2010 | Cannon |
| 7,699,707 | B2 | 4/2010 | Bahou |
| 7,716,078 | B2 | 5/2010 | Bourne |
| 7,716,113 | B2 | 5/2010 | Crosthwaite |
| 7,762,881 | B2 | 7/2010 | Ghosh |
| 7,791,607 | B1 | 9/2010 | Hughes |
| 7,815,502 | B2 | 10/2010 | Hardy |
| 7,830,830 | B2 | 11/2010 | Chan |
| 7,831,452 | B2 | 11/2010 | Ghosh |
| 7,835,974 | B2 | 11/2010 | Burgis |
| 7,840,176 | B2 | 11/2010 | Chan |
| 7,850,523 | B2 | 12/2010 | Ghosh |
| 7,850,527 | B2 | 12/2010 | Barney |
| 7,857,699 | B2 | 12/2010 | Baerlocher |
| 7,872,655 | B2 | 1/2011 | Hughes |
| 7,874,920 | B2 | 1/2011 | Hornik |
| 7,878,905 | B2 | 2/2011 | Weston |
| 7,896,740 | B2 | 3/2011 | Asher |
| 7,896,742 | B2 | 3/2011 | Weston |
| 7,905,777 | B2 | 3/2011 | Muir |
| 7,918,727 | B2 | 4/2011 | Roush |
| 7,918,737 | B2 | 4/2011 | Hirota |
| 7,922,586 | B2 | 4/2011 | Heckendorf, III |
| 7,942,735 | B2 | 5/2011 | Meyer |
| 7,980,942 | B2 | 7/2011 | Kane |
| 7,985,134 | B2 | 7/2011 | Ellis |
| 7,991,347 | B1 | 8/2011 | Chan |
| 8,029,361 | B2 | 10/2011 | Hardy |
| 8,047,907 | B2 | 11/2011 | Kane |
| 8,065,702 | B2 | 11/2011 | Goldberg |
| 8,075,407 | B2 | 12/2011 | Yamamoto |
| 8,088,000 | B2 | 1/2012 | Ginsberg |
| 8,089,458 | B2 | 1/2012 | Barney |
| 8,099,182 | B1 | 1/2012 | Kasten |
| 8,100,759 | B2 | 1/2012 | Hardy |
| 8,105,166 | B2 | 1/2012 | Cayce |
| 8,113,935 | B2 | 2/2012 | Walker |
| 8,118,658 | B2 | 2/2012 | Hughes |
| 8,118,667 | B2 | 2/2012 | Herrmann |
| 8,133,106 | B2 | 3/2012 | Englman |
| 8,142,283 | B2 | 3/2012 | Lutnick |
| 8,176,518 | B1 | 5/2012 | Junkin |
| 8,177,628 | B2 | 5/2012 | Manning |
| 8,177,644 | B2 | 5/2012 | Anderson |
| 8,184,097 | B1 | 5/2012 | Barney |
| 8,185,448 | B1 | 5/2012 | Myslinski |
| 8,185,819 | B2 | 5/2012 | Sah |
| 8,192,260 | B2 | 6/2012 | Fleming |
| 8,202,149 | B2 | 6/2012 | Gedling |
| 8,210,916 | B2 | 7/2012 | Ma |
| 8,210,931 | B2 | 7/2012 | Alderucci |
| 8,223,154 | B2 | 7/2012 | Hughes |
| 8,229,795 | B1 | 7/2012 | Myslinski |
| 8,231,453 | B2 | 7/2012 | Wolf |
| RE43,601 | E | 8/2012 | Arseneau |
| 8,239,310 | B2 | 8/2012 | Lortscher, Jr. |
| 8,239,891 | B2 | 8/2012 | Hughes |
| 8,241,100 | B2 | 8/2012 | Katz |
| 8,246,468 | B2 | 8/2012 | Anderson |
| 8,248,367 | B1 | 8/2012 | Barney |
| 8,262,465 | B2 | 9/2012 | Lutnick |
| 8,262,466 | B2 | 9/2012 | Anderson |
| 8,272,950 | B2 | 9/2012 | Rosenau |
| 8,272,961 | B2 | 9/2012 | Busey |
| 8,272,964 | B2 | 9/2012 | Van Datta |
| 8,292,720 | B2 | 10/2012 | Davis |
| 8,292,725 | B2 | 10/2012 | Wikander |
| 8,296,794 | B2 | 10/2012 | Hughes |
| 8,301,479 | B2 | 10/2012 | Bourne |
| 8,308,571 | B2 | 11/2012 | Sonn |
| 8,315,722 | B1 | 11/2012 | Russo |
| 8,328,644 | B2 | 12/2012 | Busey |
| 8,337,310 | B1 | 12/2012 | Bjordahl |
| 8,337,312 | B1 | 12/2012 | Jones |
| 8,342,929 | B2 | 1/2013 | Briggs |
| 8,342,947 | B2 | 1/2013 | Baerlocher |
| 8,342,959 | B2 | 1/2013 | Mahaffey |
| 8,348,737 | B2 | 1/2013 | Page |
| 8,353,763 | B2 | 1/2013 | Amaitis |

(56) References Cited

U.S. PATENT DOCUMENTS

| | | | |
|---|---|---|---|
| 8,353,772 B2 | 1/2013 | Callery | |
| 8,366,551 B2 | 2/2013 | Thomas | |
| 8,368,648 B2 | 2/2013 | Barney | |
| 8,373,659 B2 | 2/2013 | Barney | |
| 8,376,826 B2 | 2/2013 | Katz | |
| 8,384,668 B2 | 2/2013 | Barney | |
| RE44,095 E | 3/2013 | Sanchez | |
| 8,391,773 B2 | 3/2013 | Arseneau | |
| 8,391,774 B2 | 3/2013 | Arseneau | |
| 8,391,825 B2 | 3/2013 | Arseneau | |
| 8,398,489 B2 | 3/2013 | Lutnick | |
| 8,400,456 B2 | 3/2013 | Hughes | |
| 8,401,919 B2 | 3/2013 | Myslinski | |
| 8,403,748 B2 | 3/2013 | Anderson | |
| 8,403,758 B2 | 3/2013 | Hornik | |
| 8,417,626 B2 | 4/2013 | Crosthwaite | |
| 8,423,424 B2 | 4/2013 | Myslinski | |
| 8,425,300 B2 | 4/2013 | Kane | |
| 8,432,489 B2 | 4/2013 | Arseneau | |
| 8,435,107 B2 | 5/2013 | Englman | |
| 8,444,483 B2 | 5/2013 | Anderson | |
| RE44,323 E | 6/2013 | Goldberg | |
| 8,454,423 B2 | 6/2013 | Lutnick | |
| 8,457,545 B2 | 6/2013 | Chan | |
| 8,460,078 B2 | 6/2013 | Moore | |
| 8,460,110 B2 | 6/2013 | Costin | |
| 8,465,368 B2 | 6/2013 | Hardy | |
| 8,475,262 B2 | 7/2013 | Wolf | |
| 8,475,275 B2 | 7/2013 | Weston | |
| 8,480,471 B2 | 7/2013 | Lutnick | |
| 8,480,499 B2 | 7/2013 | Herrmann | |
| 8,490,128 B2 | 7/2013 | Davis | |
| 8,491,389 B2 | 7/2013 | Weston | |
| 8,498,924 B2 | 7/2013 | Crosthwaite | |
| 8,500,533 B2 | 8/2013 | Lutnick | |
| 8,500,537 B2 | 8/2013 | Walker | |
| 8,505,045 B2 | 8/2013 | Hughes | |
| 8,506,393 B2 | 8/2013 | Lutnick | |
| 8,509,929 B1 | 8/2013 | Hughes | |
| 8,512,133 B2 | 8/2013 | Hardy | |
| 8,512,134 B2 | 8/2013 | Hardy | |
| 8,512,143 B2 | 8/2013 | Jung | |
| 8,512,148 B2 | 8/2013 | Butz, Jr. | |
| 8,515,737 B2 | 8/2013 | Allen | |
| 8,516,473 B2 | 8/2013 | Lane | |
| 8,523,684 B2 | 9/2013 | Lutnick | |
| 8,528,036 B2 | 9/2013 | Davis | |
| 8,535,134 B2 | 9/2013 | Katz | |
| 8,538,563 B1 | 9/2013 | Barber | |
| 8,545,311 B2 | 10/2013 | Shore | |
| 8,549,416 B2 | 10/2013 | Ganz | |
| 8,556,723 B2 | 10/2013 | Jung | |
| 8,560,547 B2 | 10/2013 | Tocci | |
| 8,566,111 B2 | 10/2013 | Jung | |
| 8,574,055 B2 | 11/2013 | Odom | |
| 8,574,074 B2 | 11/2013 | Van Datta | |
| 8,579,686 B2 | 11/2013 | Abramoff | |
| 8,579,696 B2 | 11/2013 | Herrmann | |
| 8,583,509 B1 | 11/2013 | Myslinski | |
| 8,585,495 B2 | 11/2013 | Rosenau | |
| 8,608,535 B2 | 12/2013 | Weston | |
| 8,608,542 B2 | 12/2013 | Davis | |
| 8,613,653 B2 | 12/2013 | Hughes | |
| 8,613,673 B2 | 12/2013 | Perry | |
| 8,615,471 B2 | 12/2013 | Hannigan | |
| 8,622,793 B2 | 1/2014 | Ford | |
| 8,622,798 B2 | 1/2014 | Lockton | |
| 8,632,392 B2 | 1/2014 | Shore | |
| 8,632,394 B2 | 1/2014 | Muir | |
| 8,632,412 B2 | 1/2014 | Cooper | |
| 8,635,146 B2 | 1/2014 | Baggott | |
| 8,640,165 B2 | 1/2014 | Ellis | |
| 8,647,201 B1 | 2/2014 | Jehamy | |
| 8,851,981 B2 | 10/2014 | Ramsey | |
| 9,005,016 B2 | 4/2015 | Amaitis | |
| 9,589,418 B2 | 3/2017 | Givant | |
| 10,460,568 B2 | 10/2019 | Givant | |
| 11,270,556 B2 | 3/2022 | Givant | |
| 11,557,179 B2 | 1/2023 | Givant | |
| 2002/0107590 A1 | 8/2002 | Liegey | |
| 2003/0186744 A1 | 10/2003 | Bradell | |
| 2004/0192437 A1* | 9/2004 | Amaitis | G07F 17/3288 463/26 |
| 2005/0043094 A1 | 2/2005 | Nguyen | |
| 2006/0079312 A1 | 4/2006 | Penrice | |
| 2006/0252476 A1 | 11/2006 | Bahou | |
| 2007/0015562 A1* | 1/2007 | Smith | A63F 1/00 463/13 |
| 2007/0021165 A1 | 1/2007 | Ma | |
| 2007/0021214 A1 | 1/2007 | Ma | |
| 2007/0021853 A1 | 1/2007 | Ma | |
| 2007/0232393 A1* | 10/2007 | Dreyer | G07F 17/3288 463/29 |
| 2008/0051201 A1 | 2/2008 | Lore | |
| 2008/0064490 A1 | 3/2008 | Ellis | |
| 2008/0274782 A1 | 6/2008 | Schmidt | |
| 2008/0161113 A1 | 7/2008 | Hansen | |
| 2008/0280663 A1 | 11/2008 | Shar | |
| 2008/0287198 A1 | 11/2008 | Callery | |
| 2009/0054153 A1 | 2/2009 | Abekasis | |
| 2009/0149244 A1 | 6/2009 | Lutnick | |
| 2009/0170584 A1 | 7/2009 | Tan | |
| 2009/0197684 A1 | 8/2009 | Arezina | |
| 2009/0203412 A1 | 8/2009 | Gedling | |
| 2009/0215527 A1 | 8/2009 | Lipscomb | |
| 2010/0137057 A1 | 6/2010 | Fleming | |
| 2010/0184495 A1 | 7/2010 | Levy | |
| 2010/0252998 A1 | 7/2010 | Guidroz | |
| 2010/0197374 A1 | 8/2010 | Koivisto | |
| 2010/0203935 A1 | 8/2010 | Levy | |
| 2010/0203936 A1 | 8/2010 | Levy | |
| 2010/0279754 A1 | 11/2010 | Tanenbaum | |
| 2010/0279774 A1 | 11/2010 | Braig | |
| 2010/0285856 A1 | 11/2010 | Thomas | |
| 2010/0285857 A1 | 11/2010 | Anderson | |
| 2011/0034225 A1 | 2/2011 | Butz, Jr. | |
| 2011/0065489 A1 | 3/2011 | Fleischman | |
| 2011/0098093 A1 | 4/2011 | Amaitis | |
| 2011/0177856 A1 | 6/2011 | Rentis | |
| 2011/0183734 A1 | 7/2011 | Koivisto | |
| 2011/0244932 A1 | 10/2011 | Bowe | |
| 2011/0256913 A1 | 10/2011 | Ford | |
| 2011/0263318 A1 | 10/2011 | Agarwal | |
| 2012/0009984 A1 | 1/2012 | Amaitis | |
| 2012/0028718 A1 | 2/2012 | Barclay | |
| 2012/0064974 A1 | 3/2012 | Washington | |
| 2012/0142411 A1 | 6/2012 | Thompson | |
| 2012/0149473 A1 | 6/2012 | Moore | |
| 2012/0172123 A1 | 7/2012 | Beaulieu | |
| 2012/0202599 A1 | 8/2012 | Cohen | |
| 2012/0220375 A1 | 8/2012 | Williams | |
| 2012/0225724 A1 | 9/2012 | Barber | |
| 2012/0115585 A1 | 10/2012 | Goldman | |
| 2012/0270614 A1 | 10/2012 | Robinson | |
| 2012/0270615 A1 | 10/2012 | Jones | |
| 2012/0276964 A1 | 11/2012 | Jones | |
| 2012/0289344 A1 | 11/2012 | Welfringer | |
| 2013/0005419 A1 | 1/2013 | Sediq | |
| 2013/0005422 A1 | 1/2013 | Callery | |
| 2013/0273994 A1 | 10/2013 | Cobb | |
| 2013/0303268 A1 | 11/2013 | Miller | |
| 2013/0316818 A1 | 11/2013 | Earley | |
| 2013/0324237 A1 | 12/2013 | Adiraju | |
| 2014/0011573 A1 | 1/2014 | Amaitis | |
| 2014/0031105 A1 | 1/2014 | Givant | |
| 2014/0045595 A1 | 2/2014 | Baschnagel, III | |
| 2014/0094274 A1 | 4/2014 | Guinn | |
| 2014/0315623 A1 | 10/2014 | Bonavita | |
| 2014/0323191 A1 | 10/2014 | Caputo et al. | |
| 2015/0050988 A1 | 2/2015 | Nichols | |
| 2015/0170467 A1 | 6/2015 | Shore | |
| 2015/0209679 A1 | 7/2015 | Givant | |
| 2015/0325086 A1 | 11/2015 | Morrissette | |
| 2016/0133088 A1 | 5/2016 | Givant | |

(56) References Cited

U.S. PATENT DOCUMENTS

| | | | |
|---|---|---|---|
| 2017/0113147 A1 | 4/2017 | Lukasik | |
| 2018/0040192 A1 | 2/2018 | Thomas et al. | |
| 2019/0139357 A1 | 5/2019 | Katz et al. | |
| 2019/0188972 A1* | 6/2019 | Mitchell | G07F 17/3293 |
| 2020/0074809 A1 | 3/2020 | Givant | |
| 2021/0065516 A1 | 3/2021 | Warren | |
| 2021/0082254 A1 | 3/2021 | Givant | |
| 2022/0101683 A1 | 3/2022 | Elliott | |
| 2022/0165135 A1 | 5/2022 | Givant | |

OTHER PUBLICATIONS

International Search Report and Written Opinion received for PCT Patent Application No. PCT/US2021/060479, mailed on Feb. 8, 2022, 12 pages.

International Search Report and Written Opinion received for PCT Patent Application No. PCT/US2013/000168, mailed on Oct. 25, 2013, 19 pages.

McCarthy, Michael, "NFL to Offer Richest Fantasy Football Prize: $1 Million", USA Today. Feb. 2, 2012, Retrieved onOct. 16, 2012 from Internet, Available Online at <http://content.usatoday.com/communities/gameon/post/2012/02/nfl-to-offer-richest-fantasy-payday-ever-try-1-million-nfl-perfect-challenge-nflcom-super-bowl-xlvi-new-york-giants-new-england-patriots/1#.UrFUd7WcVT4>, 5 pages.

Tilman Sheets, Dealing with Oppositional Behavior, 1997, http://www.yourfamilyclinic.com/ODD/ODD.html.

Printyourbrackets.com, How to run a Round Robin Tournament, Nov. 28, 2010, http://www.printyourbrackets.com/howtoroundrobin.html.

International Preliminary Report on Patentability received for PCT Patent Application No. PCT/US2013/000168, mailed on Jun. 18, 2015, 9 pages.

International Search Report and Written Opinion received for PCT Patent Application No. PCT/US2016/068570, mailed on Jan. 19, 2017, 13 pages.

* cited by examiner

1ST PLACE - ADVANCING

Viktorious Secret 97.92 ^

| | | | | FANTASY POINTS | | | |
|---|---|---|---|---|---|---|---|
| PLAYER | POS | TEAM | OPP | BASE | PERCENT | ACTUAL | STATS |
| PEYTON MANNING | QB | DEN | @CIN | 16.44 | 100% | 16.44 | 311 PAYD, 2PATD, 4 INT |
| MARSHAWN LYNCH | RB | SEA | @ARI | 23.30 | 82% | 19.11 | 113 RUYD, 2 RUTD |
| EDDIE LACY | RB | GB | @TB | 16.90 | 91% | 15.38 | 99 RUYD, 1 RUTD, 1 RECPT, 5 REYD |
| DEMARYIUS THOMAS | WR | DEN | @CIN | 15.00 | 82% | 12.30 | 7 RECPT, 115 REYD |
| ODELL BECKHAM JR. | WR | NYG | @STL | 30.80 | 91% | 28.03 | 8 RECPT, 148 REYD, 2 RETD |
| ROB GRONKOWSKI | TE | NE | @NYJ | 12.10 | 55% | 6.66 | 6 RECPT, 31 REYD, 1 RETD |

FIG. 17

SPECIALIZED SLOT MACHINE FOR CONDUCTING A WAGERING FANTASY SPORTS TOURNAMENT

REFERENCE TO PRIORITY PATENT APPLICATIONS

The present application is a continuation-in-part (CIP) patent application of U.S. application Ser. No. 17/102,923, filed Nov. 24, 2020; which is a continuation-in-part (CIP) patent application of U.S. application Ser. No. 16/665,684, filed Oct. 28, 2019; which is a continuation application of U.S. application Ser. No. 15/437,125, filed Feb. 20, 2017, now U.S. Pat. No. 10,460,568; which is a continuation application of U.S. application Ser. No. 14/981,408, filed Dec. 28, 2015, now U.S. Pat. No. 9,589,418; which is a non-provisional continuation-in-part patent application claiming priority to application U.S. application Ser. No. 14/684,160, filed on Apr. 10, 2015, now abandoned; which is a non-provisional continuation-in-part patent application claiming priority to application U.S. application Ser. No. 13/945,628, filed on Jul. 18, 2013, now abandoned; which is a non-provisional patent application claiming priority to U.S. Appl. No. 61/741,463, filed on Jul. 19, 2012, now expired.

The present application is also a continuation-in-part (CIP) patent application of U.S. application Ser. No. 17/956,583, filed Sep. 29, 2022; which is a continuation-in-part (CIP) patent application of U.S. application Ser. No. 17/588,329, filed Jan. 30, 2022; which is a continuation patent application of U.S. application Ser. No. 16/665,684, filed Oct. 28, 2019; which is a continuation application of U.S. application Ser. No. 15/437,125, filed Feb. 20, 2017, now U.S. Pat. No. 10,460,568; which is a continuation application of U.S. application Ser. No. 14/981,408, filed Dec. 28, 2015, now U.S. Pat. No. 9,589,418; which is a non-provisional continuation-in-part patent application claiming priority to application U.S. application Ser. No. 14/684,160, filed on Apr. 10, 2015, now abandoned; which is a non-provisional continuation-in-part patent application claiming priority to application U.S. application Ser. No. 13/945,628, filed on Jul. 18, 2013, now abandoned; which is a non-provisional patent application claiming priority to U.S. Appl. No. 61/741,463, filed on Jul. 19, 2012, now expired.

The present patent application claims priority to the referenced patent applications, which are hereby incorporated by reference herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2012-2023, Philip Paul Givant, All Rights Reserved.

TECHNICAL FIELD

This patent application relates to gaming machines, slot machines, computer-implemented software, networked systems, and gaming systems according to one embodiment, and more specifically to a specialized slot machine for conducting a wagering fantasy sports tournament.

BACKGROUND

The gaming industry, casinos, and gambling venues have used gaming machines, such as slot machines, video poker machines, and the like for many years. Slot machines have proven to be very popular with players and profitable for the venue. Generally, the popularity of such machines with players is dependent on the possibility of winning money at the machine and the intrinsic entertainment value of the machine relative to other available gaming options. Players are usually attracted to the most entertaining and exciting machines, which are constructed with features and enhancements to attract frequent play and increase profitability for the operator. Therefore, there is a continuing need for slot machine manufacturers to continuously develop new games and improve gaming enhancements that will attract frequent play through enhanced entertainment value to the player. However, current gaming systems are based on the use of pre-defined sets of cards or displays (e.g., types of fruit, symbols, etc.) that form the content used in the wagering games implemented by the gaming systems. Casinos have been unable use these gaming systems to implement wagering games that are based on the use of variable content, real-time content, or live action content. Additionally, casinos have been unable to exploit an opportunity to enter the exploding fantasy sports market via traditional slot machines or other gaming systems that are designed to create games of intense, skill-based strategy.

As popular as fantasy sports has been over the last decade, there has been a huge void that nobody has been able to fill. Fantasy sports tournaments have never been able to create a process where an unlimited number of people can play without creating a lottery type of effect. A lottery effect is the very undesirable result of having so many fantasy players entered in a tournament that there is no longer enough room to have them play each other in head-to-head matchups. Unfortunately, the solution for tournaments with these types of spacing issues has always been to force the entire field to compete against each other simultaneously. This is never a good thing and is very discouraging for the competitors.

There are only two general formats available on the market for participating in fantasy tournaments. Within each tournament structure there are often different variables, but when they are stripped down to their bare essence, it comes down to two options. One of them creates the aforementioned lottery effect while the other does everything possible to avoid it. The one that avoids the lottery effect creates its own set of problems unique to itself. As far as tournament play is concerned, neither is a viable way for an unlimited number of players to enter without having to play the entire field at the same time. Some of the features of these two tournament paradigms along with some of their limitations are described below.

Format #1—Head-to-Head

Fantasy players are matched up against a single opponent to compete against for a given round. The fantasy player whose athletes score more combined fantasy points are declared the winner and their opponent is declared the loser. The won/lost records of these fantasy players are recorded. The better records receive special recognition. Duplication of athletes is not permitted in these tournaments. Often, leagues are actually built within the tournament structure. Fantasy players are allowed to remain in the tournament for quite some time even if they happen to be performing poorly. There is a selection process in place where fantasy players either bid on or draft athletes. Lineups are submitted from a very limited and well defined pool of athletes. They consist of athletes that a fantasy player has on their roster that they either drafted or bid on.

Head-to-Head Format Limitations

There are limits to the number of fantasy players that can play in these types of tournaments because of spacing issues. In other words, there are a finite number of slots available to allow people to consistently play head-to-head with each other over a relatively short season. When limits are placed on the number of people that can play, it triggers a very bad combination of events if the intent is to offer a monetary prize. The head-to-head format limits the amount of prize money that can be given out. This is because there aren't enough people paying an entry fee to support a large prize money pool. Compounding the problem is the high pricing strategy for entry fees which is often used to compensate for the limited number of fantasy players that are able to compete. This is done to create a larger pool for the prize money, but this strategy prices most fantasy sports enthusiasts out of participating.

Format #2—Lottery Effect

Some tournament formats operate as a lottery style tournament because the format mirrors what a lottery does. For example, millions of people can select the number "3" in a lottery and share that number. But, the number is meaningless unless that number is selected as one of the winning numbers and the other five or six numbers that the lottery player has are also selected as winning numbers. The same thing happens with fantasy sports lottery tournaments. Three million people might have the highest scoring athlete for a given day, week or month, but how many of them have that in combination with the next five or six highest scoring athletes? This is a very unlikely combination to have and is why this style of play mimics a lottery. The lottery effect format requires hundreds, thousands or even an unlimited number of entries to play each other simultaneously. Duplication of athletes is permitted because there aren't enough athletes to go around. This is the only way millions can play each other simultaneously. Tournaments are usually structured so that running point totals of fantasy players are compared on an ongoing basis. The goal is to have the highest running point total possible in the event that hundreds to millions of fantasy players are all competing against each other. Tournament structure always forces fantasy players to compete against the entire field. Sometimes it is for one day and sometimes it is for the whole season and sometimes it is something in between. Cumulative running point total separates the fantasy players rather than a won/lost record like with the head-to-head format. The top cumulative point scorers receive special recognition. Lineups are submitted from the entire pool of available athletes with little to no restrictions.

Lottery Effect Format Limitations

Fantasy players compete against the entire field simultaneously. Tournament format not conducive to charging an entry fee, although some do, because fantasy players are not optimistic they can beat out hundreds to millions of players at the same time for the high score. Generally considered an inferior format to the match play method because it is nothing more than an accumulated points system over a day, week, month or entire season and forces fantasy players to compete against the entire field at the same time.

Not all fantasy tournaments have every feature described in the two formats above. However, all of them though have enough of them in combination with one another to create insurmountable roadblocks for the type of tournament the applicant believes is needed to fill the hole in the industry. The only way around them is to seek non-traditional solutions. Ultimately, the goal is to create a vehicle so that an unlimited number of fantasy players can participate, without having to play the entire field simultaneously. Again, there isn't a single format currently in existence on the market that allows this to happen. The reason for this is that there are several non-obvious features that are required to make this happen.

The primary tournaments that have either been or are currently on the market are described below. In 2004, Payday Sports offered a million dollar prize to the winner of their fantasy football tournament. The entry fee was $3,600. Analysis—The tournament failed because even though the prize money was appropriate and the competitors weren't forced to play the entire field simultaneously, the entry fee was not conducive to attracting the masses.

In 2004, the Million Dollar Fantasy League held a fantasy football tournament that offered a one million dollar grand prize. The entry fee was $2,600. Analysis—This tournament failed for the same reason the Payday sports one did. The prize money was good, they also got it right by not forcing competitors to compete against the entire field, but once again, the entry fee was way too high.

In 2008, Fanball held a million dollar fantasy football tournament where the entry fee was $125. It failed in the second year because they were unable to pay the prize money. This tournament was a much better attempt at creating an entry fee that was conducive to attract the masses, but it still wasn't low enough. Consequently, it fared no better than the others because the price was still way too high for the average player and the tournament format was so structurally flawed they couldn't go any lower. Their primary issue was that they didn't have an understanding of how to create enough space for more fantasy players to enter. This became quite apparent by their use of a league format. Instead of eliminating poor performers to make room for more entries, they allowed them to remain in the tournament. The ramifications for doing it this way (along with some other strategic mistakes) resulted in the fact that they could not go any lower on the entry fee without making all the competitors compete against the entire field simultaneously. The bottom line is that even though Fanball tried entry fees that were significantly lower than previous attempts, their faulty methodology still forced them to keep them too high to attract the masses. More importantly, even if they had been able to attract the masses with their better pricing, they still didn't have a system in place to accommodate that many entries without offering a Lottery Effect format. The Fanball fiasco is one example of why the solutions to create an effective tournament format are not obvious.

FanDuel has been hosting a tournament for two years that they hope will eventually pay the winner one million dollars (in 2012 the winner received $150,000). Their entry fee is either $10 or $109. Analysis—FanDuel is a good illustration of how big money fantasy sports tournaments struggle with trying to avoid the Lottery Effect while at the same time trying to offer a big money grand prize. What they have created is a paradigm that offers two types of qualifying tournaments for a chance to compete in a 24 person tournament that crowns the winner with $150,000. For the $109 qualifier, they limit it to 250 people each week that it is run. For the $10 qualifier they cap it at just over 2,000 entries. The intent is to minimize the Lottery Effect by capping the number of people who can participate, but it is still creates a Lottery Effect when you have to be the best score in a large field to qualify. Moreover, the prize money to the winner is compromised and can never be in the multi-millions of dollars because they are creating caps for the number of people that can enter. The FanDuel format is a good example to illustrate the problem that currently exists. Nobody has been able to determine how to offer the multi-million dollar grand prize without forcing contestants to simultaneously play millions of people. FanDuel clearly is trying to address the issue, but because of their flawed strategies in creating their format, they offer BOTH the Lottery Effect and a less than desirable grand prize in their offering.

The National Fantasy Football Championship Primetime (NFFCP) is offering a $150,000 grand prize for the 2012 NFL™ season. Their entry fee is $1,500. Analysis—The prize money is not in the millions and the entry fee is way too high to attract the masses. The format limits the number of entries, because they haven't developed a tournament format that allows a large number of fantasy players to compete.

The National Fantasy Football Championship Classic (NFFCC) is offering a $75,000 grand prize for the 2012 NFL™ season. Their entry fee is $1,500. Analysis—The prize money is not in the millions and the entry fee is way too high to attract the masses. The format limits the number of entries, because they haven't developed a tournament format that allows a large number of fantasy players to compete.

The Fantasy Football Players Championship (FFPC) is offering a $200,000 grand prize for the 2012 NFL™ season. Their entry fee is $1,600. Analysis—The prize money is not in the millions and the entry fee is way too high to attract the masses. The format limits the number of entries, because they haven't developed a tournament format that allows a large number of fantasy players to compete.

The World Championship of Fantasy Football (WCFF) is offering a $200,000 grand prize for the 2012 NFL™ season. Their entry fee is $1,575. Analysis—The prize money is not in the millions and the entry fee is way too high to attract the masses. The format limits the number of entries, because they haven't developed a tournament format that allows a large number of fantasy players to compete.

SUMMARY

In various embodiments described herein, specialized slot machines for conducting wagering games using real time or live action event content via a computer system and/or a data network are disclosed. In other embodiments described herein, specialized slot machines for conducting fantasy sports tournaments via a computer system and/or a data network are disclosed. In general, this patent application relates to computer or network implemented specialized gaming systems and/or fantasy sports tournaments.

In various example embodiments, the computer or network implemented gaming system as described herein can be in data network communication with a plurality of user platforms. The user platforms can be client computing devices, mobile computing devices, mobile communication devices, or the like operated by gaming contestants or administrators. A host site or server can be used to execute the software and systems implementing the gaming structure as described herein. As such, the host site and the networked system become a special purpose computing platform particularly configured to support the computer or network implemented gaming system as described herein. The host site and the user platforms may communicate and transfer data and information in a data network environment via a wide area data network (e.g., the Internet). Various components of the host site can also communicate internally via a conventional intranet or local area network (LAN).

In the example embodiments, the computer or network implemented gaming system as described herein can be in data network communication with a plurality of contestants and other network resources. Contestants can represent the network locations of clients or client computing systems being managed by contestants, teams, gaming players, or other client users operating an embodiment as described herein. As described in more detail below, contestants or other users at a user platform can interact with a computer-generated user interface provided by the gaming system to participate in and communicate with the gaming system.

BRIEF DESCRIPTION OF THE DRAWINGS

The various embodiments are illustrated by way of example, and not by way of limitation, in the figures of the accompanying drawings in which:

FIG. 16 through FIG. 19 illustrate an example embodiment, implemented as a web application (app), which shows the basic elements of the user interface for implementing a fantasy sports tournament with multi-contestant small group rounds;

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

Figure 1:
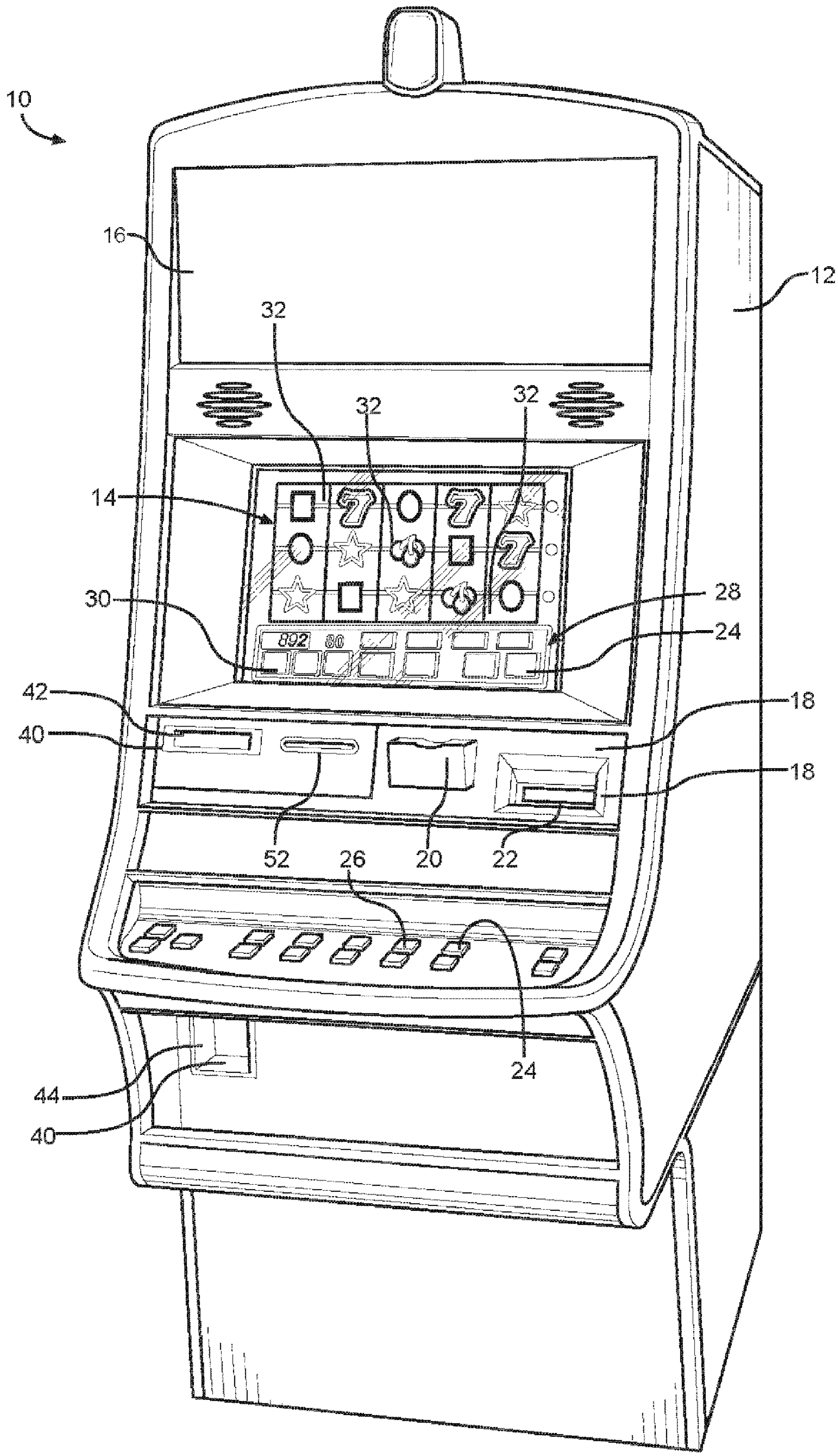
FIG. 1 is a perspective view of a free standing slot machine embodying the example embodiment.

An Example Embodiment Implemented as a Specialized Slot Machine, a Specialized Lottery Machine, or Other Specialized Gaming System for Conducting Wagering Games Using Real Time or Live Action Event Content Referring now to FIG. 1, a slot machine 10 can be used in gaming venues such as casinos. With regard to the example embodiments described herein, the slot machine 10 may be any type of slot machine and may have varying structures and methods of operation. For example, the slot machine 10 may be an electromechanical gaming machine configured to play mechanical slots, or it may be an electronic gaming machine configured to play a video casino game, such as slots, keno, poker, blackjack, roulette, etc. The slot machine 10 may also be an electromechanical lottery machine in an alternative embodiment.

The slot machine 10 comprises a housing 12 and includes input devices, including a value input device 18 and a player input device 24. For output the slot machine 10 includes a primary display 14 for displaying information about the basic wagering game. The primary display 14 can also display information about a bonus wagering game and a progressive wagering game. The slot machine 10 may also include a secondary display 16 for displaying game events, game outcomes, and/or signage information. While these typical components found in the slot machine 10 are described below, it should be understood that numerous other elements may exist and may be used in any number of combinations to create various forms of a slot machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, a barcode scanner, or a QR code scanner for reading information stored on a credit ticket, a card, or other tangible portable credit storage device. The credit ticket or card may also authorize access to a central account, which can transfer money to the slot machine 10.

The player input device 24 comprises a plurality of push buttons 26 on a button panel for operating the slot machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the slot machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game. In another implementation, a lever or handle on the side of the slot machine can be used by a user to provide input to the slot machine 10.

The various components of the slot machine 10 may be connected directly to, or contained within, the housing 12, as seen in FIG. 1, or may be located outboard of the housing 12 and connected to the housing 12 via a variety of different wired or wireless connection methods. Thus, the slot machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT) display, a high resolution liquid-crystal display (LCD), a plasma display, an LED (light emitting diode) display, or any other type of display suitable for use in the slot machine 10. As shown, the primary display 14 includes the touch screen 28 overlaying the entire display (or a portion thereof) to allow players to make game-related selections. Alternatively, the primary display 14 of the slot machine 10 may include a number of mechanical, electromechanical, or electronic reels to display the outcome in visual association with at least one payline 32. In the illustrated embodiment, the slot machine 10 is an "upright" version in which the primary display 14 is oriented vertically relative to the player. Alternatively, the slot machine may be a "slant-top" version in which the primary display 14 is slanted at about a thirty-degree angle toward the player of the slot machine 10.

A player begins play of the basic wagering game by making a wager via the value input device 18 of the slot machine 10. A player can select a type of play by using the player input device 24, via the buttons 26 or the touch screen keys 30. The basic game consists of a plurality of symbols arranged in an array, and includes at least one payline 32 that indicates one or more outcomes of the basic game. Such outcomes can be randomly selected in response to the wagering input by the player. As described in more detail below for various example embodiments, the outcomes can also be based on player input and real time or live action content retrieved by the slot machine 10 from a network information source. At least one of the plurality of outcomes determined by the slot machine 10 may be a start-bonus outcome, which can include any variations of symbols or symbol combinations triggering a bonus game.

In some embodiments, the slot machine 10 may also include a player information reader 52 that allows for identification (ID) of a player by reading a card with information indicating his or her true identity. The player information reader 52 is shown in FIG. 1 as a card reader, but may take on many forms including a ticket reader, barcode scanner, QR code scanner, RFID (radio-frequency identification) transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the slot machine 10. The slot machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
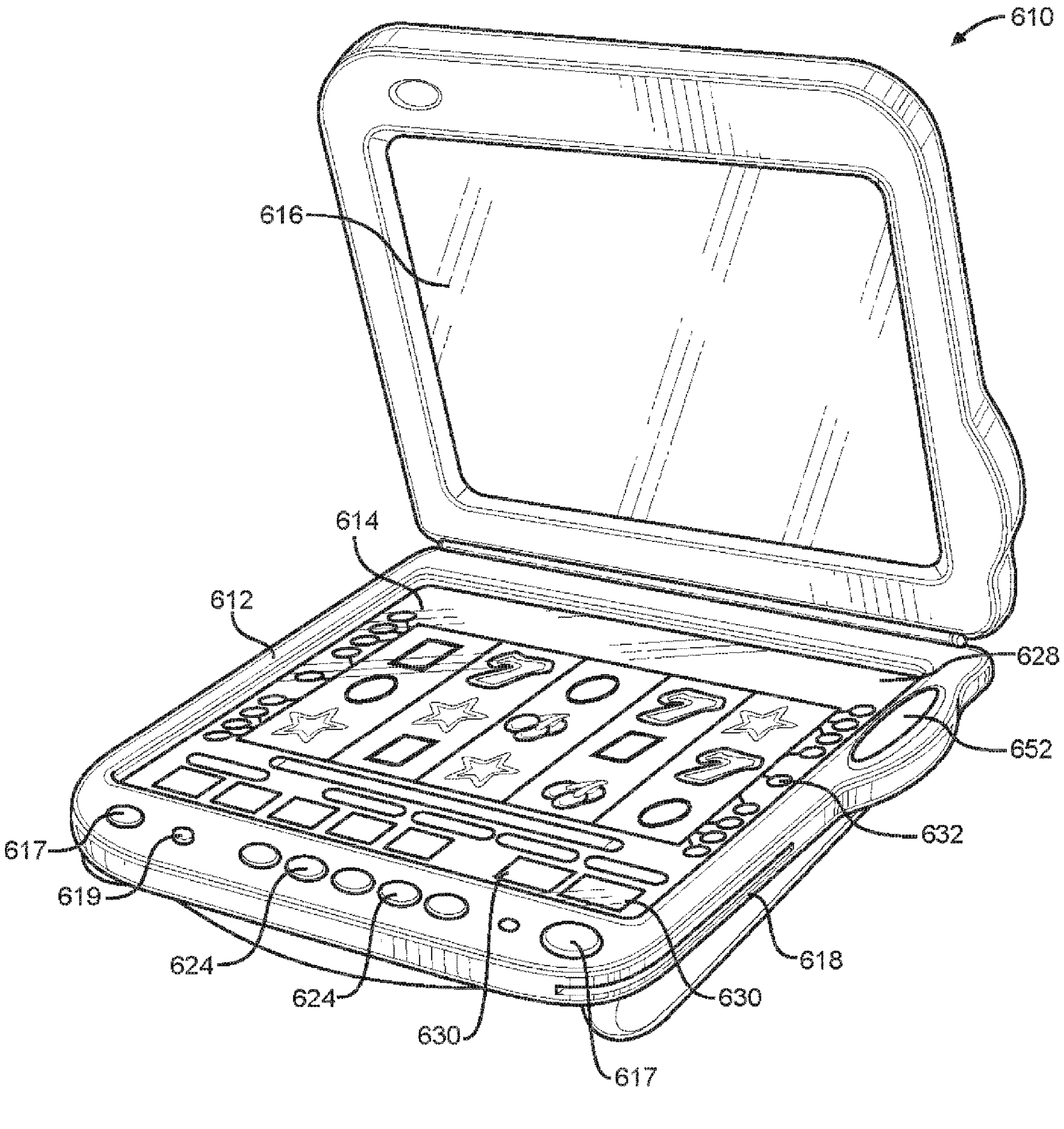
FIG. 2 is a perspective view of a handheld slot machine embodying the example embodiment.

Referring now to FIG. 2, a handheld or mobile slot machine 610 is illustrated. Like the free standing slot machine 10, the handheld slot machine 610 is preferably an electronic gaming machine configured to play a video casino game such as, but not limited to, blackjack, slots, keno, poker, blackjack, and roulette. The handheld slot machine 610 comprises a housing or casing 612 and includes input devices, including a value input device 618 and a player input device 624. For output the handheld slot machine 610 includes, but is not limited to, a primary display 614, a secondary display 616, one or more speakers 617, one or more player-accessible ports 619 (e.g., an audio output jack for headphones, a video headset jack, etc.), and other conventional input/output (I/O) devices and ports, which may or may not be player-accessible. In the embodiment depicted in FIG. 2, the handheld slot machine 610 comprises a secondary display 616 that is rotatable relative to the primary display 614. The optional secondary display 616 may be fixed, movable, and/or detachable/attachable relative to the primary display 614. Either the primary display 614 and/or secondary display 616 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld slot machine status.

The player-accessible value input device 618 may comprise, for example, a slot located on the front, side, or top of the casing 612 configured to receive credit from a stored-value card (e.g., casino card, smart card, debit card, credit card, etc.) inserted by a player. In another aspect, the player-accessible value input device 618 may comprise a sensor (e.g., an RF, radio frequency sensor) configured to sense a signal (e.g., an RF signal) output by a transmitter (e.g., an RF transmitter) carried by a player. The player-accessible value input device 618 may also or alternatively include a ticket reader, barcode scanner, or QR code scanner for reading information stored on a credit ticket, a card, or other tangible portable credit or funds storage device. The credit ticket or card may also authorize access to a central account, which can transfer money to the handheld slot machine 610.

Still other player-accessible value input devices 618 may require the use of touch keys 630 on the touch-screen display (e.g., primary display 614 and/or secondary display 616) or player input devices 624. Upon entry of player identification information and, preferably, secondary authorization information (e.g., a password, personal identification number (PIN), stored value card number, predefined key sequences, etc.), the player may be permitted to access a player's account. As one potential optional security feature, the handheld slot machine 610 may be configured to permit a player to only access an account the player has specifically set up for the handheld slot machine 610. Other conventional security features may also be utilized to, for example, prevent unauthorized access to a player's account, to minimize an impact of any unauthorized access to a player's account, or to prevent unauthorized access to any personal information or funds temporarily stored on the handheld slot machine 610.

The player-accessible value input device 618 may itself comprise or utilize a biometric player information reader, which permits the player to access available funds on a player's account, either alone or in combination with another of the aforementioned player-accessible value input devices 618. In an embodiment wherein the player-accessible value input device 618 comprises a biometric player information reader, transactions such as an input of value to the handheld device, a transfer of value from one player account or source to an account associated with the handheld slot machine 610, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 618 comprising a biometric player information reader may require a confirmatory entry from another biometric player information reader 652, or from another source, such as a credit card, debit card, player ID (identification) card, fob key, PIN (personal identification number), password, hotel room key, etc. Thus, a transaction may be enabled by, for example, a combination of the personal identification input (e.g., biometric input) with a secret PIN, or a combination of a biometric input with a fob input, or a combination of a fob input with a PIN, or a combination of a credit card input with a biometric input. Essentially, any two independent sources of identity, one of which is secure or personal to the player (e.g., biometric readings, PIN, password, etc.) could be utilized to provide enhanced security prior to the electronic transfer of any funds. In another aspect, the value input device 618 may be provided remotely from the handheld slot machine 610.

The player input device 624 comprises a plurality of push buttons on a button panel for operating the handheld slot machine 610. In addition, or alternatively, the player input device 624 may comprise a touch screen 628 mounted to a primary display 614 and/or secondary display 616. In one aspect, the touch screen 628 is matched to a display screen having one or more selectable touch keys 630 selectable by a user's touching of the associated area of the screen using a finger or a tool, such as a stylus pointer. A player enables a desired function either by touching the touch screen 628 at an appropriate touch key 630 or by pressing an appropriate push button 626 on the button panel. The touch keys 630 may be used to implement the same functions as push buttons 626. Alternatively, the push buttons may provide inputs for one aspect of the operating the game, while the touch keys 630 may allow for input needed for another aspect of the game. The various components of the handheld slot machine 610 may be connected directly to, or contained within, the casing 612, as seen in FIG. 2, or may be located outboard of the casing 612 and connected to the casing 612 via a variety of hardwired (tethered) or wireless connection methods. Thus, the handheld slot machine 610 may comprise a single unit or a plurality of interconnected parts (e.g., wireless connections) which may be arranged to suit a player's preferences.

The operation of the basic wagering game on the handheld slot machine 610 is displayed to the player on the primary display 614. The primary display 614 can also display the bonus game associated with the basic wagering game. The primary display 614 preferably takes the form of a high resolution LCD, a plasma display, an LED, or any other type of display suitable for use in the handheld slot machine 610. The size of the primary display 614 may vary from, for example, about a 2-3" display to a 15" or 17" display. In at least some aspects, the primary display 614 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 614 and/or secondary display 616 may have a 16:9 aspect ratio or other aspect ratio (e.g., 4:3). The primary display 614 and/or secondary display 616 may also each have different resolutions, different color schemes, and different aspect ratios.

As with the free standing slot machine 10, a player begins play of the basic wagering game on the handheld slot machine 610 by making a wager (e.g., via the value input device 618 or an assignment of credits stored on the handheld slot machine via the touch screen keys 630, player input device 624, or buttons 626) on the handheld slot machine 610. In at least some aspects, the basic game may comprise a plurality of symbols arranged in an array, and includes at least one payline 632 that indicates one or more outcomes of the basic game. Such outcomes can be randomly selected in response to the wagering input by the player. As described in more detail below for various example embodiments, the outcomes can also be based on player input and real time or live action content retrieved by the slot machine 610 from a network information source. At least one of the plurality of outcomes determined by the slot machine 610 may be a start-bonus outcome, which can include any variations of symbols or symbol combinations triggering a bonus game.

In some embodiments, the player-accessible value input device 618 of the handheld slot machine 610 may double as a player information reader 652 that allows for identification of a player by reading a card with information indicating the player's identity (e.g., reading a player's credit card, player ID card, smart card, etc.). The player information reader 652 may alternatively or also comprise a bar code scanner, RFID transceiver or computer readable storage medium interface. In one presently preferred aspect, the player information reader 652, shown by way of example in FIG. 2, comprises a biometric sensing device.

Figure 3:
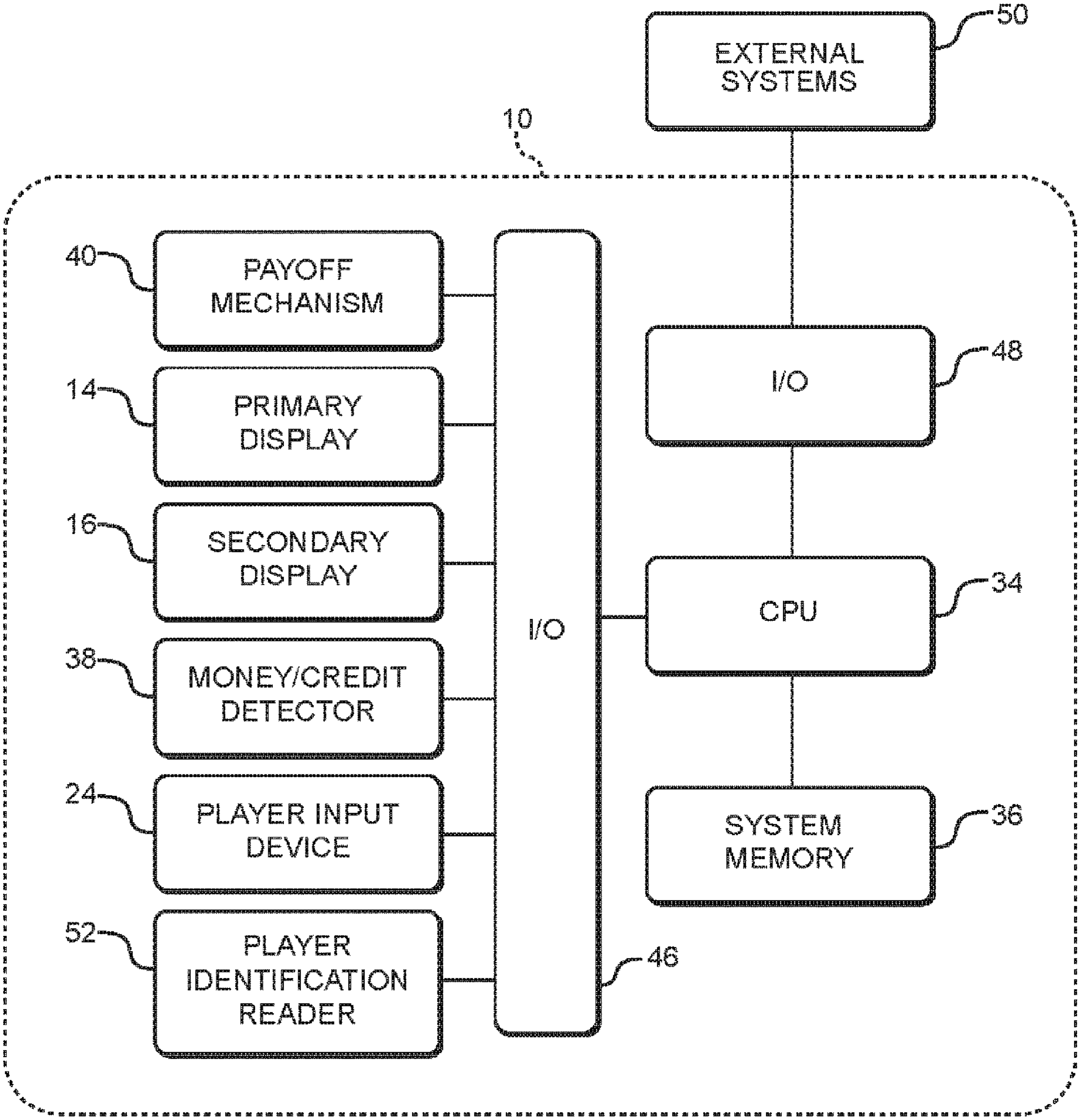
FIG. 3 is a block diagram of a control system in an example embodiment suitable for operating the slot machines of FIG. 1 and FIG. 2.

Turning now to FIG. 3, the various components of the slot machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 can perform the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the slot machine 10. However, as explained above, these components may be located outboard of the housing 12 and connected to the remainder of the components of the slot machine 10 via a variety of different wired or wireless connection methods.

As seen in FIG. 3, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 can be determined by one or more pay tables stored in the system memory 36.

Communications between the controller 34 and both the peripheral components of the slot machine 10 and external systems 50 occur through input/output (I/O) circuits 46, 48. More specifically, the controller 34 controls and receives inputs from the peripheral components of the slot machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, a central server, a central server database, Internet nodes/sites, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the slot machine 10 that may communicate with and/or control the transfer of data between the slot machine 10 and a bus, another computer, processor, or device and/or a service and/or a network. The controller 34 may comprise one or more controllers or processors. In FIG. 3, the controller 34 in the slot machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld slot machine 610 may be similar to the control system for the free standing slot machine 10 except that the functionality of the respective on-board controllers may vary.

The slot machines 10, 610 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the slot machine 10, 610 may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the slot machine 10, 610 processes display information to be displayed on the display(s) of the machine. In an alternative "rich client" configuration, the server determines game outcomes, while the controller 34 on board the slot machine 10, 610 executes game code and processes display information to be displayed on the display(s) of the machines. In yet another alternative "thick client" configuration, the controller 34 on board the slot machine 10, 610 executes game code, determines game outcomes, and processes display information to be displayed on the display(s) of the machine. Numerous alternative configurations are possible such that the aforementioned and other functions may be performed onboard or external to the slot machine 10, 610 as may be necessary for particular applications. It should be understood that the slot machines 10, 610 may take on a wide variety of forms such as a free standing machine, a portable or handheld device primarily used for gaming, a mobile telecommunications device such as a mobile telephone or personal digital assistant (PDA), a counter top or bar top gaming machine, or other personal electronic device such as a portable television, MP3 player, entertainment device, etc.

The above-described slot machines 10, 610 may be used to interact with a wagering game having outcomes that are based, at least in part, on real time or live action event content and related real time features. Various embodiments of these real time or live action wagering games implemented with real time features on slot machines 10, 610 are described in more detail below. The above-described slot machines 10, 610 may also be used to interact with wagering games having fantasy sports gaming features. Various embodiments of these fantasy sports wagering games implemented on slot machines 10, 610 are described in more detail below. The real time features and the fantasy sports gaming features may relate to, for example, a sporting event, a live event, a news event, a political event, social media trending topics, or any other real time or live action event or activity having statistical information that can be tracked. In the wagering games with real time features and fantasy sports gaming features as described herein, the decisions the players are making with the wagering game itself are based on events that are happening at the time the wagering game is being played. In embodiments in which the fantasy sports gaming feature relates to sporting events, various types of game play and wagering options may be provided as described in more detail below. For example, a user may be prompted to select particular players, positions, teams, etc. or to select from particular divisions, conferences, leagues, etc. In these embodiments, the fantasy sports gaming feature can monitor one or more tracked statistics and determine a resultant winner or winners as will be described in greater detail below with respect to FIG. 6 through FIG. 9.

The tracked statistics can be utilized to resolve the user's wager and may be tracked over a period of time. For example, the statistics used to resolve the user's wager may be tracked over a period of seconds, minutes, hours, days, weeks, months, or even years. The statistics may be tracked over a single play or group of plays, or over one or more innings, quarters, periods, halves, or races. Additionally or alternatively, the statistics may be tracked over a single game or group of games, a season or portion(s) thereof, or any time period desired by the operator.

Figure 4:
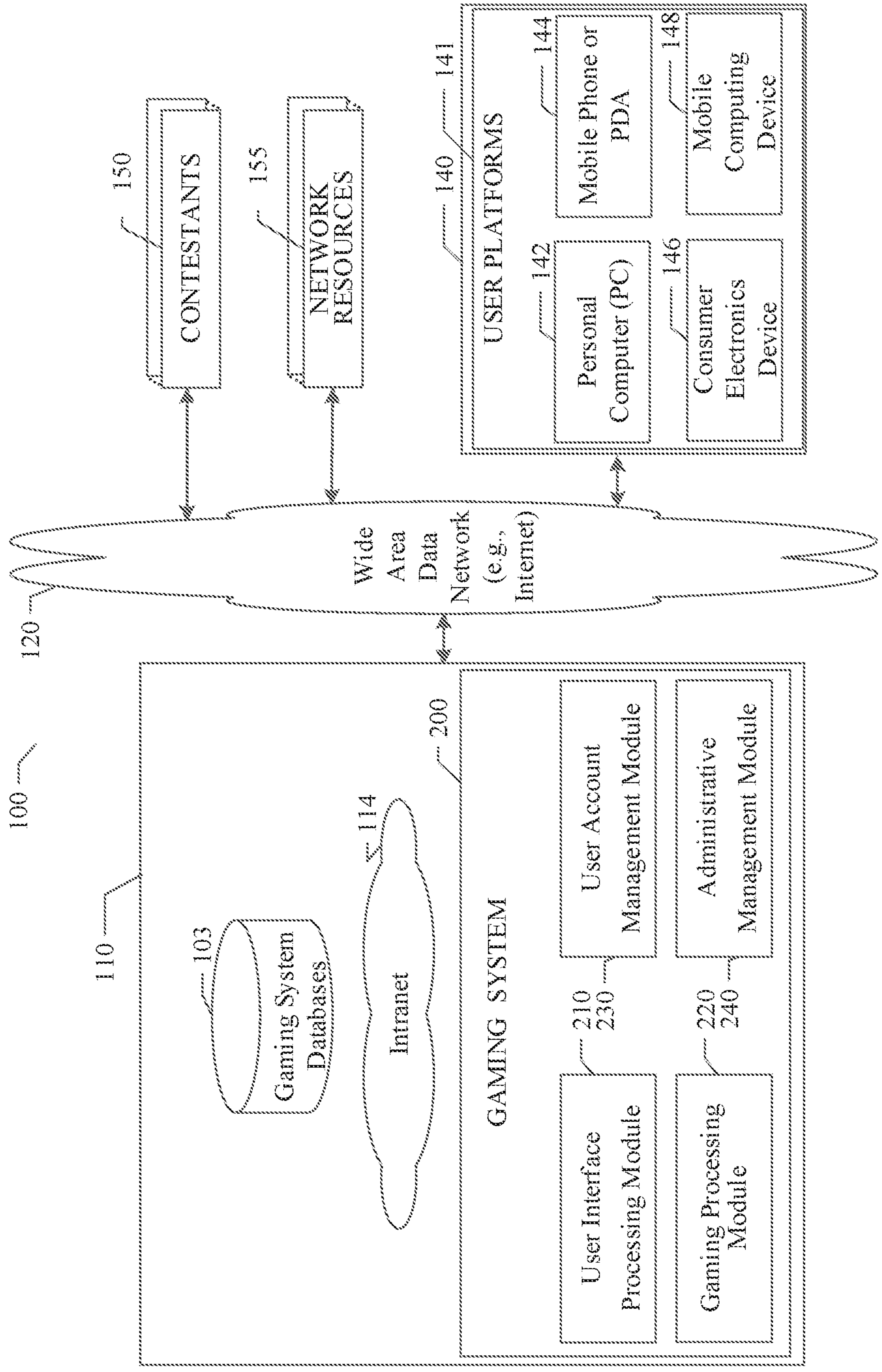
FIG. 4 illustrates an example embodiment of a gaming system in a network-enabled environment.

FIG. 4 illustrates an example embodiment 100 of a gaming system 200 in a network-enabled environment. Referring now to FIG. 4, in an example embodiment, the network-enabled gaming system environment 100 is disclosed. In various example embodiments, an application or service, typically provided by or operating on a host site (e.g., a website) 110, is provided to simplify and facilitate the downloading or hosted use of the gaming system 200 of an example embodiment. In a particular embodiment, the gaming system 200, or a portion thereof, can be downloaded from the host site 110 by a user at a user platform 140. Alternatively, the gaming system 200 can be hosted by the host site 110 for a networked user at a user platform 140. The details of the gaming system 200 of an example embodiment are provided herein.

Referring again to FIG. 4, the gaming system 200 can be in network communication with a plurality of user platforms 140. The user platforms 140 can be implemented as the slot machines 10, 610 described above. A client version of the gaming system 200 can also be implemented within each specialized slot machine 10, 610 itself. As such, the above-described slot machines 10, 610 may be used to interact with a wagering game, implemented within the slot machine 10, 610 itself or implemented by the gaming system 200, wherein the wagering game determines outcomes that are based, at least in part, on real time or live action event content and related real time features. Various embodiments of these real time or live action wagering games implemented with real time features on slot machines 10, 610 are described in more detail below. The above-described slot machines 10, 610 may also be used to interact with wagering games having fantasy sports gaming features. Various embodiments of these fantasy sports wagering games implemented on slot machines 10, 610 are described in more detail below. The host site 110 and user platforms 140 may communicate and transfer data and information in the data network environment 100 shown in FIG. 4 via a wide area data network (e.g., the Internet) 120. Various components of the host site 110 can also communicate internally via a conventional intranet or local area network (LAN) 114.

In an example embodiment, the gaming system 200 can also be in network communication with a plurality of contestants 150 and a plurality of network resources 155. Contestants 150 can represent the network locations of clients or client computing systems being managed by contestants, players, teams, tournament players, or other client users operating an embodiment described herein. For example, in a particular embodiment of the fantasy sports tournament platform as shown in FIG. 4, contestants 150 can represent the network locations of clients or client computing systems of tournament participants, contestants, teams, tournament players, brokers, dealers, agents, or the like. Contestants 150 can participate using the user platforms 140, which can be implemented as the slot machines 10, 610 described above. Contestants 150 can interact with the user interface provided by the gaming system 200 to participate in a real time or live action wagering game and/or a fantasy sports tournament. Network resources 155 can represent the network locations of sources of information related to the real time or live action wagering game and/or the fantasy sports tournament, such as real time event information, real time news information, real time political or social media information, actual team or athlete information, document sources, photos, maps, reviews, statistics, venue information, publications, articles, or other related information associated with the real time or live action wagering game and/or the fantasy sports tournament of the example embodiment.

Networks 120 and 114 are configured to couple one computing device with another computing device. Networks 120 and 114 may be enabled to employ any form of computer readable media for communicating information from one electronic device to another. Network 120 can include the Internet in addition to LAN 114, wide area networks (WANs), direct connections, such as through an Ethernet port or a universal serial bus (USB) port, other forms of computer-readable media, or any combination thereof. On an interconnected set of LANs, including those based on differing architectures and protocols, a router and/or gateway device can act as a link between LANs, enabling messages to be sent between computing devices. Also, communication links within LANs may include optical fiber data lines, twisted wire pairs or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), optical fiber, wireless links including satellite links, or other communication links known to those of ordinary skill in the art. Furthermore, remote computers and other related electronic devices can be remotely connected to either LANs or WANs via a wireless link, WiFi, BLUETOOTH™, satellite, or modem and temporary telephone link.

Networks 120 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 120 and 114 may also include an autonomous system of terminals, gateways, routers, and the like connected by wireless radio links or wireless transceivers. These connectors may be configured to be moved freely and randomly and to organize themselves arbitrarily, such that the topology of networks 120 and 114 may change rapidly and arbitrarily.

Networks 120 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, networks 120 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 120 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, networks 120 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The gaming system in various example embodiments can be implemented using any form of network transportable digital data. The network transportable digital data can be transported in any of a group of data packet or file formats, protocols, and associated mechanisms usable to enable a host site 110 and a user platform 140 to transfer data over a network 120. In one embodiment, the data format for the user interface can be HyperText Markup Language (HTML). HTML is a common markup language for creating web pages and other information that can be displayed in a web browser. In another embodiment, the data format for the user interface can be Extensible Markup Language (XML). XML is a markup language that defines a set of rules for encoding interfaces or documents in a format that is both human-readable and machine-readable. In another embodiment, a JSON (JAVASCRIPT™ Object Notation) format can be used to stream the interface content to the various user platform 140 devices. JSON is a text-based open standard designed for human-readable data interchange. The JSON format is often used for serializing and transmitting structured data over a network connection. JSON can be used in an embodiment to transmit data between a server, device, or application, wherein JSON serves as an alternative to XML. The Hypertext Transfer Protocol (HTTP) or secure HTTP (HTTPS) can be used as a network data communication protocol.

In a particular embodiment, a user platform 140 with one or more client devices 141 enables a user to access data and provide data and/or instructions for the gaming system 200 via the host 110 and network 120. Client devices 141 may include virtually any computing device that is configured to send and receive information over a data network, such as network 120. Such client devices 141 may include portable devices 144, such as, cellular telephones, smart phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. Client devices 141 may also include other computing devices, such as personal computers 142, multiprocessor systems, microprocessor-based or programmable consumer electronics, network PC's, and the like. Client devices 141 may also include other processing devices, such as consumer electronic (CE) devices 146 and/or mobile computing devices 148, which are known to those of ordinary skill in the art. As such, client devices 141 may range widely in terms of capabilities and features. For example, a client device configured as a cell phone may have a numeric keypad and a few lines of monochrome LCD (liquid-crystal display) display on which only text may be displayed. In another example, a web-enabled client device may have a touch sensitive screen, a stylus, and many lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JAVASCRIPT™, EXtensible HTML (xHTML), Compact HTML (CHTML), and the like, to display and/or send digital information. In other embodiments, mobile devices can be configured with applications (apps) with which the functionality described herein can be implemented.

Client devices 141 may also include at least one client application that is configured to send and receive content data or/or control data from another computing device via a wired or wireless network transmission. The client application may include a capability to provide and receive textual data, graphical data, video data, audio data, and the like. Moreover, client devices 141 may be further configured to communicate and/or receive a message, such as through an email application, a Short Message Service (SMS), direct messaging (e.g., TWITTER™), Multimedia Message Service (MMS), instant messaging (IM), internet relay chat (IRC), mIRC, JABBER, Enhanced Messaging Service (EMS), text messaging, Smart Messaging, Over the Air (OTA) messaging, or the like, between another computing device, and the like.

As one option, the gaming system 200, or a portion thereof, can be downloaded to a user device 141 of user platform 140 and executed locally on a user device 141. The downloading of the gaming system 200 application (or a portion thereof) can be accomplished using conventional software downloading functionality. As a second option, the gaming system 200 can be hosted by the host site 110 and executed remotely, from the user's perspective, on host system 110. In one embodiment, the gaming system 200 can be implemented as a service in a service-oriented architecture (SOA) or in a Software-as-a-Service (SAAS) architecture. In any case, the functionality performed by the gaming system 200 is as described herein, whether the application is executed locally or remotely, relative to the user.

Referring again to FIG. 4, the host site 110 of an example embodiment is shown to include a gaming system database 103. The network-accessible central database 103 is used in an example embodiment for data storage of real time event data, tournament data, player or contestant data, group data, award or prize data, configuration data, scheduling data, reporting data, and the like. Database 103 can be in data communication with the gaming system 200 directly or via intranet 114. It will be apparent to those of ordinary skill in the art that the database 103 can represent multiple datasets and can be used for the storage of a variety of data in support of the gaming system 200 of an example embodiment.

Referring again to FIG. 4, host site 110 of an example embodiment is shown to include the gaming system 200. The gaming system 200 can include a User Interface Processing Module 210, a Gaming Processing Module 220, a User Account Management module 230, and an Administrative Management module 240. Each of these modules can be implemented as software components executing within an executable environment of the gaming system 200 operating wholly or in part on host site 110 or user platform 140. Each of these modules of an example embodiment is described in more detail herein in connection with the figures provided herein.

Referring again to FIG. 4, the gaming system 200 of an example embodiment is shown to include a User Interface Processing Module 210. The User Interface Processing Module 210 is responsible for receiving input from a user, contestant, player, tournament player, team, or a network-connectible device, the input corresponding to the selections, parameters, commands, or other wagering game or tournament inputs received from a contestant 150, and for displaying wagering game or tournament data to a user, contestant, player, tournament player, team, or other client user via any of the user interface platforms 141 described above. From the contestants 150, the User Interface Processing Module 210 can receive their contestant-specific information, wagering game selections, athlete or fantasy player selections, and other contestant information associated with the wagering game or tournament and particular rounds in which the contestant is playing. The details of the interactions between the contestants in the wagering game or tournament are described in more detail herein. This contestant-related information can be used to create contestant status records for each contestant of a plurality of contestants 150. The contestant status records can be retained in the network-accessible central data repository 103 and shared with the Gaming Processing Module 220.

Although the various user interface displays provided by the example embodiments described herein are nearly infinitely varied, the descriptions of the user interface displays and sequences are provided herein to describe various features of the disclosed embodiments. These user interface displays and sequences are described herein with reference to example embodiments. It will be apparent to those of ordinary skill in the art in view of the disclosure herein that equivalent user interface displays and sequences can be implemented within the scope of the inventive subject matter disclosed and claimed herein.

Referring again to FIG. 4, the gaming system 200 of an example embodiment is shown to include a Gaming Processing Module 220. The Gaming Processing Module 220 is responsible for managing the operation of the wagering game or fantasy sports tournament and the plurality of rounds played therein. The Gaming Processing Module 220 manages the wagering game contestants and groups of contestants in the fantasy sports tournament, obtains real time and live action event data via the network, calculates contestant standings, records contestant statistics, promotes winning contestants to advanced rounds, and determines the overall winner of the wagering game or fantasy sports tournament. The Gaming Processing Module 220 can also provide notifications to contestants of the wagering game or fantasy sports tournament. The details of the wagering game and fantasy sports tournament operation, the provisioning of contestant groups, the management of multi-contestant rounds, and the management of contestants in the wagering game or fantasy sports tournament are described in more detail herein.

Referring again to FIG. 4 and as described above, a user platform 141 can include a mobile device on which a mobile application (app) can be executed. An example embodiment, implemented as a mobile device app, can be used to support a mobile device user interface for the gaming system 200 of an example embodiment. It will be apparent to those of ordinary skill in the art that other embodiments can also be implemented as a web application (app) with one or more webpages or other types of user interfaces. A mobile version of an example embodiment provides a user-friendly interface from which the user can easily view the relevant contestant/client information from a mobile device. As described in more detail herein, a mobile software application (app) embodying a mobile version of an example embodiment as described herein can be installed and executed on a mobile device, such as a smart phone, laptop computer, tablet device, or the like. In an example embodiment, a splash screen appears whenever the user opens or launches the mobile application on the mobile device. This splash screen can display a host logo and wallpaper image while opening the login screen or a live feed of processed client information.

User log-in functionality in the web application or the mobile app provides a user-friendly user interface in which the user can provide identifying information (e.g., an email address and password) associated with the user account. If the user does not have an account, the user can create an account from this user interface. The process of creating a user account in an example embodiment only requires the user to provide the identifying information (e.g., name, surname, e-mail address, and password). By completing this information, the user can create an account and get access to tournament and contestant information.

Referring again to FIG. 4, the gaming system 200 of an example embodiment is also shown to include a user account management module 230. The user account management module 230 can be used to create and maintain a user account on the host site 110. The user account management module 230 can also be used to configure user settings, create and maintain a client/user profile on host site 110, and otherwise manage user data and operational parameters on host site 110. In the example embodiment described herein, a user can register as an identified contestant in order to share wagering game or fantasy sports tournament information, receive wagering game or fantasy sports tournament information and communications, or interact with other wagering game or fantasy sports tournament-related content or other contestants. The registered user can enter their identifying information during a log-in phase and thereafter can share wagering game or fantasy sports tournament-related content and interact with other contestants.

Referring again to FIG. 4, the gaming system 200 of an example embodiment is shown to include an administrative management module 240. The administrative management module 240 can be used by an agent or administrator of the gaming system 200 to manage user accounts, configure system features, and to manage the operation and configuration of the gaming system 200. The administrative management module 240 can also be used to enforce privacy protections and tournament controls for contestants. Moreover, the administrative management module 240 can also be used to generate and/or process a variety of analytics associated with the operation of the gaming system 200. For example, the administrative management module 240 can generate various statistical models that represent the activity of the community of contestants throughout the wagering game or fantasy sports tournament. These analytics can be shared, licensed, or sold to others.

Figure 5:
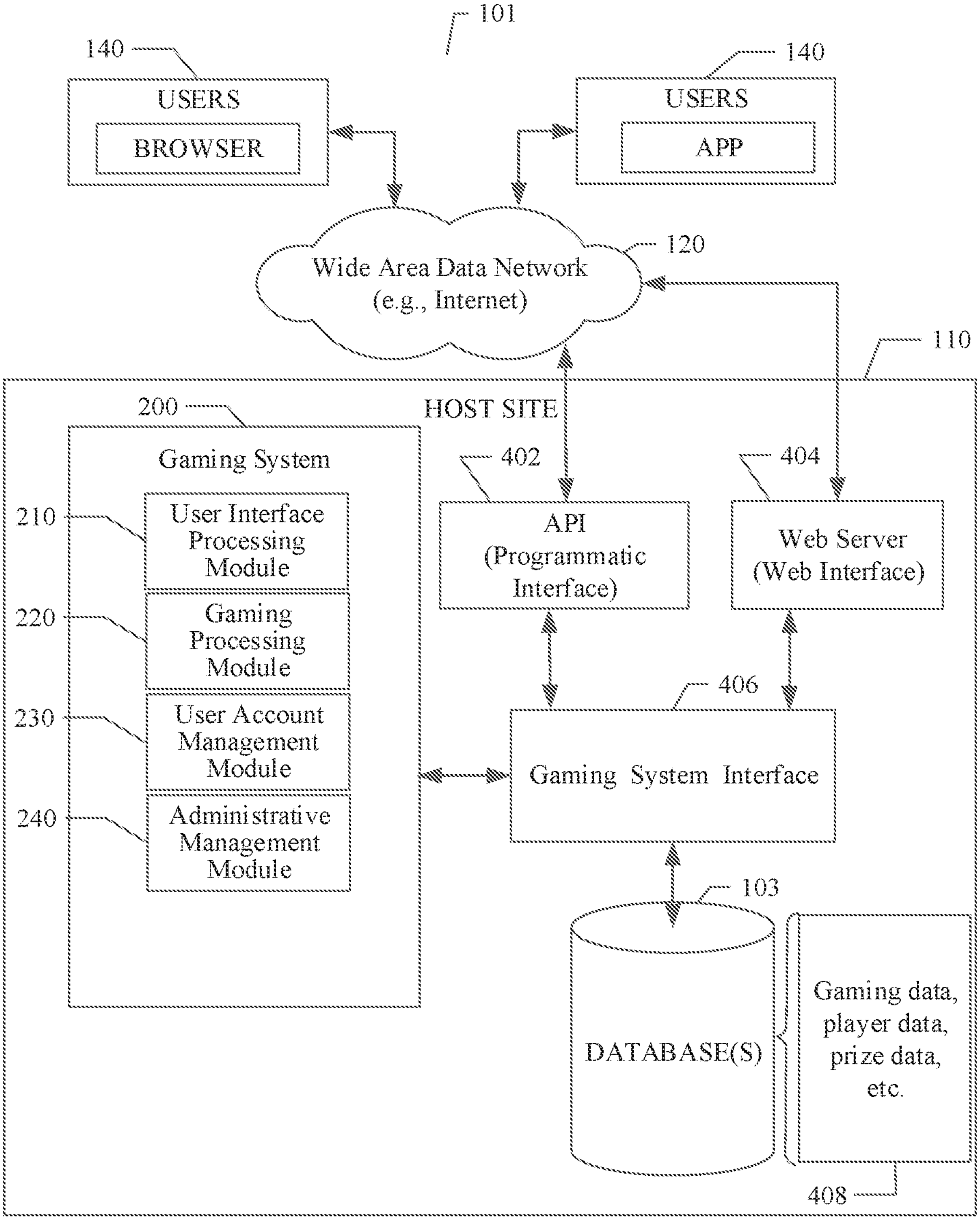
FIG. 5 illustrates another example embodiment of a networked system in which various embodiments may operate.
Figure 6:
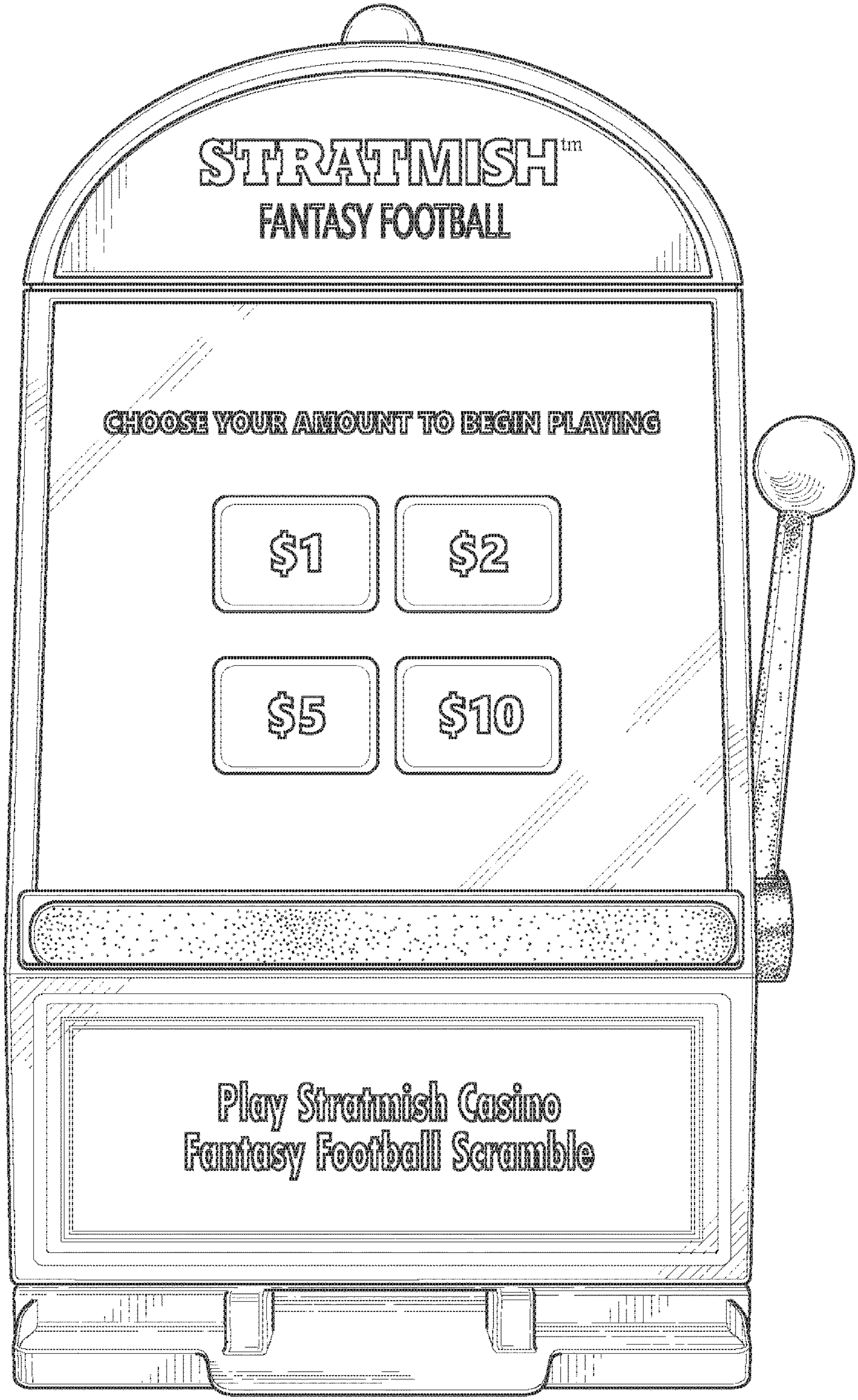
FIG. 6 through FIG. 9 illustrate an example embodiment, implemented as a specialized slot machine, which shows the basic elements of the user interface for implementing a fantasy sports tournament with multi-contestant small group rounds on the specialized slot machine.
Figure 7:
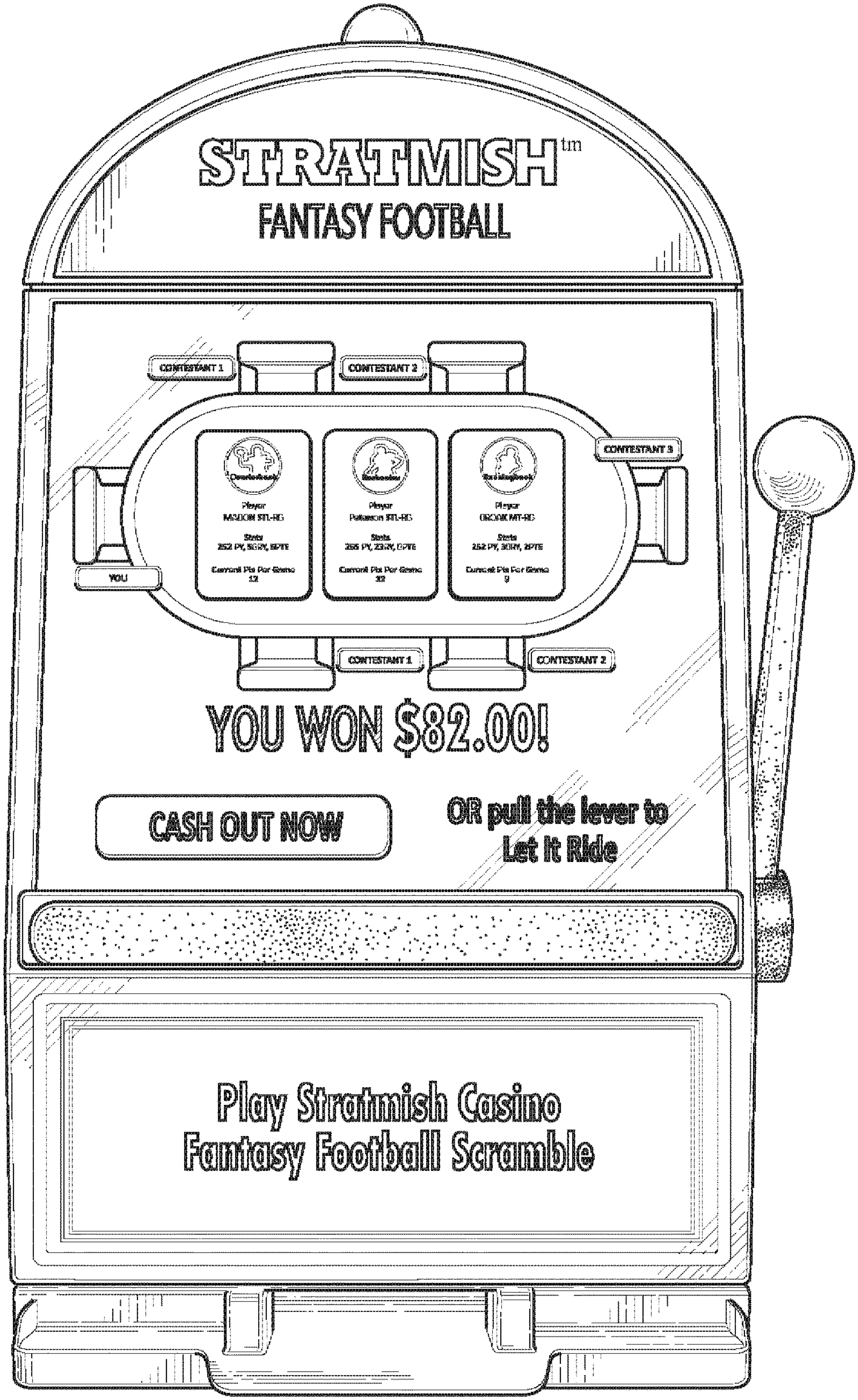
Figure 8:
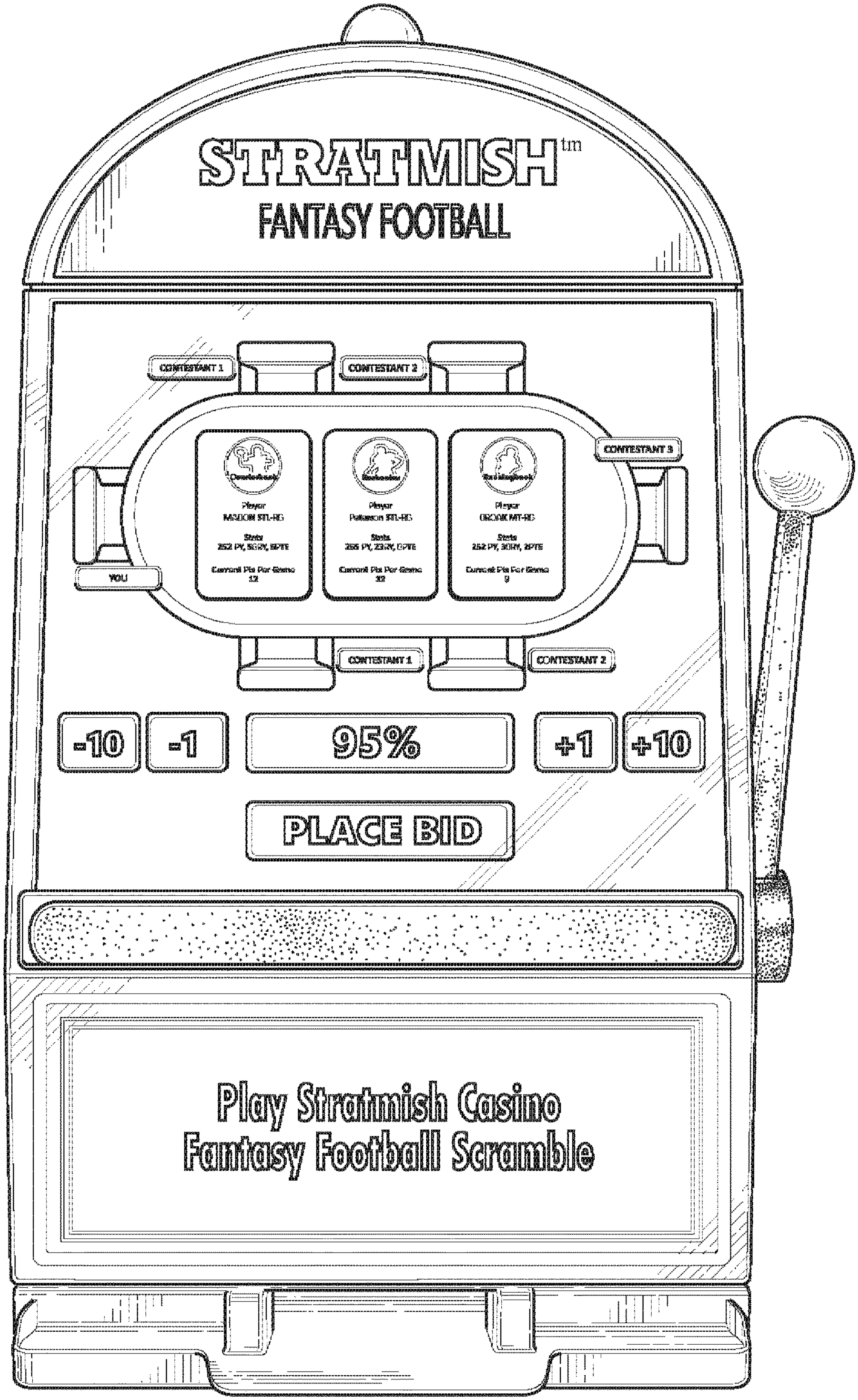

Referring now to FIG. 5, another example embodiment 101 of a networked system in which various embodiments may operate is illustrated. In the embodiment illustrated, the host site 110 is shown to include the gaming system 200. The gaming system 200 is shown to include the functional components 210 through 240, as described above. In a particular embodiment, the host site 110 may also include a web server 404, having a web interface with which users may interact with the host site 110 via a user interface or web interface. The host site 110 may also include an application programming interface (API) 402 with which the host site 110 may interact with other network entities on a programmatic or automated data transfer level. The API 402 and web interface 404 may be configured to interact with the gaming system 200 either directly or via an interface 406. The gaming system 200 may be configured to access a data storage device 103 and data 408 therein either directly or via the interface 406.

The Processes, Formats, and User Interfaces Used in a Fantasy Sports Tournament on the Specialized Slot Machine of an Example Embodiment FIG. 6 through FIG. 9 illustrate an example embodiment, implemented as a specialized slot machine, which shows the basic elements of the user interface for implementing a fantasy sports tournament with multi-contestant small group rounds on the specialized slot machine. The user interface can be used to implement the fantasy sports slot machine format of an example embodiment. The following description provides a general overview of the specialized slot machine format in an example embodiment.

Fantasy sports specialized slot machines, as described herein, are placed in casinos or other venues throughout the world. These specialized slot machines can be programmed to play whatever fantasy sport a contestant desires to play.

These specialized slot machines are linked to a central network-accessible database so that contestants competing in a given “group game” can be playing in different casinos/venues throughout the world. In other words, if a person sits down in the MGM™ in Las Vegas, they don’t have to sit and wait until their group of six people is filled by people sitting in that particular MGM™ casino. The other five players competing against them can be sitting in casinos/venues anywhere in the world.

Contestants sit at their own individual fantasy sports specialized slot machine/terminal as described herein. They are given the choice to enter for $1, $5, $20, $50 and $100 contests (or any other entry amount that casinos/venues find attractive for a slot machine).

Figure 9:
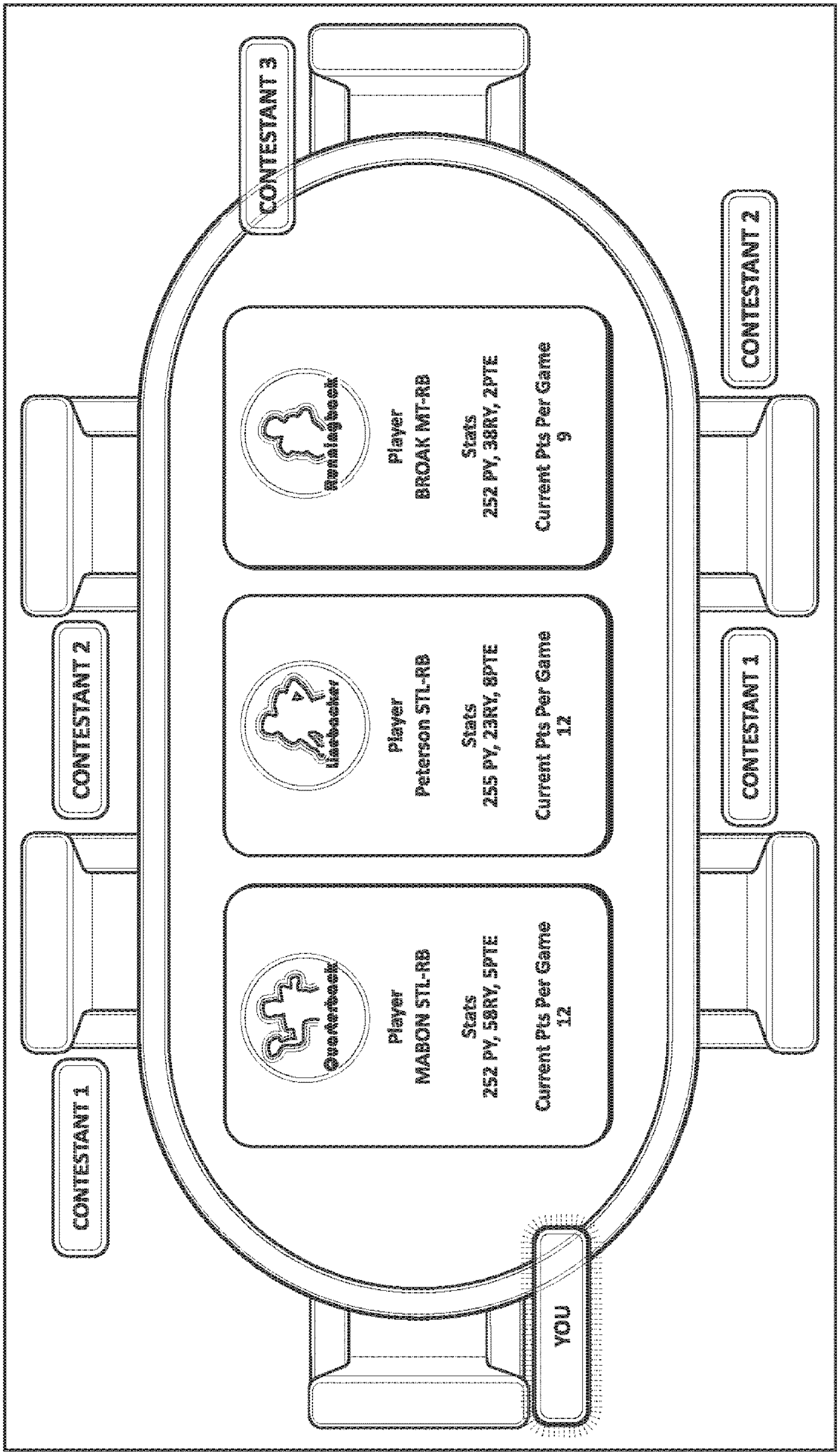

When a contestant looks at the display screen of the fantasy sports specialized slot machine/terminal, they will see an image on the display screen, as presented by the user interface logic of an example embodiment described herein, showing a virtual card table with six places (e.g., see FIG. 9). The contestant at the fantasy sports specialized slot machine/terminal will be one of the players occupying one of these six places at the virtual card table presented by the specialized slot machine/terminal.

The contestant puts an amount of money into the specialized slot machine/terminal corresponding to the level of play at which they want to participate. For example, the contestant might put $1 in for the dollar game, $10 in for the ten dollar game, or $20 in for the twenty dollar game, to enter the game.

The contestant then pulls down the handle (or activates a lever or pushes a button on the user interface of the specialized slot machine/terminal) and the specialized slot machine/terminal starts generating a variety of enticing and entertaining graphics that flash around until the contestant has a full group of six other players to play against (who are also playing for the same entry amount). Because the game will fill quickly with players, the graphic display generations, which take about five seconds, will take longer than the time needed to fill a live group of players, which will happen immediately, because the game and the players are linked to casinos/venues throughout the country/world (e.g., geographically distributed).

Groups are always comprised of six contestants in an example embodiment.

The other five contestants, who will fill the remaining five places at the virtual card table presented by the specialized slot machine/terminal, will be anonymous on the display screen in front of a given contestant. The user interface logic will configure the user interface of the example embodiment for each player to identify the different player positions as “YOU”, “Contestant #1”, “Contestant #2”, etc. (see FIG. 9).

The contestants will be instructed by the user interface of the example embodiment that they will see three fantasy sports athletes.

The contestants will be advised that in lieu of live action scoring, each athlete’s current fantasy sports points per game average will be used as the fantasy score benchmark for each one of them. If these athletes are competing in a sport not in season, their fantasy point game average from the previous season will be used.

For every group of six competing contestants, the top scoring two contestants in each of these groups are considered winners. There is no distinction between finishing first and second. The top scoring two contestants are both winners and are eligible for the same prize if they choose to cash out.

These two top scoring winners for each group have one of two options. The two top scoring winners can either: 1) cash out by pressing a button (or activating a virtual object on the user interface of the specialized slot machine/terminal) that cashes them out and automatically doubles their money, or 2) they can choose to "let it ride" by pulling the handle (or activating a lever or pushing a button on the user interface of the specialized slot machine/terminal) to form a new group with five other new contestants and try to re-double their money by playing in a new round.

The bottom scoring four contestants of a group are eliminated and lose their money. The bottom scoring four contestants can either leave the specialized slot machine or put more money into the specialized slot machine to play again by playing in a new group of six contestants.

The casino/venue provides powerful motivation in two directions for winning contestants to stay in for another round instead of cashing out. First, winning contestants can "let it ride" and attempt to redouble their money each time they stay in instead of cashing out. Secondly, the specialized slot machine experience of the example embodiment offers another huge incentive for people to stay in. Any contestant who advances ten consecutive times will play in a Tournament of Champions (TOC) sponsored by the casino/venue in which they are playing.

The TOC usually occurs during the playoffs during a given sports real live action playoffs. The TOC's format can use traditional live action fantasy sports or can be conducted the same way that the specialized slot machines operate by using fantasy point per game averages.

The rationale for offering TOC is to provide a huge incentive for contestants to not cash out and to continue playing on the specialized slot machines. The TOC pays out millions of dollars to the winner and other top finishers and is a very attractive incentive for people to try and qualify for (and therefore not cash out).

For clarification purposes, even though contestants might be playing people assigned by a managing entity from other casinos/venues, this doesn't mean that this is a coordinated multi-casino TOC. Each casino/venue hosts their own TOC, which can be run directly from their website, off their own slot machines, or could even be live action in their casino/venue.

The reason casinos are motivated to have contestants NOT cash out is because each time the contestant lets it ride into another round, the percentage of the money the casino/venue takes in goes up significantly. For example, if the two winners from every group always cashed out, the casino would receive a standard 33% of the revenue. If, however, players never cashed out and always let it ride, by round ten the casinos/venues would always receive a staggering 98.3% of the revenue.

The following table shows an example of the casino vs. contestant revenue split depending on the round from which contestants decide to cash out:

| Round | Casino Take | Player Take |
|---|---|---|
| 1 | 33% | 67% |
| 2 | 55.6% | 44.4% |
| 3 | 70.4% | 29.6% |
| 4 | 80.2% | 19.8% |
| 5 | 86.8% | 13.2% |
| 6 | 91.2% | 8.8% |
| 7 | 94.1% | 5.9% |
| 8 | 96.1% | 3.9% |
| 9 | 97.4% | 2.6% |
| 10 | 98.3% | 1.7% |

Note:
It does not matter at what dollar amount a contestant enters the competition. The percentages that each party receives are the same.

Contestants can play up to 15 rounds on a specialized slot machine as they attempt to double their money each new round. This means they can continue to try and re-double their money even after qualifying for the TOC by successfully winning ten consecutive times. If a TOC qualifier loses in rounds 11 to 15, they do not forfeit their TOC seat.

The Specialized Slot Machine Tournament Structure in an Example Embodiment

The following description provides a general overview of the specialized tournament structure in an example embodiment:

There are five bidding sessions for each round of play.

Contestants bid on three athletes at a time. These groups of three athletes are called "blocs".

Contestants only get one bloc of three athletes for their entire fantasy lineup.

The first time a contestant wins a bid, they receive all three athletes that they bid on which completes their lineup. They no longer are allowed to bid on anymore blocs of athletes. A black circle will be placed by their position on the specialized slot machine display screen indicating that they are done trying to secure a bloc.

The specialized slot machine begins the selection process by shuffling the deck and laying down the first three cards.

All six contestants have the option of making a percentage bid (the maximum range is from 1% to 100%) on the three athletes or passing on them with a "No Bid".

Contestants have 30 seconds to make a bid. In order to make the bid official, a contestant pulls the lever of the specialized slot machine (or otherwise activates a button or an object displayed on the display screen of the specialized slot machine). If a contestant fails to make a bid during the allotted time, the contestant automatically receives a "No Bid". Bids are time stamped based on the time when the lever was pulled (or other object was activated) to break ties.

Because contestants only have 30 seconds to bid for each of the five rounds, the entire game only takes two minutes and thirty seconds for the bidding process.

The percentage bid cannot be a decimal or a fraction. It must be a whole percent.

Contestants will either have a green, red or black circle by their spot on the display screen at all times. A green circle denotes that they have turned in their bid. A red circle denotes that they have not yet submitted their bid. A black circle denotes that they have already secured their bloc from a previous round.

The lowest bid wins the entire bloc of three athletes. If there is a tie amongst two or more contestants for the best bid, the contestant who submitted their bid first receives the bloc.

If none of the contestants bid on a bloc, this bloc will be reintroduced later as a "mulligan" (see below for a more detailed explanation on a mulligan). In other words, there will not be a new group of three athletes that replaces a bloc that has no bidders.

Once a contestant wins a bloc of three athletes, they have a complete lineup and are ineligible to bid anymore. A black circle will be placed by their spot on the card table to indicate they are no longer eligible to bid anymore.

Why doesn't a contestant just bid 1% on the first bloc of athletes that they really like? If the lowest bid wins, this seems like a no-brainer strategy that will automatically secure the athletes that they desire by submitting the lowest percentage which is 1%. However, this strategy would be counter-productive and would virtually guarantee that the contestant would come in last place. The reason for this is because the percentage bid serves two purposes. The bid not only secures athletes by having the lowest bid, but the bid also severely penalizes contestants for making unreasonably low bids. For example, a 1% bid will undoubtedly win a contestant the athletes that they desire, but this bid also represents the percentage of each athlete's fantasy points that they are eligible for in the game itself. For example, if someone bids 1% to win a fantasy football group they desire such as Peyton Manning, Calvin Johnson and Marshawn Lynch, they will be terribly disappointed to learn that they also only get 1% of the fantasy points that each of these three athletes scored in their respective games. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.

In the example embodiment, the setup may not seem fair in one critical way. For example, a bloc of three athletes could potentially have three duds like all kickers for a football contest while another bloc of three athletes has all high value athletes like quarterbacks for the same competition. Isn't this absurd since quarterbacks are much more valuable than kickers? In the example embodiment, the described format actually turns the selection process into a riveting high wire exercise where skill becomes a major factor. Think of these groups of athletes as stocks. The more valuable the stock, the more aggressive the bidding will be. The correct price will be set by the bids. Three kickers at 95% of their fantasy points might be more valuable than three quarterbacks at 12% of their fantasy points. This bidding process creates a tremendous amount of strategy for participants to consider.

In the example embodiment, two additional rules heighten the drama of the tournament format implemented on the specialized slot machine. These additional rules are described below:

Blocs can have multipliers on them for each athlete in a bloc. The ranges of multipliers for the entire blocs will vary from 6× (read "6 times") all the way to 10×. They aren't assigned uniformly to each athlete in the bloc, though. The multipliers will be split up and have different levels of intensity on individual athletes. For example, the specialized slot machine might flash that the multiplier is 7×, which means that the three athletes shown (e.g., see FIG. 9) will have multipliers that have a sum total of 7×; however, their placement will be random as will their intensity (or value) on each athlete. For the 7× example, this means that the total on the multipliers for the 3 athletes must add up to seven. It could be that the first athlete is worth 1× their fantasy point total, the second athlete 5× and the third athlete 1×. It could also be 2×, 2× and 3× respectively. Using the later example, this means that the first card turned over would mean the athlete would be worth double their fantasy score. The second card turned over would mean the athlete would be worth double their fantasy score. The third card turned over would mean the athlete would be worth triple their fantasy score. (Note: Fantasy score is defined as the percentage of fantasy points a group of athletes is eligible for that was determined by the bid for which the bloc was secured.)

For each new round, the maximum bid possible will be 8% less than the previous round. The specialized slot machine will show the bidding range for each round. For example, for the first round, the specialized slot machine will give the range as 1% to 100%. By the fourth round, this range will be down to 1% to 76%. This creates an urgency to get involved in the bidding process for each round, but also have enough skill to know what a proper bid is for a given bloc so that it isn't secured with an unreasonably low bid. After five rounds of bidding have occurred, the last person remaining in the group without a bloc automatically gets the last bloc that wasn't bid on for 60% of the fantasy points for each athlete in the bloc.

Table Showing Max and Min Bidding Percentages Allowed Each Round

| | Maximum Bid Allowed | Minimum Bid Allowed |
|---|---|---|
| Round 1 | 100% | 1% |
| Round 2 | 92% | 1% |
| Round 3 | 84% | 1% |
| Round 4 | 76% | 1% |
| Round 5 | 68% | 1% |
| Last Contestant Remaining | No Bid-Automatically receives bloc at 60% | No Bid-Automatically receives bloc at 60% |

Given the description of the example embodiment as provided above, one might think that the game is unfair if some blocs might have as low as a 6× multiplier while others might be as high as a 10× multiplier. However, this feature of an example embodiment makes the game even more strategic. Now, contestants will have to factor into the calculus the fact that a bloc of strong athletes might be diminished in value because they have a smaller multiplier and a more mediocre group might be increased in value because they are more valued by a higher multiplier. Even if a strong group of athletes has a 10× multiplier, this won't be a problem. The appropriate percentage bid for this bloc will be significantly lower than the norm. Conversely, a mediocre bloc of athletes with a small multiplier should be able to be secured with a bid considerable higher than the norm.

In the example embodiment as described, somebody is going to eventually get a bloc; because, there is exactly one bloc every contestant—everybody is going to eventually need a lineup. All blocs not bid on are called "mulligans" and will be reintroduced after all the blocs have been revealed. If there is more than one bloc for which a bid is not received, the blocs are reintroduced in the order that they first appeared. Also, the maximum bid for a new round does not go down 8% if the previous bloc was a mulligan. When the blocs not bid on are reintroduced and all six blocs have been shown and either bid on or passed on, the maximum bid for the reintroduced blocs go down 8% each time a new one is reintroduced and bid on. If there is a tie for a final position, amongst tied players, the person who secured their bloc in the lowest or latest round advances.

Once the bids are received from the contestants in a group for a particular round, the six contestants in the group are scored for final positions. The specialized slot machine of an example embodiment can gather the data for all athletes in the contest and then compute the final positions. This computation will take no more than five seconds after all contestants have secured their blocs. The specialized slot machine can tabulate the scores for all of the athletes and then add the three scores together for each bloc of athletes. Each contestant will then be ranked 1-6 (one through six) on the specialized slot machine user interface screen (e.g., see FIG. 7 through FIG. 9). For example, to tabulate the score of a single athlete, three components of information are required. First, the athlete's average fantasy game score has to be a part of the database linked to the managing entity website for easy retrieval. The second component of information needed is the bid with which the athlete was secured. Finally, the multiplier on the athlete has to be included in the computation. Using football as an example, let's assume Tom Brady has a running fantasy game point total of 10. Then assume he is secured at 68% of his fantasy points and the multiplier on him is 3×. Since 68% of 10 is 6.8 and when 6.8 is multiplied by 3, the result is 20.4. This means that Brady's score would be added to the other two athletes in his bloc for a final score to be posted for that contestant. Finally, tied positions always are broken by awarding the person who secured their bloc in the later round the higher spot.

The Specialized Slot Machine Tournament Structure in an Alternative Example Embodiment The following description provides a general overview of the specialized slot machine tournament structure in an alternative example embodiment. In an alternative embodiment of the specialized fantasy sports slot machine as described above, the alternative slot machine embodiment includes everything described above, but adds one more variable. This alternative embodiment calls for contestants to create the groups upon which the contestants bid. The process for this alternative embodiment is described below.

- There are 18 cards in a deck.
- Contestants see all 18 of the cards on the user interface screen ahead of time.
- Each contestant creates one of the six blocs that will be introduced in the bidding process.
- Contestants select three of the 18 athletes to represent the bloc that they created for the bidding process. They have 30 seconds to make their picks.
- The selection process is "blind" so none of the six contestants in a group knows what the other members of the group are selecting.
- Once a contestant creates their bloc of three for the bidding process, they pull the specialized slot machine's lever (or otherwise activate a button or displayed object).
- If a contestant does not select a bloc of three athletes within the 30 second time limit, a bloc of three will be selected for them by the specialized slot machine.
- Once all six contestants have created a bloc, the game is set to begin.
- It is important to note that just because a contestant creates one of the six blocs, that doesn't necessarily mean that this bloc will be the bloc that they end up securing for the fantasy sports contest. The bloc that they do receive will be determined by the bidding process.
- This process creates the possibility that some of the 18 athlete cards were not selected while others were selected more than once.
- These six blocs that were created by contestants are introduced randomly and follow all of the rules of the process that was described previously—with one notable exception. The athletes in a given bloc might not all be worth 100% of their fantasy point per game value to begin with. This value is determined by how much a given athlete is duplicated.
- When a bloc of three athletes is introduced, if a given athlete was selected only once for a bloc, they will be worth 100% of their fantasy sports point per game value. If on the other hand they are duplicated and the given athlete was selected more than once for a bloc, each time they are duplicated, they will be worth 20% less of their fantasy point per game average for each time this duplication occurs.
- The percentage of each individual athlete's fantasy points that are available at any given time (based on this duplication penalty) will be prominently displayed on each athlete card as the blocs of three athletes are introduced during the bidding process.
- The way an individual athlete is scored in the alternative embodiment is as follows: Let's assume Drew Brees fantasy points per game average is 19.7 points per game. Let's also assume that Brees is introduced by two of the six members of the group for a bloc that they submitted. This means Brees fantasy points available is at 80% or 15.8 points. The final two components are computed as follows: Let's assume the entire bloc was secured by someone who bid 68% and the multiplier on Brees is a four. Because 68% of 15.8 is equal to 10.7, this represents Brees total score before his multiplier is factored in. With the multiplier factored in, the score comes out to 42.8.
- The table below shows the duplication penalties for each time an athlete is duplicated during the formation of the blocs.

| | 1X | 2X | 3X | 4X | 5X | 6X |
|---|---|---|---|---|---|---|
| % | 100% | 80% | 60% | 40% | 20% | 0% |

Note:
"3X" is read as "three times" which represents the number of times an athlete is selected by one of the six members of the group. In this case, the duplicated athlete would appear in three of the six blocs that are introduced for bidding and each time they appear this athlete would only be worth 60% of their fantasy point value - a strong point to consider when contestants make their bids.

The fantasy sports slot machine embodiments as described herein provide a unique idea that has never been seen in the market. In order to make the fantasy sports slot machine embodiments possible, there are four key elements that are new to the fantasy sports genre that these embodiments introduce and that support the implementation. These four key elements include the following:

1) The fantasy sports slot machine of an example embodiment provides a novel format of contestants playing in small groups of three or more participants—Fantasy sports contests have always been contested in one of two ways—both of which mimic real life sports. They either are conducted using a head-to-head format or they are configured where the entire field plays against each other simultaneously. Again, the reason why these two formats have emerged is because these are the formats for how real live sporting events are contested and fantasy sports contests have always tried to come as close as possible to mimicking reality. Of the two, the head-to-head format is the most common way real life sports are contested—for both team and individual competitions. For example, in team sports competitions, there are never three (or more) baseball teams playing each other simultaneously. That would be unheard of. There are always two teams competing against one another on the baseball diamond. Similarly, this structure applies to hockey, soccer, basketball, football, and quite frankly, most other sports. The same head-to-head format also is also quite prevalent for individual sports such as tennis (both singles and doubles), bowling, fencing, table tennis, boxing, wrestling, etc.

The other real live sports format that fantasy sports tournament organizers have copied is the "entire field" concept. An entire field event is when real live sports are contested in a manner where individuals or teams have to compete against the entire field at one time. While this is not nearly as prevalent as the head-to-head format, it is still quite often used. Examples of this are golf, cycling, gymnastics, swimming, track and field, etc. Teams or individuals compete in one huge event and they are then ranked according to either their finish or their final scores.

Fantasy sports tournament organizers have tried to re-create the real live action formats that are used in sports to appeal to those who like to participate in fantasy sports events. For this reason, they have always configured their offerings to mimic these real live sporting events by either using a one-on-one format or an "entire field" format. However, as described herein, there is another way that makes the specialized slot machine format work and it is a concept that is unique to the industry. This unique format is also counter-intuitive to how real life sporting events are contested and is why nobody has ever done this before. The novel method of a fantasy sports slot machine format as described herein is to have small groups of three or more contestants competing against one another at the same time. Again, this is counter-intuitive to real live sports because it makes no sense in real life for the Dolphins, 49ers and Jets to be playing each other in the same football game. For this exact reason, nobody has thought about having Bob, Steve and Mary compete against each other in the same fantasy sports match because this configuration doesn't mimic real life sports.

2) The fantasy sports slot machine of an example embodiment provides a novel format wherein a portion of an athlete's fantasy points are or can be scored. Fantasy sports games have always been an all or nothing proposition. Contestants who "own" a certain athlete have always received all of the fantasy points that their athlete scored in their real live sports competition. Conversely, contestants who don't own an athlete receive nothing or zero points for them. This is a very valuable tool that helps make a fantasy sports slot machine implementation possible. This method involves giving contestants a portion or fraction of the fantasy points that a given athlete that they have secured scores. This fractional scoring method of an example embodiment can be implemented in two different ways as described below.
   a. Percentage Bids—This is a bidding process where the bids involve taking a percentage of the athlete's fantasy points. In accordance with this method, contestants, in order to secure an athlete, make a percentage bid on a given athlete. The rules dictate that the contestant who submits the lowest percentage bid secures that athlete for their lineup. For example, if three contestants bid, 68%, 81% and 98% for a given athlete, then two things happen. First, the contestant who made the 68% bid receives that athlete in their fantasy sports lineup. Secondly, the contestant only receives 68% of the fantasy points that this athlete scores in the competition. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.
   b. Duplication Penalties—This format allows fantasy contestants to share athletes instead of owning them exclusively, but there is a price to pay when duplication occurs. Each time an athlete is duplicated, their fantasy point value goes down a set predetermined percentage.
3) The fantasy sports slot machine of an example embodiment provides a novel format wherein fantasy sports matches are contested using fantasy game point averages instead of always using real live action scoring—People love fantasy sports because the games are fun. Who says though that fantasy sports games have to solely be based on live competitions in the real world? Why can't contests be based on averages that athletes already have with their fantasy point per game averages? Using point per game averages helps open the door for a fantasy sports slot machine to work. Instead of having to wait until a real live sports game is actually on or actually in season, people can go to a fantasy sports slot machine anytime and play.
4) The fantasy sports slot machine of an example embodiment provides a novel format wherein blocs of athletes for a lineup can be selected through an auction process. Fantasy sports contests have always operated one of two ways, either: a) contestants select their entire lineup and submit it, or b) they draft athletes individually to create their "team". As provided by the example embodiments as described herein, there is another way that makes the fantasy sports slot machine work. Under this example embodiment, contestants are shown groups of two or more athletes to be evaluated simultaneously. The contestants who are interested in this "bloc" have to evaluate the comparative strength of the entire unit over other potential ones. This process creates a new twist because contestants are now forced to put a value on a unit that has multiple moving parts. This is not a part of traditional fantasy sports play, but creates a critical gaming component for a fantasy sports slot machine.

An Example Embodiment Providing a Specialized Slot Machine for Implementing: A Fantasy Music Legends Tournament FIG. 6 through FIG. 9 illustrate an example embodiment, implemented as a specialized slot machine, which shows the basic elements of the user interface for implementing a tournament with multi-contestant small group rounds on the specialized slot machine. The specialized slot machine and the user interface thereon can be used to implement a variety of different tournament formats on the specialized slot machine of an example embodiment. The following description provides a general overview of one such tournament format in an example embodiment.

A Fantasy Music Legends Tournament is a tournament format for any genre of music. A given tournament can be designed for a specific genre like Rock & Roll, Pop, Rhythm & Blues, Country, Rap, etc. There can also be an "Open" tournament that allows all genres to be incorporated into one tournament. This concept can be a marketing tool for a company or it can be a standalone tournament that charges an entry fee and offers cash prizes for the top finishers of the Tournament of Champions (TOC). If it is used as a marketing tool, the tournament can offer interesting music perks for the top finishers. For a Rap tournament, the overall winner might win an all-expenses paid trip somewhere to see Jay Z perform and also hang out with him before and after the show. A top overall winner might have a different kind of top prize, such as winning a rare guitar for their efforts. The key components as a marketing tool are to allow contestants special perks. These perks will allow them to compete in a smaller group size than is normally required or skip a round(s) entirely. Contestants can take advantage of these perks by purchasing something off a particular website. When they do so, they are allowed to skip a round (or two) or play in a smaller group for the next round. For example, someone might be able to play the next round against only 9 people instead of the standard 12 if they purchase a song. They might be able to skip 2 rounds if they buy concert tickets. Legendary musicians eligible to be picked for a Fantasy Music Legends Tournament are any people who have played in a group with two or more people who had at least 1 hit in the top 40 in the United States in their genre of expertise. For example, Adam Ridgeley would be eligible because he was a member of Wham and has had at least one hit song that made the Billboard Hot 100 chart for his genre in the U.S. In the example embodiment, the tournament does not disqualify someone if their "band" is missing a piece (like a drummer) that is usually associated as a key component of a typical band. For example, the Carpenters are considered a "band" by the definitions of this game. Some legendary musicians have played in more than one band. For example, Paul McCartney played with The Beatles and with Paul McCartney and Wings. For this reason, Legendary Musicians score fantasy points for all bands in which they participated.

The Fantasy Music Legends Tournament Structure in an Example Embodiment

The following description provides a general overview of the Fantasy Music Legends Tournament structure in an example embodiment.

- Fantasy players are placed in groups of twelve players
- Fantasy players submit four starters—one Lead Singer, one Drummer, one Guitar Player, one Wildcard (can be anyone)
- Top three scores in a group advance to the next round—the rest are eliminated Tiebreakers Fantasy players that tie for a top three position will use the following tiebreaker process in an example embodiment:

- 1st tiebreaker—Fantasy Player with the higher ranking in their profile.
- 2nd tiebreaker—Contestant with the highest ever Fantasy Band Legends score from the IP address involved in the tie.
- 3rd tiebreaker—Contestant who has submitted the most entries ever from the IP address involved in the tie.
- 4th tiebreaker—Computer generated coin flip.

Fantasy Band Point Values

- All fantasy players in a group will submit their lineups via a blind submission process (i.e., submissions won't be known to players until ALL players in a group have submitted their lineups).
- Duplication is permitted.
- The more duplication that occurs for a given Legendary Musician the LESS their actual fantasy points they scored will be worth.
- Contestants will be given a percentage of the fantasy points their Legendary Musician scored depending on how many other fantasy players selected that SAME Legendary Musician. This is called their Adjusted Fantasy Score. Each time a Legendary Musician is duplicated, he/she will be worth 9% LESS of their fantasy points. For example, using the table below, if 12 fantasy players in a group are playing in a match and 4 of them select Keith Richards to be their guitarist, then each of them will receive 73% (see box highlighted in yellow below) of the fantasy points that Richards scores.
- Scores for individual Legendary Musicians will be rounded to the nearest hundredth.

Below is a grid that shows what percentage of Legendary Musician's points a given contestant receives depending on how many other competitors selected that Legendary Musician.

TABLE 1

Percentage of Fantasy Points a Legendary Musician is Worth Based on Duplication of Legendary Musicians Selected

| | Rock Legend selected 1X* | 2X | 3X | 4X | 5X | 6X | 7X | 8X | 9X | 10X | 11X | 12X |
|---|---|---|---|---|---|---|---|---|---|---|---|---|
| 12 player Group | 100% | 91% | 82% | 73% | 64% | 55% | 46% | 37% | 28% | 19% | 10% | 1% |

*Note:
1X is read as "one time" which means a given Legendary Musician was selected by exactley 1 of the 12 competitors The table below shows the starting Legendary Musicians in the Pop/Rock category that a 12 person group selected. The percentage under each musician's name represents the percentage that the fantasy player will get to keep of the actual fantasy points that their given Legendary Musician scored. This percentage is based on the number of times a Legendary Musician was duplicated and is taken directly from the above table (Table 1). It is important to note that if a Legendary Musician performed in more than one band and also had a solo career (e.g., Eric Clapton—The Yardbirds and Cream and a distinguished solo career), all of their works and honors will be computed in their fantasy score.

TABLE 2

Percentage Values Legendary Musicians Keep Based on Duplication for Groups of 12

| | Vocals<br>1960's | Guitar<br>1960's | Drummer<br>1980's | Wildcard<br>1970's |
|---|---|---|---|---|
| Fantasy<br>Player 1 | Mick Jagger<br>The Rolling Stones<br>91% | Keith Richards<br>The Rolling Stones<br>73% | Rick Allen<br>Def Leppard<br>82% | Clarence Clemmons<br>E Street Band<br>73% |
| Fantasy<br>Player 2 | Paul McCartney<br>The Beatles<br>82% | Angus Young<br>AC/DC<br>100% | Ringo Starr<br>Beatles<br>100% | Mary Wilson<br>Heart<br>100% |
| Fantasy<br>Player 3 | Eric Clapton<br>Cream<br>73% | Bob Weir<br>Grateful Dead<br>91% | Rick Allen<br>Def Leppard<br>82% | Barry Gibb<br>Bee Gees<br>100% |
| Fantasy<br>Player 4 | Paul McCartney<br>The Beatles<br>82% | Keith Richards<br>The Rolling Stones<br>73% | Phil Collins<br>Genesis<br>91% | Clarence Clemmons<br>E Street Band<br>73% |
| Fantasy<br>Player 5 | Michael Jackson<br>The Jackson 5<br>91% | Deen Castronovo<br>Journey<br>100% | Gina Schock<br>Go Go's<br>100% | Daryl Dragon<br>Captain & Tennille<br>100% |
| Fantasy<br>Player 6 | Annie Lennox<br>Eurythmics<br>100% | Eric Clapton<br>Cream<br>73% | Keith Moon<br>The Who<br>100% | Alec John Such<br>Bon Jovi<br>100% |
| Fantasy<br>Player 7 | Brian Wilson<br>Beach Boys<br>100% | Jimmy Page<br>Led Zeppelin<br>100% | Phil Collins<br>Genesis<br>91% | Dennis DeYoung<br>Styx<br>91% |
| Fantasy<br>Player 8 | Eric Clapton<br>Cream<br>73% | Keith Richards<br>The Rolling Stones<br>73% | Rick Allen<br>Def Leppard<br>82% | Steven Tyler<br>Aerosmith<br>100% |
| Fantasy<br>Player 9 | Mick Jagger<br>The Rolling Stones<br>91% | Vivian Campbell<br>Def Leppard<br>100% | Neil Peart<br>Rush<br>91% | Clarence Clemmons<br>E Street Band<br>73% |
| Fantasy<br>Player 10 | Paul McCartney<br>The Beatles<br>82% | Slash<br>Guns N' Roses<br>100% | John Panozzo<br>Styx<br>100% | Eric Clapton<br>Cream<br>73% |
| Fantasy<br>Player 11 | John Lennon<br>The Beatles<br>100% | Bob Weir<br>Grateful Dead<br>91% | John Bonham<br>Led Zeppelin<br>100% | Dennis DeYoung<br>Styx<br>91% |
| Fantasy<br>Player 12 | Michael Jackson<br>The Jackson 5<br>91% | Keith Richards<br>The Rolling Stones<br>73% | Neil Peart<br>Rush<br>91% | Clarence Clemmons<br>E Street Band<br>73% |

Scoring System in an Example Embodiment

The scoring system for Fantasy Band Legends in an example embodiment is described below.

10 points—For giving the name of a person who was involved with a band when their first U.S. top 40 hit is in the same decade asked for by the DECADE MATCHER that is listed in each of the four band categories on the chart above. For example, the DECADE MATCHER for the Lead Vocal category is the 1960's on the chart above. One of the contestants (contestant #11) selected John Lennon as their lead vocal. Because the indicator asks for a musician who had their first hit song in the 1960's, John Lennon would score 5 points for this (note: the indicator changes from match to match). Annie Lennox, selected by contestant #6, would not receive the 5 points because her first hit song was in the 1980's.

5 Points—If the musician is deceased.

5 points—If the musician played in a band that had siblings in it (or had a sibling themselves)

5 points—If the musician played in a band with at least one female (or is female themselves)

5 points—For every Grammy this musician has ever earned.

5 points—If the musician is in the Rock and Roll Hall of Fame.

5 points—For the Wildcard position entry if that person is not primarily associated with being a lead singer, guitarist or drummer. For example, Clarence Clemons of the E Street Band would earn an extra 5 points if he were submitted for this category because he was best known as a saxophonist.

2 points—For every platinum record of which this musician has been a part.

1 point—For every top 10 single this artist has been a part of on the Pop/Rock charts in the U.S.

Profile Ranking in an Example Embodiment

Profile rankings are achieved by how many consecutive times a contestant advances out of group play by finishing in the top 3 of their group. Some basic profile ranking rules for the example embodiment are provided below.

Once someone has a ranking, they can never lose it.

If someone skips a round by purchasing something, they don't get the ranking of the round that they skipped; however, if they advance from the group that they played in, they get the ranking that this new round is worth. For example, if a contestant has a Level 2 ranking and skips over both a Level 3 and 4 competition to compete in a Level 5 match (because they bought something), they will become a Level 5 player if they finish in the top 3 of that Level 5 match. They will revert back to a Level 2 if they don't finish in the top 3.

Contestants can always skip rounds or have their groups reduced from 12 all the way down to 6 by purchasing items.

The 11 Levels of Fantasy Band Legends in the Example Embodiment

A plurality of levels can be defined for the Fantasy Band Legends. An example of these various levels for the example embodiment are provided below.

- Level 1—No Talent—This is a person who has never finished in the top 3 of group play for even one single competition.
- Level 2—Video Game Guitar Hero Champ—This is a person who has advanced one time, but has never advanced two consecutive times, by finishing in the top 3 in group play in a national competition.
- Level 3—High School Air Band Winner—This is a person who has advanced two consecutive times by finishing in the top 3 in group play in a national competition.
- Level 4—Garage Band Wannabe—This is a person who has advanced three consecutive times by finishing in the top 3 in group play in a national competition.
- Level 5—Local Bar Circuit—This is a person who has advanced four consecutive times by finishing in the top 3 in group play in a national competition.
- Level 6—One Hit Wonder—This is a person who has advanced five consecutive times by finishing in the top 3 in group play in a national competition.
- Level 7—Platinum Album—This is a person who has advanced six consecutive times by finishing in the top 3 in group play in a national competition.
- Level 8—Concert Headliner—This is a person who has advanced seven consecutive times by finishing in the top 3 in group play in a national competition.
- Level 9—Grammy Award Winner—This is a person who has advanced eight consecutive times by finishing in the top 3 in group play in a national competition.
- Level 10—Rock and Roll Hall of Famer—This is a person who has advanced nine consecutive times by finishing in the top 3 in group play in a national competition.
- Level 11—Mount Rushmore of Rock—This is a person who has advanced ten consecutive times by finishing in the top 3 in group play in a national competition. They automatically win a seat in the TOC and get a chance to compete for the Grand Prize.

The Tournament of Champions (TOC) Format for Fantasy Band Legends

The managing entity presents the Tournament of Champions (TOC) format for Fantasy Band Legends designed for contestants who advance 10 consecutive rounds during a qualifying competition. The TOC is six rounds with the final round culminating with the top 8 contestants remaining vying for final positions. The same Fantasy Band Legends scoring system described above can be used for the TOC.

The Fantasy Music Legends TOC Structure for Rounds 1-6 in an Example Embodiment

An example of the TOC Structure for Rounds 1-6 for the example embodiment are provided below.

- Up to 10,000 players can participate.
- Contestants compete in groups of 10 (or less).
- The top contestants in each group advance to the next round. This is called an "advancing" position. Those not finishing in an "advancing" position are eliminated from the TOC.
- The number of contestants advancing from each group varies depending on which round they are playing in.
- To advance out of Round 1, contestants have to finish in the top 3 of their group of 10. This means 10,000 entries is narrowed down to 3,000 remaining.
- To advance out of Round 2, contestants have to finish in the top 3 of their group of 10. This means 3,000 contestants who started the round are narrowed down to 900 remaining.
- To advance out of Round 3, contestants have to finish in the top 2 of their group of 10. This means 900 contestants who started the round are narrowed down to 180 remaining.
- To advance out of Round 4, contestants have to finish in the top 2 of their group of 10. This means 180 contestants who started the round are narrowed down to 36 remaining.
- To advance out of Round 5, contestants have to finish in the top 2 of their group of 9 to qualify for the final round. This means 36 contestants who started the round are narrowed down to 8 remaining for the last round.
- Each round consists of decks of cards with exactly 30 Fantasy Band Legends.
- All 10 contestants in each group (nine contestants per group for round 5 and eight contestants in round 6) are allowed to study the deck before the selection process begins.
- Each contestant is told by a dealer that they only get 3 "Legends" in their entire fantasy lineup. The dealer also tells them that they don't select one Legend at a time. They, instead, bid on groups of 3 Legends called "blocs".
- The first time a contestant wins a bid, they receive all three Legends that they bid on which completes their lineup. They no longer are allowed to bid on anymore blocs of Legends.
- The dealer begins the selection process by shuffling the deck and laying down the first three cards. The presentation of cards can also be implemented electronically in the specialized slot machine as described above.
- All 10 contestants (nine contestants for round 5 and eight for round 6) have the option of making a percentage bid (the maximum range is from 1% to 100%) on the three Legends or passing on them with a "No Bid".
- The percentage bid cannot be a decimal or a fraction. It must be a whole percent.
- The lowest bid wins the entire bloc of three Legends. If there is a tie amongst two or more contestants for the best bid, the person who submitted their entry in first (time stamped by computer) gets the bloc of Legends.
- If ALL contestants opt out so that no bid is made, this bloc will be reintroduced later as a "mulligan" (see above for a more detailed explanation of a mulligan).
- Once a contestant wins a bloc of three Legends, they will have the Legends laid on the table in front of them which signals everyone that they have a complete lineup and are ineligible to bid anymore.

Why doesn't a contestant just bid 1% on the first bloc of Legends that they really like? If the lowest bid wins, this seems like a no-brainer strategy that will automatically secure the Legends that they desire by submitting the lowest percentage which is 1%. However, it would be suicidal and would virtually guarantee them coming in last place. The reason for this is because the percentage bid serves two purposes. It not only secures Legends by having the lowest bid, but it also severely penalizes contestants for making absurdly low bids. A 1% bid will undoubtedly win a contestant the Legends that they desire, but it also represents the percentage of each Legend's fantasy points that they are eligible for in the game itself. For example, if someone bids 1% to win a group they desire such as Paul McCartney, Michael Jackson and Keith Richards, they will be terribly disappointed to learn that they also only get 1% of the fantasy points that EACH of these three musicians scored.

In the example embodiment, the setup may not seem fair in one critical way. For example, a bloc of three could potentially have three second tier artists and another have three icons. It is possible and yet it is not as absurd as one might think. In the example embodiment, the described format actually turns the selection process into a riveting high wire exercise where skill becomes a major factor. Think of these groups of Legends as stocks. The more valuable the stock, the more aggressive the bidding will be. The correct price will be set by the bids. Three second tier artists at 95% of their fantasy points might be more valuable than three icons at 12% of their fantasy points.

In the example embodiment, three additional rules heighten the drama of the tournament format implemented on the specialized slot machine. These additional rules are described below:

- The order in which the cards are turned over for each bloc of three is very important. This is because the order they appear in is weighted. The first card turned over for each bloc will be worth triple their fantasy score. The second card turned over for each bloc will be double their fantasy score. The third card turned over for each bloc will be weighted face value of what their fantasy score is. (Note: Fantasy score is defined as the percentage of fantasy points for which a group of Legends is eligible.) The reason why this rule is so important is because a trio of Legends such as Mick Jagger, Robert Cray and Jimmy James (from Tommy Tutone)—in that order—will generate much more aggressive bidding than if they came out in the order of James, Cray and Jagger.
- For each new round, the maximum bid possible will be 5% less than the previous round. The dealer will announce the highest bid possible before the start of each round. For example, for the first round, the dealer will announce the max bid at 100%. By the sixth round, they will announce the highest possible bid at 75%. This creates an urgency to get involved in the bidding process for each round, but also have enough skill to know what a proper bid is for a given bloc so that it isn't secured with a ridiculously low bid.
- Fantasy Eliminator is added to the mix. This is the actual "gaming" piece where the match is decided. The game process will be broken into intervals. At the end of each interval, the lowest remaining contestant in a given interval is eliminated. This process continues until there are only advancing positions left for a given group.

In the example embodiment as described, somebody is going to eventually get a bloc; because, there are exactly three cards for every contestant—everybody is going to eventually need a lineup. What may happen, though, is that all blocs not bid on are called "mulligans" and will be reintroduced after all the blocs have been revealed. If there is more than one bloc for which a bid is not received, the blocs are reintroduced in the order that they first appeared. Also, the maximum bid for a new round does not go down 5% if the previous bloc was a mulligan. When they are reintroduced though at the end, they go down 5% each time a new one is reintroduced. If there is a tie during fantasy eliminator for last place, from the tied players (two or more), the one who secured their bloc in the latest round automatically is declared the advancing contestant.

An Example Embodiment Providing a Specialized Slot Machine for Implementing: A Slot Machine for Fantasy Sports FIG. 6 through FIG. 9 illustrate an example embodiment, implemented as a specialized slot machine, which shows the basic elements of the user interface for implementing a tournament with multi-contestant small group rounds on the specialized slot machine. The specialized slot machine and the user interface thereon can be used to implement a variety of different tournament formats on the specialized slot machine of an example embodiment. The following description provides a general overview of one such tournament format in an example embodiment.

In various example embodiments described below, real time/live events and related tournament formats are implemented on a specialized slot machine. These example embodiments bring slot machines into the 21st century and use real life events to transform the specialized slot machine from a static entity, that is currently based solely on canned information, into a real time/live event gaming apparatus.

It is important to distinguish what is meant by a real time/live event for the purposes of this example embodiment. An example of what is not meant by a real time/live event format is having a bunch of poker players playing in an online slot tournament. This might be a real time/live event, but that designation only refers to the participants who are playing—not the gaming material itself they are using for the tournament. The example embodiments describe real time/live action events that constitute the gaming material itself. No longer are slot machines simply based on pre-defined sets of cards that show up, lining up three consecutive cherries or even spinning a wheel in hopes of creating a fortune. This specialized slot machine and the particular tournament formats of the various example embodiments described herein are based on real time/live event data. In other words, the decisions the players are making with the game itself are based on events that are happening at the time the game is being played.

This real time/live event slot idea can be used for all types of real life events. For the purposes of this example embodiment, the described example embodiment uses the specialized slot machine with real time/live sporting events to create a new type of slot machine. Even more specifically, the described example embodiment is used for fantasy sports by modifying some of the current ways fantasy sports games are played to enhance the real time/live event slot machine embodiment as described herein.

- The specialized slot machines, as described herein, are placed in casinos or other venues throughout the world. These specialized slot machines can be programmed to provide a competition related to any real time/live event contestants may desire to play.

These specialized slot machines are linked to a central network-accessible database so that contestants competing in a given "group game" can be playing in different casinos/venues throughout the world. In other words, if a person sits down in the MGM™ in Las Vegas, they don't have to sit and wait until their group of six people is filled by people sitting in that particular MGM™ casino. The other five players competing against them can be sitting in casinos/venues anywhere in the world.

Contestants sit at their own individual specialized slot machine/terminal as described herein. They are given the choice to enter for $1, $5, $20, $50 and $100 contests (or any other entry amount that casinos/venues find attractive for a slot machine).

When a contestant looks at the display screen of the specialized slot machine/terminal, they will see an image on the display screen, as presented by the user interface logic of an example embodiment described herein, showing a virtual card table with six places (e.g., see FIG. 9). The contestant at the specialized slot machine/terminal will be one of the players occupying one of these six places at the virtual card table presented by the specialized slot machine/terminal.

The contestant puts an amount of money into the specialized slot machine/terminal corresponding to the level of play at which they want to participate. For example, the contestant might put $1 in for the dollar game, $10 in for the ten dollar game, or $20 in for the twenty dollar game, to enter the game.

The contestant then pulls down the handle (or activates a lever or pushes a button on the user interface of the specialized slot machine/terminal) and the specialized slot machine/terminal starts generating a variety of enticing and entertaining graphics that flash around until the contestant has a full group of six other players to play against (who are also playing for the same entry amount). Because the game will fill quickly with players, the graphic display generations, which take about five seconds, will take longer than the time needed to fill a live group of players, which will happen immediately, because the game and the players are linked to casinos/venues throughout the country/world (e.g., geographically distributed).

Groups are always comprised of six contestants in an example embodiment.

The other five contestants, who will fill the remaining five places at the virtual card table presented by the specialized slot machine/terminal, will be anonymous on the display screen in front of a given contestant. The user interface logic will configure the user interface of the example embodiment for each player to identify the different player positions as "YOU", "Contestant #1", "Contestant #2", etc. (see FIG. 9).

The contestants will be instructed by the user interface of the example embodiment that they will see three fantasy sports athletes.

The contestants will be instructed that the game will be based on live action scoring from some sporting event(s) that is currently in progress.

For every group of six competing contestants, the top scoring two contestants in each of these groups are considered winners. There is no distinction between finishing first and second. The top scoring two contestants are both winners and are eligible for the same prize if they choose to cash out.

These two top scoring winners for each group have one of two options. The two top scoring winners can either: 1) cash out by pressing a button (or activating a virtual object on the user interface of the specialized slot machine/terminal) that cashes them out and automatically doubles their money, or 2) they can choose to "let it ride" by pulling the handle (or activating a lever or pushing a button on the user interface of the specialized slot machine/terminal) to form a new group with five other new contestants and try to re-double their money by playing in a new round.

The bottom scoring four contestants of a group are eliminated and lose their money. The bottom scoring four contestants can either leave the specialized slot machine or put more money into the specialized slot machine to play again by playing in a new group of six contestants.

The casino/venue provides powerful motivation in two directions for winning contestants to stay in for another round instead of cashing out. First, winning contestants can "let it ride" and attempt to redouble their money each time they stay in instead of cashing out. Secondly, the specialized slot machine experience of the example embodiment offers another huge incentive for people to stay in. Any contestant who advances ten consecutive times will play in a Tournament of Champions (TOC) sponsored by the casino/venue in which they are playing.

The TOC format in an example embodiment uses the same real time/live action live fantasy sports format either on a specialized slot machine, online, or in a casino/venue ballroom.

The rationale for offering TOC is to provide a huge incentive for contestants to not cash out and to continue playing on the specialized slot machines. The TOC pays out millions of dollars to the winner and other top finishers and is a very attractive incentive for people to try and qualify for (and therefore not cash out).

For clarification purposes, even though contestants might be playing people assigned by a managing entity from other casinos/venues, this doesn't mean that this is a coordinated multi-casino TOC. Each casino/venue hosts their own TOC, which can be run directly from their website, off their own slot machines, or could even be live action in their casino/venue.

The reason casinos are motivated to have contestants NOT cash out is because each time the contestant lets it ride into another round, the percentage of the money the casino/venue takes in goes up significantly. For example, if the two winners from every group always cashed out, the casino would receive a standard 33% of the revenue. If, however, players never cashed out and always let it ride, by round ten the casinos/venues would always receive a staggering 98.3% of the revenue.

The table set forth above showing an example of the casino vs. contestant revenue split depending on the round from which contestants decide to cash out again illustrates the benefit for the casino/venue if players decide to remain in the game.

Contestants can play up to 15 rounds on a specialized slot machine as they attempt to double their money each new round. This means they can continue to try and re-double their money even after qualifying for the TOC by successfully winning ten consecutive times. If a TOC qualifier loses in rounds 11 to 15, they do not forfeit their TOC seat.

The Specialized Slot Machine Tournament Structure for Real time/Live Sporting Events in an Example Embodiment The following description provides a general overview of the specialized slot machine tournament structure for real time/live sporting events in an example embodiment:

- There are five bidding sessions for each round of play.
- Contestants bid on three athletes at a time. These groups of three athletes are called "blocs".
- Contestants only get one bloc of three athletes for their entire fantasy lineup.
- The first time a contestant wins a bid, they receive all three athletes that they bid on which completes their lineup. They no longer are allowed to bid on anymore blocs of athletes. A black circle will be placed by their position on the specialized slot machine display screen indicating that they are done trying to secure a bloc.
- The specialized slot machine begins the selection process by shuffling the deck and laying down the first three cards.
- All six contestants have the option of making a percentage bid (the maximum range is from 1% to 100%) on the three athletes or passing on them with a "No Bid".
- Contestants have 30 seconds to make a bid. In order to make the bid official, a contestant pulls the lever of the specialized slot machine (or otherwise activates a button or an object displayed on the display screen of the specialized slot machine). If a contestant fails to make a bid during the allotted time, the contestant automatically receives a "No Bid". Bids are time stamped based on the time when the lever was pulled (or other object was activated) to break ties.
- Because contestants only have 30 seconds to bid for each of the five rounds, the entire game only takes two minutes and thirty seconds for the bidding process.
- Once everyone has their blocs, the specialized slot machine computes the final score of the match immediately based on the real time/live action fantasy point totals each athlete in the respective blocs has in progress.
- The percentage bid cannot be a decimal or a fraction. It must be a whole percent.
- Contestants will either have a green, red or black circle by their spot on the display screen at all times. A green circle denotes that they have turned in their bid. A red circle denotes that they have not yet submitted their bid. A black circle denotes that they have already secured their bloc from a previous round.
- The lowest bid wins the entire bloc of three athletes. If there is a tie amongst two or more contestants for the best bid, the contestant who submitted their bid first receives the bloc.
- If none of the contestants bid on a bloc, this bloc will be reintroduced later as a "mulligan" (see below for a more detailed explanation on a mulligan). In other words, there will not be a new group of three athletes that replaces a bloc that has no bidders.
- Once a contestant wins a bloc of three athletes, they have a complete lineup and are ineligible to bid anymore. A black circle will be placed by their spot on the card table to indicate they are no longer eligible to bid anymore.

Why doesn't a contestant just bid 1% on the first bloc of athletes that they really like? If the lowest bid wins, this seems like a no-brainer strategy that will automatically secure the athletes that they desire by submitting the lowest percentage which is 1%. However, this strategy would be counter-productive and would virtually guarantee that the contestant would come in last place. The reason for this is because the percentage bid serves two purposes. The bid not only secures athletes by having the lowest bid, but the bid also severely penalizes contestants for making unreasonably low bids. For example, a 1% bid will undoubtedly win a contestant the athletes that they desire, but this bid also represents the percentage of each athlete's fantasy points that they are eligible for in the game itself. For example, if someone bids 1% to win a fantasy football group they desire such as Peyton Manning, Calvin Johnson and Marshawn Lynch, they will be terribly disappointed to learn that they also only get 1% of the fantasy points that each of these three athletes scored in their respective games. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.

In the example embodiment, the setup may not seem fair in one critical way. For example, a bloc of three athletes could potentially have three duds like all kickers for a football contest while another bloc of three athletes has all high value athletes like quarterbacks for the same competition. Isn't this absurd since quarterbacks are much more valuable than kickers? In the example embodiment, the described format actually turns the selection process into a riveting high wire exercise where skill becomes a major factor. Think of these groups of athletes as stocks. The more valuable the stock, the more aggressive the bidding will be. The correct price will be set by the bids. Three kickers at 95% of their fantasy points might be more valuable than three quarterbacks at 12% of their fantasy points. This bidding process creates a tremendous amount of strategy for participants to consider.

In the example embodiment, two additional rules heighten the drama of the tournament format implemented on the specialized slot machine. These additional rules are described below:

- Blocs can have multipliers on them for each athlete in a bloc. The ranges of multipliers for the entire blocs can vary from 6× (read "6 times") all the way to 10×. They aren't assigned uniformly to each athlete in the bloc, though. The multipliers can be split up and have different levels of intensity on individual athletes. For example, the specialized slot machine might flash that the multiplier is 7×, which means that the three athletes shown (e.g., see FIG. 9) will have multipliers that have a sum total of 7×; however, their placement will be random as will their intensity (or value) on each athlete. For the 7× example, this means that the total on the multipliers for the 3 athletes must add up to seven. It could be that the first athlete is worth 1× their fantasy point total, the second athlete 5× and the third athlete 1×. It could also be 2×, 2× and 3× respectively. Using the later example, this means that the first card turned over would mean the athlete would be worth double their fantasy score. The second card turned over would mean the athlete would be worth double their fantasy score. The third card turned over would mean the athlete would be worth triple their fantasy score. (Note: Fantasy score is defined as the percentage of fantasy points a group of athletes is eligible for that was determined by the bid for which the bloc was secured.)
- For each new round, the maximum bid possible will be 8% less than the previous round. The specialized slot machine will show the bidding range for each round.

For example, for the first round, the specialized slot machine will give the range as 1% to 100%. By the fourth round, this range will be down to 1% to 76%. This creates an urgency to get involved in the bidding process for each round, but also have enough skill to know what a proper bid is for a given bloc so that it isn't secured with an unreasonably low bid. After five rounds of bidding have occurred, the last person remaining in the group without a bloc automatically gets the last bloc that wasn't bid on for 60% of the fantasy points for each athlete in the bloc. See the, "Table Showing Max and Min Bidding Percentages Allowed Each Round" set forth above for an example embodiment.

Given the description of the example embodiment as provided above, one might think that the game is unfair if some blocs might have as low as a 6× multiplier while others might be as high as a 10× multiplier. However, this feature of an example embodiment makes the game even more strategic. Now, contestants will have to factor into the calculus the fact that a bloc of strong athletes might be diminished in value because they have a smaller multiplier and a more mediocre group might be increased in value because they are more valued by a higher multiplier. Even if a strong group of athletes has a 10× multiplier, this won't be a problem. The appropriate percentage bid for this bloc will be significantly lower than the norm. Conversely, a mediocre bloc of athletes with a small multiplier should be able to be secured with a bid considerable higher than the norm.

In the example embodiment as described, somebody is going to eventually get a bloc; because, there is exactly one bloc every contestant—everybody is going to eventually need a lineup. All blocs not bid on are called "mulligans" and will be reintroduced after all the blocs have been revealed. If there is more than one bloc for which a bid is not received, the blocs are reintroduced in the order that they first appeared. Also, the maximum bid for a new round does not go down 8% if the previous bloc was a mulligan. When the blocs not bid on are reintroduced and all six blocs have been shown and either bid on or passed on, the maximum bid for the reintroduced blocs go down 8% each time a new one is reintroduced and bid on. If there is a tie for a final position, amongst tied players, the person who secured their bloc in the lowest or latest round advances.

Once the bids are received from the contestants in a group for a particular round, the six contestants in the group are scored for final positions. The specialized slot machine of an example embodiment can gather the data for all athletes in the contest and then compute the final positions. This computation will take no more than five seconds after all contestants have secured their blocs. The specialized slot machine can tabulate the scores for all of the athletes and then add the three scores together for each bloc of athletes. Each contestant will then be ranked 1-6 (one through six) on the specialized slot machine user interface screen (e.g., see FIG. 7 and FIG. 8). For example, to tabulate the score of a single athlete, three components of information are required. First, the athlete's average fantasy game score has to be a part of the database linked to the managing entity website for easy retrieval. The second component of information needed is the bid with which the athlete was secured. Finally, the multiplier on the athlete has to be included in the computation. Using football as an example, let's assume Tom Brady has a running fantasy game point total of 10. Then assume he is secured at 68% of his fantasy points and the multiplier on him is 3×. Since 68% of 10 is 6.8 and when 6.8 is multiplied by 3, the result is 20.4. This means that Brady's score would be added to the other two athletes in his bloc for a final score to be posted for that contestant. Finally, tied positions always are broken by awarding the person who secured their bloc in the later round the higher spot.

The Specialized Slot Machine Tournament Structure in an Alternative Example Embodiment The following description provides a general overview of the specialized slot machine tournament structure in an alternative example embodiment. In an alternative embodiment of the specialized fantasy sports slot machine as described above, the alternative slot machine embodiment includes everything described above, but adds one more variable. This alternative embodiment calls for contestants to create the groups upon which the contestants bid. The process for this alternative embodiment is described below.

- There are 18 cards in a deck.
- Contestants see all 18 of the cards on the user interface screen ahead of time.
- Each contestant creates one of the six blocs that will be introduced in the bidding process.
- Contestants select three of the 18 athletes to represent the bloc that they created for the bidding process. They have 30 seconds to make their picks.
- The selection process is "blind" so none of the six contestants in a group knows what the other members of the group are selecting.
- Once a contestant creates their bloc of three for the bidding process, they pull the specialized slot machine's lever (or otherwise activate a button or displayed object).
- If a contestant does not select a bloc of three athletes within the 30 second time limit, a bloc of three will be selected for them by the specialized slot machine.
- Once all six contestants have created a bloc, the game is set to begin.
- It is important to note that just because a contestant creates one of the six blocs, that doesn't necessarily mean that this bloc will be the bloc that they end up securing for the fantasy sports contest. The bloc that they do receive will be determined by the bidding process.
- This process creates the possibility that some of the 18 athlete cards were not selected while others were selected more than once.
- These six blocs that were created by contestants are introduced randomly and follow all of the rules of the process that was described previously—with one notable exception. The athletes in a given bloc might not all be worth 100% of their fantasy point per game value to begin with. This value is determined by how much a given athlete is duplicated.
- When a bloc of three athletes is introduced, if a given athlete was selected only once for a bloc, they will be worth 100% of their fantasy sports point per game value. If on the other hand they are duplicated and the given athlete was selected more than once for a bloc, each time they are duplicated, they will be worth 20% less of their fantasy point per game average for each time this duplication occurs.
- The percentage of each individual athlete's fantasy points that are available at any given time (based on this duplication penalty) will be prominently displayed on each athlete card as the blocs of three athletes are introduced during the bidding process. See the table set forth above showing the duplication penalties for each time an athlete is duplicated during the formation of the blocs.

The fantasy sports slot machine embodiments based on real time/live action events as described herein provide a unique idea that has never been seen in the market. In these example embodiments, the contestants themselves do not constitute the real time/live action event(s), rather it is the game itself that uses real time/live action events as the competition unfolds. These example embodiments fundamentally change the way slot machines are currently used. Slot machine players are suddenly playing with the outcomes that are based on events that are unfolding as they are playing. This adds a dimension to slot machines that has never been provided before.

In order to make these fantasy sports slot machine embodiments possible, there are three key elements that are new to the fantasy sports genre that these embodiments introduce and that support the implementation. These three key elements include the following:

1) The fantasy sports slot machine of an example embodiment provides a novel format of contestants playing in small groups of three or more participants—Fantasy sports contests have always been contested in one of two ways—both of which mimic real life sports. They either are conducted using a head-to-head format or they are configured where the entire field plays against each other simultaneously. Again, the reason why these two formats have emerged is because these are the formats for how real live sporting events are contested and fantasy sports contests have always tried to come as close as possible to mimicking reality. Of the two, the head-to-head format is the most common way real life sports are contested—for both team and individual competitions. For example, in team sports competitions, there are never three (or more) baseball teams playing each other simultaneously. That would be unheard of. There are always two teams competing against one another on the baseball diamond. Similarly, this structure applies to hockey, soccer, basketball, football, and quite frankly, most other sports. The same head-to-head format also is also quite prevalent for individual sports such as tennis (both singles and doubles), bowling, fencing, table tennis, boxing, wrestling, etc.

The other real live sports format that fantasy sports tournament organizers have copied is the "entire field" concept. An entire field event is when real live sports are contested in a manner where individuals or teams have to compete against the entire field at one time. While this is not nearly as prevalent as the head-to-head format, it is still quite often used. Examples of this are golf, cycling, gymnastics, swimming, track and field, etc. Teams or individuals compete in one huge event and they are then ranked according to either their finish or their final scores.

Fantasy sports tournament organizers have tried to re-create the real live action formats that are used in sports to appeal to those who like to participate in fantasy sports events. For this reason, they have always configured their offerings to mimic these real live sporting events by either using a one-on-one format or an "entire field" format. However, as described herein, there is another way that makes the specialized slot machine format work and it is a concept that is unique to the industry. This unique format is also counter-intuitive to how real life sporting events are contested and is why nobody has ever done this before. The novel method of a fantasy sports slot machine format as described herein is to have small groups of three or more contestants competing against one another at the same time. Again, this is counter-intuitive to real live sports because it makes no sense in real life for the Dolphins, 49ers and Jets to be playing each other in the same football game. For this exact reason, nobody has thought about having Bob, Steve, and Mary compete against each other in the same fantasy sports match because this configuration doesn't mimic real life sports.

2) The fantasy sports slot machine of an example embodiment provides a novel format wherein a portion of an athlete's fantasy points are or can be scored. Fantasy sports games have always been an all or nothing proposition. Contestants who "own" a certain athlete have always received all of the fantasy points that their athlete scored in their real live sports competition. Conversely, contestants who don't own an athlete receive nothing or zero points for them. This is a very valuable tool that helps make a fantasy sports slot machine implementation possible. This method involves giving contestants a portion or fraction of the fantasy points that a given athlete that they have secured scores. This fractional scoring method of an example embodiment can be implemented in several different ways as described below.

a. Percentage Bids—This is a bidding process where the bids involve taking a percentage of the athlete's fantasy points. In accordance with this method, contestants, in order to secure an athlete, make a percentage bid on a given athlete. The rules dictate that the contestant who submits the lowest percentage bid secures that athlete for their lineup. For example, if three contestants bid, 68%, 81% and 98% for a given athlete, then two things happen. First, the contestant who made the 68% bid receives that athlete in their fantasy sports lineup. Secondly, the contestant only receives 68% of the fantasy points that this athlete scores in the competition. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.

b. Duplication Penalties—This format allows fantasy contestants to share athletes instead of owning them exclusively, but there is a price to pay when duplication occurs. Each time an athlete is duplicated, their fantasy point value goes down a set predetermined percentage.

c. Partial Scoring—This format allows the actual fantasy sports contests to begin and end before the related real time/live sporting event has finished. This means that a given athlete now has only a portion of their fantasy points scored. Only the points that the athlete scored in their real time/live action game up to the point that the fantasy contest ends will count.

3) The fantasy sports slot machine of an example embodiment provides a novel format wherein blocs of athletes for a lineup can be selected through an auction process. Fantasy sports contests have always operated one of two ways, either: a) contestants select their entire lineup and submit it, or b) they draft athletes individually to create their "team". As provided by the example embodiments as described herein, there is another way that makes the fantasy sports slot machine work. Under this example embodiment, contestants are shown groups of two or more athletes to be evaluated simultaneously. The contestants who are interested in this "bloc" have to evaluate the comparative strength of the entire unit over other potential ones. This process creates a new twist because contestants are now forced to put a value on a unit that has multiple moving parts. This is not a part of traditional fantasy sports play, but creates a critical gaming component for a fantasy sports slot machine of the various embodiments described herein.

An Example Embodiment Providing a Specialized Slot Machine for Implementing: A Slot Machine for Real Time Live Action Events—Current Events FIG. 6 through FIG. 9 illustrate an example embodiment, implemented as a specialized slot machine, which shows the basic elements of the user interface for implementing a tournament with multi-contestant small group rounds on the specialized slot machine. The specialized slot machine and the user interface thereon can be used to implement a variety of different tournament formats on the specialized slot machine of an example embodiment. The following description provides a general overview of one such tournament format in an example embodiment.

In various example embodiments described below, real time/live events and related tournament formats are implemented on a specialized slot machine. These example embodiments use real life events to transform the specialized slot machine from a static entity, that is currently based solely on canned information, into a real time/live event gaming apparatus.

As described above, the real time/live action events of the example embodiments constitute the gaming material itself. This specialized slot machine and the particular tournament formats of the various example embodiments described herein are based on real time/live event data. In other words, the decisions the players are making with the game itself are based on events that are happening at the time the game is being played.

This real time/live event slot idea can be used for all types of real life events. For the purposes of this example embodiment, the described example embodiment uses the specialized slot machine with real time/live current events (e.g., non-sporting events) to create a new type of specialized slot machine.

- The current event specialized slot machines, as described herein, are placed in casinos or other venues throughout the world. These specialized slot machines can be programmed to provide a competition related to any real time/live event contestants may desire to play.
- These specialized slot machines are linked to a central network-accessible database so that contestants competing in a given "group game" can be playing in different casinos/venues throughout the world. In other words, if a person sits down in the MGM™ in Las Vegas, they don't have to sit and wait until their group of six people is filled by people sitting in that particular MGM™ casino. The other five players competing against them can be sitting in casinos/venues anywhere in the world.
- Contestants sit at their own individual specialized slot machine/terminal as described herein. They are given the choice to enter a wager for $1, $5, $20, $50 and $100 contests (or any other entry amount that casinos/venues find attractive for a slot machine).
- When a contestant looks at the display screen of the specialized slot machine/terminal, they will see an image on the display screen, as presented by the user interface logic of an example embodiment described herein, showing a virtual card table with six places (e.g., see FIG. 9). The contestant at the specialized slot machine/terminal will be one of the players occupying one of these six places at the virtual card table presented by the specialized slot machine/terminal.
- The contestant puts an amount of money into the specialized slot machine/terminal corresponding to the level of play at which they want to participate. For example, the contestant might put $1 in for the dollar game, $10 in for the ten dollar game, or $20 in for the twenty dollar game, to enter the game.
- The contestant then pulls down the handle (or activates a lever or pushes a button on the user interface of the specialized slot machine/terminal) and the specialized slot machine/terminal starts generating a variety of enticing and entertaining graphics that flash around until the contestant has a full group of six other players to play against (who are also playing for the same entry amount). Because the game will fill quickly with players, the graphic display generations, which take about five seconds, will take longer than the time needed to fill a live group of players, which will happen immediately, because the game and the players are linked to casinos/venues throughout the country/world (e.g., geographically distributed).
- Groups are always comprised of six contestants in an example embodiment.
- The other five contestants, who will fill the remaining five places at the virtual card table presented by the specialized slot machine/terminal, will be anonymous on the display screen in front of a given contestant. The user interface logic will configure the user interface of the example embodiment for each player to identify the different player positions as "YOU", "Contestant #1", "Contestant #2", etc. (see FIG. 9).
- The contestants are instructed that they will see three categories of news stories displayed for them on the display screen of the specialized slot machine. The contestants are prompted to decide on whether they want to choose the displayed categories or not. The contestants are instructed that the game will be based on the frequency these types of news stories are currently being reported on national television news stations like Fox, CNBC, CNN, ABC, CBS, ABC, Headline News, etc.
- There are 18 news categories in an example embodiment.
- The news categories are stories that can involve: 1) Natural Disasters, 2) Sports, 3) Presidential Politics, 4) Military, 5) Singers, 6) Actors/Actresses, 7) Crime, 8) Congressional Politics, 9) Education, 10) Science, 11) Interviews (e.g., sit down studio interviews—not live on the street reaction interviews), 12) Religion, 13) Non-Crime/Non-Natural Disasters such as plane crashes, major accidents, etc., 14) Foreign Affairs, 15) Human Interest (about an interesting person or animal), 16) Economy, 17) Medical, 18) Other—e.g., anything not related to the other 17 categories.
- There can be overlap in the current event categories. For example, if an expert is being interviewed on how to create better ways to prevent mass shootings on school campuses, then the entire interview will count for the categories of Crime, Education and Interview.

For every group of six competing contestants, the top scoring two contestants in each of these groups are considered winners. There is no distinction between finishing first and second. The top scoring two contestants are both winners and are eligible for the same prize if they choose to cash out.

These two top scoring winners for each group have one of two options. The two top scoring winners can either: 1) cash out by pressing a button (or activating a virtual object on the user interface of the specialized slot machine/terminal) that cashes them out and automatically doubles their money, or 2) they can choose to "let it ride" by pulling the handle (or activating a lever or pushing a button on the user interface of the specialized slot machine/terminal) to form a new group with five other new contestants and try to re-double their money by playing in a new round.

The bottom scoring four contestants of a group are eliminated and lose their money. The bottom scoring four contestants can either leave the specialized slot machine or put more money into the specialized slot machine to play again by playing in a new group of six contestants.

The casino/venue provides powerful motivation in two directions for winning contestants to stay in for another round instead of cashing out. First, winning contestants can "let it ride" and attempt to redouble their money each time they stay in instead of cashing out. Secondly, the specialized slot machine experience of the example embodiment offers another huge incentive for people to stay in. Any contestant who advances ten consecutive times will play in a Tournament of Champions (TOC) sponsored by the casino/venue in which they are playing.

It is important to note that a "current events on the news" format is just one of a myriad of options that can be used for the ten qualifying rounds for the TOC. For example, contestants can compete by selecting singers in a singing competition, political debate competition, survivors for a survival competition, television shows for a ratings competition, movies for a movies competition, etc. The possibilities are endless as long as the competition is based on real time/live events.

The rationale for offering TOC is to provide a huge incentive for contestants to not cash out and to continue playing on the specialized slot machines. The TOC pays out millions of dollars to the winner and other top finishers and is a very attractive incentive for people to try and qualify for (and therefore not cash out).

For clarification purposes, even though contestants might be playing people assigned by a managing entity from other casinos/venues, this doesn't mean that this is a coordinated multi-casino TOC. Each casino/venue hosts their own TOC, which can be run directly from their website, off their own slot machines, or could even be live action in their casino/venue.

The reason casinos are motivated to have contestants NOT cash out is because each time the contestant lets it ride into another round, the percentage of the money the casino/venue takes in goes up significantly. For example, if the two winners from every group always cashed out, the casino would receive a standard 33% of the revenue. If, however, players never cashed out and always let it ride, by round ten the casinos/venues would always receive a staggering 98.3% of the revenue.

The table set forth above showing an example of the casino vs. contestant revenue split depending on the round from which contestants decide to cash out again illustrates the benefit for the casino/venue if players decide to remain in the game.

Contestants can play up to 15 rounds on a specialized slot machine as they attempt to double their money each new round. This means they can continue to try and re-double their money even after qualifying for the TOC by successfully winning ten consecutive times. If a TOC qualifier loses in rounds 11 to 15, they do not forfeit their TOC seat.

The Specialized Slot Machine Tournament Structure for Current Events in an Example Embodiment The following description provides a general overview of the specialized slot machine tournament structure for current events in an example embodiment:

There are five bidding sessions for each group of six contestants participating in a given round of the competition.

Contestants bid on a group of three (of the 18 total) current events news categories called a "bloc".

Contestants only get one bloc of current event news categories for the competition.

The first time a contestant wins a bid, they receive that bloc that they bid on and are no longer allowed to bid. A black circle will be placed by their position on the specialized slot machine display screen indicating that they are done trying to secure a bloc.

The specialized slot machine begins the selection process by showing three of the 18 current event news categories as a "bloc" to be bid on.

All three contestants have the option of making a percentage bid (the maximum range is from 1% to 100%) on the three current events categories or passing on them with a "No Bid".

Contestants have 30 seconds to make a bid. In order to make the bid official, a contestant pulls the lever of the specialized slot machine (or otherwise activates a button or an object displayed on the display screen of the specialized slot machine). If a contestant fails to make a bid during the allotted time, the contestant automatically receives a "No Bid". Bids are time stamped based on the time when the lever was pulled (or other object was activated) to break ties.

Because contestants only have 30 seconds to bid for each of the five rounds, the entire game only takes two minutes and thirty seconds for the bidding process.

Once each contestant has their bloc of three current events categories, the specialized slot machine computes the final score of the match immediately based on a scoring that includes the following three scoring factors:

Factor #1—Raw Score—This is the point total a current event news category is given. The point total is based on how much time the category was on the air in the last hour—up until the moment the bidding process ends and the final scores are tabulated. This number is determined by the total minutes of time that a current events news category appeared on all of the national news stations in comparison to all of the minutes from all of the other current events news categories. This number is represented as a percent that is calculated by the following process: total combined minutes a given category appeared on all news stations divided by the total time (in minutes) that all categories (including the category being measured) were on in the last hour. This number will be represented as a percentage. There is a straight across correlation of this percentage to the total raw score. For example, if 7% of the overall minutes were devoted to presidential politics, then the total raw score for presidential politics would be 7 points.

Factor #2—Percentage Bid—The raw score is then multiplied by the percentage bid to determine the portion of the raw score for which the contestant qualifies.

Factor #3—Multiplier Bonus—Whatever the percentage of the raw score a contestant has, this total is then multiplied by the multiplier bonus that a given current events category has by its spot on the display screen of the specialized slot machine.

The percentage bid a contestant makes cannot be a decimal or a fraction. It must always be a whole percent.

Contestants will either have a green, red or black circle by their spot on the display screen of the specialized slot machine at all times. A green circle denotes that they have turned in their bid. A red circle denotes that they have not yet submitted their bid. A black circle denotes that they have already secured a bloc of live action news categories from a previous round and are ineligible to bid.

The lowest bid wins the entire bloc of three current event categories. If there is a tie amongst two or more contestants for the best bid, the contestant who submitted their bid first receives the bloc of three current event news categories.

Because there are exactly 18 current event news categories, there are exactly three current event news categories per contestant with no overlap.

If none of the contestants bid on a bloc, this bloc will be reintroduced later as a "mulligan" (see below for a more detailed explanation on a mulligan). In other words, there will not be a new bloc of current event categories that replaces a round that has no bidders.

Once a contestant wins a bloc, they are set with their three current event categories and are ineligible to bid anymore. A black circle will be placed by their spot on the display screen of the specialized slot machine to indicate they are no longer eligible to bid anymore.

Why doesn't a contestant just bid 1% on the first bloc of current events news categories that they really like? If the lowest bid wins, this seems like a no-brainer strategy that will automatically secure the current events news categories that they desire by submitting the lowest percentage which is 1%. However, this strategy would be counter-productive and would virtually guarantee that the contestant would come in last place. The reason for this is because the percentage bid serves two purposes. The bid not only secures the bloc of current events news categories by having the lowest bid, but the bid also severely penalizes contestants for making unreasonably low bids. For example, a 1% bid will undoubtedly win a contestant the current events news categories that they desire, but this bid also represents the percentage of raw points from each current events category that they are eligible for in the game itself. For example, if a contestant bids 1% to win the current event categories that they desire, which consists of Sports, Medicine and Congressional Politics, the contestant will be terribly disappointed to learn that they also only get 1% of the raw points that each of these categories tallied. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.

In the example embodiment, two additional rules heighten the drama of the tournament format implemented on the specialized slot machine. These additional rules are described below:

Each current events category can have multipliers assigned to them. The ranges of multipliers can vary from 6× (read "6 times") all the way to 10×. They aren't assigned uniformly to each current events category, though. The multipliers can be split up and have different levels of intensity based on individual current events categories. For example, the specialized slot machine might flash that the multiplier is 7×, which means that the three current event categories now up for bid will have multipliers that have a sum total of 7×. However, their placement will be random as will their intensity (or value) on each current events news category. For the 7× example, this means that the total on the multipliers for the three current event news categories must add up to seven. It could be that the first current event news category is worth 1× its raw point total, the second current event news category 5×, and the third current event news category 1×. It could also be 2×, 2× and 3× respectively. Using the later example, this means that the first current event news category shown would be worth double its point total. The second current event news category shown would be worth double its point total. The third current event news category shown would be worth triple its point total.

For each new round, the maximum bid possible will be 8% less than the previous round. The specialized slot machine will show the bidding range for each round. For example, for the first round, the specialized slot machine will give the range as 1% to 100%. By the fourth round, this range will be down to 1% to 76%. This creates an urgency to get involved in the bidding process for each round, but also have enough skill to know what a proper bid is for a given bloc so that it isn't secured with a ridiculously low bid. After five rounds of bidding have occurred, the last person remaining in the group without a bloc automatically gets the last bloc that wasn't bid on for 60% of the raw points that each particular current events category scores in the one hour interval that is being measured. See the, "Table Showing Max and Min Bidding Percentages Allowed Each Round" set forth above for an example embodiment.

Given the description of the example embodiment as provided above, one might think that the game is unfair if some current events categories might have as low as a 6× multiplier while others might be as high as a 10× multiplier? However, this feature of an example embodiment makes the game even more strategic. Now, contestants will have to factor into the calculus the fact that a current events category might be diminished in value because it has a smaller multiplier and a less desirable current events category is now more valued because of a higher multiplier. Even if a highly sought after current events category has a 10× multiplier, this won't be a problem; because, it will drive the percentage bid lower to even things out. Conversely, a less desirable current events category, with a small multiplier, should be able to be secured with a bid considerably higher than the norm.

In the example embodiment as described, somebody is going to eventually get a bloc; because, there are no backup current events blocs available—and everybody is going to eventually need a bloc. All blocs not bid on are called "mulligans" and will be reintroduced after all the blocs have been revealed. If there is more than one bloc for which a bid is not received, the blocs are reintroduced in the order that they first appeared. Also, the maximum bid for a new round does not go down 8% if the previous bloc was a mulligan. When the blocs not bid on are reintroduced and all six blocs have been shown and either bid on or passed on, the maximum bid for the reintroduced blocs go down 8% each time a new one is reintroduced and bid on. If there is a tie for a final position, amongst tied players, the person who secured their bloc in the lowest or latest round advances.

Once the bids are received from the contestants for a particular round, the contestants in the group are scored for final positions. The specialized slot machine of an example embodiment can gather the data for all current events categories in the contest and then compute the final positions. This computation will take no more than five seconds after all contestants have secured their blocs. The specialized slot machine will tabulate the scores for all of the current events categories. Once the specialized slot machine tabulates final scores for individual current events categories, the specialized slot machine can add the scores together for blocs of current events categories belonging to the same contestant. The contestants will then be ranked 1-6 (one through six) on the specialized slot machine display screen. For example, to tabulate the score of a single current events news category, three components of information are required. First, the news category's raw score is calculated. The second component of information needed is the bid with which that the news category was secured. Finally, the multiplier on the news category is factored in. Let's assume a Religion news category has a 4.7% of the airtime raw score when the bidding process ends. This gives the category a raw score of 4.7 points. Then, assume this category is secured with a 68% bid and the multiplier on it is 3×. Because 68% of 4.7 is 3.2 and when 3.2 is multiplied by 3, the result is 9.6. This means that Religion's overall score is 9.6 points and would be added to the scores of their other two current event news categories from their bloc. Finally, tied positions always are broken by awarding the person who secured their bloc during the later round the higher finishing spot in the final standings.

An Example Embodiment Providing a Specialized Slot Machine for Implementing: A Slot Machine for Real Time Live Action Events—Debate Events FIG. 6 through FIG. 9 illustrate an example embodiment, implemented as a specialized slot machine, which shows the basic elements of the user interface for implementing a tournament with multi-contestant small group rounds on the specialized slot machine. The specialized slot machine and the user interface thereon can be used to implement a variety of different tournament formats on the specialized slot machine of an example embodiment. The following description provides a general overview of one such tournament format in an example embodiment.

In various example embodiments described below, real time/live events and related tournament formats are implemented on a specialized slot machine. These example embodiments use real life events to transform the specialized slot machine from a static entity, that is currently based solely on canned information, into a real time/live event gaming apparatus.

As described above, the real time/live action events of the example embodiments constitute the gaming material itself. This specialized slot machine and the particular tournament formats of the various example embodiments described herein are based on real time/live event data. In other words, the decisions the players are making with the game itself are based on events that are happening at the time the game is being played.

This real time/live event slot idea can be used for all types of real life events. For the purposes of this example embodiment, the described example embodiment uses the specialized slot machine with real time/live current political debate events to create a new type of specialized slot machine.

- The current political debate event specialized slot machines, as described herein, are placed in casinos or other venues throughout the world. These specialized slot machines can be programmed to provide a competition related to any real time/live event contestants may desire to play.
- These specialized slot machines are linked to a central network-accessible database so that contestants competing in a given "group game" can be playing in different casinos/venues throughout the world. In other words, if a person sits down in the MGM™ in Las Vegas, they don't have to sit and wait until their group of six people is filled by people sitting in that particular MGM™ casino. The other five players competing against them can be sitting in casinos/venues anywhere in the world.
- Contestants sit at their own individual specialized slot machine/terminal as described herein. They are given the choice to enter for $1, $5, $20, $50 and $100 contests (or any other entry amount that casinos/venues find attractive for a slot machine).
- When a contestant looks at the display screen of the specialized slot machine/terminal, they will see an image on the display screen, as presented by the user interface logic of an example embodiment described herein, showing a virtual card table with six places (e.g., see FIG. 9). The contestant at the specialized slot machine/terminal will be one of the players occupying one of these six places at the virtual card table presented by the specialized slot machine/terminal.
- The contestant puts an amount of money into the specialized slot machine/terminal corresponding to the level of play at which they want to participate. For example, the contestant might put $1 in for the dollar game, $10 in for the ten dollar game, or $20 in for the twenty dollar game, to enter the game.
- The contestant then pulls down the handle (or activates a lever or pushes a button on the user interface of the specialized slot machine/terminal) and the specialized slot machine/terminal starts generating a variety of enticing and entertaining graphics that flash around until the contestant has a full group of three other players to play against (who are also playing for the same entry amount). Because the game will fill quickly with players, the graphic display generations, which take about five seconds, will take longer than the time needed to fill a live group of players, which will happen immediately, because the game and the players are linked to casinos/venues throughout the country/world (e.g., geographically distributed).

Groups are always comprised of three contestants in an example embodiment. A game or competition (e.g., a debate), in an example embodiment, must have at least three people (debaters) in the debate.

The number of debaters associated with each contestant in a group of three contestants can vary.

Contestants in the game are each associated with at least one debater in the debate. The following list defines the number of debaters that are associated with each of the three contestants in each group depending on the number of debaters who are participating in the debate:

- 3 debaters=1 group of 3 contestants with each receiving 1 debater
- 4 debaters=1 group of 3 contestants with each receiving 1 debater
- 5 debaters=1 group of 3 contestants with each receiving 1 debater
- 6 debaters=1 group of 3 contestants with each receiving 2 debaters
- 7 debaters=1 group of 3 contestants with each receiving 2 debaters
- 8 debaters=1 group of 3 contestants with each receiving 2 debaters
- 9 debaters=1 group of 3 contestants with each receiving 3 debaters
- 10 debaters=1 group of 3 contestants with each receiving 3 debaters The other contestants, who will fill the remaining two places in the debate group as presented by the specialized slot machine/terminal, will be anonymous on the display screen in front of a given contestant. The user interface logic will configure the user interface of the example embodiment for each player to identify the different player positions as “YOU”, “Contestant #1”, “Contestant #2”, etc.

The contestants are instructed that they will see from one to three debaters (depending on the parameters described above). The contestants are instructed that the game will be based on live action scoring from the debate that is currently in progress.

For every group of three competing contestants, the top finishing contestant in each of these groups is considered a winner.

These top scoring winners for each group have one of two options. The top scoring winners can either: 1) cash out by pressing a button (or activating a virtual object on the user interface of the specialized slot machine/terminal) that cashes them out and automatically doubles their money, or 2) they can choose to “let it ride” by pulling the handle (or activating a lever or pushing a button on the user interface of the specialized slot machine/terminal) to form a new group with two other new contestants and try to re-double their money by playing in a new round.

The bottom scoring two contestants of a group are eliminated and lose their money. The bottom scoring two contestants can either leave the specialized slot machine or put more money into the specialized slot machine to play again by playing in a new group of three contestants.

The casino/venue provides powerful motivation in two directions for winning contestants to stay in for another round instead of cashing out. First, winning contestants can “let it ride” and attempt to redouble their money each time they stay in instead of cashing out. Secondly, the specialized slot machine experience of the example embodiment offers another huge incentive for people to stay in. Any contestant who advances ten consecutive times will play in a Tournament of Champions (TOC) sponsored by the casino/venue in which they are playing.

The rationale for offering TOC is to provide a huge incentive for contestants to not cash out and to continue playing on the specialized slot machines. The TOC pays out millions of dollars to the winner and other top finishers and is a very attractive incentive for people to try and qualify for (and therefore not cash out).

The reason casinos are motivated to have contestants not cash out is because each time the contestant lets it ride into another round, the percentage of the money the casino/venue takes in goes up significantly. For example, if the two winners from every group always cashed out, the casino would receive a standard 33% of the revenue. If, however, players never cashed out and always let it ride, by round ten the casinos/venues would always receive a staggering 98.3% of the revenue.

The table set forth above showing an example of the casino vs. contestant revenue split depending on the round from which contestants decide to cash out again illustrates the benefit for the casino/venue if players decide to remain in the game.

Contestants can play up to 15 rounds on a specialized slot machine as they attempt to double their money each new round. This means they can continue to try and re-double their money even after qualifying for the TOC by successfully winning ten consecutive times. If a TOC qualifier loses in rounds 11 to 15, they do not forfeit their TOC seat.

The Specialized Slot Machine Tournament Structure for Current Debate Events in an Example Embodiment The following description provides a general overview of the specialized slot machine tournament structure for current debate events in an example embodiment:

There are two bidding sessions for each group of three contestants participating in a given round of the competition.

Contestants bid on either one, two or three debaters at one time. The number of debaters a contestant bids on at one times depends on the number of debaters available for each contestant to receive. If contestants bid on more than one debater at the same time, this group of two or three debaters is called a “bloc”.

Contestants only get one bloc (or single debater when applicable) for the competition.

The first time a contestant wins a bid, they receive that debater or bloc that they bid on and are no longer allowed to bid. A black circle will be placed by their position on the specialized slot machine display screen indicating that they are done trying to secure a debater or bloc.

The specialized slot machine begins the selection process by showing the name or names of the debater(s) to bid on.

All three contestants have the option of making a percentage bid (the maximum range is from 1% to 100%) on the debater(s) in front of them or passing with a “No Bid”.

Contestants have 30 seconds to make a bid. In order to make the bid official, a contestant pulls the lever of the specialized slot machine (or otherwise activates a button or an object displayed on the display screen of the specialized slot machine). If a contestant fails to make a bid during the allotted time, the contestant automatically receives a "No Bid". Bids are time stamped based on the time when the lever was pulled (or other object was activated) to break ties.

Because contestants only have 30 seconds to bid for each of the two rounds, the entire game only takes one minute for the bidding process.

Once each contestant has their debater or bloc, the specialized slot machine computes the final score of the match immediately based on a scoring that includes the following three scoring factors:

Factor #1—Raw Score—This is the point total a debater is given for their performance. This number is determined by a real time/live tracking poll that gives the favorability rating for how each debater is doing based on a live polling process amongst debate watchers. There is a straight across correlation between the percentage favorability rating and total points. If 73% of the viewers like what "Debater A" has to say, then that debater is scored with 73 points.

Factor #2—Percentage Bid—The raw score is then multiplied by the percentage bid to determine the portion of the raw score for which the contestant qualifies.

Factor #3—Multiplier Bonus—Whatever the percentage of the raw score a contestant has, this total is then multiplied by the multiplier bonus that a given debater has by their name in a spot on the display screen of the specialized slot machine.

The percentage bid a contestant makes cannot be a decimal or a fraction. It must always be a whole percent.

Contestants will either have a green, red or black circle by their spot on the display screen of the specialized slot machine at all times. A green circle denotes that they have turned in their bid. A red circle denotes that they have not yet submitted their bid. A black circle denotes that they have already secured a debater or a bloc of debaters from a previous round and are ineligible to bid.

The lowest bid wins the debater or entire bloc of debaters. If there is a tie amongst two or more contestants for the best bid, the contestant who submitted their bid first receives the debater or bloc of debaters.

If none of the contestants bid on a debater or bloc, this debater or bloc will be reintroduced later as a "mulligan" (see below for a more detailed explanation on a mulligan). In other words, there will not be a new debater or bloc of debaters that replaces a round that has no bidders.

Once a contestant wins a debater or bloc of debaters, they are set with their debater(s) and are ineligible to bid anymore. A black circle will be placed by their spot on the display screen of the specialized slot machine to indicate they are no longer eligible to bid anymore.

Why doesn't a contestant just bid 1% on the first debater or bloc of debaters that they really like? If the lowest bid wins, this seems like a no-brainer strategy that will automatically secure the debater or bloc of debaters that they desire by submitting the lowest percentage which is 1%. However, this strategy would be counter-productive and would virtually guarantee that the contestant would come in last place. The reason for this is because the percentage bid serves two purposes. The bid not only secures the debater(s) by having the lowest bid, but the bid also severely penalizes contestants for making unreasonably low bids. For example, a 1% bid will undoubtedly win a contestant the debater(s) that they desire, but this bid also represents the percentage of each debater's points that they are eligible for in the game itself. For example, if a contestant bids 1% to win a debater(s) they desire, such as Donald Trump and Jeb Bush, the contestant will be terribly disappointed to learn that they also only get 1% of the points that each of these debaters scored. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.

In the example embodiment, two additional rules heighten the drama of the tournament format implemented on the specialized slot machine. These additional rules are described below:

Debaters or blocs of debaters can have multipliers on them for each individual person. The ranges of multipliers can vary from 6× (read "6 times") all the way to 10×. They aren't assigned uniformly to situations that involve blocs though. The multipliers will be split up and have different levels of intensity on individual debaters. For example, the specialized slot machine might flash that the multiplier is 7×, which means that the three debaters shown will have multipliers that have a sum total of 7×. However, their placement will be random as will their intensity (or value) on each debater. For the 7× example, this means that the total on the multipliers for the three debaters must add up to seven. It could be that the first debater is worth 1× their point total, the second debater 5×, and the third debater 1×. It could also be 2×, 2× and 3× respectively. Using the later example, this means that the first debater unveiled would mean the debater would be worth double their point total. The second debater shown would mean the debater would be worth double their point total. The third debater shown would mean the debater would be worth triple their point total.

For the second round, the maximum bid possible will be 10% less than the first round. The specialized slot machine will show the bidding range for each round. This means that the second round has a maximum of 90%.

Table Showing Max and Min Bidding Percentages Allowed Each Round for the Debate Embodiment

| | Maximum Bid Allowed | Minimum Bid Allowed |
|---|---|---|
| Round 1 | 100% | 1% |
| Round 2 | 90% | 1% |
| Last Contestant Remaining | No Bid-Automatically receives bloc at 80% | No Bid-Automatically receives bloc at 80% |

Given the description of the example embodiment as provided above, one might think that the game is unfair if some debaters or blocs of debaters might have as low as a 6× multiplier while others might be as high as a 10× multiplier? However, this feature of an example embodiment makes the game even more strategic. Now, contestants will have to factor into the calculus the fact that a debater/bloc might be diminished in value because they have a smaller multiplier and a less desirable debater/bloc is now more valued because of a higher multiplier. Even if a highly sought after debater/bloc has a 10× multiplier, this won't be a problem; because, it will drive the percentage bid lower to even things out. Conversely, a less desirable debater/bloc, with a small multiplier, should be able to be secured with a bid considerably higher than the norm.

In the example embodiment as described, somebody is going to eventually get a bloc; because, there are no backup debaters/blocs available—and everybody is going to eventually need a debater/bloc. All debaters/blocs that are not bid on are called "mulligans" and will be reintroduced after all the blocs have been revealed. If there is more than one bloc for which a bid is not received, the blocs are reintroduced in the order that they first appeared. Also, the maximum bid for a new round does not go down 10% if the previous bloc was a mulligan. When the blocs not bid on are reintroduced and all three debaters/blocs have been shown and either bid on or passed on, the maximum bid for the reintroduced blocs go down 10% each time a new one is reintroduced and bid on. If there is a tie for a final position, amongst tied players, the person who secured their debaters/bloc in the lowest or latest round advances.

Once the bids are received from the contestants for a particular round, the contestants in the group are scored for final positions. The specialized slot machine of an example embodiment can gather the data for all debaters in the contest and then compute the final positions. This computation will take no more than five seconds after all contestants have secured their debaters/blocs. The specialized slot machine can tabulate the scores for all of the debaters/blocs. Once the specialized slot machine tabulates final scores for individual debaters/blocs, the specialized slot machine can add the scores together for debaters/blocs belonging to the same contestant. The contestants can then be ranked 1-3 (one through three) on the specialized slot machine display screen. For example, to tabulate the score of a single debater, three components of information are required. First, the debater's raw score is retrieved from a polling source. The second component of information needed is the bid with which the debater was secured. Finally, the multiplier on the debater is factored in. Let's assume Hillary Clinton has a debate approval rating of 81% when the bidding process ends. This gives her a raw score of 81 points. Then, assume she is secured with a 68% bid and the multiplier on her is 3×. Because 68% of 81 is 55.08 and when 55.08 is multiplied by 3, the result is 165.24. This means that Clinton's score is 165.24 and would either be a standalone score for a contestant or added to the other debater scores in that contestant's bloc. Finally, tied positions always are broken by awarding the person who secured their bloc during the later round the higher finishing spot in the final standings.

Some groups of three contestants will have scores based on live data from the debate when it is just beginning and some when it is about to finish. But, this characteristic of real time/live event competition just adds another exciting element into the equation. It is important to remember that all contestants in a given group can bid on debaters/blocs that are at the same juncture in their real time/live action debate. The prepared contestant is going to have an idea how the action in the debate is unfolding to make a more educated bid during the bidding process. Again, how debaters are valued at any given time is no different than the fluctuations of the stock market. This feature is exactly why real time/live action play redefines what slot play is all about.

An Example Embodiment Providing a Specialized Slot Machine for Implementing: A Slot Machine for Real Time Live Action Events—Trending on Social Media (e.g., Twitter™) Events FIG. 6 through FIG. 9 illustrate an example embodiment, implemented as a specialized slot machine, which shows the basic elements of the user interface for implementing a tournament with multi-contestant small group rounds on the specialized slot machine. The specialized slot machine and the user interface thereon can be used to implement a variety of different tournament formats on the specialized slot machine of an example embodiment. The following description provides a general overview of one such tournament format in an example embodiment.

In various example embodiments described below, real time/live events and related tournament formats are implemented on a specialized slot machine. These example embodiments use real life events to transform the specialized slot machine from a static entity, that is currently based solely on canned information, into a real time/live event gaming apparatus.

As described above, the real time/live action events of the example embodiments constitute the gaming material itself. This specialized slot machine and the particular tournament formats of the various example embodiments described herein are based on real time/live event data. In other words, the decisions the players are making with the game itself are based on events that are happening at the time the game is being played.

This real time/live event slot idea can be used for all types of real life events. For the purposes of this example embodiment, the described example embodiment uses the specialized slot machine with real time/live current "trending on Twitter™" events or topics to create a new type of specialized slot machine.

- The current "trending on Twitter™" event specialized slot machines, as described herein, are placed in casinos or other venues throughout the world. These specialized slot machines can be programmed to provide a competition related to any real time/live event contestants may desire to play.
- These specialized slot machines are linked to a central network-accessible database so that contestants competing in a given "group game" can be playing in different casinos/venues throughout the world. In other words, if a person sits down in the MGM™ in Las Vegas, they don't have to sit and wait until their group of six people is filled by people sitting in that particular MGM™ casino. The other five players competing against them can be sitting in casinos/venues anywhere in the world.
- Contestants sit at their own individual specialized slot machine/terminal as described herein. They are given the choice to enter for $1, $5, $20, $50 and $100 contests (or any other entry amount that casinos/venues find attractive for a slot machine).
- When a contestant looks at the display screen of the specialized slot machine/terminal, they will see an image on the display screen, as presented by the user interface logic of an example embodiment described herein, showing a virtual card table with six places (e.g., see FIG. 9). The contestant at the specialized slot machine/terminal will be one of the players occupying one of these six places at the virtual card table presented by the specialized slot machine/terminal.
- The contestant puts an amount of money into the specialized slot machine/terminal corresponding to the level of play at which they want to participate. For example, the contestant might put $1 in for the dollar game, $10 in for the ten dollar game, or $20 in for the twenty dollar game, to enter the game.
- The contestant then pulls down the handle (or activates a lever or pushes a button on the user interface of the specialized slot machine/terminal) and the specialized slot machine/terminal starts generating a variety of enticing and entertaining graphics that flash around until the contestant has a full group of six other players to play against (who are also playing for the same entry amount). Because the game will fill quickly with players, the graphic display generations, which take about five seconds, will take longer than the time needed to fill a live group of players, which will happen immediately, because the game and the players are linked to casinos/venues throughout the country/world (e.g., geographically distributed).

Groups are always comprised of six contestants in an example embodiment.

The other five contestants, who will fill the remaining five places at the virtual card table presented by the specialized slot machine/terminal, will be anonymous on the display screen in front of a given contestant. The user interface logic will configure the user interface of the example embodiment for each player to identify the different player positions as “YOU”, “Contestant #1”, “Contestant #2”, etc. (see FIG. 9).

The contestants are instructed that they will see three categories that are some of the most popular topics trending on Twitter™ at the moment. The contestants will decide on whether they want the categories or not. The contestants are instructed that the game will be based on the most popular topics trending on Twitter™ at that very moment.

There are 18 Twitter™ topics in an example embodiment. These Twitter™ topics are the 18 most popular topics currently trending on Twitter™.

These 18 Twitter™ topics will all be worth a set value. The point value will be determined by the following process: The number of people following a given topic divided by the number of people following all 18 of the other topics combined. This value will be displayed as a percentage. This percentage will then be converted to a point total. For example, let’s assume that one of the 18 top trending topics on Twitter™ is Adele’s new song “Hello”. Let’s assume that amongst the top 18 trending Twitter™ topics, it has garnered 7.4% of the followers. This means that this topic is worth 7.4 points for the competition—before the bidding percentages and multiplier bonuses are factored in.

For every group of six competing contestants, the top scoring two contestants in each of these groups are considered winners. There is no distinction between finishing first and second. The top scoring two contestants are both winners and are eligible for the same prize if they choose to cash out.

These two top scoring winners for each group have one of two options. The two top scoring winners can either: 1) cash out by pressing a button (or activating a virtual object on the user interface of the specialized slot machine/terminal) that cashes them out and automatically doubles their money, or 2) they can choose to “let it ride” by pulling the handle (or activating a lever or pushing a button on the user interface of the specialized slot machine/terminal) to form a new group with five other new contestants and try to re-double their money by playing in a new round.

The bottom scoring four contestants of a group are eliminated and lose their money. The bottom scoring four contestants can either leave the specialized slot machine or put more money into the specialized slot machine to play again by playing in a new group of six contestants.

The casino/venue provides powerful motivation in two directions for winning contestants to stay in for another round instead of cashing out. First, winning contestants can “let it ride” and attempt to redouble their money each time they stay in instead of cashing out. Secondly, the specialized slot machine experience of the example embodiment offers another huge incentive for people to stay in. Any contestant who advances ten consecutive times will play in a Tournament of Champions (TOC) sponsored by the casino/venue in which they are playing.

It is important to note that a “trending on Twitter™” format is just one of a myriad of options that can be used for the ten qualifying rounds for the TOC. For example, contestants can compete by selecting singers in a singing competition, political debate competition, survivors for a survival competition, television shows for a ratings competition, movies for a movies competition, etc. The possibilities are endless as long as the competition is based on real time/live events.

The rationale for offering TOC is to provide a huge incentive for contestants to not cash out and to continue playing on the specialized slot machines. The TOC pays out millions of dollars to the winner and other top finishers and is a very attractive incentive for people to try and qualify for (and therefore not cash out).

For clarification purposes, even though contestants might be playing people assigned by a managing entity from other casinos/venues, this doesn’t mean that this is a coordinated multi-casino TOC. Each casino/venue hosts their own TOC, which can be run directly from their website, off their own slot machines, or could even be live action in their casino/venue.

The reason casinos are motivated to have contestants not cash out is because each time the contestant lets it ride into another round, the percentage of the money the casino/venue takes in goes up significantly. For example, if the two winners from every group always cashed out, the casino would receive a standard 33% of the revenue. If, however, players never cashed out and always let it ride, by round ten the casinos/venues would always receive a staggering 98.3% of the revenue.

The table set forth above showing an example of the casino vs. contestant revenue split depending on the round from which contestants decide to cash out again illustrates the benefit for the casino/venue if players decide to remain in the game.

Contestants can play up to 15 rounds on a specialized slot machine as they attempt to double their money each new round. This means they can continue to try and re-double their money even after qualifying for the TOC by successfully winning ten consecutive times. If a TOC qualifier loses in rounds 11 to 15, they do not forfeit their TOC seat.

The Specialized Slot Machine Tournament Structure for Current “Trending on Twitter™” Events in an Example Embodiment The following description provides a general overview of the specialized slot machine tournament structure for current “trending on Twitter™” events in an example embodiment:

There are five bidding sessions for each group of six contestants participating in a given round of the competition.

Contestants bid on a group of three (of the 18 total) hottest topics currently trending on Twitter™ called a “bloc”.

- Contestants only get one bloc of topics currently trending on Twitter™ for the competition.
- The first time a contestant wins a bid, they receive that bloc that they bid on and are no longer allowed to bid. A black circle will be placed by their position on the specialized slot machine display screen indicating that they are done trying to secure a bloc.
- The specialized slot machine begins the selection process by showing three of the 18 hottest topics currently trending on Twitter™ as a "bloc" to be bid on.
- All three contestants have the option of making a percentage bid (the maximum range is from 1% to 100%) on the three current topics currently trending on Twitter™ or passing on them with a "No Bid".
- Contestants have 30 seconds to make a bid. In order to make the bid official, a contestant pulls the lever of the specialized slot machine (or otherwise activates a button or an object displayed on the display screen of the specialized slot machine). If a contestant fails to make a bid during the allotted time, the contestant automatically receives a "No Bid". Bids are time stamped based on the time when the lever was pulled (or other object was activated) to break ties.
- Because contestants only have 30 seconds to bid for each of the five rounds, the entire game only takes two minutes and thirty seconds for the bidding process.
- Once each contestant has their bloc of three topics currently trending on Twitter™, the specialized slot machine computes the final score of the match immediately based on a process that includes the following three scoring factors:
  - Factor #1—Raw Score—This is the point total a topic currently trending on Twitter™ is given. This is calculated by taking the number of people following a trending Twitter™ topic and then dividing it by the total number of people following the hottest 18 Twitter™ topics at any given moment. This percentage is then converted to a raw point total.
  - Factor #2—Percentage Bid—The raw score is then multiplied by the percentage bid to determine the portion of the raw score for which the contestant qualifies.
  - Factor #3—Multiplier Bonus—Whatever the percentage of the raw score a contestant has, this total is then multiplied by the multiplier bonus that a given current Twitter™ topic has by its spot on the display screen of the specialized slot machine.
- The percentage bid a contestant makes cannot be a decimal or a fraction. It must always be a whole percent.
- Contestants will either have a green, red or black circle by their spot on the display screen of the specialized slot machine at all times. A green circle denotes that they have turned in their bid. A red circle denotes that they have not yet submitted their bid. A black circle denotes that they have already secured a bloc of Twitter™ topics from a previous round and are ineligible to bid.
- The lowest bid wins the entire bloc of three trending on Twitter™ topics. If there is a tie amongst two or more contestants for the best bid, the contestant who submitted their bid first receives the bloc of three trending on Twitter™ topics.
- Because there are exactly 18 trending on Twitter™ topics, there are exactly three trending on Twitter™ topics per contestant with no overlap.
- If none of the contestants bid on a bloc, this bloc will be reintroduced later as a "mulligan" (see herein for a more detailed explanation on a mulligan). In other words, there will not be a new bloc of trending on Twitter™ topics that replaces a round that has no bidders.
- Once a contestant wins a bloc, they are set with their three trending on Twitter™ topics and are ineligible to bid anymore. A black circle will be placed by their spot on the display screen of the specialized slot machine to indicate they are no longer eligible to bid.

Why doesn't a contestant just bid 1% on the first bloc of trending on Twitter™ topics that they really like? If the lowest bid wins, this seems like a no-brainer strategy that will automatically secure the trending on Twitter™ topics that they desire by submitting the lowest percentage which is 1%. However, this strategy would be counter-productive and would virtually guarantee that the contestant would come in last place. The reason for this is because the percentage bid serves two purposes. The bid not only secures the bloc of trending on Twitter™ topics by having the lowest bid, but the bid also severely penalizes contestants for making unreasonably low bids. For example, a 1% bid will undoubtedly win a contestant the trending on Twitter™ topics that they desire, but this bid also represents the percentage of raw points from each trending on Twitter™ topic that they are eligible for in the game itself. For example, if a contestant bids 1% to win the trending on Twitter™ topics that they desire, which hypothetically might consist of, "President Obama's Dog", "The New Star Wars Movie," and "The Royals Just Won the World Series", the contestant will be terribly disappointed to learn that they also only get 1% of the raw points that each of these categories tallied. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.

In the example embodiment, two additional rules heighten the drama of the tournament format implemented on the specialized slot machine. These additional rules are described below:

- Each trending on Twitter™ topic can have multipliers assigned to them. The ranges of multipliers can vary from 6× (read "6 times") all the way to 10×. They aren't assigned uniformly to each trending on Twitter™ topic, though. The multipliers can be split up and have different levels of intensity based on individual trending on Twitter™ topics. For example, the specialized slot machine might flash that the multiplier is 7×, which means that the three trending on Twitter™ topics now up for bid will have multipliers that have a sum total of 7×. However, their placement will be random as will their intensity (or value) on each trending on Twitter™ topic. For the 7× example, this means that the total on the multipliers for the three trending on Twitter™ topics must add up to seven. It could be that the first trending on Twitter™ topic is worth 1× its raw point total, the second trending on Twitter™ topic 5×, and the third trending on Twitter™ topic 1×. It could also be 2×, 2× and 3× respectively. Using the later example, this means that the first trending on Twitter™ topic shown would be worth double its point total. The second trending on Twitter™ topic shown would be worth double its point total. The third trending on Twitter™ topic shown would be worth triple its point total.

For each new round, the maximum bid possible will be 8% less than the previous round. The specialized slot machine will show the bidding range for each round. For example, for the first round, the specialized slot machine will give the range as 1% to 100%. By the fourth round, this range will be down to 1% to 76%. This creates an urgency to get involved in the bidding process for each round, but also have enough skill to know what a proper bid is for a given bloc so that it isn't secured with a ridiculously low bid. After five rounds of bidding have occurred, the last person remaining in the group without a bloc automatically gets the last bloc that wasn't bid on for 60% of the raw points that each particular trending on Twitter™ topic scores in the one hour interval that is being measured. See the, "Table Showing Max and Min Bidding Percentages Allowed Each Round" set forth above for an example embodiment.

Given the description of the example embodiment as provided above, one might think that the game is unfair if some trending on Twitter™ topics might have as low as a 6× multiplier while others might be as high as a 10× multiplier? However, this feature of an example embodiment makes the game even more strategic. Now, contestants will have to factor into the calculus the fact that a trending on Twitter™ topic might be diminished in value because it has a smaller multiplier and a less desirable trending on Twitter™ topic is now more valued because of a higher multiplier. Even if a highly sought after trending on Twitter™ topic has a 10× multiplier, this won't be a problem; because, it will drive the percentage bid lower to even things out. Conversely, a less desirable trending on Twitter™ topic, with a small multiplier, should be able to be secured with a bid considerably higher than the norm.

In the example embodiment as described, somebody is going to eventually get a bloc; because, there are no backup trending on Twitter™ topic blocs available—and everybody is going to eventually need a bloc. All blocs not bid on are called "mulligans" and will be reintroduced after all the blocs have been revealed. If there is more than one bloc for which a bid is not received, the blocs are reintroduced in the order that they first appeared. Also, the maximum bid for a new round does not go down 8% if the previous bloc was a mulligan. When the blocs not bid on are reintroduced and all six blocs have been shown and either bid on or passed on, the maximum bid for the reintroduced blocs go down 8% each time a new one is reintroduced and bid on. If there is a tie for a final position, amongst tied players, the person who secured their bloc in the lowest or latest round advances.

Once the bids are received from the contestants for a particular round, the contestants in the group are scored for final positions. The specialized slot machine of an example embodiment can gather the data for all trending on Twitter™ topics in the contest and then compute the final positions. This computation will take no more than five seconds after all contestants have secured their blocs. The specialized slot machine will tabulate the scores for all of the trending on Twitter™ topics. Once the specialized slot machine tabulates final scores for individual trending on Twitter™ topics, the specialized slot machine can add the scores together for blocs of trending on Twitter™ topics belonging to the same contestant. The contestants will then be ranked 1-6 (one through six) on the specialized slot machine display screen. For example, to tabulate the score of a single trending on Twitter™ topic, three components of information are required. First, the trending on Twitter™ topic's raw score is calculated. The second component of information needed is the bid with which that the trending on Twitter™ topic was secured. Finally, the multiplier on the trending on Twitter™ topic is factored in. Let's assume, "JLo is Getting Divorced Again!" has a 5.2% of the top 18 topics trending on Twitter™ when the bidding process ends. This gives the trending on Twitter™ topic a raw score of 5.2 points. Then, assume this trending on Twitter™ topic is secured with a 68% bid and the multiplier on it is 5×. Because 68% of 5.2 is 3.5 and when 3.5 is multiplied by 5, the result is 17.5. This means that the JLo trending on Twitter™ topic has an overall score of 17.5 points and would be added to the scores of their other two trending on Twitter™ topics from their bloc. Finally, tied positions always are broken by awarding the person who secured their bloc during the later round the higher finishing spot in the final standings.

An Example Embodiment Providing a Specialized Slot Machine for Implementing: A Multi-State Lottery for Fantasy Sports FIG. 6 through FIG. 9 illustrate an example embodiment, implemented as a specialized slot machine, which shows the basic elements of the user interface for implementing a tournament with multi-contestant small group rounds on the specialized slot machine. The specialized slot machine and the user interface thereon can be used to implement a variety of different tournament formats on the specialized slot machine of an example embodiment. The following description provides a general overview of one such tournament format in an example embodiment.

In various example embodiments described herein, two gaming formats have been blended together. One format involves the daily fantasy sports games that are immensely popular and the other format exploits their popularity by combining them with a skill based national tournament.

In in an example embodiment, there are seven essential gaming features required for a skill based national tournament to operate effectively. These features are described in more detail below. The goal of the combined gaming format provided by the specialized slot machine of an example embodiment is to balance two competing factors. One factor calls for maximizing the number of people who can play, which is what companies want to increase profits. The other factor works in the exact opposite direction by seeking to limit participation, which is what contestants want to enhance their chances to demonstrate their skill level.

The format and features of the combined gaming format provided by the specialized slot machine of an example embodiment are described in more detail next.

Format

- Offer a dynamic daily games format that feeds into a national tournament.
- Offer entry fees for the following prices: $1, $5, $10, $20 and $50. Lotteries can decide if there are other entry points as well.
- Players enter a competition for one of the above fees and compete in groups of 12.
- Players finishing in the top four of their group are considered winners and automatically double their money (Beginning with the entry fee amount).
- Players finishing 5th through 12th in their groups are out and they lose their money. Their opportunity to play for the entry fee they selected has expired with no winnings.
- Players who finish in the top four of their group all double their entry fee amount. There are no extra incentives for finishing first as opposed to third—with one exception described below. The goal is simply to finish in the top four.

Top four finishers have a choice to make. They can either cash out and double their entry fee or let it ride.

If players cash out, their entry has expired and they walk away with their winnings.

This decision to cash out or continue playing is made before contestants start playing and is done at the lottery terminal when they sign up to play. This creates a process where the game is skills-based, but everything happens in a one shot deal.

If the top four finishers let it ride, they are put in a new group of 12 and the process repeats itself. If any of the previous top four finishers finish again in the top four, they re-double their money (now 4× their entry fee). If they finish 5th through 12th, they are out and lose everything and leave with nothing.

Incentives to Keep Playing

The combined gaming format described above for an example embodiment guarantees a minimum of 23% share of the entry fee revenue to the "house" (e.g., the lottery provider) for daily games. This is much better than the 10% that most companies (e.g., lottery providers) take for daily games. However, this percentage dramatically increases if players opt to keep playing. Additionally, the percentage take for the lottery provider is always the same for whatever the entry fee is. The two tables below, one for a $50 entry fee and one for a $1 entry fee, illustrate this point.

TABLE #1

Lottery vs. Player Revenue Split (How Doubling Down Increases Revenue for Lottery Providers, $1 Entry Fee)

| Number of Consecutive Rounds Finishing in Top 4 out of 12 | Number of Groups Needed | Number of Players | Total Entry Fee Amount | Lottery Gets | The 4 Winning Players Get | Amount Added to Progressive Jackpot | Odds to Get this Far |
|---|---|---|---|---|---|---|---|
| 1 Round | 1 | 12 | $12 | $2.76 | $8 | $1.24 | 3 to 1 |
| To Win $2 | | | | 23% | 67% | 10% | |
| 2 Rounds | 3 | 36 | $36 | $16.42 | $16 | $3.58 | 9 to 1 |
| To Win $4 | | | | 45.6% | 44.4% | 10% | |
| 3 Rounds | 9 | 108 | $108 | $65.23 | $32 | $10.77 | 27 to 1 |
| To Win $8 | | | | 60.4% | 29.6% | 10% | |
| 4 Rounds | 27 | 324 | $324 | $182.52 | $64 | $77.48 | 81 to 1 |
| To Win $16 | | | | 70.2% | 19.8% | 10% | |
| 5 Rounds | 81 | 972 | $972 | $648.19 | $128 | 195.81 | 243 to 1 |
| To Win $32 | | | | 76.8% | 13.2% | 10% | |
| 6 Rounds | 243 | 2,916 | $2,916 | $2,159.92 | $256 | 500.08 | 729 to 1 |
| To Win $64 | | | | 81.2% | 8.8% | 10% | |
| 7 Rounds | 729 | 8,748 | $8,748 | $6,926.48 | $512 | $1,309.52 | 2,187 to 1 |
| To Win $128 | | | | 84.1% | 5.9% | 10% | |
| 8 Rounds | 2,187 | 26,244 | $26,244 | 21,714.42 | $1,024 | $3,505.58 | 6,561 to 1 |
| To Win $256 | | | | 86.1% | 3.9% | 10% | |
| 9 Rounds | 6,561 | 78,732 | $78,732 | 67,021.82 | $2,048 | 9,662.18 | 19,683 to 1 |
| To Win $512 | | | | 87.4% | 2.6% | 10% | |
| 10 Rounds | 19,683 | 236,196 | $236,196 | 204,944.30 | $4,096 | $27,155.70 | 59,049 to 1 |
| To Win $1,024 | | | | 88.3% | 1.7% | 10% | |

TABLE #2

Lottery vs. Player Revenue Split (How Doubling Down Increases Revenue for Lottery Providers, $50 Entry Fee)

| Number of Consecutive Rounds Finishing in Top 4 out of 12 | Number of Groups Needed | Number of Players | Total Entry Fee Amount | Lottery Gets | The 4 Winning Players Get | Amount Added to Progressive Jackpot | Odds to Get this Far |
|---|---|---|---|---|---|---|---|
| 1 Round | 1 | 12 | $600 | $138 | $400 | $62 | 3 to 1 |
| To Win $100 | | | | 23% | 67% | 10% | |
| 2 Rounds | 3 | 36 | $1,800 | $821 | $800 | $179 | 9 to 1 |
| To Win $200 | | | | 45.6% | 44.4% | 10% | |
| 3 Rounds | 9 | 108 | $5,400 | $3,261.50 | $1,600 | $5.38.50 | 27 to 1 |
| To Win $400 | | | | 60.4% | 29.6% | 10% | |
| 4 Rounds | 27 | 324 | $16,200 | $9,126 | $3,200 | $3,874 | 81 to 1 |
| To Win $800 | | | | 70.2% | 19.8% | 10% | |
| 5 Rounds | 81 | 972 | $48,600 | $32,409.50 | $6,400 | $9,790.50 | 243 to 1 |
| To Win $1,600 | | | | 76.8% | 13.2% | 10% | |
| 6 Rounds | 243 | 2,916 | $145,800 | $107,996 | $12,800 | $25,004 | 729 to 1 |
| To Win $3,200 | | | | 81.2% | 8.8% | 10% | |
| 7 Rounds | 729 | 8,748 | $437,400 | $346,324 | $25,600 | $65,476 | 2,187 to 1 |
| To Win $6,400 | | | | 84.1% | 5.9% | 10% | |
| 8 Rounds | 2,187 | 26,244 | $1,312,200 | 1,085,721 | $51,200 | $175,279 | 6,561 to 1 |
| To Win $12,800 | | | | 86.1% | 3.9% | 10% | |

TABLE #2-continued

Lottery vs. Player Revenue Split (How Doubling Down Increases Revenue for Lottery Providers, $50 Entry Fee)

| Number of Consecutive Rounds Finishing in Top 4 out of 12 | Number of Groups Needed | Number of Players | Total Entry Fee Amount | Lottery Gets | The 4 Winning Players Get | Amount Added to Progressive Jackpot | Odds to Get this Far |
|---|---|---|---|---|---|---|---|
| 9 Rounds To Win $25,600 | 6,561 | 78,732 | $3,936,600 | 3,351,091 87.4% | $102,400 2.6% | 483,109 10% | 19,683 to 1 |
| 10 Rounds To Win $51,200 | 19,683 | 236,196 | $11,809,800 | 10,247,215 88.3% | $204,800 1.7% | $1,357,785 10% | 59,049 to 1 |

As shown in the tables above, this group format of an example embodiment guarantees a minimum of 23% to the lottery for each group of 12 players. In this group format of an example embodiment, the ratios work the same for any entry fee. For all group play, the returns immediately jump to 45.6% to the lottery if a given player lets their winnings ride one time by playing in a round two group. Each time a player decides to let it ride into another round, the lottery makes significantly more money—see the "Lottery Gets" column in Tables #1 and #2. It is essential to create incentives to continue playing. In the group gaming format described herein in an example embodiment, there are at least two incentives created to encourage contestant's to keep playing. Firstly, players keep doubling their money each time they advance. Secondly, players who advance ten consecutive rounds receive automatic berths in a big money TOC.

The Operation of the Group Format of an Example Embodiment at a Lottery Terminal

- Contestants use a value input device at a lottery terminal to put value (e.g., cash or credit) into the lottery terminal in an amount of the contestant's choosing.
- Contestants are prompted to enter or select the quantity of consecutive rounds they wish to play. The minimum is one and the maximum is ten.
- Contestants are advised that each round is contested in randomly selected groups of 12 contestants.
- A contestant must finish in the top four to advance to the next consecutive round. If they fail to do so, their entry has expired and they win no money.
- Once a contestant selects the quantity of consecutive rounds they desire to play, they are bound to this particular selection.
- Contestants are invited to go on-line, to the state lottery website they are playing from, to look at the payouts for the game implemented with the example embodiment described herein. There are two variables that increase the potential winnings for contestants. Firstly, the dollar amount with which the contestant initially enters the game is one factor for determining the maximum amount for which the contestant is playing. Another factor is the quantity of consecutive rounds the contestant agrees to play during a given entry. See table #3 below for an example of the payout amounts.
- The goal of the example embodiment is to encourage contestants to play as many consecutive rounds as possible (up to 10). This is because the lottery retains larger and larger percentages of the entry fee pool the longer people are willing to stay in the game (see tables #1 and #2 above). If every contestant always played only one round each time they entered, the lottery would receive 23% of the entry fees from all of these players. Conversely, if every contestant always played 10 consecutive rounds at a time, the lottery would make 88.3% of all entry fee revenue.
- To entice people to play as many consecutive rounds as possible, there are two huge incentives to keep them going. Firstly, for every consecutive round a contestant enters, they have a chance to double their previous rounds' winnings. Also, all contestants who advance ten consecutive rounds receive an automatic berth in a $2^{nd}$ chance multi-million dollar tournament at the end of the season.

TABLE #3

State Lottery Entry Fee and Payout Table

| Cash Out $$$ | $1 Entry | $5 Entry | $10 Entry | $20 Entry | $50 Entry |
|---|---|---|---|---|---|
| Rd 1 Winners | $2 payout | $10 payout | $20 payout | $40 payout | $100 payout |
| Rd 2 Winners | $4 payout | $20 payout | $40 payout | $80 payout | $200 payout |
| Rd 3 Winners | $8 payout | $40 payout | $80 payout | $160 payout | $400 payout |
| Rd 4 Winners | $16 payout | $80 payout | $160 payout | $320 payout | $800 payout |
| Rd 5 Winners | $32 payout | $160 payout | $320 payout | $640 payout | $1,600 payout |
| Rd 6 Winners | $64 payout | $320 payout | $640 payout | $1,280 payout | $3,200 payout |
| Rd 7 Winners | $128 payout | $640 payout | $1,280 payout | $2,560 payout | $6,400 payout |
| Rd 8 Winners | $256 payout | $1,280 payout | $2,560 payout | $5,120 payout | $12,800 payout |
| Rd 9 Winners | $512 payout | $2,560 payout | $5,120 payout | $10,240 payout | $25,600 payout |
| Rd 10 Winners | $1,024 payout | $5,120 payout | $10,240 payout | $20,480 payout | $51,200 payout |

Contestants at their local lottery terminal can select six athletes for their lineup. For purposes of the example embodiment described herein, we will use fantasy football as an example. However, the group gaming format of the described embodiments can work for all sports. The required positions to fill out for a fantasy football lineup are one QB, two RBs, two WRs and one TE. If a contestant only wants to play one round, their lineup will be printed on a lottery ticket with "Rd 1" on it as well as a game number so the contestant can go to the lottery's website to identify their group of 12 players against whom they are playing. The contestants are also able to check their lineup against the other eleven people they are playing in their group. If a contestant wants to play more than one consecutive round, there is an exact process for lineup submissions for these situations. Firstly, they can't submit the same lineup for more than one round. The reason for this is because if a contestant hits with six athletes that have fantastic games, then the contestant has a chance to quickly advance ten consecutive rounds with one hot lineup, which is not desirable for the lottery holding the contest. At the same time, contestants are not allowed to sit at the lottery terminal and select entire new lineups for each new round of consecutive play. This would keep contestants at the lottery terminal for too long of a time period.

The 33% Solution—In an example embodiment, the lottery game format allows contestants to print lineups for several consecutive rounds (up to 10) in a very quick and timely manner. The format requires contestants to always change one third of their lineup for every new round while also requiring them to keep the other two thirds of their lineup exactly the same as it was for the previous round. To save even more time, contestants are not allowed to decide what two lineup positions they want to swap athletes out for. The lottery will determine these positions that are to be changed to keep the contestant focused on only two positions instead of a possible six for swap outs. Contestants who opt to play multiple consecutive rounds will see the following lineup submission process on their lottery terminal beginning with Round 2:

- For Round 2—The first two positions that the lottery requires to be swapped out are QB and TE. A blank space for QB and TE will appear on the lottery terminal display screen and must be filled in with new names. The other four slots are required to remain the same from the previous round. A contestant selecting to play for exactly two consecutive rounds will have both their Rd 1 and Rd 2 lineups on the printed ticket that is given out at the lottery terminal. This ticket will have a game number that directs the contestant to their Round 1 twelve person match on the lottery's website. If the contestant advances to Round 2, the website will direct them to the game number that they will be competing in for round 2.
- For Rounds 3 through 10—If a contestant pre-determines that they are going to play more than two consecutive rounds when they originally enter the game, the contestant is directed at the lottery terminal to select a lineup for each consecutive round for which the contestant signed up to play.

For the football format, the lineup parameters that a contestant follows in an example embodiment are set forth below. The contestant follows through a progression that is based on the quantity of consecutive rounds for which the contestant originally signed up to play.

- Rd 1—Contestant makes all six lineup selections.
- Rd 2—Contestant selects new QB and TE. The other four athletes must remain the same.
- Rd 3—Contestant selects two new RB's. The other four athletes must remain the same.
- Rd 4—Contestant selects two new WR's. The other four athletes must remain the same.
- Rd 5—Contestant selects new QB and TE. The other four athletes must remain the same.
- Rd 6—Contestant selects two new RB's. The other four athletes must remain the same.
- Rd 7—Contestant selects two new WR's. The other four athletes must remain the same.
- Rd 8—Contestant selects new QB and TE. The other four athletes must remain the same.
- Rd 9—Contestant selects two new RB's. The other four athletes must remain the same.
- Rd 10—Contestant selects two new WR's. The other four athletes must remain the same.

It is important to note that in an example embodiment, once an athlete completes their cycle for a contestant, the athlete cannot be used again for rounds later on. Athletes can only be used one time per entry.

In an example embodiment, the lottery game can close on a Sunday morning, right before kickoff of the first Sunday morning game. The final results are tabulated and dispersed on each participating lottery's website at the conclusion of the Sunday night game. Monday night games (as well as all other non-Sunday games) are ineligible for athlete selection purposes. The rationale for this is to have everything finalized by Sunday night so contestants are buying new lottery tickets on Monday instead of what might happen in their Monday night game.

It is important to understand that, once the Sunday night game has finished, all of the statistics are done. There are no more games to play. The way a contestant who signed up for three consecutive rounds finds out how they did is that the contestant can go to their Round 1 game on the website of the state lottery page where they purchased their ticket. The number on the ticket identifies their game number. They will then check the final standings for their group of twelve contestants. If they finished in the top four, they will be given another game number to check their Round 2 results. If they, again, finish in the top four, they receive a third game number that directs them to their 3rd round game. If they finished in the top four for this 3rd round match, they cash out at this point, because they signed up for three consecutive rounds. If they entered for $20, they would leave with $160 (because $20 doubled is $40 for Rd 1; and $40 doubled again is $80 for Rd 2; and $80 doubled a third time is $160 for Rd 3).

The Sunday night statistics are final—no matter what happens later in the week. Occasionally the NFL™ changes statistics during the following week after looking at film. For example, a pass completion might be changed to a run because the film showed what initially looked like a pass was changed to a lateral. These types of changes will not be considered relevant. It is not in the lottery's best interest to have entire scenarios recalibrated and have people who thought they won on Sunday night find out they lost on Tuesday morning.

Finally, most fantasy sports enthusiasts prefer to have multiple entries in tournaments. The idea is to get them off of the terminal as quickly as possible so the next contestant can get on it. Instead of requiring someone to start all over again to create another entry, the lottery terminal will ask the contestant how many entries they wish to have their submission count for. For example, someone might choose to play a $5 per entry competition and designate they will play for seven consecutive rounds. Once they have created their seven lineups outlined by the process above, they can then designate how many entries they want from this product they created. If they choose six entries, for example, then they would pay $30 ($5 per entry multiplied by the six times they want to enter) and this progression of seven lineups is then entered in six unique first round groups with each one having a separate entry number to track. All of this information is printed on their ticket.

The Operation of Progressive Lottery Format in an Example Embodiment at a Lottery Terminal In an example embodiment, a multi-state lottery system can offer the following to contestants:

- A weekly $5,000,000 payout to the top scorer nationally as well as cash prizes for other top positions.
- A special $10 million bonus pool of money that goes to any contestant who can finish in the top two of their group for ten consecutive rounds. The odds of this happening are 60,466,176 to 1.

An automatic berth into a second chance, for winners only, Tournament of Champions (TOC) for anyone who finishes in the top four for ten consecutive rounds. This tournament of champions is funded through a progressive cash building system that takes 10% of every entry fee during the season and funds the prize pool for this tournament that takes place during the last week of the NFL™'s regular season. The grand prize winner will most likely win hundreds of millions of dollars. In an alternative embodiment, there is another way to qualify for this TOC. The top 10 finishers nationally each week receive an automatic berth.

An end of the year TOC that can work exactly like the ten consecutive rounds format. The lottery system control mechanism can determine the number of contestants who qualified for the TOC and then calculate the number of consecutive rounds needed for all players to compete in a one day event that creates a champion and other top finishers. Most likely the number of rounds will be between an eight to ten round tournament.

The Scoring Process for a Twelve Person Group Play Tournament Structure in an Example Embodiment The following description provides a general overview of the scoring process for a twelve person group play tournament structure in an example embodiment. For the purpose of illustration, the example embodiment is described as implemented for a fantasy football tournament. It will be apparent to those of ordinary skill in the art in view of the disclosure herein that other implementations can be supported as well. The format and rules for the qualifying rounds of the fantasy football tournament of the example embodiment are set forth below.

General

Fantasy players are placed in groups of twelve players.

Fantasy players submit six starters—one QB, two RBs, two WRs, and one TE

Top three scores in a group advance to the next round—the rest are eliminated

Tiebreakers

Fantasy players that tie for a top four position will use the following tiebreaker process in an example embodiment:

1st tiebreaker—Combined touchdowns (TD's) of all athletes in the lineup.

2nd tiebreaker—Combined passing/rushing/receiving yards of all athletes in the lineup.

3rd tiebreaker—Lineup with the athlete with the highest raw fantasy score—i.e., before points are subtracted for duplication.

4th tiebreaker—Lineup with the athlete with the most total TD's.

5th tiebreaker—Lineup with the QB with the most passing yards.

6th tiebreaker—Lineup with the RB with the most rushing yards.

7th tiebreaker—Lineup with the WR with most receiving yards.

8th tiebreaker—Lineup with the TE with most receiving yards.

9th tiebreaker—Lowest combined lost fumbles and interceptions (INT's) of all athletes in lineup.

10th tiebreaker—Contestant who signed up to play the most consecutive rounds on the ticket for the match in which they are participating.

11th tiebreaker—Contestant with the highest average fantasy score from all the rounds they played in off of that ticket to that point.

12th tiebreaker—Computer generated coin flip. This tiebreaker does not count for TOC positions that involve money. The money for a given position is split amongst all contestants who tied for it.

Fantasy Point Values

All fantasy players in a group submit their lineups via a blind submission process (i.e., submissions won't be known to players until all players in a group have submitted their lineups).

Duplication is permitted.

The more duplication that occurs for a given NFL™ athlete, the less their actual fantasy points they scored that round will be worth.

Fantasy players will be given a percentage of the fantasy points their NFL™ player scored depending on how many other fantasy players selected that same NFL™ player. This is called their Adjusted Fantasy Score. For example, using the table set forth below, if twelve fantasy players in a group are playing in a match and four of them select Tom Brady to be their QB, then each of them will receive 73% of the fantasy points that Brady scores for the week (e.g., see table below).

Scores for individual NFL™ players will be rounded to the nearest hundredth.

For contestants who finish in the top four of their group, but are not eligible to cash out, they are directed to a new group for their next round. The duplication process is recalculated with the new group and the lineups they bring forward.

Below is a grid that shows what percentage of an NFL™ player's points a given fantasy participant receives depending on how many other competitors selected that NFL™ player.

TABLE #4

| Percentage of Fantasy Points an NFL ™ Player is Worth Based on Duplication of NFL ™ Players Selected | | | | | | | | | | | | |
|---|---|---|---|---|---|---|---|---|---|---|---|---|
| | NFL ™ player selected 1X* | 2X | 3X | 4X | 5X | 6X | 7X | 8X | 9X | 10X | 11X | 12X |
| 12 player Group | 100% | 91% | 82% | 73% | 64% | 55% | 46% | 37% | 28% | 19% | 10% | 1% |

*Note:
1X above is read as "one time", which means a given NFL ™ player was selected by exactly one of the twelve competitors The table below shows an example of the starting NFL™ players that a twelve person group selected. Note that there is no TE in this example. The percentage under each player's name represents the percentage that the fantasy player will get to keep of the actual fantasy points that their given NFL™ player scored for a particular week. This percentage is based on the number of times an NFL™ player was duplicated and is taken directly from the above table (Table 4).

TABLE #5

Percentage Values for Fantasy Points NFL ™ Players Score with a Group of Twelve Fantasy Players Competing

| | QB | RB #1 | RB #2 | WR #1 | WR #2 |
|---|---|---|---|---|---|
| Fantasy Player 1 | Vick<br>Phila<br>91% | Gore<br>SF<br>91% | Peterson<br>Min<br>10% | Welker<br>NE<br>91% | Johnson<br>Det<br>55% |
| Fantasy Player 2 | Brady<br>NE<br>55% | Peterson<br>Min<br>10% | Mendenhall<br>Pitt<br>100% | Johnson<br>Det<br>55% | Bowe<br>KC<br>100% |
| Fantasy Player 3 | Manning<br>Indy<br>82% | Johnson<br>Ten<br>73% | Peterson<br>Min<br>10% | Johnson<br>Hou<br>64% | Welker<br>NE<br>91% |
| Fantasy Player 4 | Brady<br>NE<br>55% | Johnson<br>Ten<br>73% | Peterson<br>Min<br>10% | Johnson<br>Det<br>55% | Austin<br>Dal<br>100% |
| Fantasy Player 5 | Brees<br>NO<br>100% | Peterson<br>Min<br>10% | Foster<br>Hou<br>100% | White<br>Atl<br>100% | Wallace<br>Pit<br>100% |
| Fantasy Player 6 | Manning<br>Indy<br>82% | Jones-Drew<br>Jax<br>100% | Peterson<br>Min<br>10% | Johnson<br>Hou<br>64% | Jennings<br>GB<br>100% |
| Fantasy Player 7 | Brady<br>NE<br>55% | Johnson<br>Ten<br>73% | Peterson<br>Min<br>10% | Johnson<br>Det<br>55% | Johnson<br>Hou<br>64% |
| Fantasy Player 8 | Vick<br>Phila<br>91% | Bradshaw<br>NYG<br>100% | Peterson<br>Min<br>10% | Marshall<br>Mia<br>100% | Johnson<br>Hou<br>64% |
| Fantasy Player 9 | Brady<br>NE<br>55% | Peterson<br>Min<br>10% | Gore<br>SF<br>91% | Johnson<br>Det<br>55% | Fitzgerald<br>Az<br>82% |
| Fantasy Player 10 | Brady<br>NE<br>55% | Peterson<br>Min<br>10% | Turner<br>Atl<br>100% | Johnson<br>Det<br>55% | Johnson<br>Hou<br>64% |
| Fantasy Player 11 | Brady<br>NE<br>55% | Johnson<br>Ten<br>73% | Rice<br>Balt<br>100% | Fitzgerald<br>Az<br>82% | Wayne<br>Indy<br>100% |
| Fantasy Player 12 | Manning<br>Indy<br>82% | Jackson<br>STL<br>100% | Peterson<br>Min<br>10% | Jackson<br>Phil<br>100% | Fitzgerald<br>Az<br>82% |

Assume that a given NFL™ week has gone by and the Actual Fantasy Scores individual NFL™ players earned are then converted to their Adjusted Fantasy Score based on how many people selected them. Using the sample twelve player fantasy game set forth above (i.e., Table 5), the Adjusted Fantasy Scores for the example are as follows:

TABLE #6

Adjusted Fantasy Scored Based on How Many Selected a Given Player

| Player | Actual Fantasy Score | Percentage Multiplier | *Adjusted Fantasy Score |
|---|---|---|---|
| Vick Phil | 31 | .91 | 28.21 |
| Brady NE | 25 | .55 | 13.75 |
| P. Manning Ind | 40 | .82 | 32.80 |
| Brees NO | 28 | 1.00 | 28.00 |
| Gore SF | 16 | .91 | 14.56 |
| Peterson Min | 33 | .10 | 3.30 |
| Mendenhall Pit | 15 | 1.0 | 15.00 |
| C. Johnson Ten | 29 | .73 | 21.17 |
| Foster Hou | 21 | 1.0 | 21.00 |
| Jones-Drew Jax | 9 | 1.0 | 9.00 |
| Bradshaw NYG | 13 | 1.0 | 13.00 |
| Turner Atl | 31 | 1.0 | 31.00 |
| Rice Balt | 17 | 1.0 | 17.00 |
| S. Jackson STL | 24 | 1.0 | 24.00 |
| Welker NE | 21 | .91 | 19.11 |
| C. Johnson Det | 18 | .55 | 9.90 |
| A. Johnson Hou | 27 | .64 | 17.28 |
| Bowe KC | 11 | 1.0 | 11.00 |
| Austin Dal | 15 | 1.0 | 15.00 |
| White Atl | 13 | 1.0 | 13.00 |
| Wallace Pitt | 25 | 1.0 | 25.00 |
| Jennings GB | 17 | 1.0 | 17.00 |
| Marshall Mia | 16 | 1.0 | 16.00 |
| Fitzgerald Az | 22 | .82 | 18.04 |
| Wayne Ind | 10 | 1.0 | 10.00 |
| D. Jackson Phil | 12 | 1.0 | 12.00 |

*To calculate the Adjusted Fantasy Score, the fantasy tournament processing system multiplies the Actual Fantasy Score by the Percentage Multiplier. For example, Michael Vick scored 31 actual fantasy points and because two people selected him, they each will receive 91% of those points. Vick's Adjusted Fantasy Score is 31 × .91 = 28.21

Below are the final point totals for each of the twelve players competing in this hypothetical match of the example set forth above (see Table 5):

TABLE #7

Final Scores for Hypothetical Match

| | QB | RB #1 | RB #2 | WR #1 | WR #2 | Totals |
|---|---|---|---|---|---|---|
| Fantasy Player 1 | Vick<br>Phila<br>28.21 pts | Gore<br>SF<br>14.56 | Peterson<br>Min<br>3.30 | Welker<br>NE<br>19.11 | Johnson<br>Det<br>9.90 | 75.08<br>$8^{th}$ Place |
| Fantasy Player 2 | Brady<br>NE<br>13.75 pts | Peterson<br>Min<br>3.30 | Mendenhall<br>Pitt<br>15.00 | Johnson<br>Det<br>9.90 | Bowe<br>KC<br>11.00 | 52.95<br>$12^{th}$ Place |
| Fantasy Player 3 | Manning<br>Indy<br>32.80 pts | Johnson<br>Ten<br>21.17 | Peterson<br>Min<br>3.30 | Johnson<br>Hou<br>17.28 | Welker<br>NE<br>19.11 | * 93.66<br>$1^{st}$ Place |
| Fantasy Player 4 | Brady<br>NE<br>13.75 pts | Johnson<br>Ten<br>21.17 | Peterson<br>Min<br>3.30 | Johnson<br>Det<br>9.90 | Austin<br>Dal<br>15.00 | 63.12<br>$10^{th}$ Place |
| Fantasy Player 5 | Brees<br>NO<br>28.00 pts | Peterson<br>Min<br>3.30 | Foster<br>Hou<br>21.00 | White<br>Atl<br>13.00 | Wallace<br>Pit<br>25.00 | * 90.30<br>$2^{nd}$ Place |

TABLE #7-continued

| Final Scores for Hypothetical Match | | | | | | |
|---|---|---|---|---|---|---|
| | QB | RB #1 | RB #2 | WR #1 | WR #2 | Totals |
| Fantasy Player 6 | Manning Indy 32.80 pts | Jones-Drew Jax 9.00 | Peterson Min 3.30 | Johnson Hou 17.28 | Jennings GB 17.00 | 79.38 5th Place |
| Fantasy Player 7 | Brady NE 13.75 pts | Johnson Ten 21.17 | Peterson Min 3.30 | Johnson Det 9.90 | Johnson Hou 17.28 | 65.40 9th Place |
| Fantasy Player 8 | Vick Phila 28.21 pts | Bradshaw N.Y. Giants 13.00 | Peterson Min 3.30 | Marshall Mia 16.00 | Johnson Hou 17.28 | 77.79 6th Place |
| Fantasy Player 9 | Brady NE 13.75 pts | Peterson Min 3.30 | Gore SF 14.56 | Johnson Det 9.90 | Fitzgerald Az 18.04 | 59.55 11th Place |
| Fantasy Player 10 | Brady NE 13.75 pts | Peterson Min 3.30 | Turner Atl 31.00 | Johnson Det 9.90 | Johnson Hou 17.28 | 75.23 7th place |
| Fantasy Player 11 | Brady NE 13.75 pts | Johnson Ten 21.17 | Rice Balt 17.00 | Fitzgerald Az 18.04 | Wayne Indy 10.00 | * 79.96 4th Place |
| Fantasy Player 12 | Manning Indy 32.80 pts | Jackson STL 24.00 | Peterson Min 3.30 | Jackson Phil 12.00 | Fitzgerald Az 18.04 | * 90.14 3rd Place |

Those Player Totals highlighted with "*" finish in the top four and advance to the next round. Fantasy players 3, 5, 11 and 12 would move on.

An Example Embodiment Providing a Specialized Slot Machine for Implementing: A Slot Machine for Real Time Live Action Events—Sports Books FIG. 6 through FIG. 9 illustrate an example embodiment, implemented as a specialized slot machine, which shows the basic elements of the user interface for implementing a tournament with multi-contestant small group rounds on the specialized slot machine. The specialized slot machine and the user interface thereon can be used to implement a variety of different tournament formats on the specialized slot machine of an example embodiment. The following description provides a general overview of one such tournament format in an example embodiment.

In various example embodiments described below, real time/live events and related tournament formats are implemented on a specialized slot machine. These example embodiments use real life events to transform the specialized slot machine from a static entity, that is currently based solely on canned information, into a real time/live event gaming apparatus.

As described above, the real time/live action events of the example embodiments constitute the gaming material itself. This specialized slot machine and the particular tournament formats of the various example embodiments described herein are based on real time/live event data. In other words, the decisions the players are making with the game itself are based on events that are happening at the time the game is being played.

This real time/live event slot idea can be used for all types of real life events. For the purposes of this example embodiment, the described example embodiment uses the specialized slot machine with real time/live sporting events to create a new type of slot machine. Even more specifically, the described example embodiment is used for a sports book format, using fantasy sports, by modifying some of the current ways fantasy sports games are played to enhance the real time/live event slot machine embodiment as described herein. In an example embodiment, the fantasy sports books application can be implemented as follows:

- Fantasy sports book specialized slot machines, as described herein, are placed in casinos or other venues throughout the world. These specialized slot machines can be programmed to provide a competition related to any fantasy sport a contestant desires to play.
- These specialized slot machines are linked to a central network-accessible database so that contestants competing in a given "group game" can be playing in different casinos/venues throughout the world. In other words, if a person sits down in the MGM™ in Las Vegas, they don't have to sit and wait until their group of six people is filled by people sitting in that particular MGM™ casino. The other five players competing against them can be sitting in casinos/venues anywhere in the world.
- Contestants sit at their own individual specialized slot machine/terminal as described herein. They are given the choice to enter for $1, $5, $20, $50 and $100 contests (or any other entry amount that casinos/venues find attractive for a slot machine).
- When a contestant looks at the display screen of the specialized slot machine/terminal, they will see an image on the display screen, as presented by the user interface logic of an example embodiment described herein, showing a virtual card table with six places (e.g., see FIG. 9). The contestant at the specialized slot machine/terminal will be one of the players occupying one of these six places at the virtual card table presented by the specialized slot machine/terminal.
- The contestant puts an amount of money into the specialized slot machine/terminal corresponding to the level of play at which they want to participate. For example, the contestant might put $1 in for the dollar game, $10 in for the ten dollar game, or $20 in for the twenty dollar game, to enter the game.
- The contestant then pulls down the handle (or activates a lever or pushes a button on the user interface of the specialized slot machine/terminal) and the specialized slot machine/terminal starts generating a variety of enticing and entertaining graphics that flash around until the contestant has a full group of six other players to play against (who are also playing for the same entry amount). Because the game will fill quickly with players, the graphic display generations, which take about five seconds, will take longer than the time needed to fill a live group of players, which will happen immediately, because the game and the players are linked to casinos/venues throughout the country/world (e.g., geographically distributed).

Groups are always comprised of six contestants in an example embodiment.

The other five contestants, who will fill the remaining five places at the virtual card table presented by the specialized slot machine/terminal, will be anonymous on the display screen in front of a given contestant. The user interface logic will configure the user interface of the example embodiment for each player to identify the different player positions as "YOU", "Contestant #1", "Contestant #2", etc. (see FIG. 9).

The contestants are instructed that they will see two hypothetical fantasy sports contests with a betting line. The contestants are instructed that the scoring for these two games will be based on live action scoring from some sporting event(s) that are currently in progress.

For every group of six competing contestants, the two contestants in each of these groups who both secure a team successfully and win their match are considered winners. Both winners are eligible for the same prize if they choose to cash out.

These two winners for each group have one of two options. The two winners for each group can either: 1) cash out by pressing a button that cashes them out and automatically doubles their money, or 2) they can choose to "let it ride" by pulling the handle (or activating a lever or pushing a button on the user interface of the specialized slot machine/terminal) to form a new group with five other new contestants and try to re-double their money by playing in a new round.

The casino/venue provides powerful motivation in two directions for winning contestants to stay in for another round instead of cashing out. First, winning contestants can "let it ride" and attempt to redouble their money each time they stay in instead of cashing out. Secondly, the specialized slot machine experience of the example embodiment offers another huge incentive for people to stay in. Any contestant who advances ten consecutive times will play in a Tournament of Champions (TOC) sponsored by the casino/venue in which they are playing.

The rationale for offering TOC is to provide a huge incentive for contestants to not cash out and to continue playing on the specialized slot machines. The TOC pays out millions of dollars to the winner and other top finishers and is a very attractive incentive for people to try and qualify for (and therefore not cash out).

The reason casinos are motivated to have contestants not cash out is because each time the contestant lets it ride into another round, the percentage of the money the casino/venue takes in goes up significantly. For example, if the two winners from every group always cashed out, the casino would receive a standard 33% of the revenue. If, however, players never cashed out and always let it ride, by round ten the casinos/venues would always receive a staggering 98.3% of the revenue.

The table set forth above showing an example of the casino vs. contestant revenue split depending on the round from which contestants decide to cash out again illustrates the benefit for the casino/venue if players decide to remain in the game.

| Round | Casino Take | Player Take |
|---|---|---|
| 1 | 33% | 67% |
| 2 | 55.6% | 44.4% |
| 3 | 70.4% | 29.6% |
| 4 | 80.2% | 19.8% |
| 5 | 86.8% | 13.2% |
| 6 | 91.2% | 8.8% |
| 7 | 94.1% | 5.9% |
| 8 | 96.1% | 3.9% |
| 9 | 97.4% | 2.6% |
| 10 | 98.3% | 1.7% |

Note:
It does not matter at what dollar amount a contestant enters the competition. The percentages that each party receives are the same.

Contestants can play up to 15 rounds on a specialized slot machine as they attempt to double their money each new round. This means they can continue to try and re-double their money even after qualifying for the TOC by successfully winning ten consecutive times. If a TOC qualifier loses in rounds 11 to 15, they do not forfeit their TOC seat.

The Specialized Slot Machine Tournament Structure for Real Time Live Action Events with Sports Books in an Example Embodiment The following description provides a general overview of the specialized slot machine tournament structure for real time live action events with sports books in an example embodiment:

There are four bidding sessions for each round of play.

Contestants are shown four hypothetical teams that are competing in two hypothetical games with real professional athletes. The structure has two teams competing against one another in one game and the other two teams competing against one another in the other game.

A sports betting line can be established for both of these contests. One team will be favored over another team by a certain number of fantasy points (or the game can be declared even with no point spread).

The betting line can be established by taking the sum of the fantasy game average of all players on one team and then the sum of the fantasy game average on the other team they are playing and calculating the difference.

This difference is the betting line.

The athletes are randomly selected athletes playing in a real life game currently in progress.

Contestants can be shown all four teams and the athletes on them as well as the betting line for the two games.

Contestants can then randomly be shown one of these four teams on which to bid.

Because there are only four teams to bid on, two of the six people playing in the contest will not have a team when the bidding process ends and, as a result, will be out of the contest.

If a contestant wins a bid, they receive the team on which they bid. They are no longer allowed to bid on another team. A black circle will be placed by their position on the specialized slot machine display screen indicating that they are done trying to secure a team.

The specialized slot machine begins the first round of bidding by randomly selecting one of the four teams.

- All six contestants have the option of making a percentage bid (the range is from 1% to 100%—no decimals allowed) on the team in front of them or passing on them with a "No Bid".
- Contestants have 30 seconds to make a bid. In order to make the bid official, a contestant pulls the lever of the specialized slot machine (or otherwise activates a button or an object displayed on the display screen of the specialized slot machine). If a contestant fails to make a bid during the allotted time, the contestant automatically receives a "No Bid". Bids are time stamped by when the lever was pulled (or other object was activated) to break ties.
- Because contestants only have 30 seconds to bid for each of the four rounds, the entire game only takes two minutes for the bidding process.
- Once all four hypothetical teams have been secured, the two people without a team are out of the competition. The four contestants who remain aren't all four playing each other. Two contestants are playing each other and the other two are playing each other.
- Who is playing who is determined by the original match-ups established by the betting line. If hypothetical Team A is playing Team B according to the original betting line, then the person who secured Team A is playing the person who secured Team B. The same goes for the other match-up.
- The specialized slot machine computes the final score of each of these two hypothetical games immediately based on the real time/live action fantasy point totals each athlete from the various teams has—in progress.
- Contestants will either have a green, red or black circle by their spot on the display screen of the specialized slot machine at all times. A green circle denotes that they have turned in their bid. A red circle denotes that they have not yet submitted their bid. A black circle denotes that they have already secured their team from a previous round.
- The lowest bid wins the hypothetical team that is being bid on. If there is a tie amongst two or more contestants for the best bid, the contestant who submitted their bid first receives the team.
- If none of the contestants bid on a team, this team will be reintroduced later as a "mulligan" (see herein for a more detailed explanation on a mulligan). In other words, there will not be a new hypothetical team that replaces a team that has no bidders.
- If a contestant wins a team, they are ineligible to bid anymore. A black circle will be placed by their spot on the display screen of the specialized slot machine to indicate they are no longer eligible to bid.

Why doesn't a contestant just bid 1% on the first team that they really like? If the lowest bid wins, this seems like a no-brainer strategy that will automatically secure the team of athletes that they desire by submitting the lowest percentage which is 1%. However, this strategy would be counter-productive and would virtually guarantee them coming in last place. The reason for this is because the percentage bid serves two purposes. It not only secures the team of athletes by having the lowest bid, but it also severely penalizes contestants for making unreasonably low bids. For example, a 1% bid will undoubtedly win a contestant the team of athletes that they desire, but this bid also represents the percentage of each athlete's fantasy points that they are eligible for in the game itself. For example, if someone bids 1% to win a fantasy football group they desire such as Peyton Manning, Calvin Johnson, Larry Fitzgerald, Marshawn Lynch, Frank Gore and Vernon Wells, they will be terribly disappointed to learn that they also only get 1% of the fantasy points that each of these six athletes scored in their respective games. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.

Given the description of the example embodiment as provided above, one might think that the game is unfair if a team could potentially have six mediocre athletes on one side and six great athletes on another team? However, this feature of an example embodiment makes the game even more strategic. This feature actually turns the selection process into a riveting high wire exercise where skill becomes a major factor. Think of these teams of athletes as stocks. The more valuable the stock, the more aggressive the bidding will be. The correct price will be set by the bids. A weak team at 95% of their fantasy points might be more valuable than a strong team at 12% of their fantasy points. This bidding process creates a tremendous amount of strategy for participants to consider.

In the example embodiment, two additional rules heighten the drama of the tournament format implemented on the specialized slot machine. These additional rules are described below:

- Each team will have three special multipliers on three randomly selected athletes. One of the athletes will have a 3× by their name, which means that whatever their fantasy point total turns out to be, the total will be multiplied by three for their final score. Two other athletes on the team will be randomly assigned a 2× by their names. This means that whatever these two athletes have as their final score, the score will be multiplied by two for their respective final scores. Contestants need to factor in the value of the athletes who have these special multipliers during the bidding process.
- The betting line of a game has significant meaning. Assume that a strong hypothetical fantasy team is established as a 32 point favorite over a weaker team. The person who won the bidding for the stronger team will have each athlete on their team scored by whatever they bid. For example, if the winning bid was 64%, then each athlete would be given 64% of their current fantasy score in progress from the live action games they are playing in. The athletes with the multipliers would then be given their bonus points depending on their respective multipliers. The same process would happen with the weaker team with one major exception. If the weaker team was secured with a 72% bid, then the point differential on the betting line is added to their winning bid. In this case, all athletes on the weaker team would be scored at 104% (72%+32%=104%) of their in progress fantast score. This betting line is a huge factor in determining a proper bid for a team.
- If nobody bids on a team, the team will be reintroduced after all the teams have been revealed and bid on. If there is more than one team that is not bid on, they are reintroduced in the order that they first appeared.
- If a hypothetical game ends in a tie, the contestant who secured their team in a later round of bidding is declared the winner.
- In an example embodiment, the six contestants on a team can be scored in the manner described below:

1. Take the current running fantasy point total for an athlete.
2. Multiply this total by the percentage of fantasy points they are worth (determined by a contestant's bid as well as the betting line).
3. If an athlete has one of the special multipliers by their name, multiply their point total by this number.
4. Add the point totals for all six athletes together to establish a final team score. The contestant in the head-to-head contest with the higher score wins their hypothetical game. Because there are two hypothetical games, there will be two winning contestants and two losing contestants.

Some teams will have athlete statistics on live data from games that are almost over and some might be just starting. In other words, contestants might show up at the specialized slot machine when all of the games are beginning and some when the games are ending. However, this feature of the various adds another exciting element into the equation. It is important to remember that all contestants in a given group will bid on athletes that are at the same juncture in their real time/live action games. The prepared contestant is going to have an idea how the action in various games is unfolding to make a more educated bid during the bidding process. Again, how athletes are valued at any given time is no different than the fluctuations of the stock market. This feature is exactly why real time/live action play redefines what slot play is all about.

The fantasy sports slot machine embodiments based on real time/live action events as described herein provide a unique idea that has never been seen in the market. In these example embodiments, the contestants themselves do not constitute the real time/live action event(s), rather it is the game itself that uses real time/live action events as the competition unfolds. These example embodiments fundamentally change the way slot machines are currently used. Slot machine players are suddenly playing with the outcomes that are based on events that are unfolding as they are playing. This adds a dimension to slot machines that has never been provided before.

In order to make these fantasy sports slot machine embodiments possible, there are four key elements that are new to the fantasy sports genre that these embodiments introduce and that support the implementation. These four key elements include the following:

1) The fantasy sports slot machine of an example embodiment provides a novel format of contestants playing in small groups of three or more participants—Fantasy sports contests have always been contested in one of two ways—both of which mimic real life sports. They either are conducted using a head-to-head format or they are configured where the entire field plays against each other simultaneously. Again, the reason why these two formats have emerged is because these are the formats for how real live sporting events are contested and fantasy sports contests have always tried to come as close as possible to mimicking reality. Of the two, the head-to-head format is the most common way real life sports are contested—for both team and individual competitions. For example, in team sports competitions, there are never three (or more) baseball teams playing each other simultaneously. That would be unheard of. There are always two teams competing against one another on the baseball diamond. Similarly, this structure applies to hockey, soccer, basketball, football, and quite frankly, most other sports. The same head-to-head format also is also quite prevalent for individual sports such as tennis (both singles and doubles), bowling, fencing, table tennis, boxing, wrestling, etc.

The other real live sports format that fantasy sports tournament organizers have copied is the "entire field" concept. An entire field event is when real live sports are contested in a manner where individuals or teams have to compete against the entire field at one time. While this is not nearly as prevalent as the head-to-head format, it is still quite often used. Examples of this are golf, cycling, gymnastics, swimming, track and field, etc. Teams or individuals compete in one huge event and they are then ranked according to either their finish or their final scores.

Fantasy sports tournament organizers have tried to re-create the real live action formats that are used in sports to appeal to those who like to participate in fantasy sports events. For this reason, they have always configured their offerings to mimic these real live sporting events by either using a one-on-one format or an "entire field" format. However, as described herein, there is another way that makes the specialized slot machine format work and it is a concept that is unique to the industry. This unique format is also counter-intuitive to how real life sporting events are contested and is why nobody has ever done this before. The novel method of a fantasy sports slot machine format as described herein is to have small groups of three or more contestants competing against one another at the same time. Again, this is counter-intuitive to real live sports because it makes no sense in real life for the Dolphins, 49ers and Jets to be playing each other in the same football game. For this exact reason, nobody has thought about having Bob, Steve, and Mary compete against each other in the same fantasy sports match because this configuration doesn't mimic real life sports.

2) The fantasy sports slot machine of an example embodiment provides a novel format wherein a portion of an athlete's fantasy points are or can be scored. Fantasy sports games have always been an all or nothing proposition. Contestants who "own" a certain athlete have always received all of the fantasy points that their athlete scored in their real live sports competition. Conversely, contestants who don't own an athlete receive nothing or zero points for them. This is a very valuable tool that helps make a fantasy sports slot machine implementation possible. This method involves giving contestants a portion or fraction of the fantasy points that a given athlete that they have secured scores. This fractional scoring method of an example embodiment can be implemented in several different ways as described below.

a. Percentage Bids—This is a bidding process where the bids involve taking a percentage of the athlete's fantasy points. In accordance with this method, contestants, in order to secure an athlete, make a percentage bid on a given athlete. The rules dictate that the contestant who submits the lowest percentage bid secures that athlete for their lineup. For example, if three contestants bid, 68%, 81% and 98% for a given athlete, then two things happen. First, the contestant who made the 68% bid receives that athlete in their fantasy sports lineup. Secondly, the contestant only receives 68% of the fantasy points that this athlete scores in the competition. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.

b. Duplication Penalties—This format allows fantasy contestants to share athletes instead of owning them exclusively, but there is a price to pay when duplication occurs. Each time an athlete is duplicated, their fantasy point value goes down a set predetermined percentage.

c. Partial Scoring—This format allows the actual fantasy sports contests to begin and end before the related real time/live sporting event has finished. This means that a given athlete now has only a portion of their fantasy points scored. Only the points that the athlete scored in their real time/live action game up to the point that the fantasy contest ends will count.

3) The fantasy sports slot machine of an example embodiment provides a novel format wherein blocs of athletes for a lineup can be selected through an auction process. Fantasy sports contests have always operated one of two ways, either: a) contestants select their entire lineup and submit it, or b) they draft athletes individually to create their "team". As provided by the example embodiments as described herein, there is another way that makes the fantasy sports slot machine work. Under this example embodiment, contestants are shown groups of two or more athletes to be evaluated simultaneously. The contestants who are interested in this "bloc" have to evaluate the comparative strength of the entire unit over other potential ones. This process creates a new twist because contestants are now forced to put a value on a unit that has multiple moving parts. This is not a part of traditional fantasy sports play, but creates a critical gaming component for a fantasy sports slot machine of the various embodiments described herein.

4) The fantasy sports slot machine of an example embodiment provides a novel format for creating a betting line for hypothetical fantasy sports contests similar to how it is done in real live sports contests. Fantasy sports has already created an alternate reality with hypothetical teams that people select and manage. This has been going on for decades. The various embodiments described herein provide for the creation of a fantasy sports betting line for a hypothetical game that allows people to evaluate two hypothetical teams competing in a hypothetical match and to bet on the outcome based on an established betting line that creates a favorite and an underdog. The betting line that can be established can be determined by the parameters set forth below for an example embodiment:

a. The season fantasy point differential between the athletes on one hypothetical team versus another hypothetical team.

b. The individual matchups the athletes have in their real life sporting contests.

c. The actual wagering that people are making, which always impacts the fluctuation of the line.

d. Any other relevant factor that odds makers decide is relevant.

This betting line can also create betting situations other than for the winner and loser of a hypothetical sporting contest. An example embodiment can establish a betting line over or under the total fantasy points scored between the two teams in a hypothetical fantasy match, one team in the contest or individual athletes (or groups of athletes) in that contest—much like they do in real live sports betting. The big difference, though, is that all of the betting is based on fantasy points and hypothetical teams competing in fantasy sports contests.

An Example Embodiment Providing a Specialized Slot Machine for Implementing: Fantasy Sports Books FIG. 6 through FIG. 9 illustrate an example embodiment, implemented as a specialized slot machine, which shows the basic elements of the user interface for implementing a tournament with multi-contestant small group rounds on the specialized slot machine. The specialized slot machine and the user interface thereon can be used to implement a variety of different tournament formats on the specialized slot machine of an example embodiment. The following description provides a general overview of one such tournament format in an example embodiment.

Fantasy sports games have become a cultural phenomenon. People select their teams and then compete against other individuals. These hypothetical teams have become so real to people that, in some cases, they pull harder for their fantasy teams than their local hometown team.

If people are creating hypothetical or imaginary teams to play against other hypothetical teams, why not have a betting line for these games too? In other words, one application of fantasy sports that hasn't emerged is a sports books format that mimics the sports betting on real life games. For example, people might make a $200 bet that the San Francisco 49ers beat the N.Y. Jets in a football game as long as they get seven points. If the 49ers lose by 7 points or less (or win outright), the person who made the bet wins. If the 49ers lose by 8 or more points, then the person who made the bet loses.

This betting format can apply directly to imaginary fantasy sports teams as well. A gaming institution, using the fantasy sports book format as described herein, could make up their own fantasy sports "games" that mimic real life games and support bets made on the fantasy sports games. For example, an embodiment can be illustrated by an example below using two imaginary teams for a fantasy football game between the Spiders and the Steamrollers. The composition of these two example imaginary fantasy football teams is set forth below.

Spiders:

a. QB Tom Brady
b. RB Frank Gore
c. RB Adrian Peterson
d. WR Dez Bryant
e. WR Larry Fitzgerald
f. TE Vernon Wells Steamrollers:

a. QB Drew Brees
b. RB Marshawn Lynch
c. RB Chris Johnson
d. WR Anquan Bolden
e. WR Jordy Nelson
f. TE Rob Gronkowski In an example embodiment and with the sample imaginary fantasy football teams set forth above, assume the initial betting line for the game can be set by analyzing the sum of the average fantasy points. Let's assume in the example described herein that the average fantasy points for the two sample imaginary fantasy football teams set forth above are as follows:

Spiders:

a. QB Tom Brady 21.3
b. RB Frank Gore 11.4
c. RB Adrian Peterson 14.7
d. WR Dez Bryant 11.2
e. WR Larry Fitzgerald 8.8
f. TE Vernon Wells 5.7

----------------------------------

Sum of the average fantasy points for the Spiders: 73.1

Steamrollers:

a. QB Drew Brees 22.4
b. RB Marshawn Lynch 12.3
c. RB Chris Johnson 9.2
d. WR Anquan Bolden 7.6
e. WR Jordy Nelson 11.9
f. TE Rob Gronkowski 6.8

----------------------------------

Sum of the average fantasy points for the Steamrollers: 70.2

Because the Spiders, in this example, have a sum total of 73.1 fantasy points per game average and the Steamrollers have a 70.2 fantasy points per game average, a betting line can be established by using the difference which is 2.9 fantasy points to establish the original betting line. Because 2.9 rounds to 3, the initial betting line can be established, in this example, as follows:

| Favorite | Line | Underdog |
|---|---|---|
| Spiders | 3 points | Steamrollers |

This betting line can fluctuate based on other factors too. For example, the betting line can fluctuate based on: 1) the individual matchups the athletes have in their real life games, and 2) the real life betting action that is happening on these matchups. In cases where an athlete is scratched at the last moment and doesn't play, the scratched athlete could potentially create chaos. In these situations, the athlete can be given their current seasonal average (rounded to the nearest whole number) as their fantasy point total for the match. If it is the first set up games for a season, their average fantasy game score from the previous season can be used.

Finally, betting lines for other elements of the imaginary fantasy sports game can also be offered. For example, an over/under for the total fantasy points these two teams combine for can be bet on. The over/under for fantasy points for each team can be bet on. The over/under for each athlete or group of athletes can be bet on. Other embodiments can similarly provide betting lines on a variety of aspects of the imaginary fantasy sports teams and the games they play.

An Example Embodiment Providing a Specialized Slot Machine for Implementing: A State Lottery Format FIG. 6 through FIG. 9 illustrate an example embodiment, implemented as a specialized slot machine, which shows the basic elements of the user interface for implementing a large scale tournament on the specialized slot machine. The specialized slot machine and the user interface thereon can be used to implement a variety of different tournament formats on the specialized slot machine of an example embodiment. The following description provides a general overview of one such tournament format in an example embodiment.

There is an exciting way to package fantasy sports using state lotteries that will create great interest to fantasy sports enthusiasts. One of the great benefits a fantasy sports lottery has over a traditional lottery is the emotional attachment that participants have towards the athletes they select as they compete in their real life sporting events. This opportunity, to openly root for athletes, adds an additional element that traditional lotteries simply don't have.

To organize a fantasy sports lottery, a couple of key barriers need to be addressed. Specifically, there are three factors lottery organizers need to consider in order to implement a smooth running fantasy sports lottery. These factors include the following:

1) Proper Sample Space—Athletes aren't like numbers. They perform at different levels making some more desirable than others. This creates a problem, because it narrows the number of athletes in the sample size that people will want to select to a very small number.
2) The Drawing—Lotteries have an incredible appeal when winning numbers are selected at random from a drawing. It would be beneficial to preserve this integral part of traditional lotteries where random athletes are selected from a drawing and the lottery payouts are still based on a fantasy sports model.
3) The Rollover Effect—Traditional lotteries don't always have a grand prize winner each time it runs, which creates a rollover effect. Prize pools increase week-to-week when no winner emerges. This process generates more excitement. Fantasy sports games are not built this way. They are designed so a winner (or winners) will always emerge. This is because the compilation of real life game statistics creates a ranking system that begins with a top spot. This format implies that there will always be a winner (or winners). A lottery commission will have to determine for themselves whether it is desirable for a fantasy sports lottery to have this rollover effect. If they decide it is important, it can be done using the various embodiments as described herein.

In order to package fantasy sports using state lotteries with a specialized fantasy sports slot machine, there are three solutions provided by an example embodiment that are new to state lottery systems and the fantasy sports genre. These three key solutions include the following:

1) Solution #1—Proper Sample Space—In a lottery with numbers, there is no statistical difference between selecting the number "23" as opposed to "47". The reason this is important is because the sample size is not compromised because one of those numbers has inherent qualities that are more strategically appealing than others. This is not true for fantasy sports. For example, what if we are talking about a fantasy football lottery and Tom Brady has by far the best match-up of any quarterback for the week? Now factor in that this lottery is being held in Massachusetts. Clearly, the randomness for selecting numbers as it happens in a traditional lottery probably won't apply to this scenario. In a State like Massachusetts, over 90% of the population might select Brady if he has a superior match-up for a given week. This creates a huge problem. Lotteries work best when people are selecting from a decent sized sample space and there is a true randomness to the selection process. They don't work nearly as well when everyone is making the same selections. So how is the problem rectified? What can be done so that the people of Massachusetts seriously consider picking someone other than Tom Brady—especially when he has a really good match-up? The answer is the duplication penalty system provided by an example embodiment. This system penalizes contestants at an increasingly higher level of severity the more times a given athlete is selected. For example, let's assume that 91.3% of the state of Massachusetts selected Tom Brady while only 3.6% selected Aaron Rogers for the quarterback position. The duplication penalty system provided by an example embodiment would work in the following manner:

a. Step #1—The control process of the example embodiment would take the percentage rate that each athlete was selected and subtract it from 100%.
b. Step #2—This creates a percentage of 8.7% for Tom Brady (since 100%-91.3%=8.7%) and 96.4% for Aaron Rogers (since 100%-3.6%=96.4%).
c. Step #3—This new percentage that was just calculated is called their adjusted fantasy percentage. What that means is that all of the people participating in the lottery who selected Tom Brady, will get Brady in their lineup, but he is only worth 8.7% of his fantasy points he scores that weekend to all of those who selected him. Similarly, since significantly fewer people selected Rogers, this means that a much higher percentage of the fantasy points he scores for the week will go to each person who selected him. In this case, each person who selected Rogers would receive 96.4% of his fantasy points.

This format of the example embodiment provides a solution to run an effective lottery. The format forces contestants to think about their selections from a number of angles. Contestants will start looking at undervalued options much more aggressively with this rule in place. It opens up the sample space so that all quarterbacks will be considered as viable players—even by the people in Massachusetts on days where Brady has a great match-up. One good thing about this format is that now people will have to start thinking about the duplication penalty system as described herein and whether Brady is going to be undervalued in Massachusetts, because so many people will potentially shy away from him.

2) Solution #2—The Drawing—Nothing beats the excitement of the moment when a lottery selects and announces the winning numbers. The problem with doing something like this with athletes is that it eliminates the fantasy achievement piece—if the lottery isn't done right. For example, imagine what would happen if officials announced on a Sunday morning—before the games even started—that the winning athletes were the following:

a. QB—Peyton Manning—Broncos
b. RB—Adrian Peterson—Vikings
c. RB—Frank Gore—Colts
d. WR—Larry Fitzgerald—Cardinals
e. WR—Martavis Bryant—Steelers
f. TE—Vernon Wells—49ers
g. Flex—DeMarco Murray—Eagles The example above mimics a traditional lottery; but, the example is contrary to the practices in a fantasy sports tournament. In the above example, all someone would need to do is check their ticket stub and see if they selected all seven athletes for their lineup. If they hit them all, they would be a grand prize winner. Because this example format would be comparable to a traditional lottery, the example format would completely eliminate the fantasy sports element where participants root for their athletes in their real life games. The whole idea behind a fantasy sports lottery is to actually include fantasy sports into the equation. The above example turns the athletes into nothing more than "numbers" like a traditional lottery and they would have no inherent value from a fantasy sports point of view.

Using an example embodiment described herein, the lottery commission could still make meaningful random selections as long as they aren't winning lottery "numbers". This keeps the random selection process in place that people expect from traditional lotteries, but also adds a whole new dimension to the fantasy sports contest. In an example embodiment, a fantasy sports lottery system can make these selections bonuses instead of winning numbers. For example, let's assume that on a Sunday morning, the percentages for each athlete in the NFL™ for the positions of QB, RB, WR and TE were already known and published. These percentages would be based on the duplication penalty system of the example embodiment as described above Solution #1. Let's further assume that the seven athletes were worth the following percentages of their fantasy points they scored later that day:

a. QB—Peyton Manning—Broncos 97.8%
b. RB—Adrian Peterson—Vikings 95.2%
c. RB—Frank Gore—Colts 99.8%
d. WR—Larry Fitzgerald—Cardinals 99.4%
e. WR—Martavis Bryant—Steelers 99.9%
f. TE—Vernon Wells—49ers 99.9%
g. Flex—DeMarco Murray—Eagles 99.7%

Let's also assume that these seven athletes had another factor applied to their fantasy point values (a bonus factor) that none of the other athletes had for a given week. These seven athletes also happened to be the athletes randomly selected by the lottery commission in their drawing. Instead of representing winning numbers like a traditional lottery, the selected athletes instead represent athletes who are awarded a huge statistical bonus to contestants who selected them. For example, the first six athletes would receive a 20% boost to their fantasy point values and the flex athlete would receive a 30% boost to their fantasy point value. Instead of the percentages these athletes earned through the duplication penalty process as described above, these athletes now would be worth the following fantasy point value percentages after the lottery drawing:

a. QB—Peyton Manning—Broncos 117.8%
b. RB—Adrian Peterson—Vikings 115.2%
c. RB—Frank Gore—Colts 119.8%
d. WR—Larry Fitzgerald—Cardinals 119.4%
e. WR—Martavis Bryant—Steelers 119.9%
f. TE—Vernon Wells—49ers 119.9%
g. Flex—DeMarco Murray—Eagles 129.7%

Because the flex player would be like the power ball number with a higher value, the bonus factor would be worth a little more—something like a 30% boost. In this case, because Murray was selected as the flex athlete, he would then be worth 129.7% of his fantasy points for anyone who selected him.

This boost (the bonus factor) for these winning athletes will add a lot of drama as contestants will tune in to see if any of the athletes they selected received this bump. The interesting part is that the bonus factor wouldn't necessarily decide who was going to win the lottery for a given week. These athletes would still have to perform to make their percentage increases mean anything. This process will create incredible drama even before the actual fantasy sports competition takes place—exactly what a lottery wants in order to capture the interest of as many people as possible.

Because there are so many athletes who would potentially be eligible, there is an alternative possibility for how the lottery drawing could be conducted in an alternative embodiment. The lottery drawing could be done in a more traditional sports-oriented manner, like they do with all-star teams. This would put more athletes in the mix for the bonus factor. The lottery commission could select six athletes for the 20% bonus as the “1st team” with a flex athlete at the 30% level, six more athletes could be selected as the “2nd team” for a 15% bonus with a flex athlete worth 25% and a “3rd team” of six athletes could be selected for a 10% bonus with the flex at 20%. Once an athlete is selected, they couldn't be selected again. This would give 21 athletes a bonus percentage and would undoubtedly create even more interest.

3) Solution #3—Creating a “rollover” effect—The use of a rollover in a particular embodiment may or may not be a desirable feature from the standpoint of the state lottery commission. There is no doubt, though, that traditional lotteries generate more and more excitement when a cash prize keeps increasing. For that reason, a state lottery might want to include a feature that creates the possibility that there isn't a winner for a given week.

In one embodiment, the lottery commission might use a format of simply paying out a guaranteed weekly grand prize winner(s). If this is the case, then a solution is not needed to create the rollover effect. If on the other hand, it is desirable to have a rollover effect possibility, then an additional feature is needed in an alternative embodiment. This solution requires a minimum fantasy point threshold that a contestant would have to meet in order for them to be eligible to be a grand prize winner. For example, the game might require that the grand prize winner must score a minimum of 300 points to be eligible to collect the top prize. This creates the possibility that nobody hits this threshold for a given week.

In order for this to work, a minimum point total would have to be selected that would do two important things. First, the minimum point total would be high enough so that it isn't a given that someone will emerge out of hundreds of thousands of contestants each week. Secondly, the minimum point total would have to be attainable at some point so that the lottery actually has winners on a fairly regular basis.

In order to combine fantasy sports features using state lotteries with a specialized fantasy sports slot machine, there are processes provided by an example embodiment that are new to state lottery systems and the fantasy sports genre. These processes for the example embodiment are described below.

Contestants can have the option to either select their fantasy sports lineups themselves or have the specialized fantasy sports slot machine do it for them. The specialized fantasy sports slot machine can also allow contestants to submit multiple entries simultaneously—by both methods described above.

The number of athletes the fantasy sports lottery format will require can be five, six, or another number depending on the sport. The fantasy sports lottery format can also select a power ball athlete. For some sports, the athletes can be required to fit specific positions on the field. Football, for example, would require a selection process of exactly one QB, two RB's, two WR's, one TE and one Flex (e.g., the flex athlete can be any RB, WR, or TE who wasn't already selected) for each entry. For other sports, like baseball, the contestant can be asked for each entry to pick six position ballplayers and one power ball without concern for position (as long as the position is not a pitcher for the slugger's game and not a slugger for the pitcher's game).

Once contestants can no longer submit entries, all lineups are then locked and the fantasy sports lottery system of an example embodiment can calibrate and determine the percentage of fantasy points each athlete will be worth in their game (or series of games) that encompasses the lottery timeframe. For example, for the football lottery, let's assume that one hour before kickoff in the first Sunday NFL™ football game, no more entries can be submitted by contestants in the fantasy sports lottery. At that point, contestants can go to a fantasy sports lottery website to see what percentage each athlete is worth. Moreover, during this one hour time period before the first kickoff, the bonus athletes can be drawn and their new percentages can be displayed too.

Lottery players often like to play different types of games. A fun variation in an alternative embodiment is a Fantasy Eliminator game. This is a game where contestants have to stay in the top 50% tier or they are eliminated as the real life fantasy contests are progressing. To illustrate the operation of this game format, an example embodiment is described below with football as the example fantasy sports game.

Assume there are separate Fantasy Eliminator games for both the AM (early) and PM (late) Sunday NFL™ games. Let's choose the AM (early) games for the purposes of this example. The selection process would follow all of the rules already described above for the general game format. That is, contestants would select their athletes, the duplication penalties would be calculated by the fantasy sports lottery system of an example embodiment, and then the bonus athletes would be announced and their updated percentages added to the mix.

The Fantasy Eliminator game would begin with a timing mechanism that starts with the kickoff of the last morning (early) NFL™ football game. Once this happens, every ten minutes (or other pre-determined time period) that goes by, the bottom 50% of the field is eliminated. This process continues with the clock running and 50% of the field eliminated every ten minutes (or other pre-determined time period). The only time this clock stops is when every single game is on a halftime break—at the same time—and there is no NFL™ action from any of the morning (early) games. If this never happens, the clock will never stop until the last morning (early) game is complete. The clock resumes during situations when all games are in halftime the moment one of the contests resumes its third quarter action.

A typical NFL™ football contest runs for about three hours. Assuming there will be a ten minute interval where no games are going on during the approximate halftime time slot; this leaves approximately 17 ten minute intervals during the course of the morning (early) games. Let's assume 5 million people signed up to play the Fantasy Eliminator game. The table below shows how the field would pare down according to the rules of the game:

| 10 Minute Interval Number | Number of Contestants Left |
|---|---|
| Beginning Entries | 5,000,000 |
| Interval #1 | 2,500,000 |
| Interval #2 | 1,250,000 |

-continued

| 10 Minute Interval Number | Number of Contestants Left |
|---|---|
| Interval #3 | 625,000 |
| Interval #4 | 312,500 |
| Interval #5 | 156,250 |
| Interval #6 | 78,125 |
| Interval #7 | 39,063 |
| Interval #8 | 19,531 |
| Interval #9 | 9,766 |
| Interval #10 | 4,883 |
| Interval #11 | 2,441 |
| Interval #12 | 1,221 |
| Interval #13 | 610 |
| Interval #14 | 305 |
| Interval #15 | 153 |
| Interval #16 | 76 |
| Interval #17 | 38 |

If the game ended after interval #17, then the final 38 contestants would be ranked and given prizes according to where they were ranked. If at any time the number of contestants left is less than 20, then one contestant is eliminated every five minutes until there is only one left standing.

The time interval that is used to eliminate players can fluctuate depending on how many entries there are. The fewer entries there are, the longer the time interval is to eliminate contestants. The more entries there are, the shorter this eliminator time interval becomes. The correct time intervals can be pre-programmed based on how many contestants there are in a given Fantasy Eliminator game.

An Example Embodiment Providing a Specialized Slot Machine for Implementing: A State Lottery Scratcher Format FIG. 6 through FIG. 9 illustrate an example embodiment, implemented as a specialized slot machine, which shows the basic elements of the user interface for implementing a large scale tournament on the specialized slot machine. The specialized slot machine and the user interface thereon can be used to implement a variety of different tournament formats on the specialized slot machine of an example embodiment. The following description provides a general overview of one such tournament format in an example embodiment.

In the example embodiment, the following description illustrates the structure and rules for a fantasy sports scratcher game (a 5/25/50 format). This game format can be used for any fantasy sport. The example embodiment provides a format and system wherein contestants can purchase scratchers with the names of athletes from a given fantasy sport that are hidden and waiting to be scratched off. The contestant will be guaranteed that each athlete will play in their game. If an athlete on a scratcher does not play in their game, the athlete's fantasy point per game average can be used for their score.

Scoring systems can vary depending on the sport. In general, the five athletes on a scratcher must score about 10% higher across the board on their fantasy points per game average to enable the contestant to get their money back. The object of the game is for the athletes on the scratcher to score a combined number of fantasy points that puts them in the winner's circle. The better the combined score of the athletes on the scratcher, the more money the contestant can win. For example, the sum of the athletes' fantasy points for a particular game might warrant that the fantasy score for the five athletes is ten points higher than their seasonal average. If this happens, the contestant would get their money back.

The contestant would then be able to win higher increments of money depending on the combined total fantasy points of the athletes who are on the scratcher. The following table illustrates an example of how the process works in the example embodiment:

| Contestant | Fantasy Points Required |
|---|---|
| Wins Money Back | 10 points higher than the athlete's seasonal average |
| Wins 5X Entry Fee | 20 points higher than the athlete's seasonal average |
| Wins 25X Entry Fee | 30 points higher than the athlete's seasonal average |
| Wins 50X Entry Fee | 40 points higher than the athlete's seasonal average |

To illustrate the operation of the example embodiment, assume that a scratcher has the following athletes with their point per game averages listed below:

a. Mike Trout 12.7 PPG
b. Brandon Crawford 9.2 PPG
c. Joey Votto 11.2 PPG
d. Lorenzo Cain 9.9 PPG
e. Josh Donaldson 12.9 PPG The sum of the averages in the example set forth above is 55.9, which is about 56 points. The fantasy sports scratcher game of the example embodiment would require that the contestant needs to produce a scratcher with a combined score of 62 points (10% higher) to get their money back, 68 points for 5× their money, 74 points for 25× their money, and 80 points for 50× their money for this particular example.

In the example embodiment, the structure and rules for a fantasy sports scratcher game can be implemented in a variety of ways. In a particular embodiment, rules can be defined to structure the format and operation of the fantasy sports scratcher game. In the particular embodiment, these rules can be defined as follows:

Rule #1—There are five athletes to scratch off with a coin.

Rule #2—Contestants determine how much they want to play for. Entry points might be $1, $5, $10, $20, $50, and $100, for example.

Rule #3—The athletes' names are hidden under the position slots on the scratcher. Contestants can scratch off each position to reveal the athlete that was randomly given to them.

Rule #4—Contestants will be guaranteed that each of their athletes will play in their game. If an athlete doesn't play (e.g., including injury, suspension or coach's decision) in their game, the athlete's fantasy point game average for the season or a prior season can be used.

An Example Embodiment Providing a Specialized Slot Machine for Implementing: A Scratcher Game—Tic-Tac-Toe FIG. 6 through FIG. 9 illustrate an example embodiment, implemented as a specialized slot machine, which shows the basic elements of the user interface for implementing a large scale tournament on the specialized slot machine. The specialized slot machine and the user interface thereon can be used to implement a variety of different tournament formats on the specialized slot machine of an example embodiment. The following description provides a general overview of one such tournament format in an example embodiment.

In the example embodiment, the structure and rules for a Tic-Tac-Toe scratcher game can be implemented in a variety of ways. In a particular embodiment, rules can be defined to structure the format and operation of the Tic-Tac-Toe scratcher game. In the particular embodiment, these rules can be defined as described below.

In the example embodiment, contestants get a scratcher with nine athletes' names printed on it in nine distinct spots on the scratcher (see example below). Initially, all of the names of the athletes on the scratcher are obscured. The athletes printed on the scratcher may all play the same position (like the example below) or the athletes may play different positions.

| | | |
|---|---|---|
| Tom | Drew | Cam |
| Brady | Brees | Newton |
| Peyton | Aaron | Derek |
| Manning | Rogers | Carr |
| Russell | Tony | Teddy |
| Wilson | Romo | Bridgewater |

In the example embodiment, contestants can scratch off a variable number of distinct spots on the scratcher to reveal the athletes' names printed at the scratched spots. The number of scratched spots can correspond to a plurality of achievements accomplished by the contestant. These achievements in an example embodiment are described below.

Achievement #1—The contestant wins 2× (twice) the entry fee—The contestant scratches off three spots that make three in a row. The other six spots are left unscratched. If the combined fantasy score of the athletes hits a pre-determined benchmark (about 15% more than their combined average), the contestant wins 2× their entry fee.

Achievement #2—The contestant wins 4× (four times) the entry fee—The contestant scratches off any six spots and leaves three unscratched. If the combined fantasy sport score of the six athletes at the scratched spots hits a pre-determined benchmark (about 20% more than their combined average), the contestant wins 2× their entry fee. Achievement #1 is not in play for contestants who scratch off only six spots.

Achievement #3—The contestant wins 8× (eight times) the entry fee—The contestant scratches off all nine spots. If all three in a row combinations of the combined fantasy sport score of the athletes at the scratched spots hits a pre-determined benchmark (about 10% more than their combined average), the contestant wins 8× their entry fee. Achievements #1 and #2 are not in play for contestants who scratch off all nine spots.

Achievement #4—The contestant wins 16× (sixteen times) the entry fee—The contestant scratches off all nine spots. If all three in a row combinations of the combined fantasy sport score of the athletes at the scratched spots hits a pre-determined benchmark (Achievement #3) and each of the four athletes outscore the middle athlete, the contestant wins 16× their entry fee. Achievements #1 and #2 are not in play for contestants who scratch off all nine spots.

In the example embodiment, athletes appearing on a scratcher must play in their game. If the athlete doesn't play, then the point total they receive is exactly one third (⅓) of what is needed to make the three in a row requirement. In the case of this example, if 100 is the three in a row total, then an athlete who didn't play is worth 33.3 points. This rule guarantees that suspended, hurt, or demoted athletes will still have a fair value.

In the example embodiment, athletes appearing on a scratcher must start. If an athlete doesn't start for any reason, then the athlete gets the better score between the one third (⅓) requirement described above or the score the athlete actually scored. This rule guarantees contestants that they will get real starters for their scratchers.

An Example Embodiment Providing a Specialized Slot Machine for Implementing: A Scratcher Game—Two Touchdown Versions FIG. 6 through FIG. 9 illustrate an example embodiment, implemented as a specialized slot machine, which shows the basic elements of the user interface for implementing a large scale tournament on the specialized slot machine. The specialized slot machine and the user interface thereon can be used to implement a variety of different tournament formats on the specialized slot machine of an example embodiment. The following description provides a general overview of one such tournament format in an example embodiment.

In the example embodiment, the structure and rules for a Two Touchdown scratcher game can be implemented in a variety of ways. In a particular embodiment, rules can be defined to structure the format and operation of the Two Touchdown scratcher game. In the particular embodiment, these rules can be defined as described below.

In the example embodiment, the Two Touchdown scratcher game supports a game format that is not necessarily based on fantasy points. Not all sports games have to be based on fantasy points to create a fun offering. In the example embodiment, there are two versions of this game. The formats of these two versions of the Two Touchdown scratcher game are described below. In the example embodiment, all athletes on a given scratcher must appear in their respective games or the scratcher can be redeemed for a new play the following week. If it is the last week, then the money is refunded.

Two Touchdown Scratcher Game—Version #1

- Five athletes (must be a WR, TE or RB) are hidden and must be scratched off
- If all the athletes scratched off each score at least one touchdown, the contestant wins 10× their entry fee.
- If all the athletes scratched off each score at least two touchdowns, the contestant wins 1,000× their entry fee.
- If all the athletes scratched off each score at least three touchdowns, the contestant wins 100,000× their entry fee.

Two Touchdown Scratcher Game—Version #2

- In this example embodiment, the game is structured to look like each of the four quarters of a football game as well as having a chance for overtime.
- A tight end (TE), wide receiver (WR), and running back (RB) are all under a spot on the scratcher that says "first half". If all three of these athletes each score at least one touchdown (not throwing for one) in their respective games, the contestant wins 5× their entry fee. The contestant can cash out or risk their winnings by scratching off the third quarter spot on the scratcher to play for more.
- If a contestant plays on and decides to scratch off the third quarter spot on the scratcher, the contestant risks their guaranteed 5× winnings to go for more. If they do this, they will have a quarterback in this slot to be scratched. If this quarterback scores a rushing touchdown, the contestant wins 25× their entry fee. If the quarterback does not score a rushing touchdown, the contestant wins nothing. Winning contestants can cash out or risk their winnings by scratching off the fourth quarter spot on the scratcher to play for more.
- If a contestant plays on and decides to scratch off the fourth quarter spot on the scratcher, the contestant risks their guaranteed 25× winnings to go for more. If they do this, the contestant will have an NFL™ team listed in this fourth quarter spot to be scratched. If this NFL™ team scores a defensive touchdown (not including a punt return or kickoff return touchdown), the contestant wins 1,000× their entry fee. If the NFL™ team does not score a defensive touchdown, the contestant wins nothing. Winning contestants can cash out or risk their winnings by scratching off the overtime spot on the scratcher to play for more.

If a contestant plays on and decides to scratch off the overtime spot on the scratcher, the contestant risks their guaranteed 1,000× winnings to go for more. If they do this, the contestant will have an NFL™ team listed in this overtime spot to be scratched. If this NFL™ team scores a special teams touchdown (e.g., a punt return, kickoff return, blocked kick, etc. and not including a defensive touchdown), the contestant wins 100,000× their entry fee. If this NFL™ team does not score a special teams touchdown, the contestant wins nothing.

An Example Embodiment Providing a Specialized Slot Machine for Implementing: A Scratcher Second Chance Game FIG. 6 through FIG. 9 illustrate an example embodiment, implemented as a specialized slot machine, which shows the basic elements of the user interface for implementing a large scale tournament on the specialized slot machine. The specialized slot machine and the user interface thereon can be used to implement a variety of different tournament formats on the specialized slot machine of an example embodiment. The following description provides a general overview of one such tournament format in an example embodiment.

In the example embodiment, a luck-based second chance game is described.

For every team in the NFL™, for example, there are some combinations in the scratcher game that can make contestants eligible for prizes at the end of the season. These combinations can have real life teammates appearing at the same time on the same scratchers. For example, if a single scratcher had exactly two 49ers on it, then the scratcher could be worth a $5 bonus at the end of the NFL™ playoffs. If the single scratcher had three 49ers on it, then the scratcher might be worth a $100 bonus at the end of the NFL™ playoffs. If the single scratcher had four 49ers on it, then the scratcher might be worth a $10,000 bonus at the end of the NFL™ playoffs. If the single scratcher had five 49ers on it, then the scratcher might be worth a $100,000 bonus at the end of the NFL™ playoffs. If the single scratcher had six 49ers on it, then the scratcher might be worth a million dollar bonus at the end of the NFL™ playoffs.

In the example embodiment, a lottery administrator can pre-determine the number of winning tickets the lottery administrator will distribute for each level of common teammates. For example, there might be five million dollar winners for having six common teammates, 20 $100,000 winners for five common teammates, etc. The way the lottery administrator would do this is by printing exactly five one million dollar tickets with six 49ers on it, exactly 20 $100,000 tickets with five 49ers on it, etc.

The lottery administrator can then print these combinations as described above for the 49ers for every NFL™ team. The lottery administrator can also print the same number of potential winning scratchers, for each level, in the increments as described above for the 49ers. Contestants would be inclined to save any scratcher ticket they got with common teammates; because, these scratchers might be worth something at the end of the season. Ultimately, only the scratchers with combinations featuring the Super Bowl winning team at the end of the year will have any meaning. The Super Bowl winning team at the end of the year automatically pays off for these amounts for each ticket at the combination level for which they are good. Again, all other combination tickets with common teammates are rendered meaningless.

During the regular season, there will be 32 teams worth of all of these combinations so a lot of people will initially be hopeful. There would actually be 160 possible million dollar winners since five (for each team)×32 (total NFL™ teams) =160 possible million dollar winners. There would be 640 possible $100K winners during the NFL™ season in this example embodiment.

Once the playoffs begin, only 12 teams get into the playoffs. This means that the 20 teams that didn't get into the playoffs now all have worthless multiple player combinations on the same team. The drama builds each week as people hope their multiple combination scratchers are still good as NFL™ teams advance or get eliminated. Once an NFL™ team is eliminated, the combinations the team represents will be worthless—in terms of winning money for contestants. Again, only the Super Bowl winning combination is a winner for all combinations of two, three, four, five, and six athletes on the same team. There might be approx. 30,000 total $5 winners with two common athletes on the scratcher of the Super Bowl winning team, 1,000 total $100 winners with three common athletes, 100 total $10,000 winners with four common athletes, 20 total $100,000 winners with five common athletes, and five total $1,000,000 winners with six common athletes.

Specialized Slot Machine for Conducting Fantasy Sports Tournaments

Casinos and other gaming venues have an opportunity to enter the exploding fantasy sports market via traditional slot machines that are designed to create games of intense skill-based strategy. The specialized fantasy sports slot machine, such as the example embodiments described herein, implements games of skill that feature live players competing against one another. The entire game is designed to involve skill; because, variables involving luck are eliminated. This concept becomes possible because the data used is solely based on known statistics and not live action scoring where all kinds of variables get introduced. The disclosure herein provides a general overview of the specialized slot machine in an example embodiment.

In various embodiments described herein, slot machines for conducting wagering games using real time or live action event content via a computer system and/or a data network are disclosed. In general, this patent application relates to computer or network implemented gaming systems and/or fantasy sports tournaments. Fantasy sports is a competitive gaming structure where participants pick real life professional or amateur athletes to fill out a personalized team. They then use this lineup or roster that they picked to compete against teams selected by other fantasy players by comparing the accumulated statistics earned of their respective athletes. This patent application describes various embodiments of computer and network implemented systems and processes providing a tournament structure for fantasy sports that has never been on the market. One reason it hasn't been available before is because the systems and methods that it uses are counter-intuitive to what fantasy players are accustomed. At the same time, these new strategies address a tremendous need in the industry.

Definition of Terms

Athlete—A professional or amateur athlete that is selected from a real life sports team to represent a fantasy player's team for a fantasy game.

Actual Fantasy Points—The fantasy points an athlete accumulates from their real life athletic competition.

Adjusted Fantasy Points—A process for deducting or increasing an athlete's fantasy points based on potential bonuses and deductions.

Blind Submission Process—A process where fantasy players attempt to secure athletes for their fantasy teams by putting in their requests without knowing what their opponents requested.

Bonus Fantasy Points—Additional fantasy points that are awarded up and beyond what an athlete actually scores in their real life athletic competition. This happens when multipliers are introduced for prioritizing a given athlete over others.

Caps—The process of creating an upper bound (it can be extremely high) for the number of fantasy players that can participate in a given qualifying tournament. It is essential to coordinate the upper bounds of all the qualifying tournaments with each other so that the fixed number of seats in the Main Event tournament is not exceeded.

Contingency Lineup—When a fantasy player is required to submit a second lineup (or possibly more) from games later in the day. This second lineup is contingent upon them advancing from proceedings that happened using the first lineup (or prior lineup). The reason a contingency lineup is needed is because there is not enough time to submit a new lineup after the fantasy player advanced to the next round.

Draft Room—Place where fantasy players get together to draft athletes.

This concept can be extended to a virtual draft room where fantasy players "meet" via the Internet and select athletes using their computers.

Duplication of Athletes—Occurs when two or more fantasy players select the same athlete via a blind submission process for their respective lineups.

Entry—Refers to a fantasy player that signs up to play in a fantasy sports tournament.

Fantasy Game—A game with rules that is played between two or more fantasy players to see who accumulates the better fantasy score from accumulated statistics of athletes from live sporting events.

Fantasy Player—A person that enjoys playing fantasy sports games.

Fantasy Points—What an athlete accrues based on performing positive actions in their real life athletic competition.

Fantasy Tournament—A tournament format where fantasy players compete against each other to see who emerges as the winner.

Group—Three or more fantasy players placed together to compete against each other at the same time for a given match.

Group Play—This format is used for tournaments with groups of three or more fantasy players competing against each other at the same time. A predetermined number of top finishers advance to the next round for each group involved.

Head-to-Head Method—When two fantasy players are paired against each other in a fantasy match. This is one of the two formats that is currently used in tournament play. The other is the lottery style of play.

Holy Grail Tournament—The applicant's ideal fantasy sports tournament that is currently not on the market. The format has three primary components in it that are required to appeal to the masses. First, the entry fees are nominal to make it affordable to the masses. Secondly, the grand prize is in the millions of dollars to attract the masses. Finally, the tournament format does not require fantasy players to simultaneously play against the entire field. No fantasy sports tournament has ever been introduced to the market with at least these three important features.

League—Where eight (usually no less) to twenty (usually no more) fantasy players form a league and select athletes to compete against each other in head-to head matches. Won/Lost records are recorded and the better records are rewarded at the end of the season by making the playoffs and competing for the championship.

League Format—Fantasy tournaments that run leagues within a tournament structure.

Lineup Submissions—The process where fantasy players submit the names of the athletes that they want to represent them for a fantasy match. This process can either be a one-time submission or happen over several rounds of submissions.

Locked In—A term that is used to represent an athlete has been submitted and accepted into the lineup of a fantasy player competing in a head-to-head match.

Lottery Method—Tournament format where fantasy players are required to compete against the entire field simultaneously. This is one of the two formats that is currently used in tournament play. The other is the head-to-head style of play.

Main Tournament—This is the portion of a Holy Grail tournament where the qualifying tournament winners meet to determine an overall champion.

Penalties for Duplication—Point penalties that occur when the same athlete is selected by two or more fantasy players during a blind submission process.

Percentage Multiplier—A number that represents the fraction of fantasy points that a fantasy player receives from their athlete's actual fantasy score based on duplication rules that are in place. This number is multiplied by an athlete's fantasy points to recalibrate their fantasy point total to give them their adjusted fantasy point total.

Qualifying Tournament—A tournament that is held to qualify fantasy players for the Main Event tournament.

Re-entry Format—A type of Holy Grail tournament format that allows fantasy players that are eliminated in a given round to buy back into the tournament. This can be done in four different ways: Players can either 1) immediately advance to the next round as if they weren't eliminated; 2) return back to the round that they were eliminated; 3) start over again in the same round they originally entered; or 4) completely re-enter under a different round structure.

RINGS—RINGS is an acronym for, "Rounds Involving Narrow Group Size". The term and the related concepts as described herein can be used in fantasy sports tournaments of various embodiments and involve using small groups of fantasy contestants competing over two or more rounds of play.

Seats—The number of fantasy players that can play in the tournament before it is filled up.

Serpentine Draft Format—A drafting format that snakes back up from bottom to top once everyone has drafted. This is used instead of starting back up at the beginning again. For example, if four people are drafting, then the drafting order would be player A, player B, player C, player D, player D (again), player C, player B, player A, player A (again), player B, etc. This is not a new concept to the fantasy sports industry.

Single Round Elimination Tournament—A tournament structure where fantasy players are eliminated once they lose a round.

Slotted position—The ranking or priority a fantasy player gives a given athlete for their lineup. This procedure is used for tournaments where fantasy players are asked to list the athletes they covet in order of preference.

Spacing Problems—Happens when there aren't enough paths that have been created to allow unlimited numbers of fantasy players into a tournament. If the spacing problems are too severe, tournaments are forced to operate using lottery effect rules where all the fantasy players have to compete against each other simultaneously.

Super Wild Card Format—A format for conducting a fantasy sports tournament where more than one round is needed for a given live real world athletic competition or group of competitions that are running concurrently. This is not to be confused with a Wildcard Format where more than one round is needed during the same day.

Weighting Athletes—A process for giving additional or higher fantasy point values to athletes that are slotted higher.

Wildcard Format—A format for conducting a fantasy sports tournament where more than one round is needed for a given day. This is not to be confused with a Super Wildcard Format where more than one round is needed during the same game (or games running concurrently).

Fantasy sports tournaments have never been able to create a process where an unlimited number of people can play without creating a lottery type of effect. A lottery effect is the very undesirable result of having so many fantasy players entered in a tournament that there is no longer enough room to have them play each other in head-to-head matchups. There are several reasons why the lottery effect continues to occur for tournaments that don't limit the number of entries. Primarily, it is because of the strong sentiment for keeping with tradition. Fantasy tournament organizers are reluctant to alter the format of the way the game has traditionally been played. This mindset has definitely helped preserve tradition, but it has come at a price. It has stifled creativity.

Tournament organizers have not been able to identify at least four key characteristics required for a Holy Grail type of fantasy sports tournament. The reason for this is because in order to develop this type of tournament, there are several non-obvious solutions for the features that have to be implemented. This is a two-step process that makes it even more non-obvious for someone to figure out. First, it is necessary to minimally identify what these four features are and then, just as importantly, provide solutions so that these features can all appear together in the same tournament—solutions that must incorporate outside-the-box thinking or the task becomes unwieldy. The various embodiments as described herein provide these features and solutions.

There are at least four key features that should be in the same tournament structure to produce an effective tournament. These features include the following: 1) entry fees must be a nominal (e.g., low cost, low risk for the consumer) cost to the consumer so the masses can afford to play; 2) the grand prize must be a multi-million dollar grand prize (it has to be life-changing money where the winner minimally becomes a millionaire after taxes) so the masses will enthusiastically desire to play; 3) participants must not be subjected to playing the entire field or large numbers of contestants at the same time to discourage the masses—skill must always be a factor in the tournament; and 4) there must be a re-entry component that allows fantasy players an option to continue getting back into the tournament for as long as possible.

Low entry fee—A tournament with a large prize pool must attract the masses or it is doomed. Tournament organizers would much rather have 5 million people pay $1 and generate 5 million dollars as opposed to 50,000 people paying $100 and generating 5 million dollars. There is a much higher probability that more people will pay a lower cost buy-in. The key concept here is that a low risk entry point for the consumer, especially for a chance at a high reward like a multi-million dollar prize, is always more successful than a high risk entry point even if the reward is something much higher like 10 million dollars. In an example embodiment, the low risk entry point for the consumer can be considered to be a buy-in of less than or equal to $50 per fantasy player or per entry. In another example embodiment, the low risk entry point for the consumer can be considered to be a buy-in of less than or equal to $5 per fantasy player or per entry.

A Multi-Million dollar Grand Prize—A multi-million dollar grand prize guarantees that the winner will have tremendous incentive to play—especially since the buy-in cost is so low. This type of opportunity creates a frenzied climate where people start believing they have to get into the tournament, especially if the risk is low as provided by the low cost buy-in of the first element of the tournament format described herein.

Group Play—Tournaments that enable fantasy players of a fantasy sports tournament to be partitioned into a plurality of player groups thereby enabling competition in small groups where fantasy players are allowed to advance to the next round create more entries and more value, because contestants have the belief they have a chance to advance to the next round. Conversely, forcing fantasy players to simultaneously beat the entire field (which could be millions of people) is suffocating, because people won't believe they can advance so they won't enter. This is deadly for a tournament that has to cover a multi-million dollar prize pool with low cost (e.g., $5) entries.

Re-Entry Component—The only way that a tournament that charges low cost (e.g., $5) entry fees for a chance to win a multi-million dollar grand prize can be successful is if people continue to circulate back into the tournament if they get knocked out. People are much more willing to spend $200 on tournament entry fees if the fees are paid in increments of $5 and $10 dollars over a two or three month time span as opposed to a one time up-front payment. If there is no re-entry component, a potential $200 customer only gets one chance to spend $5. This is a recipe to render a high stakes fantasy sports tournament insolvent very quickly.

In the various embodiments described herein, a re-entry component only has meaning when a tournament has a progression of rounds so that players can either immediately advance to the next round as if they weren't eliminated, return back to the round that they were eliminated, start over again in the same position they originally entered or completely re-enter under a different round structure. The FanDuel tournament is a good example to illustrate what is NOT a re-entry format. FanDuel has 24 different one round qualifying tournaments that they use for people to get into their Main Event. This would not be considered a re-entry type of tournament because it doesn't have a progression of rounds.

Creating a Spacing Mechanism—The inability to create a spacing mechanism that allows millions of people to play in a fantasy sports tournament while not subjecting them to a Lottery Effect has been a significant roadblock to holding an effective tournament for the fantasy sports industry. The embodiments described herein create a spacing mechanism that now makes it possible to hold fantasy sports tournaments where people can enter for a low cost entry fee (e.g., under $100 or even less than $5) and win a high value (e.g., multi-million dollar) grand prize. There are two important features that the embodiments described herein provide to allow this spacing to happen in a sports fantasy tournament. These features are: 1) group play within a tournament, and 2) advancing instead of winning. These features are described below.

The feature of group play within a tournament—No other fantasy sports tournament in existence uses group play (as a matter of fact, group play doesn't exist for any fantasy sports contests—tournament or no tournament). Yet, group play is the only way to create the spacing that allows a low entry fee while at the same time not forcing fantasy players to compete against the entire field simultaneously. The reason for this is that group play allows tournament organizers to create ratios other than the standard 2:1 ratio where one person advances per two people playing. Nobody has ever introduced a group play format for fantasy tournaments.

The feature of advancing instead of winning—Meeting a minimum threshold to advance (as opposed to having to win to advance) is an important feature that no other tournament format uses to create the right ratios for spacing. Group play allows participants the opportunity to advance without necessarily having to win to move on in a tournament. For example, a group of 12 can permit the top 3 players to advance.

A high stakes fantasy sports tournament involving millions of players cannot operate using a traditional draft. It simply takes too long which is lethal for what is needed to make the tournament successful. Long drawn out drafts means fantasy players won't have the time to purchase multiple entries. Multiple entries are an important element to support this type of tournament format. There is no way a tournament that charges a nominal entry fee and awards a multi-million dollar grand prize can survive unless a large number of players are buying multiple entries. This makes it important to eliminate traditional drafts. The high stakes fantasy sports tournament format described herein can eliminate the need for a traditional draft. There are five features listed below that are employed in various embodiments described herein to eliminate traditional drafts. Each of these features involve a blind submission process where the participants in a group or match play event don't know what their opponents have submitted Duplication Penalties Feature—In an example embodiment, fantasy players are penalized points (e.g., the players' point totals are reduced) from their athletes' actual fantasy points earned based on how many other fantasy players in their group selected that athlete. For example, if a fantasy player is the only one to select a particular athlete, that fantasy player gets the particular athlete at 100% of the athlete's fantasy point value. However, if three other fantasy players in the group also submit/select that particular athlete, the three other fantasy players in the group would all get that particular athlete for their lineup, but each of the three fantasy players may only get 75% (or some other percentage less than 100%) of the actual fantasy points earned by the particular athlete.

Multipliers Feature—Athletes are selected based on desirability. The higher a fantasy player values the athlete, the higher the multiplier is for their fantasy points. If there are five athletes selected, the first slotted athlete might get five times their fantasy points, the second slotted athlete might get four times their fantasy points, etc.

Feature for Slotting Athletes on a Percentage Continuum—Athletes can be selected and slotted on a scale ranging from any percentages that a tournament organizer decides. For example, the first slot can be for 100%, the second slot can be for 85%, the third slot for 70%, etc. This allows fantasy players to select the same athletes, but the fantasy players might have their athletes valued at different percentages.

Feature for Disqualifying Athletes that are Duplicated—Disqualifying athletes that are duplicated is an especially effective feature in head-to-head matches. If both fantasy players in a match submit the same athlete, that athlete is disqualified and cannot be resubmitted.

Blind Percentage Bid Feature—Fantasy players are required to not only submit an athlete, but also a bid specifying a percentage of their fantasy points they will get for the match. For cases when both fantasy players select the same athlete, the bid is used by the example embodiment to decide who gets the athlete. The fantasy player who bids the lower percentage of fantasy points gets the athlete. For example, if fantasy player A is willing to take a given athlete at 73% of their fantasy points and fantasy player B is only willing to take the given athlete at 98% of their fantasy points, then fantasy player A would receive this athlete, but would only receive 73% percent of the fantasy points that athlete scored in the match. If both fantasy players bid the same percentage, nobody would get that athlete.

Specific Re-entry Strategies of an Example Embodiment—The only way that a high stakes fantasy sports tournament can charge a nominal buy-in fee and offer a high value grand prize is if there is a re-entry component that allows fantasy players an option to continue getting back into the tournament for as long as possible. The various embodiments described herein provide at least two re-entry features that have never been used before. These re-entry features are described below.

Re-entry Feature for Paying More Money to Play Fewer Rounds—When a fantasy player is eliminated and their opponent moves on, it would be inherently unfair to let the loser back in unless a fair accommodation was made. One method for letting somebody back in is to create another qualifying option that has fewer rounds (because there isn't as much time left until the tournament concludes), but charges the person a re-entry fee that is at a higher cost level than their opponent had to pay for their entry. For example, a fantasy player might only pay $5 to play in a 10 round qualifier and another fantasy player might pay $500 to play in a three round qualifier.

Re-entry Feature for Creating New Qualifiers with the Same Number of Rounds—This feature allows a fantasy player to continue playing in a new qualifier, but creates new paths to duplicate the same number of rounds that fantasy players who are still playing are required to play. This process is not as simple as it may sound; but, the capability is highly desirable, because it allows people to re-enter at very low prices and retains the fairness of the tournament. To create the new paths, an example embodiment can hold multiple rounds in the same day or even multiple rounds in the same game. This is because the qualifying tournament sometimes has only one day to duplicate the many rounds that another player took many weeks to complete. The various embodiments create new qualifiers to duplicate the same number of rounds by manipulating a smaller time period to create the same number of rounds thereby enabling the re-entry price to remain fixed.

Creating a Format for Condensed Seasons and Events—Many real life sporting seasons and events are so condensed that the only way to hold a viable high stakes fantasy tournament is to hold two or more rounds on the same day. For example, it is difficult to hold a high stakes fantasy tournament for the Olympics, World Cup of Soccer, or even the NFL™ playoffs where millions of fantasy players can play for a low entry fee, win a high value prize, and still play in groups. The various embodiments described herein provide a format that supports these condensed seasons and events. At least two features provided by an example embodiment enable these types of tournaments to be feasible. These features are described below.

Feature for Contingency Lineups—Fantasy players must submit two or more lineups during the same day for events that are happening throughout the day. Any lineup other than the initial one is a contingency lineup and only goes into effect if that fantasy player has advanced to the round where the contingency lineup becomes relevant.

Feature for Group Play throughout the tournament—In most cases, it is desirable to hold qualifying tournaments that involve group play to qualify fantasy players for the main tournament. During the main tournament, because there will be a fewer number of players, the tournament format can revert to the more traditional match play where fantasy players compete against a single opponent. Sometimes, it is simply not possibly to have any match play (e.g., head-to-head play), because the time frame is so short (like the Olympic Games). In cases like these, the feature for group play between fantasy players as described herein is used exclusively for these condensed tournaments so that the tournaments still can have the four essential ingredients that a thriving fantasy sports tournament must have as described herein.

The various embodiments as described herein provide the systems and methods (solutions) required for a fantasy sports machine or program that allows an unlimited number of fantasy players to enter a fantasy sports tournament without requiring them to play the entire field at the same time. The various embodiments as described herein are not tied to a particular fantasy sports game. Rather, the various embodiments provide a how-to guide for the features required to create a tournament format that is not currently available on the market. Before going into detail, some background information is helpful to understand some key practices that have created barriers for this new type of format.

Fantasy sports has become a multi-billion dollar industry that continues to grow exponentially. Emerging from this incredible growth has been a culture that has created certain expectations for how a fantasy tournament should look. Unfortunately, these expectations have not always been conducive for progress and have actually hindered the development of new types of formats. Factors that have contributed to this mindset and impeded progress include the common practices, beliefs and expectations that are described below.

Once such common practice is the practice of fantasy players competing against each other in a head-to-head format whenever possible. This is a by-product of how real life sports teams compete. The reasoning seems to be that you don't see three football teams competing against each other in the same game; therefore, you shouldn't have three fantasy players competing against each other in the same fantasy match. The only exception to this rule occurs when lottery type of tournaments are played. During lottery tournaments fantasy players are strictly vying for the high point total often against millions of others over the course of a given time period, which means they are all playing each other at the same time—a very discouraging method of competing.

Other factors impeding progress include the tendency of fantasy tournament organizers to preserve the tradition of league play within the tournament structure. League play is where anywhere from eight to twenty fantasy players form a league to compete head-to-head in order to determine which person has the best overall record. This is an extremely entertaining format; but, it is a disaster for fantasy tournaments that seek to crown an overall champion. The problem is that once leagues are formed, inferior fantasy players are kept in the tournament far too long which creates spacing problems.

Another factor is the reluctance to eliminate fantasy competitors early on in the tournament—even when they are doing poorly. As a general rule, fantasy players consider fantasy sports to be an entertainment outlet for the entire season. Early elimination from a tournament runs counter to this fundamental expectation.

Another factor is the practice of fantasy players exclusively owning their athletes. Once again, this mirrors how the real world of sports works. You don't see more than one team in real life sports share ownership of the same athlete, so the reasoning is that it shouldn't happen in fantasy games either. The only exception in the fantasy arena, once again, is with lottery style tournaments where the sharing of athletes is permitted out of necessity. This is due to the fact that there are not enough athletes to go around when the entire field of competitors are simultaneously playing one another. However, even though lottery tournaments allow sharing, they still don't have a system in place that penalizes fantasy players for duplicating athletes.

Another factor is the limited strategy inherent in submitting lineups in conventional tournament formats. In standard formats, what one fantasy player submits has no bearing on what their opponent submits in terms of potential bonuses or penalties. This creates a relatively stress free process, but may also create inefficiencies.

Another factor is the inability of many fantasy enthusiasts to differentiate between the actual fantasy games that have created a cultural phenomenon (and frankly don't need to be changed) and separate them from the flawed tournament structures that need an overhaul.

The solutions to address these barriers are not obvious. Some of them run counter to deeply entrenched beliefs on how fantasy sports games should be played. If they were obvious, people would be holding Holy Grail tournaments using the format described herein. There would be scores of tournaments where competitors could enter for a $5 entry fee, win a multi-million dollar grand prize, not be subjected to the daunting parameters of having to compete against the entire field at the same time, and also have an opportunity to re-enter the tournament without creating a competitive disadvantage for any of the players. However, in currently used tournament formats, the opposite of this is true. There isn't a single tournament on the market that has all of these features.

It is difficult to quantify how big this void is in the fantasy sports industry by not having a Holy Grail tournament structure. In many respects, the lack of an effective tournament format has been devastating for the industry. There has been so much interest in fantasy sports events, but current structures have not been an effective vehicle for delivering an all-comers tournament.

In the various embodiments described herein, there are at least four features that when combined together create a fantasy sports tournament that can attract the masses. These features include the following: 1) a low entry fee (buy-in); 2) a multi-million dollar grand prize; 3) participants must not be subjected to playing the entire field or large numbers of contestants at the same time to discourage the masses; and 4) a re-entry component.

In the previous section, six common practices were discussed that have impeded the progress for a Holy Grail tournament as described herein. Each of these common practices along with their non-obvious solution(s) is described in more detail below. It is important to note that these solutions don't have to appear in a particular order. Not all of them even need to be present to operate a successful Holy Grail tournament; although, the more solutions that are incorporated into the tournament structure, the more effective the tournament will be.

A first common practice in traditional tournament structures is the practice of fantasy players exclusively competing against each other in either head-to-head or lottery type formats. The various embodiments described herein provide a non-obvious solution or feature to address this common practice. In an example embodiment, fantasy players compete in small player groups of three or more in the same match. This feature of the example embodiment runs counter to what fantasy players think should happen. Fantasy players are used to their sports teams competing head-to-head so they expect the same from their fantasy matchups. As implemented in the example embodiment, a group is not the same as a league. A player group is defined as a small cluster of fantasy players who are put together to compete against one another in a single match. Leagues have groups of fantasy players competing against one another in head-to-head matches. This format only allows two fantasy players to compete against each another at the same time. For the purposes of this patent disclosure, a group is defined as three or more fantasy players who compete against each another at the same time. This format of the example embodiment with groups of three or more creates much needed spacing that allows more fantasy players to enter without subjecting them to the Lottery Effect.

A second common practice in traditional tournament structures is the tendency of fantasy tournament organizers to preserve the tradition of "league play" within the tournament structure. The various embodiments described herein provide a non-obvious solution or feature to address this common practice. In an example embodiment, a solution is implemented to eliminate the under-performing participants in a consistent and timely manner. In an effective tournament structure, it is simply not possible to keep low performing fantasy players in a tournament that looks to crown an overall champion, especially when there are millions of entries in the tournament. It creates a spacing nightmare, because nobody goes away until it is too late. There is no way to whittle millions of fantasy players down to one overall champion if the tournament format doesn't eliminate the participants in a consistent and timely manner. Current formats tend to start their elimination process way too late in the tournament. In one embodiment, a solution paradigm is to create single elimination fantasy sports tournaments. This format requires fantasy players to meet a minimum expectation for every round in which they play or they are immediately eliminated. It doesn't matter if it is the first round, the last round or any round in between. The expectation might be that they have to beat a single opponent in a head-to-head format or the expectation might be that they have to finish in the top four of their player group to advance. Whatever it is, there has to be a minimum expectation to remain in for every round. A single elimination type of format is common in sports and can be found in tennis, the NFL™ playoffs and the NCAA college basketball playoffs.

A third common practice in traditional tournament structures is the reluctance to eliminate fantasy competitors early on in the tournament, even when they are doing poorly. As a general rule, fantasy players consider fantasy sports to be an entertainment outlet for the entire season. Early elimination from a tournament runs counter to this fundamental expectation. The various embodiments described herein provide a non-obvious solution or feature to address this common practice/problem. As described above, a single elimination tournament structure helps to address the problem of slow elimination of under-performing players. However, this solution does not address the finality of getting eliminated quickly in the tournament. In an example embodiment, a solution is implemented to offset this problem by creating non-lottery effect qualifying tournaments that are staggered throughout the beginning of a given sports season and that provide a re-entry component. This allows the tournament to immediately eliminate or disqualify fantasy players that lose during a given round, but also provides an opportunity for them to opt back into the tournament by paying a new entry fee. The end result of this paradigm is that fantasy players can play in the tournament for quite some time like they traditionally have, but it also creates a format to hold a single round elimination tournament where fantasy players are eliminated if they lose a particular match. Some fantasy tournaments may appear to offer a re-entry component, but they really aren't. Each week they are holding a new lottery with the winner gaining a seat into the main tournament. In contrast, the embodiments described herein provide a system and method enabling fantasy players to have the opportunity to buy their way back into a tournament and still compete in small player groups without penalizing the players who advanced from the previous round(s). There are two ways to do this. First, fantasy players can pay higher fees to replace the rounds that they skipped to buy back into the tournament. Secondly, a method as disclosed herein is provided to allow fantasy players back into the tournament for the same price, yet replicating the same number of rounds that contestants who signed up earlier, and have already advanced at least one round, are required to play. In this manner, re-entry players do not gain an advantage over players who advanced from the previous round(s).

A fourth common practice in traditional tournament structures is the practice of fantasy players exclusively owning their athletes. This is a universal practice in traditional tournaments with the exception of lottery effect tournaments. The various embodiments described herein provide a non-obvious solution or feature to address this common practice. For tournament play, it is not practical to have a draft before every round. Moreover, if group play is a feature of the tournament, there has to be a system in place where athletes are selected quickly. The best way to do this is to permit duplication of athletes similar to what is done in lottery tournaments; but only if duplication of athletes comes at a price. There must be penalties for duplication of athletes. The way to accomplish this is to have a blind submission process where the more a given athlete is duplicated, the fewer fantasy points everyone in the player group that selected that athlete receives.

A fifth common practice in traditional tournament structures is the limited strategy that currently exists with submitting lineups. With current formats, what one fantasy player submits has almost no bearing at all on what their opponent submits in terms of potential bonuses and penalties. The various embodiments described herein provide a non-obvious solution or feature to address this common practice. As mentioned in the previous point, the example embodiment penalizes fantasy players for duplication of athletes. This is not the only way to penalize them though. The example embodiment is also configured to penalize fantasy players for not valuing a given athlete highly enough. This will force fantasy players to evaluate athletes not only on merit, but also on the likelihood that several other competitors in their player group might potentially select the same athletes. Also, the example embodiment is configured to offer bonuses by weighting the athletes. This can be done by requiring fantasy players to submit lineups with a listing of athletes in order of preference. The higher the athlete is ranked or "slotted", the more potential bonus points the player will receive. This will create strategy where fantasy players really have to think about where their athletes should be placed on the lineup and create a climate where competing fantasy players try to out-think each other.

A sixth common practice in traditional tournament structures is the inability of many fantasy enthusiasts to differentiate between the actual fantasy games that have created a cultural phenomenon (and frankly don't need to be changed) and separate this from the flawed tournament structures that need to be fixed. Fantasy sports games are so compelling that it makes it less likely that people will look to find out-of-the-box solutions for fixing flawed tournaments formats for fear of incurring the wrath of fantasy players. As a result, the status quo remains in place. In contrast, the various embodiments described herein provide a non-obvious set of solutions or features to address the failures of the traditional tournament structures.

The various embodiments of systems and methods for creating a Holy Grail tournament are described herein. The tournament format in an example embodiment utilizes a two tiered structure. First, qualifying tournaments are used to qualify fantasy players that feed directly into a main event tournament. Secondly, a main tournament is used to determine an overall winner as well as other top finishers. It is important to note that individual features within each of these two tournament formats don't necessarily have to be in the order described. Some are not even required to hold a Holy Grail tournament, but are listed to enhance the quality of the tournament. Finally, the idea of having qualifying tournaments to get into a main event isn't unprecedented. The problem with what is currently available is that all variations fall into the trap of either offering one of the two variations (Head-to-Head or Lottery Effect) that was described earlier. For example, FanDuel offers a Main Event where hundreds or even thousands of people are forced to compete against one another simultaneously to try and qualify for the Main Event. It is extremely discouraging for fantasy players to enter a tournament knowing that the only way to gain entry into the Main Event is if they post the highest score out of several hundred or thousand people.

Qualifying Tournaments

The goal is to create a predetermined number of qualifying tournaments that feed into a Main Event tournament. In an example embodiment, these qualifying tournaments have the following features. Matches are played in small groups of three or more fantasy players. A predetermined number of "winning" fantasy players advance to the next qualifying round (or qualify directly into the Main Event tournament). For example, if groups are set at 12 members each, it might be determined that the top three scores in each group will advance. The particular scoring system for determining fantasy points for an athlete can be any that is commonly used or one that is completely new to the industry. Fantasy players submit their lineups via a blind submission process. The more duplication that occurs for a given athlete during this blind submission process, the less they will be worth. There is a re-entry component that allows contestants to opt back in either by 1) by allowing them to pay more money for playing less rounds or 2) allowing them to re-enter at the same price by duplicating the number of rounds that advancing contestants have been required to play. If they re-enter by paying more money for less rounds there might be a qualifying tournament where it only takes advancing four rounds to qualify directly into the Main Event tournament and there might be a qualifying tournament that takes nine rounds to advance to the Main Event Tournament. The qualifying tournament that takes more rounds to qualify would be less expensive to enter. There is also an alternative version that can be used instead of the version previously described. If they re-enter by paying the same amount of money, that particular qualifying tournament would have to have the same number of rounds. This format requires creating options to include more and more rounds in a shorter period of time. What ends up happening is that individual rounds are contested in different ways than the earlier rounds (see Explanation #4 below). Portions of some qualifying tournaments can run concurrently with other qualifying tournaments while other portions don't have to run concurrently. Fantasy players can purchase multiple entries for the same qualifying tournament. Fantasy players can enter more than one qualifying tournament at the same time. The Main Event tournament has a predetermined number of seats; therefore, it is critical that the satellite rounds are capped at an appropriate number so that there aren't more fantasy players qualifying for the Main Event tournament than there are seats available. Qualifying rounds can have several different types of formats for weighting athletes depending on where they are slotted (see Explanation #1).

Main Event Tournament

Main Event consists of fantasy players who advanced via qualifying tournaments or directly buying in. The number of seats available for fantasy players in the Main Event is predetermined before the tournament even started. Main Event can either be a head-to-head format or a continuation of group play. If the Main Event is head-to-head, fantasy players are randomly assigned an opponent. If there is nobody to whom they can be assigned, they receive a bye to the next round. If the Main Event is group play, then a predetermined number of fantasy players advance from each group for a given round. For the final group, during the last round, fantasy players play for final positions. In an example embodiment, the scoring system for the Main Event should be a simple scoring system that fantasy players are familiar with from whatever sport the tournament is featuring. The Main Event should have a predetermined number of seats to ensure that it is possible to crown an overall champion as well as recognize top finishers.

The following description illustrates one example of a step-by-step explanation of how a Holy Grail tournament works in an example embodiment. Again, these steps are interchangeable in many places and some of them aren't even required.

Step #1—Fantasy players are presented with different options for entering a qualifying tournament. They will find that the more rounds a qualifying tournament offers, the less expensive they are to play in (see Explanation #3 and Table 1 in the Appendix below). Table 1 shows a satellite tournament structure for a fantasy sports tournament.

Step #2—Caps are established by the computer program to ensure that there are not more seats allocated for the Main Event Tournament than it can support (see Table 2 in the Appendix below). Table 2 shows how caps are established for qualifying tournaments.

Figure 10:
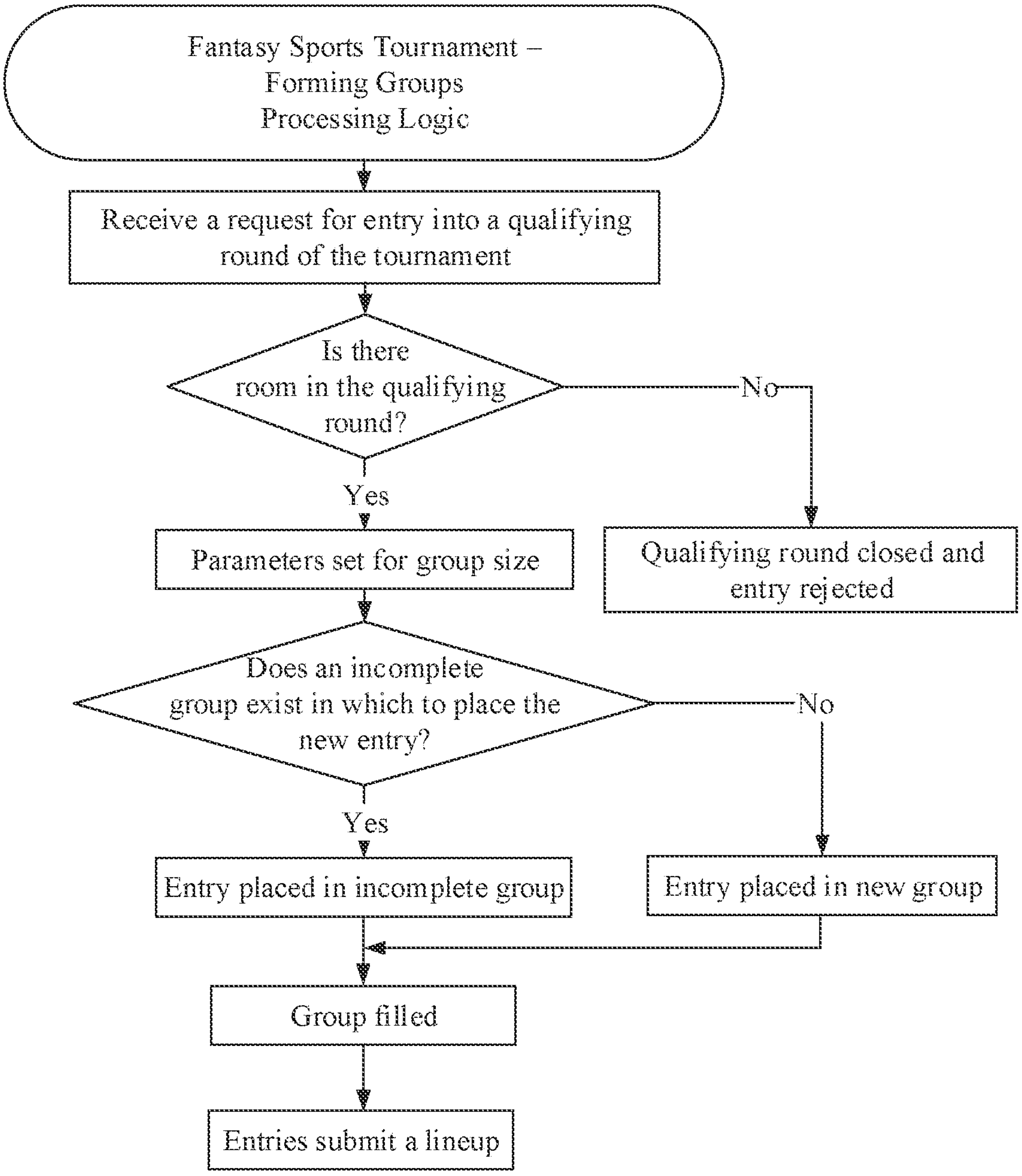
FIG. 10 is a flowchart showing how player groups are formed one group at a time.
Figure 14:
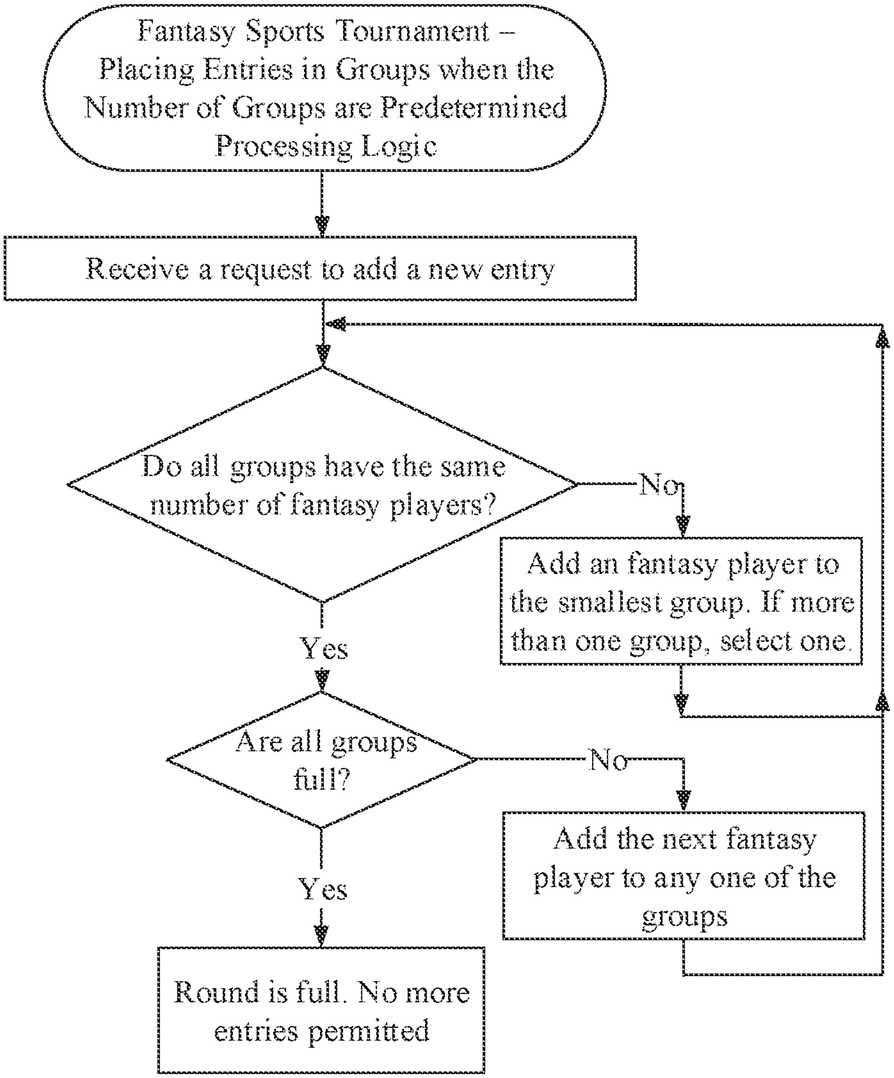
FIG. 14 is a flowchart showing how group tournaments can also be filled by creating a pre-determined number of groups and then adding one fantasy player to each group before any one group gets bumped higher.

Step #3—Once a fantasy player has entered a qualifier, they will be assigned a group. Group play is a technique that helps create the proper spacing a tournament needs to accommodate millions of fantasy players (see Explanation #2 below for different group formats). There are two ways groups can be filled. They can either be filled one group at a time (see FIG. 10) to ensure that each group has the maximum number of fantasy players established by the tournament rules or, instead, a predetermined number of groups can be established and fantasy players are placed into the groups in a manner where each group receives their first fantasy player before a second is added in and so on (see FIG. 14).

Figure 12:
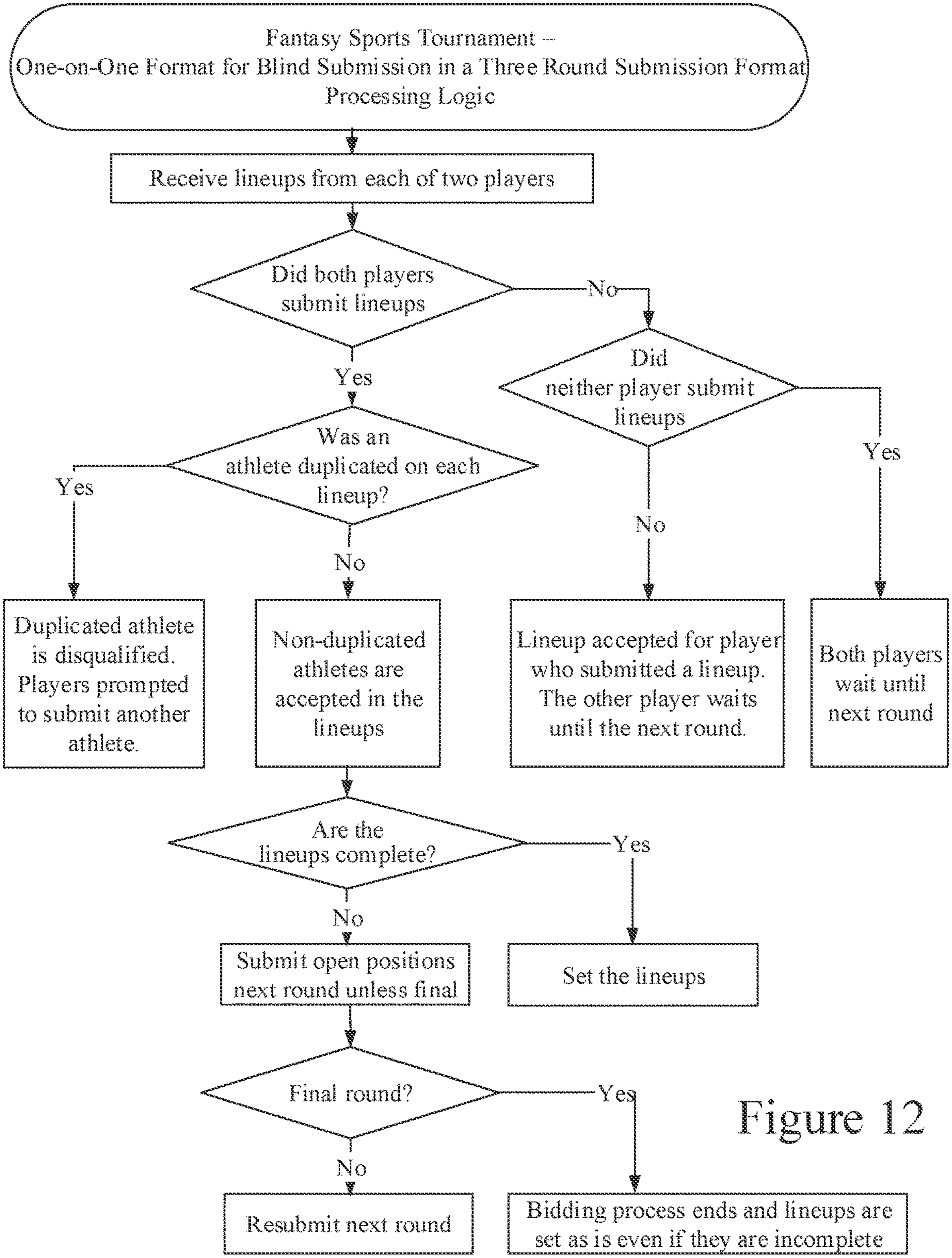
FIG. 12 is a flowchart showing how head-to-head fantasy players submit athletes via a blind submission process over a set number of submission rounds. In this example, three rounds are used.
Figure 13:
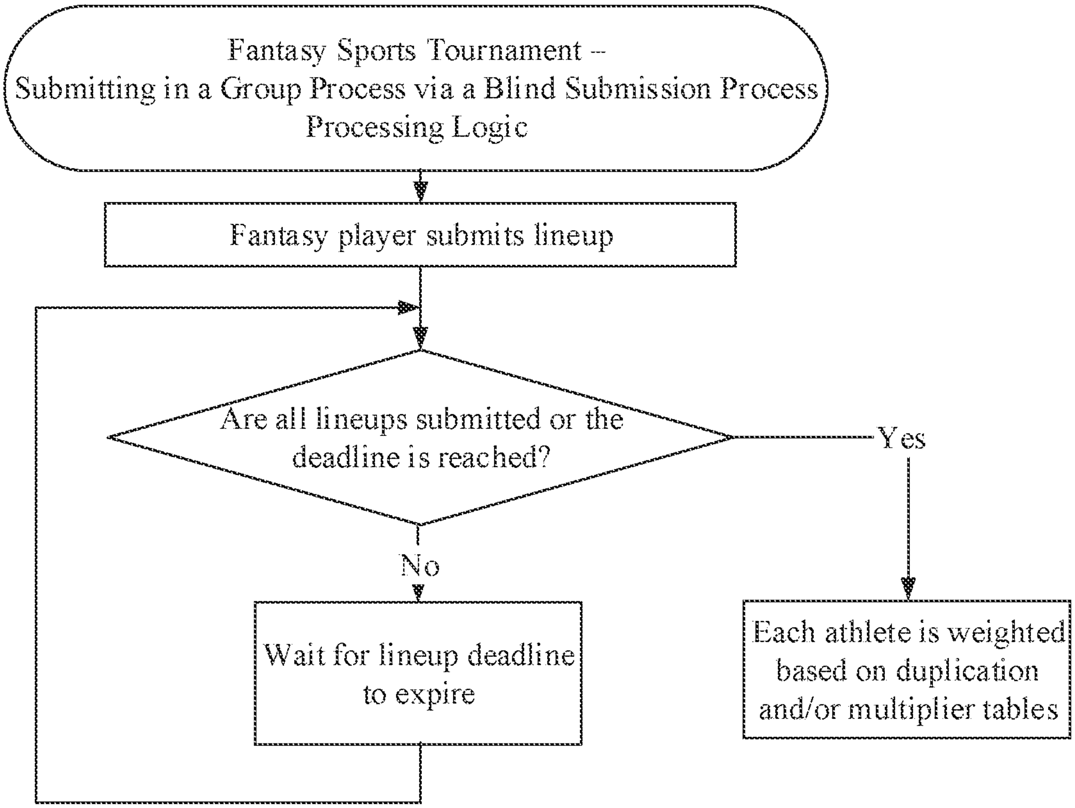
FIG. 13 is a flowchart showing how groups submit athletes via a blind submission process.

Step #4—Fantasy players are required to turn in their lineups via a blind submission process (see FIG. 12 and FIG. 13). Fantasy players will have to take into consideration how athletes are weighted and also the likelihood of being duplicated (see Explanation #1 below).

Step #5—The scoring system can be a commonly used and accepted format.

Step #6—The computer program of an example embodiment calculates the fantasy point value each athlete is worth based on duplication of athletes (see Table 3 and Table 4 in the Appendix below). Table 3 shows how a given athlete loses a percentage of their fantasy points based on two or more fantasy players selecting that same athlete for their lineups. Table 4 shows the calculations of several athletes' recalibrated fantasy points based on how much duplication occurred.

Step #7—If a player fails to get their lineup in for a match, their previous lineup will be submitted as a default lineup for the match by the computer program of an example embodiment.

Step #8—Live athletic competition in the corresponding sport takes place. The computer program of an example embodiment has ongoing scoring updates and shows each fantasy player, their running score, and where they rank overall in their group.

Step #9—Once all of the real life sporting events are completed that are relevant to the group fantasy match, the computer program of an example embodiment tabulates final scores based on the given weighting and duplication systems used for the match (see Table 5 in the Appendix below). Table 5 shows a final tally of a fantasy match that incorporates both weighting bonuses and duplication penalties.

Figure 11:
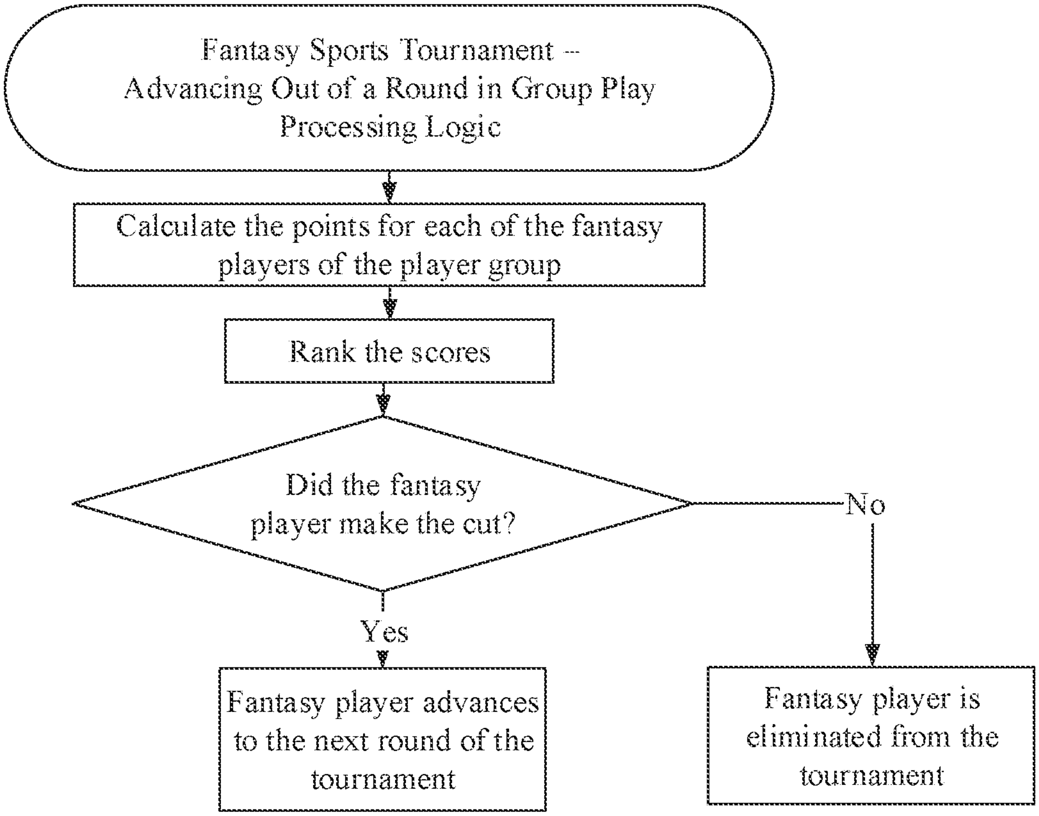
FIG. 11 is a flowchart showing how some fantasy players advance in the group play tournament while some are eliminated or disqualified.

Step #10—The computer program of an example embodiment determines a cutoff for each group. The number of fantasy players that are qualified to advance for a given round of the qualifying process move onto the next qualifying round (or move onto the Main Event Tournament if they advance during the last qualifying round) and the remaining members of the group are eliminated (see FIG. 11).

Step #11—The process begins anew for qualifying rounds and the first ten steps are repeated over and over until a fantasy player is either eliminated or qualifies for the Main Event Tournament. Fantasy players can either re-enter by buying into a new qualifying tournament or they have advanced from a previous round of a qualifying tournament and are placed in a group for the new round.

Step #12—For Main Event Tournament rounds, the same format is in place if group play is in effect. The only exception is for the last round of the tournament where fantasy players compete for final positions instead of trying to advance. If the Main Event Tournament is structured in a head-to-head format, fantasy players are randomly assigned to play in a particular match. Each single match (keep in mind that the number of matches is predetermined) must have one fantasy player assigned to it before assignments for an opponent are made (see FIG. 15).

Figure 15:
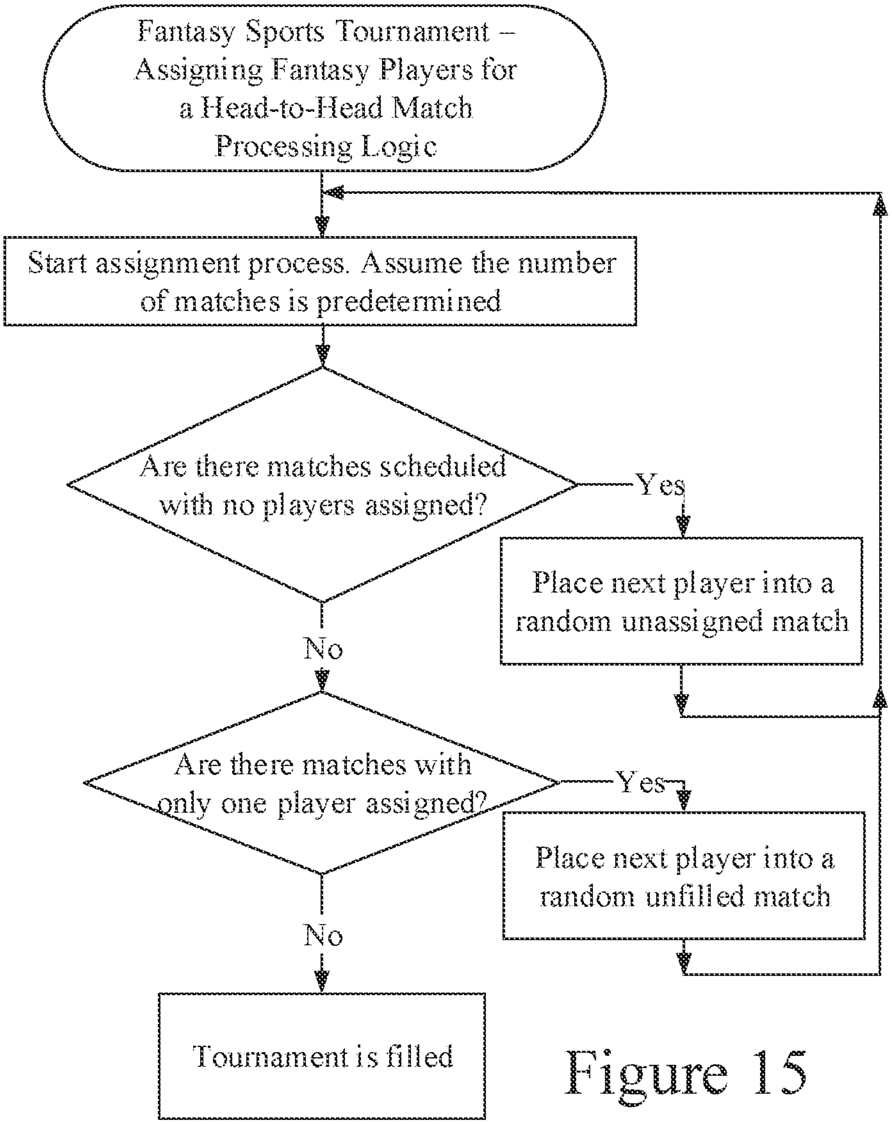
FIG. 15 is a flowchart showing how fantasy players are randomly assigned for a head-to-head Main Event tournament match.

Step #13—Any match that has only one fantasy player assigned to it results in that fantasy player receiving a bye for the round and automatically advancing to the next round (see FIG. 15).

Step #14—If for some reason there isn't a fantasy player assigned to a match, a double bye is declared and a "bye" will be entered into the mix for the next round. The fantasy player that is assigned this bye will be awarded a bye during that new round and will move on to the next round (see FIG. 15).

Step #15—The format for the match will be determined (see Explanation #2 for different match formats).

Step #16—The scoring system can be a commonly used and accepted format.

Step #17—The fantasy player with the better score moves on to the next round, the loser is eliminated from the tournament.

Step #18—The last two standing will play for the championship with the fantasy player with the higher fantasy point total earning the tournament championship and their opponent earning the runner-up position.

Explanation #1—Weighting the point values of fantasy players based on a) the slotted position in which an athlete was selected, and/or b) how many fantasy players selected them. Weighting athletes based on how they were prioritized and/or how often they were duplicated is a process that forces fantasy players to think very carefully about which athletes they submit and where they place them in their lineup hierarchy. This is especially true for formats that require fantasy players competing against each other to turn in their lineups via a blind submission process. A blind submission method is where all the fantasy players in a group competing against one another are required to turn in their lineups before they find out what the others in the group submitted.

The following are examples of some techniques used in an example embodiment to weight the players. Fantasy players are awarded multiples of the fantasy points their athletes scored depending on where their athletes were selected. For example, assume each fantasy player selects five athletes. For each fantasy player's first slotted athlete, the athlete could be worth five times the fantasy points they scored in their match. For each fantasy player's second slotted athlete, the athlete could be worth four times the fantasy points they scored in their match. For each fantasy player's third slotted athlete, the athlete could be worth three times the fantasy points they scored in their match. For each fantasy player's fourth slotted athlete, the athlete could be worth two times the fantasy points they scored in their match. For each fantasy player's fifth slotted athlete, the athlete could be worth face value of the fantasy points they scored in their match. The following is a table illustrating a hypothetical example that could be from a 12 player group competing, for example, in a fantasy cricket tournament:

| | Athlete #1<br>5X | Athlete #2<br>4X | Athlete #3<br>3X | Athlete #4<br>2X | Athlete #5<br>FACE VALUE |
|---|---|---|---|---|---|
| Fantasy<br>Player 1 | Tendulkar<br>Mumbai Indians | Vettori<br>Bangalore | Sangakkara<br>Hyderabad | Jadeja<br>Chennai | Sehwag<br>Delhi |
| Fantasy<br>Player 2 | Gilchrist<br>Mohali | Sangakkara<br>Hyderabad | Sharma<br>Mumbai | Vettori<br>Bangalore | Ganguly<br>Pune |
| Fantasy<br>Player 3 | Sangakkara<br>Hyderabad | Dravid<br>Jaipur | Dhoni<br>Chennai | Kohli<br>Bangalore | Jadeja<br>Chennai |
| Fantasy<br>Player 4 | Gilchrist<br>Mohali | Vettori<br>Bangalore | Sangakkara<br>Hyderabad | Pathan<br>Delhi | Gambhir<br>Calcutta |
| Fantasy<br>Player 5 | Ganguly<br>Pune | Sangakkara<br>Hyderabad | Sehwag<br>Delhi | Dravid<br>Jaipur | Sharma<br>Mumbai |
| Fantasy<br>Player 6 | Dhoni<br>Chennai | Tendulkar<br>Mumbai Indians | Sangakkara<br>Hyderabad | Sehwag<br>Delhi | Gambhir<br>Calcutta |
| Fantasy<br>Player 7 | Vettori<br>Bangalore | Sehwag<br>Delhi | Sangakkara<br>Hyderabad | Tendulkar<br>Mumbai Indians | Gilchrist<br>Mohali |
| Fantasy<br>Player 8 | Gambhir<br>Calcutta | Sharma<br>Mumbai | Sangakkara<br>Hyderabad | Tendulkar<br>Mumbai Indians | Kohli<br>Bangalore |
| Fantasy<br>Player 9 | Dravid<br>Jaipur | Sangakkara<br>Hyderabad | Pathan<br>Delhi | Gilchrist<br>Mohali | Vettori<br>Bangalore |
| Fantasy<br>Player 10 | Gilchrist<br>Mohali | Sangakkara<br>Hyderabad | Dravid<br>Jaipur | Ganguly<br>Pune | Gambhir<br>Calcutta |
| Fantasy<br>Player 11 | Vettori<br>Bangalore | Gilchrist<br>Mohali | Gambhir<br>Calcutta | Sehwag<br>Delhi | Tendulkar<br>Mumbai Indians |
| Fantasy<br>Player 12 | Dhoni<br>Chennai | Tiwary<br>Bangalore | Sangakkara<br>Hyderabad | Tendulkar<br>Mumbai Indians | Ganguly<br>Pune |

Another weighting method that can be implemented in an alternative embodiment is one where fantasy players are given a percentage of the fantasy points an athlete earned depending on where the player selected that athlete. For example, if each fantasy player is asked to select eight athletes, the selected athletes can be weighted by having the first athlete everyone selects be worth 100% of their fantasy points, the second athlete selected can be worth 87.5% of their fantasy points, the third worth 75% of their fantasy points, the fourth worth 62.5% of their fantasy points, the fifth worth 50% of their fantasy points, the sixth worth 37.5% of their fantasy points, the seventh worth 25% of their fantasy points, and the eighth worth 12.5% of their fantasy points. The following is a table illustrating a hypothetical example of this method using athletes from the Philippine Basketball League as an example (Note that duplication of athletes is permitted in this example):

| | Slotted #1<br>100% | Slotted #2<br>87.5% | Slotted #3<br>75% | Slotted #4<br>62.5% | Slotted #5<br>50% | Slotted #6<br>37.5% | Slotted #7<br>25% | Slotted #8<br>12.5% |
|---|---|---|---|---|---|---|---|---|
| Fantasy<br>Player #1 | Miller<br>Barako | David<br>Powerade | Yap<br>B-Meg | Lutz<br>Petron | Santos<br>Petron | Lassiter<br>Powerade | Cardoa<br>Meralco | Chan<br>Rain or<br>Shine |
| Fantasy<br>Player #2 | David<br>Powerade | Yap<br>B-Meg | Reyes<br>Alaska<br>Aces | Lassiter<br>Powerade | Castro<br>Talk N<br>Text | Chan<br>Rain or<br>Shine | Sena<br>Shopinas | Lutz<br>Petron |

Another format that can be implemented in an alternative embodiment penalizes fantasy players for duplication of athletes. Using this method, fantasy players are allowed to share athletes, but the more duplication that occurs reduces the percentage of fantasy points each fantasy player receives for that given athlete. For example, here is a sample duplication table for up to a 12 player fantasy match.

| Percentage of Fantasy Points an Athlete is Worth Based on Duplication of Athletes Selected | | | | | | | | | | | |
|---|---|---|---|---|---|---|---|---|---|---|---|
| | Athlete selected 1X | 2X | 3X | 4X | 5X | 6X | 7X | 8X | 9X | 10X | 11X | 12X |
| 4 player fantasy match | 100% | 67% | 33% | 0% | NA | NA | NA | NA | NA | NA | NA | NA |
| 5 player fantasy match | 100% | 75% | 50% | 25% | 0% | NA | NA | NA | NA | NA | NA | NA |
| 6 player fantasy match | 100% | 80% | 60% | 40% | 20% | 0% | NA | NA | NA | NA | NA | NA |
| 7 player fantasy match | 100% | 83% | 67% | 50% | **33%** | 17% | 0% | NA | NA | NA | NA | NA |
| 8 player fantasy match | 100% | 86% | 72% | 58% | 43% | 28% | 14% | 0% | NA | NA | NA | NA |
| 9 player fantasy match | 100% | 87% | 75% | 62% | 50% | 38% | 25% | 13% | 0% | NA | NA | NA |
| 10 player fantasy match | 100% | 89% | 78% | 67% | 56% | 45% | 34% | 23% | 12% | 0% | NA | NA |
| 11 player fantasy match | 100% | 90% | 80% | 70% | 60% | 50% | 40% | 30% | 20% | 10% | 0% | NA |
| 12 player fantasy match | 100% | 91% | 82% | 73% | 64% | 55% | 46% | 37% | 28% | 19% | 10% | 0% |

In the example above, "1×" is read as "one time" which means a given athlete was selected by exactly 1 of the 12 fantasy players. Also, note that the in the example above, the percentages are not fixed. They are completely arbitrary. For this example table, the spreads were distributed equally (to the nearest whole percentage) based on how many fantasy players selected a given athlete.

The highlighted (bolded and underlined) portion of the table represents a seven player fantasy group where five of the members submitted the same athlete. Because duplication of athletes is permitted in an example embodiment, each of the members would have that athlete in their lineups, but each of the members would receive only 33% of the fantasy points that athlete scored in their match.

Once the live sporting events have been completed, the actual fantasy points an athlete scores are converted to their adjusted fantasy points based on how many other fantasy players selected a given athlete. The following table is an example from a hypothetical group of NFL™ athletes that shows an example of this conversion.

| Athlete | Actual Fantasy Score | # of times Athlete Selected | Percentage Multiplier | *Adjusted Fantasy Score |
|---|---|---|---|---|
| Vick, Phila | 31 | 2 | .91 | 28.21 |
| Brady, NE | 25 | 6 | .55 | 13.75 |
| P. Manning, Ind | 40 | 3 | .82 | 32.80 |
| Brees, NO | 28 | 1 | 1.00 | 28.00 |
| Gore, SF | 16 | 2 | .91 | 14.56 |
| Peterson, Min | 33 | 11 | .10 | 3.30 |
| Mendenhall, Pit | 15 | 1 | 1.0 | 15.00 |
| C. Johnson, Ten | 29 | 4 | .73 | 21.17 |
| Foster, Hou | 21 | 1 | 1.0 | 21.00 |
| Jones-Drew, Jax | 9 | 1 | 1.0 | 9.00 |
| Bradshaw, NYG | 13 | 1 | 1.0 | 13.00 |
| Turner, Atl | 31 | 1 | 1.0 | 31.00 |
| Rice, Balt | 17 | 1 | 1.0 | 17.00 |
| S. Jackson, STL | 24 | 1 | 1.0 | 24.00 |
| Welker, NE | 21 | 2 | .91 | 19.11 |
| C. Johnson, Det | 18 | 6 | .55 | 9.90 |
| A. Johnson, Hou | 27 | 5 | .64 | 17.28 |
| Bowe, KC | 11 | 1 | 1.0 | 11.00 |
| Austin, Dal | 15 | 1 | 1.0 | 15.00 |
| White, Atl | 13 | 1 | 1.0 | 13.00 |
| Wallace, Pitt | 25 | 1 | 1.0 | 25.00 |
| Jennings, GB | 17 | 1 | 1.0 | 17.00 |
| Marshall, Mia | 16 | 1 | 1.0 | 16.00 |
| Fitzgerald, Az | 22 | 3 | .82 | 18.04 |
| Wayne, Ind | 10 | | 1.0 | 10.00 |
| D. Jackson, Phil | 12 | | 1.0 | 12.00 |

To calculate the Adjusted Fantasy Score in an example embodiment, the computer program can multiply the Actual Fantasy Score by the Percentage Multiplier. For instance in the example above, Michael Vick scored 31 actual fantasy points and two players selected Vick as an athlete in their player lineups. Because two players selected Vick as an athlete in their player lineups, each player will receive 91% of those actual fantasy points. Thus, Vick's Adjusted Fantasy Score, in this example, is 31×0.91=28.21.

Another technique, that is similar to the previous example, punishes fantasy players more severely for duplication of athlete selection. In this embodiment, the system splits the fantasy points that an athlete earns with every member of the group that selected the athlete. For example, if an athlete scores 32 fantasy points and five fantasy players selected the athlete, then each member of the group that selected the athlete would receive 6.4 fantasy points (32 divided by 5 equals 6.4).

The weighting systems can also be combined. For example, the following table shows an example from a 20 player fantasy cricket match where the slots are weighted according to where an athlete was selected and the percentage of fantasy points (listed under their name and country) they earn is based on how many other fantasy players selected a given athlete.

| | Athlete #1 5 TIMES | Athlete #2 4 TIMES | Athlete #3 3 TIMES | Athlete #4 2 TIMES | Athlete #5 FACE VALUE |
|---|---|---|---|---|---|
| Fantasy Player 1 | Al Hasan Bangladesh 32% | ul-Haq Pakistan 64% | Rahim Bangladesh 6% | Afridi Pakistan 48% | Gul Pakistan 22% |
| Fantasy Player 2 | Hafeez Pakistan 53% | Al Hasan Bangladesh 32% | Mahmudullah Pakistan 85% | Gul Pakistan 22% | Afridi Pakistan 48% |
| Fantasy Player 3 | Gul Pakistan 22% | Rahim Bangladesh 6% | Hafeez Pakistan 53% | Cheema Pakistan 58% | ul-Haq Pakistan 64% |
| Fantasy Player 4 | ul-Haq Pakistan 64% | Afridi Pakistan 48% | Iqbal Pakistan 79% | Rahim Bangladesh 6% | Al Hasan Bangladesh 32% |
| Fantasy Player 5 | Gul Pakistan 22% | Khan Pakistan 90% | Rahim Bangladesh 6% | Hafeez Pakistan 53% | Cheema Pakistan 58% |
| Fantasy Player 6 | Rahim Bangladesh 6% | Afridi Pakistan 48% | Al Hasan Bangladesh 32% | Mahmudullah Pakistan 85% | ul-Haq Pakistan 64% |
| Fantasy Player 7 | Al Hasan Bangladesh 32% | Gul Pakistan 22% | Cheema Pakistan 58% | Afridi Pakistan 48% | Rahim Bangladesh 6% |
| Fantasy Player 8 | Rahim Bangladesh 6% | Hafeez Pakistan 53% | Gul Pakistan 22% | Iqbal Pakistan 79% | Al Hasan Bangladesh 32% |
| Fantasy Player 9 | Rahim Bangladesh 6% | Cheema Pakistan 58% | Afridi Pakistan 48% | Al Hasan Bangladesh 32% | Gul Pakistan 22% |
| Fantasy Player 10 | Hafeez Pakistan 53% | Khan Pakistan 90% | Gul Pakistan 22% | Rahim Bangladesh 6% | ul-Haq Pakistan 64% |
| Fantasy Player 11 | Rahim Bangladesh 6% | Al Hasan Bangladesh 32% | ul-Haq Pakistan 64% | Gul Pakistan 22% | Mahmudullah Pakistan 85% |
| Fantasy Player 12 | Afridi Pakistan 48% | Gul Pakistan 22% | Al Hasan Bangladesh 32% | Cheema Pakistan 58% | Rahim Bangladesh 6% |
| Fantasy Player 13 | Cheema Pakistan 58% | Afridi Pakistan 48% | Gul Pakistan 22% | Rahim Bangladesh 6% | Hafeez Pakistan 53% |
| Fantasy Player 14 | Al Hasan Bangladesh 32% | Iqbal Pakistan 79% | Afridi Pakistan 48% | Hafeez Pakistan 53% | Rahim Bangladesh 6% |
| Fantasy Player 15 | Gul Pakistan 22% | Rahim Bangladesh 6% | Hafeez Pakistan 53% | ul-Haq Pakistan 64% | Khan Pakistan 90% |
| Fantasy Player 16 | ul-Haq Pakistan 64% | Al Hasan Bangladesh 32% | Mahmudullah Pakistan 85% | Gul Pakistan 22% | Rahim Bangladesh 6% |
| Fantasy Player 17 | Gul Pakistan 22% | Jamshed Pakistan 100% | Al Hasan Bangladesh 32% | Rahim Bangladesh 6% | Cheema Pakistan 58% |
| Fantasy Player 18 | Cheema Pakistan 58% | Al Hasan Bangladesh 32% | Afridi Pakistan 48% | Iqbal Pakistan 79% | Rahim Bangladesh 6% |
| Fantasy Player 19 | Rahim Bangladesh 6% | Gul Pakistan 22% | Hafeez Pakistan 53% | Afridi Pakistan 48% | Iqbal Pakistan 79% |
| Fantasy Player 20 | Hafeez Pakistan 53% | Rahim Bangladesh 6% | Gul Pakistan 22% | Cheema Pakistan 58% | Al Hasan Bangladesh 32% |

Explanation #2—Structuring some or all of a tournament in groups of three or more players. Because sporting events are almost universally structured where either one team competes against another team (such as in football, basketball, baseball, etc.) or one individual competes against another individual (such as in boxing, wrestling, tennis, etc.) or individuals compete against the entire field simultaneously (such as in golf, motor sports, cycling, etc.), the fantasy sports industry has been a victim of these formats when it comes to creating tournaments for fantasy sports enthusiasts. For that reason, there has never been a fantasy tournament where an unlimited number of people can play without being subjected to playing the entire field at the same time. The various embodiments described herein provide a solution to this problem with existing fantasy tournaments.

Even though real life sporting events don't usually have seven teams compete against each other at the same time, there is no reason why this can't happen for a fantasy sports match. Instead of structuring fantasy tournaments as if they were real sporting events, there is no reason why the format can't look more like a card game with several players competing against one another simultaneously. This format allows more fantasy players to compete in the tournament without subjecting them to having to face the entire field at once.

There is little doubt that having fantasy players compete in small groups runs counter to how people think fantasy tournaments should be held. But, it is the only way to allow an unlimited number of players the opportunity to enter without subjecting them to competing against the entire field at the same time.

In the various example embodiments described herein, there are several specific formats that use a group play format (some are more effective than others because of the time it takes to create a full lineup to submit). These formats in an example embodiment include the following sample formats.

Group Tournament Type #1—Using a Fantasy Draft—Leagues of 10 to 12 people have been getting together and drafting for fantasy leagues since the origins of fantasy sports. However, the purpose of a draft in traditional leagues has always been to form a league where members of the group play each other in one-on-one matches throughout the season to see which fantasy owners emerge with the best records to playoff for the championship.

In the various embodiments described herein, an important distinction is made between traditional leagues and the small player groups used in the various embodiments. Instead of drafting to compete in a league as is traditionally done, small groupings of players come together (typically online) to draft for a single match where everyone in the group is playing everyone else in the group simultaneously. This simultaneous play between all members of the group does not occur in traditional leagues. In the various embodiments described herein, a predetermined number of top scores from this fantasy player group earn the right to advance to the next round. For example, a group of 12 entries (fantasy players) playing in a fantasy cricket tournament might end up drafting athletes with the understanding that the top 3 scores are to advance to the next round. The number of scores necessary to advance can be predetermined.

To conduct a Holy Grail tournament online using this particular format in accordance with an example embodiment described herein, fantasy players would pay a fee, which would automatically put them in an online draft room that is capped at a certain number of entries for a given group. The online draft room can be implemented as an online collection of users/fantasy players in a manner similar to the way collections of online users can gather in a chat room. For example, the fantasy game might be rugby that allows ten entries (fantasy players) per group with the top two scores advancing to the next round. This doesn't necessarily mean that the group will ultimately end up with ten people; because, this is determined by when the first person of a given group enters the online draft room. Once the first person enters, a time limit is set (for example 20 minutes) for the group to fill up with ten people. Once it does, the draft starts immediately with the drafting order determined by when the players show up in the draft room. The earlier a person appears, the higher they draft. The draft can follow a serpentine format as defined above.

If not enough fantasy players fill the ten spaces, the draft begins when the allotted time has passed with however many people are in the draft room. If the number of people in the draft room is less than or equal to the number of fantasy players that are supposed to advance from a group determined by the tournament rules, the fantasy players automatically receive byes to the next round and do not compete in a match against each other for that round.

Group Tournament Type #2—Holding a Fantasy Draft with a Bidding Twist—Once again, the example embodiment provides a draft amongst a small group of fantasy players who compete against each other in a single match. Parts of the draft protocol are the same as the first tournament format described above. For instance, the mechanics of how the first person in the draft room starts the clock to determine the number of people that will be in the group is the same.

The draft rules are completely different though from a traditional draft. In this format, fantasy players don't necessarily get the athlete they draft. In this format of an example embodiment, every fantasy player is given a set amount of credits to spend in order to secure athletes. All members of the group can bid on an athlete who was drafted. For example, let's assume it is a fantasy football draft and every fantasy player is given 50 credits to secure one quarterback (QB), two running backs (RB's) and two wide receivers (WR's). The fantasy player who initially drafts a given football player automatically has a 1 credit bid for that player to kick off the bidding process. The draft bidding process then goes to the next fantasy player in the draft. The next fantasy player can either bid 2 or more credits (must bid in increments of 1—can't use fractions) or "pass" to the next fantasy player in the draft.

Only when the draft bidding process goes through the entire group of fantasy players back to the person who has the highest bid on record, does the bidding end for this football player (athlete). The fantasy player who made the winning bid has the number of credits they bid deducted from their credit account. They are the only fantasy player in the group who is allowed to start that football player for their lineup. The draft then goes back to the original order where the second fantasy player drafting introduces a new football player on whom the fantasy players in the group can bid.

An example of the process for an 8 player group is set forth below:

Fantasy Player #1—"I submit Tom Brady" (automatically means a 1 credit bid)
Fantasy Player #2—"Pass"
Fantasy Player #3—"I bid 2 credits"
Fantasy Player #4—"I bid 5 credits"
Fantasy Player #5—"I bid 6 credits"
Fantasy Player #6—"Pass"
Fantasy Player #7—"I bid 9 credits"
Fantasy Player #8—"I bid 11 credits"
Fantasy Player #1—"Pass"
Fantasy Player #2—"Pass"
Fantasy Player #3—"Pass"
Fantasy Player #4—"I bid 12 credits"
Fantasy Player #5 through Fantasy Player #3 all pass
Fantasy Player #4 gets Tom Brady and has 12 credits removed from their account
Fantasy Player #2 introduces the next player to bid on If a fantasy player runs out of credits without filling up all of their positions, they no longer can bid and must wait for the free agent draft which comes immediately after the main draft. This free agent draft happens once everyone has either filled out an entire lineup or run out of credits. The free agent draft is then held only for the fantasy players who still have places to fill. This draft goes in reverse order from the original draft order. A fantasy player drafting can only take one football player when it is their turn. If they have more than one place to fill, they must wait until the drafting process comes back to them again. Once a fantasy player fills their entire roster, they are automatically dropped from the free agent draft.

Group Tournament Type #3—Blind Submission Format—Sharing Fantasy Points of Duplicated Athletes—In an example embodiment, a blind submission format is utilized when lineup submissions happen exactly one time. Small groups competing against one another submit lineups for all required positions using a blind submission format (e.g., where fantasy players have to turn in their lineups without knowing what other fantasy players involved in the match selected). Duplication of athletes is permitted, but when this happens there is a penalty. All fantasy players who submitted a duplicated athlete will evenly split that athlete's point total for the match. For example, if eleven fantasy players competing in a fantasy soccer group have six of the fantasy players submit athlete, Lionel Messi for their lineup (i.e., a duplicated athlete), then those six fantasy players will evenly split however many fantasy points Messi scored in his game. In the case of multiple games, the six fantasy players would either split the average or split the total points. If Messi scored 14 fantasy points for his game, each fantasy player would receive 2.33 (rounded to nearest hundredth) fantasy points, because 14 divided by 6 equals 2.33.

This type of penalty creates a tremendous amount of strategy and elevates second tier players to the forefront. Fantasy players might opt to pass on superstars because lesser players have less of a chance of being duplicated. Sometimes these types of tournaments only have three to five starting positions to fill.

Group Tournament Type #4—Blind Submission Format—Lowering the Value of Duplicated Athletes—This is a variation of the previous format. This format variation is also an effective way to hold a tournament where lineups can only be submitted one time. This format is also played where all members competing in a group submit lineups using a blind submission format. Once again, duplication of athletes is permitted, but the penalty is different from the previous format described above. The penalty for duplication is the reduction of the fantasy points an athlete scores. The more duplication that occurs, the less they are worth. For example, in fantasy baseball, if a 12 person group has only one member (fantasy player) who submits athlete, Albert Pujols, the member might get 100% of the fantasy points corresponding to the submitted athlete. If two members of that group selected athlete, Pujols, each selecting member might get only 90% of the selected athlete's fantasy points. If three people selected the same athlete, each selecting member might get only 80% of the selected athlete's fantasy points, and so on. The point reductions can range from a completely arbitrary system of penalties all the way to a very well-calibrated method.

The table set forth below is an example of an embodiment that determines what percentage of an athlete's points a given fantasy participant receives based completely on how many other competitors also selected that athlete. It is important to note that the percentages listed are arbitrary. Any percentages can be used that penalize fantasy players the more duplication of athlete selection that occurs.

Percentage of Fantasy Points an Athlete is worth Based on Duplication of a Given Athlete Selected

| | Athlete selected 1X* | 2X | 3X | 4X | 5X | 6X | 7X | 8X | 9X | 10X | 11X | 12X |
|---|---|---|---|---|---|---|---|---|---|---|---|---|
| 3 player fantasy match | 100% | 50% | 0% | NA | NA | NA | NA | NA | NA | NA | NA | NA |
| 4 player fantasy match | 100% | 67% | 33% | 0% | NA | NA | NA | NA | NA | NA | NA | NA |
| 5 player fantasy match | 100% | 75% | 50% | 25% | 0% | NA | NA | NA | NA | NA | NA | NA |
| 6 player fantasy match | 100% | 80% | 60% | 40% | 20% | 0% | NA | NA | NA | NA | NA | NA |
| 7 player fantasy match | 100% | 83% | 67% | 50% | **33%** | 17% | 0% | NA | NA | NA | NA | NA |
| 8 player fantasy match | 100% | 86% | 72% | 58% | 43% | 28% | 14% | 0% | NA | NA | NA | NA |
| 9 player fantasy match | 100% | 87% | 75% | 62% | 50% | 38% | 25% | 13% | 0% | NA | NA | NA |
| 10 player fantasy match | 100% | 89% | 78% | 67% | 56% | 45% | 34% | 23% | 12% | 0% | NA | NA |

-continued

| Percentage of Fantasy Points an Athlete is worth Based on Duplication of a Given Athlete Selected | | | | | | | | | | | | |
|---|---|---|---|---|---|---|---|---|---|---|---|---|
| | Athlete selected 1X* | 2X | 3X | 4X | 5X | 6X | 7X | 8X | 9X | 10X | 11X | 12X |
| 11 player fantasy match | 100% | 90% | 80% | 70% | 60% | 50% | 40% | 30% | 20% | 10% | 0% | NA |
| 12 player fantasy match | 100% | 91% | 82% | 73% | 64% | 55% | 46% | 37% | 28% | 19% | 10% | 0% |

*Note:
1X is read as "one time" which means a given athlete was selected by exactly 1 of the 12 fantasy players.

The highlighted (bolded and underlined) percentage shown in the table above represents a seven player fantasy group where five of the fantasy players selected the same athlete. For example, let's assume five of the seven players selected Michael Vick to be their starting quarterback for an upcoming match. What this means is that each of the five fantasy players will have Vick in their starting lineup, but they will each receive only 33% of the points Vick scores that week (round).

The table below is a hypothetical example from a fantasy football tournament and shows the starting NFL™ athletes that a 12 person group has selected. The percentage under each athlete's name represents the percentage that the fantasy player selecting that athlete will get to keep of the actual fantasy points that their selected NFL™ athlete scored for a particular week. This percentage is based on the number of times an NFL™ athlete was duplicated and is taken directly from the table above.

| Day 1 Submissions and Bids | | | | | |
|---|---|---|---|---|---|
| | QB | RB #1 | RB #2 | WR #1 | WR #2 |
| Fantasy Player 1 | Vick Phila 91% | Gore SF 91% | Peterson Min 10% | Welker NE 91% | Johnson Det 55% |
| Fantasy Player 2 | Brady NE 55% | Peterson Min 10% | Mendenhall Pitt 100% | Johnson Det 55% | Bowe KC 100% |
| Fantasy Player 3 | Manning Indy 82% | Johnson Ten 73% | Peterson Min 10% | Johnson Hou 64% | Welker NE 91% |
| Fantasy Player 4 | Brady NE 55% | Johnson Ten 73% | Peterson Min 10% | Johnson Det 55% | Austin Dal 100% |
| Fantasy Player 5 | Brees NO 100% | Peterson Min 10% | Foster Hou 100% | White Atl 100% | Wallace Pit 100% |
| Fantasy Player 6 | Manning Indy 82% | Jones-Drew Jax 100% | Peterson Min 10% | Johnson Hou 64% | Jennings GB 100% |
| Fantasy Player 7 | Brady NE 55% | Johnson Ten 73% | Peterson Min 10% | Johnson Det 55% | Johnson Hou 64% |
| Fantasy Player 8 | Vick Phila 91% | Bradshaw NYG 100% | Peterson Min 10% | Marshall Mia 100% | Johnson Hou 64% |
| Fantasy Player 9 | Brady NE 55% | Peterson Min 10% | Gore SF 91% | Johnson Det 55% | Fitzgerald Az 82% |
| Fantasy Player 10 | Brady NE 55% | Peterson Min 10% | Turner Atl 100% | Johnson Det 55% | Johnson Hou 64% |
| Fantasy Player 11 | Brady NE 55% | Johnson Ten 73% | Rice Balt 100% | Fitzgerald Az 82% | Wayne Indy 100% |

-continued

| Day 1 Submissions and Bids | | | | | |
|---|---|---|---|---|---|
| | QB | RB #1 | RB #2 | WR #1 | WR #2 |
| Fantasy Player 12 | Manning Indy 82% | Jackson STL 100% | Peterson Min 10% | Jackson Phil 100% | Fitzgerald Az 82% |

Group Tournament Type #5—Blind Submission Format—Bidding for Athletes—This type of format is used over several days of bidding. Fantasy players in a group submit lineups along with a percentage next to the name of each athlete they submit. The percentage represents how small of a portion of an athlete's fantasy points they are willing to accept in order to secure that athlete for their lineup. In other words, a fantasy player is willing to give up some of the fantasy points a given athlete scores because they covet them so much. The fantasy player with the lowest bid wins that athlete. For example, if three fantasy players select athlete, Adrian Peterson to be their running back for a football tournament and the bids are 100%, 93% and 87%, then the fantasy player who bid 87% wins Peterson for their lineup. The catch is that the fantasy player who bid 87% would only get 87% of whatever Peterson's fantasy points are for a given game. The other two fantasy players not winning the athlete would have to submit a new athlete's name for this position during the next round of bidding. If two or more fantasy players submit the same winning bid for an athlete, each of the fantasy players would get that athlete in their lineup for the bid amount they presented. Once an athlete has been placed in at least one person's lineup in the group, the athlete cannot be bid on again by anyone for the match.

After the final round, a free agent draft is conducted using a computer generated drafting order. Only the fantasy players who don't have a complete lineup are eligible for the free agent draft. Fantasy players can only select one athlete when it is their turn in the free agent draft. If a fantasy player has multiple holes to fill in their lineup, the fantasy player must wait for their turn to select an athlete in the free agent draft process. Once a fantasy player has filled out their lineup from the free agent draft, they are automatically dropped from the draft. All athletes in the free agent draft are worth 100% of their fantasy points.

The tables below illustrate an example of a three day submission process for a fantasy baseball tournament. Each fantasy player has to submit a bid for five athletes (non-pitchers). There are no restrictions as to what position the athletes play.

-continued

| Day 1 Submissions and Bids | Athlete #1 | Athlete #2 | Athlete #3 | Athlete #4 | Athlete #5 |
|---|---|---|---|---|---|
| Fantasy Player 1 | **Cabrera<br>Det<br>91%** | **Holliday<br>STL<br>91%** | Pujols<br>STL<br>94% | **ARod<br>NYY<br>91%** | Hamilton<br>Tex<br>93% |
| Fantasy Player 2 | Fielder<br>Mil<br>97% | Pujols<br>STL<br>100% | **Braun<br>Mil<br>100%** | Hamilton<br>Tex<br>89% | **Teixeira<br>NYY<br>100%** |
| Fantasy Player 3 | Cano<br>NYY<br>99% | Gonzalez<br>Bos<br>90% | Pujols<br>STL<br>100% | Kemp<br>LA<br>94% | **ARod<br>NYY<br>91%** |
| Fantasy Player 4 | Fielder<br>Mil<br>97% | **Gonzalez<br>Bos<br>83%** | Pujols<br>STL<br>100% | **Hamilton<br>Tex<br>85%** | **Reyes<br>NYM<br>100%** |
| Fantasy Player 5 | **Howard<br>Phil<br>100%** | Pujols<br>STL<br>100% | **Reynolds<br>Balt<br>100%** | **Tulowitzki<br>Col<br>100%** | **Young<br>Tex<br>100%** |
| Fantasy Player 6 | **Cano<br>NYY<br>92%** | **Pence<br>Phil<br>100%** | Pujols<br>STL<br>100% | Kemp<br>LA<br>94% | **Votto<br>Cin<br>100%** |
| Fantasy Player 7 | **Fielder<br>Mil<br>95%** | Gonzalez<br>Bos<br>93% | Pujols<br>STL<br>98% | Hamilton<br>Tex<br>95% | Kemp<br>LA<br>97% |
| Fantasy Player 8 | Cabrera<br>Det<br>93% | **Granderson<br>NYY<br>100%** | **Pujols<br>STL<br>89%** | **Beltran<br>SF<br>100%** | Kemp<br>LA<br>100% |
| Fantasy Player 9 | **Fielder<br>Mil<br>95%** | Pujols<br>STL<br>94% | Holliday<br>STL<br>97% | Hamilton<br>Tex<br>96% | **Beltre<br>Tex<br>92%** |
| Fantasy Player 10 | **Fielder<br>Mil<br>95%** | Pujols<br>STL<br>100% | **Ramirez<br>CHC<br>100%** | Hamilton<br>Tex<br>97% | **Kemp<br>LA<br>92%** |
| Fantasy Player 11 | Fielder<br>Mil<br>100% | Gonzalez<br>Bos<br>100% | **Pedroia<br>Bos<br>100%** | Beltre<br>Tex<br>93% | **Bautista<br>Tor<br>100%** |
| Fantasy Player 12 | Cano<br>NYY<br>99% | **Ortiz<br>Bos<br>100%** | Pujols<br>STL<br>100% | **Konerko<br>CHW<br>100%** | Beltre<br>Tex<br>99% |

In the example above, Bold text denotes a winning bid. Note, in the example above, two fantasy players secured athlete, AROD at 91% and three fantasy players secured athlete, Fielder at 95%.

| Day 2 Submissions and Bids | Athlete #1 | Athlete #2 | Athlete #3 | Athlete #4 | Athlete #5 |
|---|---|---|---|---|---|
| Fantasy Player 1 | Cabrera<br>Det<br>91% | Holliday<br>STL<br>91% | **Ellsbury<br>Bos**<br>91% | ARod<br>NYY<br>91% | **Victorino<br>Phila**<br>99% |
| Fantasy Player 2 | **C. Lee<br>Hou**<br>100% | **Bruce<br>Cin**<br>100% | Braun<br>Mil<br>100% | Ellsbury<br>Bos<br>99% | Teixeira<br>NYY<br>100% |
| Fantasy Player 3 | Longoria<br>TB<br>99% | **Mauer<br>Minn**<br>98% | Utley<br>Phil<br>100% | Suzuki<br>Sea<br>100% | ARod<br>NYY<br>91% |
| Fantasy Player 4 | Phillips<br>Cin<br>100% | Gonzalez<br>Bos<br>83% | **Longoria<br>TB**<br>98% | Hamilton<br>Tex<br>85% | Reyes<br>NYM<br>100% |
| Fantasy Player 5 | Howard<br>Phil<br>100% | **C. Jones<br>Atl**<br>100% | Reynolds<br>Balt<br>100% | Tulowitzki<br>Col<br>100% | Young<br>Tex<br>100% |
| Fantasy Player 6 | Cano<br>NYY<br>92% | Pence<br>Phil<br>100% | Hardy<br>Balt<br>100% | **McCutchen<br>Pitt**<br>100% | Votto<br>Cin<br>100% |
| Fantasy Player 7 | Fielder<br>Mil<br>95% | **Mauer<br>Minn**<br>98% | Willingham<br>Oak<br>100% | **Suzuki<br>Sea**<br>99% | **C. Jones<br>Atl**<br>100% |
| Fantasy Player 8 | **Upton<br>TB**<br>100% | Granderson<br>NYY<br>100% | Pujols<br>STL<br>89% | Beltran<br>SF<br>100% | Utley<br>Phil<br>100% |
| Fantasy Player 9 | Fielder<br>Mil<br>95% | **Willingham<br>Oak**<br>98% | **Utley<br>Phil**<br>97% | Mauer<br>Minn<br>99% | Beltre<br>Tex<br>92% |
| Fantasy Player 10 | Fielder<br>Mil<br>95% | Longoria<br>TB<br>100% | Ramirez<br>CHC<br>100% | **Phillips<br>Cin**<br>97% | Kemp<br>LA<br>92% |
| Fantasy Player 11 | Swisher<br>NYY<br>100% | **Uggla<br>Atl**<br>100% | Pedroia<br>Bos<br>100% | **Hardy<br>Balt**<br>93% | Bautista<br>Tor<br>100% |
| Fantasy Player 12 | **Swisher<br>NYY**<br>99% | Ortiz<br>Bos<br>100% | **Crawford<br>Bos**<br>100% | Konerko<br>CHW<br>100% | **Stanton<br>Mia**<br>100% |

In the example above, Bold text denotes a winning bid. Underlined text denotes an athlete previously secured with a value indicating the percentage the athlete is worth. Note, in the example above, two fantasy players secured athlete, C. Jones at 100% and athlete, Mauer of Minnesota at 98%.

Day 3 Submissions and Bids

| | Athlete #1 | Athlete #2 | Athlete #3 | Athlete #4 | Athlete #5 |
|---|---|---|---|---|---|
| Fantasy Player 1 | Cabrera Det 91% | Holliday STL 91% | Ellsbury Bos 91% | ARod NYY 91% | Victorino Phil 99% |
| Fantasy Player 2 | C. Lee Hou 100% | Bruce Cin 100% | Braun Mil 100% | **Sandoval SF 99%** | Teixeira NYY 100% |
| Fantasy Player 3 | Upton Ariz 100% | Mauer Minn 98% | **Gordon KC 100%** | **Quentin CHW 100%** | ARod NYY 91% |
| Fantasy Player 4 | Trumbo LAA 100% | Gonzalez Bos 83% | Longoria TB 98% | Hamilton Tex 85% | Reyes NYM 100% |
| Fantasy Player 5 | Howard Phil 100% | C. Jones Atl 100% | Reynolds Balt 100% | Tulowitzki Col 100% | Young Tex 100% |
| Fantasy Player 6 | Cano NYY 92% | Pence Phil 100% | **Upton Ariz 99%** | McCutchen Pitt 100% | Votto Cin 100% |
| Fantasy Player 7 | Fielder Mil 95% | Mauer Minn 98% | Sandoval SF 100% | Suzuki Sea 99% | C. Jones Atl 100% |
| Fantasy Player 8 | Upton TB 100% | Granderson NYY 100% | Pujols STL 89% | Beltran SF 100% | **Trumbo LAA 98%** |
| Fantasy Player 9 | Fielder Mil 95% | Willingham Oak 98% | Utley Phil 97% | **Morse Wash 99%** | Beltre Tex 92% |
| Fantasy Player 10 | Fielder Mil 95% | Upton Ariz 100% | Ramirez CHC 100% | Phillips Cin 97% | Kemp LA 92% |
| Fantasy Player 11 | Sandoval SF 100% | Uggla Atl 100% | Pedroia Bos 100% | Hardy Balt 93% | Bautista Tor 100% |
| Fantasy Player 12 | Swisher NYY 99% | Ortiz Bos 100% | Crawford Bos 100% | Konerko CHW 100% | Stanton Mia 100% |

In the example above, Bold text denotes a winning bid. Underlined text denotes an athlete previously secured with a value indicating the percentage the athlete is worth.

Final Rosters Before Free Agent Draft

| | Athlete #1 | Athlete #2 | Athlete #3 | Athlete #4 | Athlete #5 |
|---|---|---|---|---|---|
| Fantasy Player 1 | **Cabrera Det 91%** | **Holliday STL 91%** | **Ellsbury Bos 91%** | **ARod NYY 91%** | **Victorino Phil 99%** |
| Fantasy Player 2 | **C. Lee Hou 100%** | **Bruce Cin 100%** | **Braun Mil 100%** | **Sandoval SF 99%** | **Teixeira NYY 100%** |
| Fantasy Player 3 | Open Spot | **Mauer Minn 98%** | **Gordon KC 100%** | **Quentin CHW 100%** | **ARod NYY 91%** |
| Fantasy Player 4 | Open Spot | **Gonzalez Bos 83%** | **Longoria TB 98%** | **Hamilton Tex 85%** | **Reyes NYM 100%** |
| Fantasy Player 5 | **Howard Phil 100%** | **C. Jones Atl 100%** | **Reynolds Balt 100%** | **Tulowitzki Col 100%** | **Young Tex 100%** |
| Fantasy Player 6 | **Cano NYY 92%** | **Pence Phil 100%** | **Upton Ariz 99%** | **McCutchen Pitt 100%** | **Votto Cin 100%** |
| Fantasy Player 7 | **Fielder Mil 95%** | **Mauer Minn 98%** | Open Spot | **Suzuki Sea 99%** | **C. Jones Atl 100%** |

-continued

Final Rosters Before Free Agent Draft

| | Athlete #1 | Athlete #2 | Athlete #3 | Athlete #4 | Athlete #5 |
|---|---|---|---|---|---|
| Fantasy Player 8 | **Upton TB 100%** | **Granderson NYY 100%** | **Pujols STL 89%** | **Beltran SF 100%** | **Trumbo LAA 98%** |
| Fantasy Player 9 | **Fielder Mil 95%** | **Willingham Oak 98%** | **Utley Phil 97%** | **Morse Wash 99%** | **Beltre Tex 92%** |
| Fantasy Player 10 | **Fielder Mil 95%** | Open Spot | **Ramirez CHC 100%** | **Phillips Cin 97%** | **Kemp LA 92%** |
| Fantasy Player 11 | Open Spot | **Uggla Atl 100%** | **Pedroia Bos 100%** | **Hardy Balt 93%** | **Bautista Tor 100%** |
| Fantasy Player 12 | **Swisher NYY 99%** | **Ortiz Bos 100%** | **Crawford Bos 100%** | **Konerko CHW 100%** | **Stanton Mia 100%** |

In the example above, fantasy players #3, #4, #7, #10 and #11 (e.g., fantasy players with openings to fill) would then participate in a free agent fantasy draft until all their openings (in this case each has one) are filled. The fantasy players in the free agent fantasy draft can select any baseball athlete (non-pitcher) that has not been selected by someone in the group. These free agents will each be worth 100% of their fantasy points.

Group Tournament Type #6—Blind Submission Format—Using a Cap—This type of tournament can be done on a one shot basis, but is best used over multiple rounds of submissions. Fantasy players are allocated a certain number of credits for a blind submission process to fill in their lineups. The fantasy player that bids the highest for a given athlete earns the right to have the athlete in their lineup, while all the other members of the group lose the opportunity to play this athlete. Once the last round of submissions has passed, a free agent draft will be conducted for any fantasy player who still has lineup slots to fill. The free agent draft is for athletes who haven't been selected by anyone in the group.

A fantasy player may use all of their credits before the selection process has finished. If they happen to do this and they still have positions to fill, the fantasy player must wait until the free agent draft, which begins at the end of the last round of submissions. Also, if two or more fantasy players submit an identical bid and it turns out to be the highest one for a given athlete, each of them will enter this athlete into their lineups at the fantasy value they each submitted.

The tables below illustrate an example of a progression of an NBA fantasy basketball tournament. In this example, there are 12 fantasy players participating in the group. Each of them starts with 50 credits to fill 5 lineup positions. In this hypothetical tournament, the actual positions the NBA athletes play are irrelevant. A fantasy player can fill all the positions with forwards if they wish. Also, there is no requirement forcing a fantasy player to bid on all slots. If s/he chooses, a fantasy player can strategically bid high for a couple of superstars and then rely on the free agent draft to fill their remaining roster slots.

| Round 1 - NBA Athletes Submitted | | | | | |
|---|---|---|---|---|---|
| | Athlete #1 | Athlete #2 | Athlete #3 | Athlete #4 | Athlete #5 |
| Fantasy | James | Bryant | **Howard** | **Paul** | **Griffin** |
| Player 1 | Miami | LAL | **Orlando** | **LAC** | **LAC** |
| 50 Credits Avail | 7 Credits bid | 10 Credits bid | **17** Credits bid | **6** Credits bid | **10** Credits bid |
| Fantasy | Wade | **Duncan** | **Stoudemire** | Anthony | James |
| Player 2 | Miami | **S.A.** | **NY** | NY | Miami |
| 50 Credits Avail | 13 Credits bid | **3** Credits bid | **8** Credits bid | 5 Credits bid | 21 Credits bid |
| Fantasy | Rose | James | **Johnson** | Ellis | Bryant |
| Player 3 | Chi | Mia | **Atl** | GS | LAL |
| 50 Credits Avail | 16 Credits bid | 22 Credits bid | **1** Credit bid | 2 Credits bid | 9 Credits bid |
| Fantasy | James | **Bryant** | No Bid | No Bid | No Bid |
| Player 4 | Mia | **LAL** | | | |
| 50 Credits Avail | 25 Credits bid | **25** Credits bid | | | |
| Fantasy | **Griffin** | Howard | Durant | **Anthony** | **Williams** |
| Player 5 | **LAC** | Orlando | OKC | **NY** | **NJ** |
| 50 Credits Avail | **10** Credits bid | 10 Credits bid | 10 Credits bid | **10** Credits bid | **10** Credits bid |
| Fantasy | Durant | Nowitski | **Aldridge** | **Love** | Wade |
| Player 6 | OKC | Dallas | **Port** | **Min** | Mia |
| 50 Credits Avail | 15 Credits bid | 10 Credits bid | **7** Credits bid | **8** Credits bid | 10 Credits bid |
| Fantasy | Durant | James | **Nowitski** | No Bid | No Bid |
| Player 7 | OKC | Mia | **Dallas** | | |
| 50 Credits Avail | 17 Credits bid | 17 Credits bid | **16** Credits bid | | |
| Fantasy | **James** | **Ellis** | **Parker** | **Gasol** | **Randolph** |
| Player 8 | **Mia** | **GS** | **SA** | **LAL** | **Memphis** |
| 50 Credits Avail | **40** Credits bid | **3** Credits bid | **3** Credits bid | **2** Credits bid | **2** Credits bid |
| Fantasy | Wade | Howard | Bryant | **Nash** | **Curry** |
| Player 9 | Mia | Orl | LAL | **Phoenix** | **GS** |
| 50 Credits Avail | 15 Credits bid | 15 Credits bid | 15 Credits bid | **3** Credits bid | **2** Credits bid |
| Fantasy | Bryant | Rose | **Wade** | No Bid | No Bid |
| Player 10 | LAL | Chi | **Mia** | | |
| 50 Credits Avail | 15 Credits bid | 18 Credits bid | **17** Credits bid | | |
| Fantasy | **Rose** | **Durant** | No Bid | No Bid | No Bid |
| Player 11 | **Chi** | **OKC** | | | |
| 50 Credits Avail | **23** Credits bid | **27** Credits bid | | | |
| Fantasy | Durant | James | No Bid | No Bid | No Bid |
| Player 12 | OKC | Miami | | | |
| 50 Credits Avail | 25 Credits bid | 25 Credits bid | | | |

In the example above, Bold text denotes a winning bid. Note that fantasy players can bid any or all of their credits for any given round of submissions. In the example above, athlete, Griffin was secured by players #1 and #5.

| Round 2 - NBA Athletes Submitted | | | | | |
|---|---|---|---|---|---|
| | Athlete #1 | Athlete #2 | Athlete #3 | Athlete #4 | Athlete #5 |
| Fantasy | Howard | Paul | Griffin | **Bynum** | Rondo |
| Player 1 | Orlando | LAC | LAC | **LAL** | Bos |
| 17 Credits Avail | | | | **12** Credits bid | 5 Credits bid |
| Fantasy | Duncan | Stoudemire | **Jennings** | **Ginobili** | Bosh |
| Player 2 | S.A. | NY | **Mil** | **SA** | Miami |
| 39 Credits Avail | | | **8** Credits bid | **17** Credits bid | 14 Credits bid |
| Fantasy | Johnson | Bosh | Pierce | Rondo | **Granger** |
| Player 3 | Atl | Mia | Bos | Bos | **Ind** |
| 49 Credits Avail | | 25 Credits bid | 15 Credits bid | 6 Credits bid | **3** Credits bid |
| Fantasy | Bryant | **Garnett** | **Evans** | **Martin** | Pierce |
| Player 4 | LAL | **Bos** | **Sac** | **Hou** | Bos |
| 25 Credits Avail | | **7** Credits bid | **1** Credit bid | **2** Credits bid | 15 Credits bid |
| Fantasy | Griffin | Anthony | Williams | **Westbrook** | Bosh |
| Player 5 | LAC | NY | NJ | **OKC** | Mia |
| 20 Credits Avail | | | | **5** Credits bid | 15 Credits bid |
| Fantasy | Aldridge | Love | **Jefferson** | Bosh | Pierce |
| Player 6 | Port | Min | **Utah** | Mia | Bos |
| 35 Credits Avail | | | **2** Credits bid | 25 Credits bid | 8 Credits bid |
| Fantasy | Nowitski | **Wall** | Bosh | **Boozer** | Pierce |
| Player 7 | Dallas | **Wash** | Miami | **Chi** | Bos |
| 34 Credits Avail | | **2** Credits bid | 20 Credits bid | **5** Credits bid | 7 Credits bid |
| Fantasy | James | Ellis | Parker | Gasol | Randolph |
| Player 8 | Mia | GS | SA | LAL | Memphis |
| 0 Credits Avail | | | | | |

-continued

| Round 2 - NBA Athletes Submitted | | | | | |
|---|---|---|---|---|---|
| | Athlete #1 | Athlete #2 | Athlete #3 | Athlete #4 | Athlete #5 |
| Fantasy<br>Player 9<br>45 Credits Avail | Nash<br>Phoenix | Curry<br>GS | **Bosh**<br>**Mia**<br>**30** Credits bid | Rondo<br>Bos<br>15 Credits bid | No Bid |
| Fantasy<br>Player 10<br>33 Credits Avail | Wade<br>Mia | **Rondo**<br>**Bos**<br>**17** Credits bid | Bosh<br>Mia<br>16 Credits bid | No Bid | No Bid |
| Fantasy<br>Player 11<br>0 Credits Avail | Rose<br>Chi | Durant<br>OKC | Not eligible to bid | Not eligible to bid | Not eligible to bid |
| Fantasy<br>Player 12<br>50 Credits Avail | Bosh<br>Mia<br>17 Credits bid | **Rondo**<br>**Bos**<br>**17** Credits bid | **Pierce**<br>**Bos**<br>**16** Credits bid | No Bid | No Bid |

In the example above, Bold text denotes a winning bid. Underlined text denotes an athlete previously secured. In the example above, athlete, Rondo was secured by both fantasy player #10 and #12.

| Round 3 - NBA Athletes Submitted | | | | | |
|---|---|---|---|---|---|
| | Athlete #1 | Athlete #2 | Athlete #3 | Athlete #4 | Athlete #5 |
| Fantasy<br>Player 1<br>5 Credits Avail | Howard<br>Orlando | Paul<br>LAC | Griffin<br>LAC | Bynum<br>LAL | Allen<br>Bos<br>5 Credits bid |
| Fantasy<br>Player 2<br>14 Credits Avail | Duncan<br>SA | Stoudemire<br>NY | Jennings<br>Mil | Ginobili<br>SA | **Lawson**<br>**Den**<br>**14** Credits bid |
| Fantasy<br>Player 3<br>46 Credits Avail | Johnson<br>Atl | Granger<br>Ind | **Thornton**<br>**Sac**<br>**12** Credits bid | **Allen**<br>**Bos**<br>**20** Credits bid | **Wallace**<br>**Port**<br>**14** Credits bid |
| Fantasy<br>Player 4<br>15 Credits Avail | Bryant<br>LAL | Garnett<br>Bos | Evans<br>Sac | Martin<br>Hou | Allen<br>Bos<br>15 Credits bid |
| Fantasy<br>Player 5<br>15 Credits Avail | Griffin<br>LAC | Anthony<br>NY | Williams<br>NJ | Westbrook<br>OKC | **Anderson**<br>**Orl**<br>**15** Credits bid |
| Fantasy<br>Player 6<br>33 Credits Avail | Aldridge<br>Port | Love<br>Min | Jefferson<br>Utah | **Deng**<br>**Chi**<br>**15** Credits bid | **Lee**<br>**GS**<br>**18** Credits bid |
| Fantasy<br>Player 7<br>27 Credits Avail | Nowitski<br>Dallas | Wall<br>Wash | Boozer<br>Chi | **Gasol**<br>**Memphis**<br>**12** Credits bid | Allen<br>Bos<br>15 Credits bid |
| Fantasy<br>Player 8<br>0 Credits Avail | James<br>Mia | Ellis<br>GS | Parker<br>SA | Gasol<br>LAL | Randolph<br>Memphis |
| Fantasy<br>Player 9<br>15 Credits Avail | Nash<br>Phoenix | Curry<br>GS | Bosh<br>Mia | Allen<br>Bos<br>14 Credits bid | **Hibbert**<br>**Ind**<br>**1** Credit bid |
| Fantasy<br>Player 10<br>16 Credits Avail | Wade<br>Mia | Rondo<br>Bos | **Lowry**<br>**Hou**<br>**2** Credits bid | Wallace<br>Port<br>13 Credits bid | Thornton<br>Sac<br>1 Credit bid |
| Fantasy<br>Player 11<br>0 Credits Avail | Rose<br>Chi | Durant<br>OKC | Not eligible to bid | Not eligible to bid | Not eligible to bid |
| Fantasy<br>Player 12<br>17 Credits Avail | Pierce<br>Bos | Rondo<br>Bos | Allen<br>Bos<br>17 Credits bid | No Bid | No Bid |

In the example above, Bold text denotes a winning bid. Underlined text denotes an athlete previously secured.

| Final Rosters - Free Agents to be Determined | | | | | |
|---|---|---|---|---|---|
| | Athlete #1 | Athlete #2 | Athlete #3 | Athlete #4 | Athlete #5 |
| Fantasy Player 1 | Howard Orlando | Paul LAC | Griffin LAC | Bynum LAL | Open |
| Fantasy Player 2 | Duncan SA | Stoudemire NY | Jennings Mil | Ginobili SA | Lawson Den |
| Fantasy Player 3 | Johnson Atl | Granger Ind | Thornton Sac | Allen Bos | Wallace Port |
| Fantasy Player 4 | Bryant LAL | Garnett Bos | Evans Sac | Martin Hou | Open |
| Fantasy Player 5 | Griffin LAC | Anthony NY | Williams NJ | Westbrook OKC | Anderson Orl |
| Fantasy Player 6 | Aldridge Port | Love Min | Jefferson Utah | Deng Chi | Lee GS |
| Fantasy Player 7 | Nowitski Dallas | Wall Wash | Boozer Chi | Gasol Memphis | Open |
| Fantasy Player 8 | James Mia | Ellis GS | Parker SA | Gasol LAL | Randolph Memphis |
| Fantasy Player 9 | Nash Phoenix | Curry GS | Bosh Mia | Hibbert Ind | Open |
| Fantasy Player 10 | Wade Mia | Rondo Bos | Lowry Hou | Open | Open |
| Fantasy Player 11 | Rose Chi | Durant OKC | Open | Open | Open |
| Fantasy Player 12 | Pierce Bos | Rondo Bos | Open | Open | Open |

In the example above, fantasy players #1, #4, #7, #9, #10, #11 and #12 would then participate in a free agent fantasy draft until each fills all of their openings. A fantasy player gets one selection per round. Once a given fantasy player has all their slots filled, they are automatically dropped from the free agent draft.

Group Tournament Type #7—Blind Submission Format—Meeting a Minimum Threshold—In an example embodiment, this format might appear to be a Lottery Effect format, but it is not. This type of group tournament acts the same way that small group Holy Grail tournaments do even though everyone competes against each other simultaneously. This is a bona fide Holy Grail tournament even though it does not have fantasy players competing in small groups. This can be accomplished by setting up a minimum threshold tournament.

A minimum threshold tournament recognizes that more than 50% of the contestants need to be eliminated at each round. This is because the one-on-one match play format eliminates half the contestants each week. But this has already proven to be ineffective for a tournament that attracts the masses. On the other hand, a minimum threshold tournament must be more forgiving than having everyone compete at the same time with one person left standing. This format is virtually a 100% certainty that a random player loses. The way to fix this problem is to hone in on a percentage somewhere between the 50% and 100% extremes that are incompatible with holding a successful Holy Grail tournament. This type of strategy generates the same small group dynamic that is so conducive to creating a dynamic Holy Grail tournament.

The format for the tournament is relatively simple. Fantasy players have to meet a minimum performance threshold between 50% and 100% each round. Let's arbitrarily pick 70%. What this means is that all fantasy players have to beat 70% of the field for a given week to advance to the next round. Fantasy players have to submit a lineup each round and there is no penalty for duplication, because millions of people can be playing each other simultaneously. Once the field narrows, duplication penalties can be utilized.

A key difference between this format and the flawed models that are currently available is that this format gives fantasy players hope. Instead of having to emerge as the top person out of a group of millions of people, one only has to finish in the top thirty or forty percent to advance. Fantasy players will gravitate towards this because it is a tournament of skill and most players believe they have what it takes to finish in the top 30% or whatever the pre-determined number is. Once this is method is used for 8 to 12 rounds, it becomes possible to whittle millions of entries down to a manageable level so that it is possible to conduct one-on-one match play events for the remaining rounds to determine an overall winner.

This type of tournament, like all the tournament formats described above, can be used for any fantasy sport. To illustrate how this type of tournament works, consider a particular sample tournament where there are 50 million entries and the pre-determined tournament rules specify the use of a 30% rule for the first 12 weeks of an NFL™ football season. For weeks 13 through 17 of the NFL™ season, the tournament concludes with one-on-one match play. An example of the numbers of fantasy players advancing at the end of each week in the sample tournament are shown below.

30% Rule Format—Weeks 1 Through 12
Week 1—50 million entries with 15 million advancing
Week 2—15 million winners with 4,500,000 advancing
Week 3—4,500,000 winners with 1,350,000 advancing
Week 4—1,350,000 winners with 405,000 advancing
Week 5—405,000 winners with 121,500 advancing
Week 6—121,500 winners with 36,450 advancing
Week 7—36,450 winners with 10,935 advancing
Week 8—10,935 winners with 3,281 advancing
Week 9—3,281 winners with 985 advancing
Week 10—985 winners with 296 advancing
Week 11—296 winners with 86 advancing
Week 12—86 winners with 27 advancing
One-On-One Match Play Format—Weeks 13 Through 17
Week 13—27 winners with 16 advancing (note: 5 players received byes)
Week 14—16 winners with 8 advancing
Week 15—8 winners with 4 advancing
Week 16—4 winners with 2 advancing
Week 17—2 winners playing for the championship The submission process for the one-on-one match play format is different than the first 12 weeks where lineups are simply turned in and fantasy players have to finish in the top 30%. For the one-on-one match play phase, which begins week 13, there could be a three round (it could be a different number of rounds) submission process. An example of this submission process is set forth below.

Round 1—Lineups are compared. If a given position has a different athlete submitted, the two competitors (fantasy players) lock in this athlete into their starting lineups. If a given position has the same athlete submitted, this athlete is disqualified from the match and cannot be resubmitted by either fantasy player. All open slots will be resubmitted the next round.

Round 2—Same rules and processes as Round 1 as described above.

Round 3—All open slots require two submissions by each fantasy player.

One submission is the intended starting athlete and the other is a backup athlete. The intended starter athlete must also have a percentage value associated with the starter athlete. This percentage represents the percentage of fantasy points a fantasy player is willing to deduct from a given athlete's fantasy score to get the athlete in their lineup. This only comes into play if both fantasy players submit the same athlete for an open position. If the submitted athletes are different, then each fantasy player will lock them in at 100%. If, however, the submitted athletes are the same, the bids will be compared. The fantasy player with the lower percentage bid gets that athlete at the percentage they bid. That fantasy player secures that athlete for their lineup, but it comes with a penalty. The fantasy player only receives the percentage of fantasy points they bid for the match while their opponent gets their backup athlete they submitted for this position at 100% of their fantasy point total. If the percentage bid is the same, both fantasy players will lock in their backup athletes in at 100%. If their backups are the same athlete, they will each get the backup athlete at 100%, which effectively cancels each other out for this position.

One-on-One Match Play Tournament Type #8—Blind Submission Format—Valuing slots at different percentages—There are some techniques that are also quite effective for matches that involve two players. The following example allows for duplication and is especially effective when there are a limited number of athletes from which to choose.

In the example presented below, assume that it is one of the Main Event rounds of a soccer fantasy tournament and fantasy players are competing head-to-head. Fantasy players have been paired off in these matches with each slot having a different value. The percentages below represent the percentage of fantasy points a fantasy player will be given of their selected athlete's fantasy points scored. It should be noted that these percentages are just an example and they can be of any value that a tournament organizer sees fit.

Hypothetical Main Event Soccer Match
Submitted Lineups and Slots

| | Slotted #1 100% | Slotted #2 87.5% | Slotted #3 75% | Slotted #4 62.5% | Slotted #5 50% | Slotted #6 37.5% | Slotted #7 25% | Slotted #8 12.5% |
|---|---|---|---|---|---|---|---|---|
| Fantasy Player #1 | Messi Barcelona | Ronaldo Real Madrid | Rooney Man U | Sturridge Chelsea | Milito Internazionale | Huntelaar Schalke 04 | Higuain Real Madrid | Lampard Chelsea |
| Fantasy Player #2 | Messi Barcelona | Rooney Man U | Ronaldo Real Madrid | Huntelaar Schalke 04 | Adebayor Tottenham | Lampard Chelsea | Raul Schalke 04 | Sturridge Chelsea |

The percentage indicates the portion of fantasy points a given athlete scored that will be given to the corresponding fantasy player.

Hypothetical Fantasy Points that Athletes Scored
Fantasy Player #1 vs. Fantasy Player #2 Match

| Athlete | Team | Fantasy Points Scored | Fantasy Player #1's Score | Fantasy Player #2's Score |
|---|---|---|---|---|
| Messi | Barcelona | 12 | 12 × 1.0 = 12.00 | 12 × 1.0 = 12.00 |
| Rooney | Manchester U. | 10 | 10 × .75 = 7.50 | 10 × .875 = 8.75 |
| Ronaldo | Real Madrid | 15 | 15 × .875 = 13.13 | 15 × .75 = 11.25 |
| Sturridge | Chelsea | 7 | 7 × .625 = 4.38 | 7 × .125 = 0.88 |
| Huntelaar | Schalke 04 | 9 | 9 × .375 = 3.38 | 9 × .625 = 5.63 |
| Milito | Internazionale | 10 | 10 × .50 = 5.00 | N/A |
| Lampard | Chelsea | 5 | 5 × .125 = 0.63 | 5 × .375 = 1.88 |
| Adebayor | Tottenham | 4 | N/A | 4 × .50 = 2.00 |
| Higuain | Real Madrid | 7 | 7 × .25 = 1.75 | N/A |
| Raul | Schalke 04 | 8 | N/A | 8 × .25 = 2.00 |

Hypothetical Main Event Soccer Match
Final Score

| | Slotted #1 100% | Slotted #2 87.5% | Slotted #3 75% | Slotted #4 62.5% | Slotted #5 50% | Slotted #6 37.5% | Slotted #7 25% | Slotted #8 12.5% | Final Score |
|---|---|---|---|---|---|---|---|---|---|
| Fantasy Player #1 | Messi Barcelona 12.00 | Ronaldo Real Madrid 13.13 | Rooney Man U 7.50 | Sturridge Chelsea 4.38 | Milito Internazionale 5.00 | Huntelaar Schalke 04 3.38 | Higuain Real Madrid 1.75 | Lampard Chelsea 0.63 | 47.77 |

-continued

| Hypothetical Main Event Soccer Match Final Score | | | | | | | | | |
|---|---|---|---|---|---|---|---|---|---|
| | Slotted #1 100% | Slotted #2 87.5% | Slotted #3 75% | Slotted #4 62.5% | Slotted #5 50% | Slotted #6 37.5% | Slotted #7 25% | Slotted #8 12.5% | Final Score |
| Fantasy Player #2 | Messi Barcelona 12.00 | Rooney Man U 8.75 | Ronaldo Real Madrid 11.25 | Huntelaar Schalke 04 5.63 | Adebayor Tottenham 2.00 | Lampard Chelsea 1.88 | Raul Schalke 04 2.00 | Sturridge Chelsea 0.88 | 44.39 |

In the example above, underlined values are Adjusted Fantasy Point values. In the example above, fantasy Player #1 would move on in the tournament based on a 47.77 to 44.39 victory over Fantasy Player #2.

One-on-one Match Play Tournament Type #9—Blind Submission Format—Disqualifying athletes that are duplicated—This format of an example embodiment can be used over two or more rounds of fantasy players submitting athletes. An example of this type of tournament is illustrated in the hypothetical presented below. This example is from a football tournament.

In this example, fantasy players submit six starter athletes for various positions on the fantasy football team—one quarterback (QB), two running backs (RB's), two wide receivers (WR's), and 1 Flex position (e.g., a RB or WR). Fantasy players also submit four tiebreakers, which are used only to break ties. In this example, these four tiebreakers include: 1) one tight end (TE) that represents the 1$^{st}$ tiebreaker; 2) one defensive position that represents the 2$^{nd}$ tiebreaker; 3) one kicker that represents the 3$^{rd}$ tiebreaker; and 4) the 4$^{th}$ tiebreaker can be represented as one tiebreaker NFL™ football team playing that week. Point differentials in the score of the game played by the tiebreaker NFL™ football team that week determine the fantasy value for the 4$^{th}$ tiebreaker (e.g., a 27-21 victory is a +6, conversely, a 28-3 loss is a −25). A 5$^{th}$ tiebreaker can be represented as a computer generated coin flip produced by a random number generator.

Lineups are submitted over a three day period (e.g., Wednesday, Thursday, and Friday by 8:00 PM EST for each day—could be a greater or lesser number of days, the number is arbitrary). All NFL™ athletes are eligible as long as they haven't been disqualified or already played in their game for the week.

On the first day of the lineup submission period (e.g., Wednesday), both fantasy players must have their lineups submitted. If both fail to do so, a new deadline is set for the next day at, for example, 5:00 PM EST. If only one fantasy player has their lineup submitted, the one fantasy player locks in all six of their starters in their starting lineup and all four tiebreakers into their tiebreaker lineup. Their opponent has until the last day of the lineup submission period (e.g., Friday night at 5:00 PM EST) to enter a lineup of six starting athletes and four tiebreaker athletes or the opponent forfeits the match. Once a starting athlete or tiebreaker position has been filled, the opposing fantasy player cannot select the same NFL™ athlete or team that has already been locked in.

If both fantasy players submit their lineups within the lineup submission period, the lineups are compared athlete-by-athlete. If any athlete or team is duplicated, the athlete or team is immediately disqualified from the match and cannot be resubmitted again by either fantasy player. This disqualification includes a scenario wherein, for example, an NFL™ athlete is submitted by one fantasy player as a running back and their opponent submitted the same athlete as a flex player, or other different position. All other starting athletes and tiebreaker athletes who aren't duplications are locked into the starting and tiebreaker slots for the respective fantasy players. The defense category and team category are not considered a duplication if the same NFL™ team is submitted in these two different categories. Duplicated athletes will leave open slots that will be resubmitted the next day.

On the second day of the lineup submission period (e.g., Thursday), if there are still open positions, both fantasy players will be expected to turn in a lineup for the slots in their lineups that haven't been filled. If only one fantasy player turns in their lineup, the athletes submitted by the one fantasy player are immediately locked in and their opponent has until the next day to fill in these open slots. Once a starting athlete or tiebreaker position has been filled, the opponent cannot select the same NFL™ athlete or team that has already been locked in. In other respects, the same rules apply as the previous day. Duplicated athletes and tiebreakers are disqualified and can't be resubmitted again. Non-duplicated athletes/teams are locked in. If there are any remaining openings, there is one final day for submissions.

On the third day of the lineup submission period (e.g., Friday), if both fantasy players fail to submit a lineup during the entire three day period, a double forfeit is declared and both fantasy players are eliminated from the tournament. If one player never submitted a lineup during any of the days and their opponent did, then the fantasy player who turned in a lineup wins by forfeit and moves on to the next round. If one or both fantasy players submitted lineups at some point, but one or both don't have complete lineups, the fantasy players will compete against one another with "open" slots that receive zero points for every slot in their respective starting and tiebreaker lineups where this happens. If both fantasy players submit athletes for open slots on this final day of the lineup submission period, both fantasy players will submit two options for each open slot. There will be a primary and a backup option. If the primary options are different athletes for a given position, the athletes submitted as primary options will be locked into their respective lineups. If the athletes submitted as primary options are the same athlete or team, then a bidding number that was submitted ahead of time will be checked. Fantasy players can submit a bidding number or bid from 1% to 100%. A bid of 93% means that a fantasy player covets that NFL™ athlete enough that they are willing to receive only 93% of the fantasy points this NFL™ athlete scores. At the same time, their opponent will automatically get 100% of their backup options fantasy value to lose this athlete that they also coveted. Because both fantasy players are submitting a bid, the fantasy player that makes the lowest percentage bid gets that NFL™ athlete for the week (round). Once again, the losing bidder gets their backup athlete for 100% of their fantasy point value. If however, the bids happen to be the same, then the equality of the bids disqualifies this NFL™ athlete from the match. The backup athlete names are then compared. If the backup athlete names are different, they are locked in. If the backup athlete names are the same, both fantasy players will play the match with an open slot for this position that will be scored as a zero.

Explanation #3—Creating staggered qualifying tournaments of the same or different lengths that feed into a Main Tournament—A single elimination tournament can be very discouraging for people who get eliminated in the first round. The "staggered qualifying" feature allows rabid fantasy players multiple avenues to remain in and possibly win the tournament. This type of format can be used for virtually any type of sporting event that lasts at least five days. The important features of the staggered qualifying tournaments are described below.

In an example embodiment, there are two stages to the tournament structure. There are several qualifying tournaments and there is a main tournament. Fantasy players can submit multiple entries for any qualifying tournament. Fantasy players can sign up for different qualifying tournaments at the same time. The main tournament has a predetermined number of seats available that fantasy players can either try to qualify for or directly buy their way into. The qualifying tournaments may or may not have different amounts of rounds in them. New qualifying tournaments can start at any time. There is no set time period that must elapse. The more rounds a qualifying tournament has, the less expensive the rounds are to play in. Fantasy players who are eliminated can re-enter because a new qualifying tournament will be starting soon.

These qualifying tournaments have the following features in an example embodiment. The qualifying tournaments are separate and distinct tournaments from one another. The qualifying tournaments don't always have the same number of rounds (although there is no reason why they can't). Some qualifying tournaments are often running at the same time as other qualifying tournaments. The qualifying tournaments are staggered over a portion of the season in a way where the qualifying tournaments sometimes overlap each other completely, sometimes partially, and sometimes not at all.

In an example of the qualifying tournament structure used in an embodiment using the 2012 NFL™ season as an illustration, we can randomly set up nine qualifying tournaments that each have a different number of rounds. The nine qualifying tournaments can be set up such that they are staggered in time. Fantasy players are placed in groups of 12 for each round with the top three fantasy players advancing. In the example illustrated below, the nine qualifying tournaments are staggered in a way where the tournaments become increasingly shorter. Alternatively, the qualifying tournaments can be staggered by making them increasingly longer. The data for each of the nine qualifying tournaments in the example are set forth below.

| Qualifier #1 |
| --- |
| Round 1 - Sept 9 |
| Round 2 - Sept 16 |
| Round 3 - Sept 23 |
| Round 4 - Sept 30 |
| Round 5 - Oct 7 |
| Round 6 - Oct 14 |
| Round 7 - Oct 21 |
| Round 8 - Oct 28 |
| Round 9 - Nov 4 |

-continued

| Qualifier #2 |
| --- |
| Round 1 - Sept 16 |
| Round 2 - Sept 23 |
| Round 3 - Sept 30 |
| Round 4 - Oct 7 |
| Round 5 - Oct 14 |
| Round 6 - Oct 21 |
| Round 7 - Oct 28 |
| Round 8 - Nov 4 |

| Qualifier #3 |
| --- |
| Round 1 - Sept 23 |
| Round 2 - Sept 30 |
| Round 3 - Oct 7 |
| Round 4 - Oct 14 |
| Round 5 - Oct 21 |
| Round 6 - Oct 28 |
| Round 7 - Nov 4 |

| Qualifier #4 |
| --- |
| Round 1 - Sept 30 |
| Round 2 - Oct 7 |
| Round 3 - Oct 14 |
| Round 4 - Oct 21 |
| Round 5 - Oct 28 |
| Round 6 - Nov 4 |

| Qualifier #5 |
| --- |
| Round 1 - Oct 7 |
| Round 2 - Oct 14 |
| Round 3 - Oct 21 |
| Round 4 - Oct 28 |
| Round 5 - Nov 4 |

| Qualifier #6 |
| --- |
| Round 1 - Oct 14 |
| Round 2 - Oct 21 |
| Round 3 - Oct 28 |
| Round 4 - Nov 4 |

| Qualifier #7 |
| --- |
| Round 1 - Oct 21 |
| Round 2 - Oct 28 |
| Round 3 - Nov 4 |

| Qualifier #8 |
| --- |
| Round 1 - Oct 28 |
| Round 2 - Nov 4 |

| Qualifier #9 |
| --- |
| Round 1 - Nov 4 |

| Qualifying Tournaments Based on 2012 NFL ™ Season | | | | | | | | | |
|---|---|---|---|---|---|---|---|---|---|
| Rounds | Qualifier #1 9 | Qualifier #2 8 | Qualifier #3 7 | Qualifier #4 6 | Qualifier #5 5 | Qualifier #6 4 | Qualifier #7 3 | Qualifier #8 2 | Qualifier #9 1 |
| Week 1 | Round 1 Sept 9 | — | — | — | — | — | — | — | — |
| Week 2 | Round 2 Sept 16 | Round 1 Sept 16 | — | — | — | — | — | — | — |
| Week 3 | Round 3 Sept 23 | Round 2 Sept 23 | Round 1 Sept 23 | — | — | — | — | — | — |
| Week 4 | Round 4 Sept 30 | Round 3 Sept 30 | Round 2 Sept 30 | Round 1 Sept 30 | — | — | — | — | — |
| Week 5 | Round 5 Oct 7 | Round 4 Oct 7 | Round 3 Oct 7 | Round 2 Oct 7 | Round 1 Oct 7 | — | — | — | — |
| Week 6 | Round 6 Oct 14 | Round 5 Oct 14 | Round 4 Oct 14 | Round 3 Oct 14 | Round 2 Oct 14 | Round 1 Oct 14 | — | — | — |
| Week 7 | Round 7 Oct 21 | Round 6 Oct 21 | Round 5 Oct 21 | Round 4 Oct 21 | Round 3 Oct 21 | Round 2 Oct 21 | Round 1 Oct 21 | — | — |
| Week 8 | Round 8 Oct 28 | Round 7 Oct 28 | Round 6 Oct 28 | Round 5 Oct 28 | Round 4 Oct 28 | Round 3 Oct 28 | Round 2 Oct 28 | Round 1 Oct 28 | — |
| Week 9 | Round 9 Nov 4 | Round 8 Nov 4 | Round 7 Nov 4 | Round 6 Nov 4 | Round 5 Nov 4 | Round 4 Nov 4 | Round 3 Nov 4 | Round 2 Nov 4 | Round 1 Nov 4 |

This staggering concept can also go in the opposite direction where the qualifying tournaments all start at the same time, but end at different dates as shown below.

| Qualifying Tournaments Based on 2012 NFL ™ Season | | | | | | | | | |
|---|---|---|---|---|---|---|---|---|---|
| Rounds | Qualifier #1 9 | Qualifier #2 8 | Qualifier #3 7 | Qualifier #4 6 | Qualifier #5 5 | Qualifier #6 4 | Qualifier #7 3 | Qualifier #8 2 | Qualifier #9 1 |
| Week 1 | Round 1 Sept 9 | Round 1 Sept 9 | Round 1 Sept 9 | Round 1 Sept 9 | Round 1 Sept 9 | Round 1 Sept 9 | Round 1 Sept 9 | Round 1 Sept 9 | Round 1 Sept 9 |
| Week 2 | Round 2 Sept 16 | Round 2 Sept 16 | Round 2 Sept 16 | Round 2 Sept 16 | Round 2 Sept 16 | Round 2 Sept 16 | Round 2 Sept 16 | Round 2 Sept 16 | — |
| Week 3 | Round 3 Sept 23 | Round 3 Sept 23 | Round 3 Sept 23 | Round 3 Sept 23 | Round 3 Sept 23 | Round 3 Sept 23 | Round 3 Sept 23 | — | — |
| Week 4 | Round 4 Sept 30 | Round 4 Sept 30 | Round 4 Sept 30 | Round 4 Sept 30 | Round 4 Sept 30 | Round 4 Sept 30 | — | — | — |
| Week 5 | Round 5 Oct 7 | Round 5 Oct 7 | Round 5 Oct 7 | Round 5 Oct 7 | Round 5 Oct 7 | — | — | — | — |
| Week 6 | Round 6 Oct 14 | Round 6 Oct 14 | Round 6 Oct 14 | Round 6 Oct 14 | — | — | — | — | — |
| Week 7 | Round 7 Oct 21 | Round 7 Oct 21 | Round 7 Oct 21 | — | — | — | — | — | — |
| Week 8 | Round 8 Oct 28 | Round 8 Oct 28 | — | — | — | — | — | — | — |
| Week 9 | Round 9 Nov 4 | — | — | — | — | — | — | — | — |

This staggering concept can also have no pattern as shown in the example below.

| Qualifying Tournaments Based on 2012 NFL ™ Season | | | | | | | | | |
|---|---|---|---|---|---|---|---|---|---|
| Rounds | Qualifier #1 9 | Qualifier #2 8 | Qualifier #3 7 | Qualifier #4 6 | Qualifier #5 5 | Qualifier #6 4 | Qualifier #7 3 | Qualifier #8 2 | Qualifier #9 1 |
| Week 1 | Round 1 Sept 9 | Round 1 Sept 9 | — | Round 1 Sept 9 | — | — | — | — | Round 1 Sept 9 |
| Week 2 | Round 2 Sept 16 | Round 2 Sept 16 | Round 1 Sept 16 | Round 2 Sept 16 | — | — | Round 1 Sept 16 | — | Round 2 Sept 16 |
| Week 3 | Round 3 Sept 23 | Round 3 Sept 23 | Round 2 Sept 23 | Round 3 Sept 23 | — | Round 1 Sept 23 | Round 2 Sept 23 | — | — |
| Week 4 | Round 4 Sept 30 | Round 4 Sept 30 | Round 3 Sept 30 | Round 4 Sept 30 | — | Round 2 Sept 30 | Round 3 Sept 30 | — | — |

-continued

| Qualifying Tournaments Based on 2012 NFL ™ Season | | | | | | | | | |
|---|---|---|---|---|---|---|---|---|---|
| Rounds | Qualifier #1 9 | Qualifier #2 8 | Qualifier #3 7 | Qualifier #4 6 | Qualifier #5 5 | Qualifier #6 4 | Qualifier #7 3 | Qualifier #8 2 | Qualifier #9 1 |
| Week 5 | Round 5 Oct 7 | Round 5 Oct 7 | Round 4 Oct 7 | Round 5 Oct 7 | Round 1 Oct 7 | Round 3 Oct 7 | — | — | — |
| Week 6 | Round 6 Oct 14 | Round 6 Oct 14 | Round 5 Oct 14 | Round 6 Oct 14 | Round 2 Oct 14 | Round 4 Oct 14 | — | Round 1 Oct 14 | — |
| Week 7 | Round 7 Oct 21 | Round 7 Oct 21 | Round 6 Oct 21 | — | Round 3 Oct 21 | Round 5 Oct 21 | — | — | — |
| Week 8 | Round 8 Oct 28 | Round 8 Oct 28 | Round 7 Oct 28 | — | Round 4 Oct 28 | — | — | — | — |
| Week 9 | Round 9 Nov 4 | — | — | — | — | — | — | — | — |

This staggering concept can also have the same number of rounds for some (or even all) of the satellites.

| Qualifying Tournaments Based on 2012 NFL ™ Season | | | | | | | | | |
|---|---|---|---|---|---|---|---|---|---|
| Rounds | Qualifier #1 9 | Qualifier #2 8 | Qualifier #3 7 | Qualifier #4 6 | Qualifier #5 5 | Qualifier #6 4 | Qualifier #7 3 | Qualifier #8 2 | Qualifier #9 1 |
| Week 1 | Round 1 Sept 9 | Round 1 Sept 9 | — | Round 1 Sept 9 | — | — | — | — | Round 1 Sept 9 |
| Week 2 | Round 2 Sept 16 | Round 2 Sept 16 | Round 1 Sept 16 | Round 2 Sept 16 | — | — | Round 1 Sept 16 | — | Round 2 Sept 16 |
| Week 3 | Round 3 Sept 23 | Round 3 Sept 23 | Round 2 Sept 23 | Round 3 Sept 23 | — | Round 1 Sept 23 | Round 2 Sept 23 | — | — |
| Week 4 | Round 4 Sept 30 | Round 4 Sept 30 | Round 3 Sept 30 | Round 4 Sept 30 | — | Round 2 Sept 30 | Round 3 Sept 30 | — | — |
| Week 5 | Round 5 Oct 7 | Round 5 Oct 7 | Round 4 Oct 7 | Round 5 Oct 7 | Round 1 Oct 7 | Round 3 Oct 7 | Round 4 Oct 7 | — | — |
| Week 6 | Round 6 Oct 14 | Round 6 Oct 14 | Round 5 Oct 14 | Round 6 Oct 14 | Round 2 Oct 14 | Round 4 Oct 14 | Round 5 Oct 14 | Round 1 Oct 14 | — |
| Week 7 | Round 7 Oct 21 | Round 7 Oct 21 | Round 6 Oct 21 | Round 7 Oct 21 | Round 3 Oct 21 | Round 5 Oct 21 | — | Round 5 Oct 21 | — |
| Week 8 | Round 8 Oct 28 | Round 8 Oct 28 | Round 7 Oct 28 | — | Round 4 Oct 28 | — | — | — | — |
| Week 9 | Round 9 Nov 4 | — | — | — | Round 5 Nov 4 | — | — | — | — |

Once these qualifying tournaments have concluded, the qualifying process is over and the main tournament begins. The format for each round of the main tournament could either be group play or fantasy players competing against each other head-to-head.

The staggering concept provided in the example embodiment can be used for sports where there is more than one game that is included in each round. For example, the Major League Baseball season could be partitioned in a way where each satellite tournament is one week in length. An example of this scenario is shown below.

| Qualifying Tournament Information | | | |
|---|---|---|---|
| | Begins | Ends | # Rounds |
| Qualifier #1 | Apr 9 | June 10 | 9 |
| Qualifier #2 | Apr 16 | June 10 | 8 |
| Qualifier #3 | Apr 23 | June 10 | 7 |
| Qualifier #4 | Apr 30 | June 10 | 6 |
| Qualifier #5 | May 7 | June 10 | 5 |
| Qualifier #6 | May 14 | June 10 | 4 |
| Qualifier #7 | May 21 | June 10 | 3 |
| Qualifier #8 | May 28 | June 10 | 2 |
| Qualifier #9 | June 4 | June 10 | 1 |

Explanation 4—Creating staggered qualifying tournaments with the same number of rounds—The idea behind this format in an example embodiment (denoted herein as the Wildcard and Super Wildcard Formats) is to allow fantasy players to continue to re-enter the tournament at a same low price throughout all qualifying tournaments. In order to do this, the number of rounds must remain constant so there isn't an unfair advantage that any one group of contestants has depending on their entry point. What this means is that creative strategies must be developed to hold this set number of rounds as the tournament gets closer and closer to the Main Event. A Wildcard Format is used when more than one round is needed during an interval of the tournament where fantasy players who entered earlier might only be playing one round. This technique is used as a "catch up" mechanism so that all fantasy players end up playing the same number of rounds. Using NFL™ football as an example, the regular season schedule always has morning and afternoon games. The morning games could be used as one round while the afternoon games serve as an additional round. When a Wildcard Format is needed, it is necessary for fantasy players to give a Contingency Lineup for the PM games in advance, because there is not enough time to submit lineups between the AM and PM games.

Sometimes there is so little time left that a Super Wildcard Format is needed. This happens when several rounds are needed in the same game as a way to catch up. A Super Wildcard Format breaks individual games (or games happening simultaneously) into two or more rounds. For example, using an NFL™ fantasy football tournament again, if there are 10 weeks for qualifying that cover the first 10 weeks of the regular season, it is straightforward to hold a 10 round qualifying tournament. Each of those 10 weeks would constitute a round. There is no need for either a Wildcard or Super Wildcard Format. It gets more difficult to create 10 rounds though once there are no longer 10 weeks of NFL™ games to contest them. For example, if during the 17th week of the NFL™ season, a fantasy football tournament organizer wants to still charge the same $5 entry fee that they did in NFL™ week 1, they would have to create 10 rounds in order to make it fair. The only way to do so is by implementing a Super Wildcard Format where each game (or group of simultaneously running games) is broken down into two or more rounds. Below are two potential options to accomplish this result as illustrated by example.

During the 17$^{th}$ week, fantasy players can sign up for a one week version where the AM games count as four rounds (e.g., one round for each quarter of the AM game) and the PM games count as four rounds (e.g., one round for each quarter of the PM game) and the Sunday Night Game is a round and the Monday Night Game is a round (e.g., Sunday night is Round 9 and Monday night is Round 10). Because this structure involves four sets of lineups (AM games, PM games, Sunday night game and Monday night game), fantasy players will have to submit four lineups in order to play this format before any of the games begin. An example of this tournament structure is set forth below.

Option #1

Round 1—1$^{st}$ quarter of AM games
Round 2—2$^{nd}$ quarter of AM games
Round 3—3rd quarter of AM games
Round 4—4$^{th}$ quarter of AM games
Round 5—1$^{st}$ quarter of PM games
Round 6—2$^{nd}$ quarter of PM games
Round 7—3rd quarter of PM games
Round 8—4$^{th}$ quarter of PM games
Round 9—Sunday Night Game
Round 10—Monday Night Game Option #2

AM games begin at 10 AM PST for Rounds 1 through 4. Player statistics accumulate from 10:00 AM to 10:50 AM. Round 1 begins at 10:50 AM. Adjusted fantasy percentages are calibrated for groups.

10:54 AM—12$^{th}$ ranked player in each group is eliminated
10:58 AM—11$^{th}$ ranked player in each group is eliminated
11:02 AM—10$^{th}$ ranked player from each group is eliminated
11:06 AM—9$^{th}$ ranked player from each group is eliminated
11:10 AM—8$^{th}$ ranked player from each group is eliminated
11:14 AM—7$^{th}$ ranked player in each group is eliminated
11:18 AM—6$^{th}$ ranked player in each group is eliminated
11:22 AM—5$^{th}$ ranked player from each group is eliminated
11:26 AM—4$^{th}$ ranked player from each group is eliminated Remaining top 3 fantasy players of each group advance to the 2nd round. New adjusted fantasy percentages calibrated for new groups 11:30 AM—12$^{th}$ ranked player from each group is eliminated
11:34 AM—11$^{th}$ ranked player in each group is eliminated
11:38 AM—10$^{th}$ ranked player from each group is eliminated
11:42 AM—9$^{th}$ ranked player from each group is eliminated
11:46 AM—8$^{th}$ ranked player from each group is eliminated
11:50 AM—7$^{th}$ ranked player in each group is eliminated
11:54 AM—6$^{th}$ ranked player in each group is eliminated
11:58 AM—5$^{th}$ ranked player from each group is eliminated
12:02 PM—4$^{th}$ ranked player from each group is eliminated Remaining top 3 fantasy players of each group advance to the 3rd round. New adjusted fantasy percentages calibrated for new groups 12:06 PM—12$^{th}$ ranked player from each group is eliminated
12:10 PM—11$^{th}$ ranked player in each group is eliminated
12:14 PM—10$^{th}$ ranked player from each group is eliminated
12:18 PM—9$^{th}$ ranked player from each group is eliminated
12:22 PM—8$^{th}$ ranked player from each group is eliminated
12:26 PM—7$^{th}$ ranked player in each group is eliminated
12:30 PM—6$^{th}$ ranked player in each group is eliminated
12:34 PM—5$^{th}$ ranked player from each group is eliminated
12:38 PM—4$^{th}$ ranked player from each group is eliminated Remaining top 3 fantasy players of each group advance to the 4th round. New adjusted fantasy percentages calibrated for new groups 12:42 PM—12$^{th}$ ranked player from each group is eliminated
12:46 PM—11$^{th}$ ranked player in each group is eliminated
12:50 PM—10$^{th}$ ranked player from each group is eliminated
12:54 PM—9$^{th}$ ranked player from each group is eliminated
12:58 PM—8$^{th}$ ranked player from each group is eliminated
1:02 PM—7$^{th}$ ranked player in each group is eliminated
1:06 PM—6$^{th}$ ranked player in each group is eliminated
1:10 PM—5$^{th}$ ranked player from each group is eliminated
1:14 PM—4$^{th}$ ranked player from each group is eliminated Survivors are regrouped in a new super group to begin round 5 during PM games.

PM games begin at 1:25 PM PST for Rounds 5 through 8. Player statistics accumulate from 1:25 to 2:15 PM. Round 5 begins at 2:15 PM. Adjusted fantasy percentages are calibrated for groups.

2:19 PM—12$^{th}$ ranked player in each group is eliminated
2:23 PM—11$^{th}$ ranked player in each group is eliminated
2:27 PM—10$^{th}$ ranked player from each group is eliminated
2:31 PM—9$^{th}$ ranked player from each group is eliminated
2:35 PM—8$^{th}$ ranked player from each group is eliminated
2:39 PM—7$^{th}$ ranked player in each group is eliminated
2:43 PM—6$^{th}$ ranked player in each group is eliminated
2:47 PM—5$^{th}$ ranked player from each group is eliminated 2:51 PM—4$^{th}$ ranked player from each group is eliminated Remaining top 3 fantasy players of each group advance to the 6th round. New adjusted fantasy percentages calibrated for new groups.

2:55 PM—12$^{th}$ ranked player from each group is eliminated

2:59 PM—11$^{th}$ ranked player in each group is eliminated

3:03 PM—10$^{h}$ ranked player from each group is eliminated

3:07 PM—9$^{th}$ ranked player from each group is eliminated

3:11 PM—8$^{th}$ ranked player from each group is eliminated

3:15 PM—7$^{th}$ ranked player in each group is eliminated

3:19 PM—6$^{th}$ ranked player in each group is eliminated

3:23 PM—5$^{th}$ ranked player from each group is eliminated

3:27 PM—4$^{th}$ ranked player from each group is eliminated

Remaining top 3 fantasy players of each group advance to the 7th round. New adjusted fantasy percentages calibrated for new groups.

3:31 PM—12$^{th}$ ranked player from each group is eliminated

3:35 PM—11$^{th}$ ranked player in each group is eliminated

3:39 PM—10$^{th}$ ranked player from each group is eliminated

3:43 PM—9$^{th}$ ranked player from each group is eliminated

3:47 PM—8$^{th}$ ranked player from each group is eliminated

3:51 PM—7$^{th}$ ranked player in each group is eliminated

3:55 PM—6$^{th}$ ranked player in each group is eliminated

3:59 PM—5$^{th}$ ranked player from each group is eliminated

4:03 PM—4$^{th}$ ranked player from each group is eliminated

Remaining top 3 fantasy players of each group advance to the 8th round. New adjusted fantasy percentages calibrated for new groups.

4:07 PM—12$^{th}$ ranked player from each group is eliminated

4:11 PM—11$^{th}$ ranked player in each group is eliminated

4:15 PM—10$^{th}$ ranked player from each group is eliminated

4:19 PM—9$^{th}$ ranked player from each group is eliminated

4:23 PM—8$^{th}$ ranked player from each group is eliminated

4:27 PM—7$^{th}$ ranked player in each group is eliminated

4:31 PM—6$^{th}$ ranked player in each group is eliminated

4:35 PM—5$^{th}$ ranked player from each group is eliminated

4:39 PM—4$^{th}$ ranked player from each group is eliminated

The top 3 survivors from each group after round 8 are regrouped in a new group to begin round 9, which is played during Sunday night game. The top 3 survivors from each group of the Sunday night game then compete during the Monday night game for the 10th and final round. The top 3 survivors automatically qualify for the Main Event.

The process described above is one of the most important features developed as part of the various embodiments. The process includes the following important characteristic—the process defines a set number of qualifying rounds that are needed to qualify for a Main Event and then offers these qualifying options during any point of the qualifying process. Additionally, the described embodiments offer a variety of others features and benefits. An example embodiment described herein allows a qualifying process for a fantasy tournament Main Event to be compressed in terms of time. For some competitors the qualifying process might be two months or more. For other competitors, the qualifying process might be a few weeks. For some competitors, the qualifying process might be a week and for some the process might even be a day. Even though the time duration of the qualifying process can fluctuate dramatically, the number of rounds a fantasy contestant must play during this qualifying process remains constant. If it is predetermined that a qualifying process is for 10 rounds, then all qualifying tournaments must be 10 rounds regardless of whether the qualifying tournament is ten weeks or one day. This format allows people to re-enter the qualifying process at the same low price point at any stage of the qualifying process without being subjected to a Lottery Effect type of parameters. Fantasy players are still able to compete in small groups. As seen from the above two examples, this means that various embodiments as described herein can generate 10 (or an arbitrary number of) rounds for qualifying tournaments that have a very limited time period.

Explanation #5—Using Contingency Lineups to create exciting tournaments that have a limited number of days—This is an extremely powerful embodiment that makes fantasy tournaments possible for situations where there are a very small number of days that the real life tournament is being conducted. Without using the Contingency Lineup technique, there would be no possible way to hold these types of fantasy tournaments.

The Contingency Lineup Format of an example embodiment requires fantasy players to submit multiple lineups (two or more) before any of the games take place for a given day. If a given fantasy player advances to the next round, then their next contingency lineup becomes their actual lineup. The reason that this format becomes necessary is because there may not be enough time to select new lineups for the next round. This is because a new set of games starts immediately after the games that just finished. An example demonstrating the power of this embodiment is set forth below.

During the NFL™ playoffs, there are always 11 games. These 11 games are distributed over six unique days. Five days have two games each and then the Super Bowl is a standalone game during the sixth day. If there was no Contingency Lineup Format, we could only have six rounds of play (each day is one round); because, the way the games are scheduled is not conducive to submitting a new lineup once a fantasy player advances (e.g., there is not enough time in between games to submit a new lineup). If a fantasy tournament organizer wanted to play the tournament in groups of 12 for each round with the top two scorers in each group advancing, this creates a 6 to 1 ratio (one person advancing for every six players). A 6:1 ratio over six rounds creates 93,312 potential openings. Let's assume that a tournament organizer wanted to offer a fantasy tournament for just the NFL™ playoffs and used the above technique without employing contingency lineups. This tournament organizer might set the asking price at $5 per entry and the grand prize at five million dollars. The tournament organizer might believe they have created an ideal high stakes fantasy sports tournament with a low entry fee, a multi-million dollar grand prize, and small group play during individual rounds.

However, the problem with this tournament organizer's tournament is that because only 93,312 people can play, the tournament can only generate $466,560 if all of the seats are filled. Clearly, it isn't financially possible to offer a five million dollar grand prize for a tournament that only has the capacity to generate less than half a million dollars in revenue.

The Contingency Lineups of the example embodiment described herein can change this result. If each of the 11 games became an individual round by using Contingency Lineups for games where one comes immediately after another, a whole new landscape can be created. This new arrangement allows for over 750,000,000 (three quarters of a billion) entries. This type of format would easily support a five million dollar grand prize for $5 entry fees.

In an alternative embodiment, a tournament can be implemented that uses RINGS. RINGS or rings, as denoted herein, is an acronym for Rounds Involving Narrow Group Size. In an example embodiment, a tournament using rings provides a more robust and fair way to handle group play. In an example embodiment, a tournament supporting rings includes the following novel characteristics not seen before in any prior fantasy sports tournaments that have a large number of entries (e.g., entries of 100,000 or more people). The characteristics of a tournament with rings can include the following:

Avoiding Trap Rounds—All previous attempts of large scale fantasy sports tournaments of 100,000 or more entries have at LEAST one "trap" round in the tournament. A trap round is a given round (or multiple rounds) of a tournament where participants are placed together in such large numbers that a random participant has less than a 1% mathematical chance to advance. In essence a lottery is created which negates the skill level of the players competing. This is because a portion of the tournament is based on pure luck; which makes the tournament less than desirable to play in for players. A tournament with RINGS NEVER has a trap round.

Small Group Play—In an example embodiment, a tournament supporting rings provides an opportunity for small skill-based group play.

Skill Based—The 10% Rule—In a tournament supporting rings, fantasy players always, mathematically, have at least a 10% chance to advance to the next round. This is true for every contested part of the tournament. This defines a skill based tournament.

RINGS—RINGS (Rounds Involving Narrow Group Size) are the combination of small group play contested over multiple rounds (two rounds or more). RINGS are the answer to the problem with which current high stakes fantasy sports models are struggling. There has never been a version of a tournament created that offers the two money-maker components of an effective tournament (e.g., low entry fees and a multi-million dollar grand prize) that also is skill based (at least a 10% chance to advance in every round). Moreover, every high stakes fantasy sports tournament example ever attempted in the conventional art has had a least one portion where there is a trap round with a less than 1% chance to advance.

Combining Regular and Post Seasons—Prior examples of fantasy tournaments have included only the regular season of a given sport while others have included only the post-season. An example embodiment of the tournament described herein provides both the regular season and the post-season together in a single tournament. Conventional implementations do not provide a fantasy sports tournament that includes both the regular season and the post-season together. The example embodiment of the tournament described herein works in conjunction with RINGS to provide both the regular season and the post-season together. The importance of this dynamic should not be underestimated. There are many gaming barriers that had to be addressed to offer this format, which is why nobody has ever thought of putting both together in the same tournament.

Scrambles—An example embodiment of the tournament described herein provides a scrambles process where players enter RINGS competitions and compete in group play for an increasingly higher prize every time they advance in consecutive rounds. For example, if a fantasy player is competing in a Scramble, they might receive $5 for finishing in the top 3 of a group of 12 and an automatic berth in a second round Scramble. If they finish in the top 3 of 12 for this second Scramble, they might win $10 and an automatic bid to a third round Scramble. This process continues on until a pre-determined number of rounds is reached for a chance to win a grand prize.

An example embodiment of the tournament structure described herein that supports rings can enable various related methods, such as the method described below.

A method comprising: prompting, by execution of a data processor, a large number (defined as 100,000 or more) of users at a corresponding large number of user platforms to each submit a nominal buy-in for entry into a fantasy sports tournament, the users submitting the nominal buy-in becoming fantasy players of the fantasy sports tournament; partitioning, by execution of the data processor, the fantasy players of the fantasy sports tournament into player groups called "rings" that compete to advance through a pre-determined number of rounds to a main tournament (RINGS is an acronym for Rounds Involving Narrow Group Size), at least one player ring having at least three fantasy players as ring members, the fantasy players in each player ring only playing against other members of the same player ring during a given round; receiving from each member of each player ring a selection of athletes corresponding to each member and scoring each member of each player ring based on the performance of selected athletes, members of each player ring who do not score within a predetermined number of advancing players for their given ring relative to the other members of the same player ring are disqualified from the fantasy sports tournament; enabling a disqualified fantasy player to re-enter the fantasy sports tournament after submittal of an additional fee by either a) paying the same fee again which requires playing one or more additional rounds to catch up to the number of rounds other players have played or b) paying an additional fee to bypass rounds that have already been played; enabling an advancing player to move on to the next round of the tournament, without having to pay an additional charge, as the advancing player is placed in a new ring of players who also have successfully advanced to the same stage of the tournament; and configuring the fantasy sports tournament to include rings.

An example embodiment of the tournament structure described herein that supports rings can be part of a larger high stakes fantasy sports tournament format. In the example embodiment, there are seven essential features that distinguish this new tournament format from existing tournament formats. These seven essential features are described in more detail below.

Seven Essential Gaming Features for a High Stakes Fantasy Sports Tournament

In the example embodiment described herein, there are seven key features or characteristics that a high stakes fantasy sports tournament requires to be successful. These seven key features can be broken into two categories. These categories include:

A. The Money Category (which includes two of the seven key features)
 1. Low entry fee—$5 or less per entry
 2. A multi-million dollar grand prize
B. The Gaming Structure Category (which includes the other Jive of the seven key features)
 1. Two-tiered format using the regular season of a given sport as tier one and the playoffs as tier two.
 2. Allows unlimited entries—or pretty close to it
 3. Skill must be a factor—each time someone plays, the player must have at least a 10% mathematical chance of advancing to a next round of play.
 4. Allows simultaneous entries from the same fantasy player to compete at the same time.
 5. Allows re-entry at any point in tier one.

The best any conventional fantasy sports company in the industry has done in the past is to offer a few of these seven features in the same tournament. However, no conventional tournament format has included all seven features or key combinations of these seven features. RINGS (Rounds Involving Narrow Group Size), as described above, are a key component that has been left out of all conventional high stakes fantasy tournaments. Even more importantly, no conventional fantasy sports tournament has ever offered both of the "Money Category" features described above, which include a "low entry fee" and a "multi-million dollar grand prize", in combination with the "Gaming Structure Category" feature of "skill as a factor".

In the example embodiment described herein, the seven key features or characteristics listed above are important for a high stakes fantasy sports tournament to be successful. The reasons why each of these seven ingredients are so important are described next.

The Money Category

Low Entry Fee (Ideally $5 or Less Per Entry)—

People like to play when the risk level is minimal. Tournaments that offer a low entry fee are always going to have the potential to draw many more people than ones with pricey entry fees.

A Multi-Million Dollar Grand Prize—

When tournaments have a low entry fee paired with a multi-million dollar grand prize, the potential is extraordinary—especially if there is skill involved in the tournament format. No conventional multi-million dollar tournament in the fantasy sports genre has ever had a skill component; because, every single one of them has always had at least one trap component in the tournament (e.g., at least one occasion in the tournament when fantasy players face less than a 1% chance to advance to a next round in the tournament).

The Gaming Structure Category

Two Tiered Format—

The example embodiment described herein uses both the regular season and the playoffs of a given sport in the same tournament. No conventional fantasy sports tournament provider has ever implemented a combination of the regular season and the playoffs of a given sport in the same tournament. This combination allows for much greater flexibility in the number of entries the tournament can accommodate.

Allows Unlimited Entries—or Pretty Close to it—

This is where conventional fantasy sports companies have gotten it consistently wrong. Conventional fantasy tournaments weed out fantasy participants by placing them simultaneously in large quantities of players. Conventional fantasy tournament providers have consistently struggled with the quantity of players that should simultaneously compete against one another. The traditional solution has always been to allow players to compete against fewer players at once if they are willing to pay a higher entry fee. For example, it might cost $100 to be able to compete in a pool of as little as 500 players simultaneously as opposed to going against 5,000 people all at once for $5. These pools of people in traditional fantasy tournaments create two competing realities that make these tournaments problematic; because, these tournaments involve gaming features that are diametrically opposed to one another. The first reality is that to offer a huge prize, the traditional tournament must have lots of people entering the tournament or the tournament cannot generate the necessary revenue to offer a large cash prize. Thus, the first reality of traditional fantasy tournaments is to entice lots of people to enter the tournament. On the other hand, the second reality of traditional fantasy tournaments creates a different dynamic. Because the strategy to weed players out has always been to place them in large pools of participants, the players themselves are concerned about playing too many people at one time. To address this reality, tournament organizers have taken the path of capping pools of players by offering guaranteed player pools of fewer people if players are willing to pay more money, which also happens to violate the low entry fee requirement that makes the ideal format flourish. In other words, the second reality of traditional fantasy tournaments is to put limits on the numbers of people who can enter the tournament as a strategy to appease the players. These conflicting realities have created significant problems in conventional tournament formats. The reality is that these traditional tournaments are always capped and usually no more than 300,000 to 400,000 people can enter. This is a disaster if the goal is to have an entry fee of $5 or less, because the most a tournament can collect in entry fees is $2 million dollars. In contrast, the fantasy tournament format as disclosed herein allows for over 2.1 billion entries.

Skill is a Major Factor—

Player skill has never been a factor in any past or current examples of low entry fee and high dollar reward fantasy sports tournaments. The reason is that every single example ever offered has had at least one "trap" round where the chance of a player advancing to a next round is less than 1%. A trap round is where participants are placed together in such large numbers that a random participant has less than a 1% mathematical chance to advance. In essence, a trap round creates a lottery, which negates the skill level of the players competing. A tournament based on pure luck is less desirable for players who are seeking a skill based tournament. The tournament format as disclosed herein avoids this problem by using the RINGS feature as described herein. The RINGS feature as disclosed herein combines small group play over multiple rounds. No traditional fantasy sports tournament has ever used this process.

The various example embodiments described herein are skill based tournament formats. The tournament formats described herein avoid "trap" rounds where the chance of a player advancing to a next round is less than 1%. The tournament formats described herein provide a high stakes tournament that provides players a reasonable chance to advance (at least 10% at any given time) so that skill actually is a factor in the competition. All previous attempts of large scale fantasy sports tournaments of 100,000 or more entries had at least one trap round in the tournament where a player had less than a 1% chance to advance.

The various embodiments described herein allow simultaneous entries from the same fantasy player in Tier 1 (i.e., the qualifying portion of the tournament). The only way a tournament can generate the kind of revenue necessary to offer a high dollar prize for a low entry fee is to allow multiple entries by the same person to be played simultaneously. The only way that this can be done effectively is to create a submission process that doesn't take a lot of time like drafting players or studying salary caps. In an example embodiment, a process is used that penalizes competitors for duplication through a blind submission process. This is the most effective way to avoid a draft and salary caps.

The various embodiments described herein also allow re-entry at any point in Tier 1. This feature is an important part of a particular embodiment. In order for a low entry fee tournament to flourish, there must be processes provided that allow contestants to enter the tournament at any time in Tier 1 for the same low entry fee. This is a necessary component to continue generating the revenue required to support a low entry fee and a high dollar grand prize tournament. The difficulty lies in providing ways for contestants entering late in Tier 1 to still have a chance to get in, but also cover the same amount of ground that contestants in earlier stages of Tier 1 had to cover. The only way to accomplish this is to employ the RINGS feature as described herein. In particular, a tournament can offer multiple RINGS within the same day. An example embodiment of the tournament structure that supports rings to enable various related methods is described herein.

Daily fantasy sports games are extremely popular. In a particular embodiment, the Scrambles and RINGS concepts as disclosed herein can be integrated into a daily fantasy sports game format. For example, a particular embodiment can offer a pre-determined 10 round Scramble where each new round occurs the next day of a given sports season. Winning players could either cash out after a given round or let their winnings ride until the next round. Fantasy players who finish in the top predetermined positions would be considered "winners" and then could either cash out or decide to go to the next round where their money could be doubled (as an example) for finishing in a top position again.

In another example embodiment, a National Fantasy Sports Certification System can be implemented. Conventional fantasy sports tournaments have never provided a system for fantasy sports certification where people who play fantasy sports are ranked and certified like they can be in other activities, such as martial arts. A detailed description of an example embodiment of a fantasy sports certification system is provided next.

An Example Embodiment for Creating a National Fantasy Certification System

What is a GOAT and What does this have to do with Fantasy Sports Certification?—

GOAT is an acronym for the "Greatest of All Time". Every sport has its own version of who the GOAT is. Baseball has Babe Ruth. Hockey has Wayne Gretzky. Basketball has Michael Jordan. Soccer has Pele. Sometimes there is fierce debate. Is it Tiger Woods or Jack Nicklaus in golf? Is it Jim Brown, Joe Montana, Jerry Rice or someone else in football? In any event, the GOAT for any sport is the pinnacle of what anyone could ever hope to be. It is what men and women in sports dream about. They idolize these great athletes because they would like to be them. This fantasy to be the GOAT can be used as a powerful trigger for players with respect to fantasy sports. Just like with GOAT athletes, the ultimate goal for fantasy sports participants is to be recognized as great competitors—maybe even the GOAT. Creating a structure in this manner allows participants to take on all kinds of roles that will fuel this concept to dizzying heights. Some players will be embarrassingly bad, most will be mediocre, some will be good, even less will be great and just a handful will become elite. This is the type of system that can generate huge money if a fantasy sports implementation can be created around it. Such a fantasy sports implementation in an example embodiment is described herein.

In conventional fantasy sports formats, there is no standardized way to evaluate whether someone who plays fantasy sports is really any good or not. When some player brags that s/he has won his/her fantasy league three straight years, is this really an accomplishment that should be respected or did the bragging player merely beat a bunch of low-performing league players. Conventional fantasy sports formats create a culture where nobody really knows how good anybody else is. In an example embodiment described herein, a fantasy sports system levels the playing field and provides a way to properly evaluate everyone who plays against a true standardized measuring system. Because fantasy football is the biggest fantasy sport on the market today, the following example embodiment describes the levels of a fantasy football GOAT measuring system.

GOAT Fantasy Football—

In the example embodiment disclosed herein, GOAT Fantasy Football is a national certification process where fantasy football enthusiasts can accurately assess their skill level by comparing themselves to a uniform national standard. The GOAT system requires players to compete in national competitions so that they can be properly evaluated. For a low certification fee, fantasy enthusiasts can have their GOAT level calculated. In a particular embodiment, the process can be similar to the way martial artists use a progression of belts to distinguish the skill level of a given individual. However, unlike the martial art belt method, the GOAT system of a particular embodiment does not guarantee that players will advance if they just put in the time. In the GOAT system of a particular embodiment, if players do not perform well, they will not progress. If they perform well, they will be rewarded with advancement. If they are great, they might one day be recognized as the GOAT of fantasy football. Fantasy football players in the example embodiment who don't like their GOAT level can always re-apply as often as they like.

The Importance of the GOAT Certification Process—

The fantasy football GOAT measuring system of an example embodiment can generate a GOAT Certification for anyone who plays fantasy football (or any other fantasy sport). At every fantasy football draft in the country, it will become a requirement for any serious player to publicly reveal their GOAT Certification level to their group. Poorly rated players will be unlikely to receive priority in the draft. Excellent players will be revered as they should be and will be likely to receive priority in the draft. An individual player's GOAT level will always be present on their certification profile over the Internet for anyone to quickly access at any time. People who aren't enrolled and don't have a profile because they have never attempted to be certified with a ranking will be unlikely to receive the opportunities in a fantasy sports event that GOAT certified players will receive.

The fantasy football GOAT measuring system of an example embodiment is the first process ever created that allows tens of millions of people to be evaluated at one time that can also accurately gauge skill level. That is because the ranking process is done in small groups or head-to-head.

Small group competitions can involve, for example, 12 people competing against one another with only the top 3 advancing to a new GOAT level.

The GOAT Levels—

In an example embodiment, there are 9 different GOAT levels with the 9th level being the highest or "GOAT" level, which is comparable to a black belt in martial arts. Once a player makes a level, the player retains the level for life. It is possible that a player might try to re-certify for a higher level and do worse than the player's current level. However, in the example embodiment, the player will not be penalized and will retain the highest level achieved. The various GOAT measuring levels in an example embodiment are described in more detail below.

The various GOAT measuring levels in an example embodiment are as follows:

- Parasite (AKA a Zero)—This isn't even a true level, so it is given a zero numeric to represent a player who has not been officially ranked. A player who is unranked and uncertified is unlikely to receive the opportunities in a fantasy sports event that GOAT certified players will receive.
- Junior Varsity (JV)—Basically, you are a beginner or a poor performer if you are at this level. This is comparable to someone being cut from their varsity team in high school and fantasy football is not your deal either. Players need to do is finish in the top 3 of a 12 person national competition one time to go to the Varsity level.
- Varsity—This is the "Al Bundy" ranking. This is comparable to someone making the varsity in high school, but never went any further. Players need to finish in the top 3 of a 12 person national competition two times consecutively to go to the JUCO level.
- JUCO—This level is comparable to the high school stud who simply wasn't good enough for Division 1 ball, so they have to play JUCO (JUCO is a common abbreviation used for "junior college"). Players need to finish in the top 3 of a 12 person national competition three times consecutively to go to the next level (Division 1).
- Division 1—At this level, players are pretty good, but nowhere close to a professional. They need to finish in the top 3 of a 12 person national competition four times consecutively to go to the Professional level.
- Professional—At this level, players can go into any fantasy draft and be respected. These players are considered an elite fantasy football player. Players need to finish in the top 3 of a 12 person national competition five times consecutively to go to the All Pro level.
- All Pro—This is comparable to all star professional athletes. These are fantasy experts who usually dominate other professional level fantasy players. Players need to finish in the top 3 of a 12 person national competition six times consecutively to go to the MVP level.
- MVP—These are people who are the best players in the city in which they live. They need to finish in the top 3 of a 12 person national competition seven times consecutively to go to the Hall of Fame level.
- Hall of Fame—These are national caliber fantasy football players. Players need to finish in the top 3 of a 12 person national competition eight times consecutively to go to the GOAT level.
- GOAT—These are fantasy legends. They are the black belts of the fantasy football participant pool. These folks are the best of the national caliber players who will be invited to compete against other fantasy football GOATS to determine the GOAT of GOATS.

Odds for Each Level—

In the fantasy football GOAT measuring system of an example embodiment, the goal is to create an extremely difficult challenge to become a GOAT, but at the same time, make it achievable in a way that many people will become GOATS. This will fuel the masses to do whatever it takes to make it; because, they will see many who have done it. The truth is, though, that over 99% of the people who play fantasy football will never achieve the level of GOAT; because, it is a 65,536 to 1 shot—assuming we don't account for the talent level of individual players. Nevertheless, the fantasy football GOAT measuring system of an example embodiment creates a plurality of levels based on the skill of the players and not merely on random luck. As such, the players are more motivated to try to move up the GOAT levels and willing to pay fees to take the chance. The odds of a typical player achieving a ranking at each of the GOAT levels described above are set forth below.

- JV level player:
- Level players are placed at when they signup. —Just pay a certification fee and get in the system
- Varsity level player: 4 to 1
- JUCO level player: 16 to 1
- Division 1 level player: 64 to 1
- Professional level player: 256 to 1
- All Pro level player: 1,024 to 1
- MVP level player: 4,096 to 1
- Hall of Fame level player: 16,384 to 1
- GOAT level player: 65,536 to 1

GOAT Only Competitions—

In an example embodiment, national tournaments are held for only GOAT certified players. The national tournaments occur after the NFL™ regular season is over and are held during the NFL™ playoffs. GOAT certified players can compete against one another using a one-on-one single elimination format (like the NCAA basketball tournament). GOAT players can compete to achieve any of a plurality of degrees of GOAT. In the example embodiment, there are ten degrees of GOAT. The higher the GOAT degree, the more revered the GOAT player will be in the pantheon of fantasy football players.

Once a person earns the title of GOAT as described above, the GOAT player will continually be invited back to GOAT only tournaments to improve on their GOAT degree. Also, winners of GOAT tournaments will not only be recognized as a 10th degree GOAT, but they will also be recognized with a goat horn. This goat horn will be treasured the same way bracelets get treasured for wins on the World Poker Tour or rings get valued for winning championships in team sports or belts for boxing and MMA. The elite GOAT players will battle it out to see who can accumulate the most GOAT horns so that they can be recognized as the true GOAT in the history of fantasy football. This whole special GOAT "club" that only plays each other will motivate the non-GOAT players to attempt to join this exclusive club.

In an example embodiment, the ten degrees of GOAT are as follows:

- 1st Degree GOAT—Any player who has ever finished in the top 3 of a group of 12 in a nationally GOAT certified tournament for 8 consecutive times.
- 2nd Degree GOAT—Any player who has ever finished in the top 256 of a "GOAT only" nationally certified GOAT tournament.
- 3rd Degree GOAT—Any player who has ever finished in the top 128 of a "GOAT only" nationally certified GOAT tournament.

- 4th Degree GOAT—Any player who has ever finished in the top 64 of a "GOAT only" nationally certified GOAT tournament.
- 5th Degree GOAT—Any player who has ever finished in the top 32 of a "GOAT only" nationally certified GOAT tournament.
- 6th Degree GOAT—Any player who has ever finished in the top 16 of a "GOAT only" nationally certified GOAT tournament.
- 7th Degree GOAT—Any player who has ever finished in the top 8 of a "GOAT only" nationally certified GOAT tournament.
- 8th Degree GOAT—Any player who has ever finished in the top 4 of a "GOAT only" nationally certified GOAT tournament.
- 9th Degree GOAT—Any player who has ever finished as a Runner-up in a "GOAT only" nationally certified GOAT tournament.
- 10th Degree GOAT—Any player who has ever won a "GOAT only" nationally certified GOAT tournament.

Example embodiments of the tournament structure described herein can also support additional features and formats including: 1) Multiple rounds in one day, and 2) a Let It Ride format. These features of an example embodiment are described below.

Multiple Rounds in One Day—The following process is a way to allow fantasy contestants to play several rounds in one day without breaking games up into separate rounds. This example is for a situation where 10 rounds are needed to be played in a single day for a tournament that is played in groups of 12 with the top 3 advancing. The format can be modified to accommodate a set number of rounds, group size and advancing contestants needed for a given day of play.

- A contestant can still enter for a single entry fee.
- The contestant only submits one lineup for that single entry (or they might be required to change the lineup—i.e., the same lineup might only be allowable for 3 rounds so it has to be altered if more than 3 rounds are needed).
- This lineup will be randomly placed in 10 unique groups of 12.
- The 10 unique groups are numbered from 1 to 10 so that the contestant knows that they are sequenced.
- These sequenced numbers are to be considered individual rounds of play in the tournament.
- The contestant can view the scoring for all 10 groups in this 10 round format up until all of the games go final.
- A computer program will seek out the lowest numbered group in that sequence that the contestant doesn't finish in the top 3 of 12 in.
- The earliest or lowest numbered round becomes the cutoff point and the other groups with rounds that are numbered higher drop off the screen once all the games go final.
- Contestants now have a record of how many rounds they successfully advanced and also the round that they were eliminated in by not finishing in the top 3 out of 12.
- This cutoff then tells the contestant how many rounds they successfully advanced in the tournament before they were eliminated.

Let it Ride—This is a daily fantasy sports concept where contestants can play in a group format structure for as many rounds that they desire (unless the tournament organizer establishes a maximum number of rounds). At the end of each round, the contestant can decide whether they want to collect their money or let it carry over to another round where they will get an even bigger prize if they finish in "winning" positions (for example finishing in the top 3 out of their group of 12 for a structure that declares the first three positions as winning spots).

Bid well or take a Scrub—Athletes are split into two groups for each position. Each position group contains half of all available athletes. The top 50% of athletes (based on weekly fantasy point average) will be in a pool to be bid on. Contestants will select an athlete for each position and submit a percentage bid (1% to 100%) of fantasy points they are willing to settle for each athlete they select. If they have the lowest bid, they receive that athlete in their starting lineup (if ties happen, all tied people get that athlete for what they bid). Contestants who did not win a bid for a given position will be assigned a random "field" athlete at 100% of their fantasy value. This athlete can only come from the lower ranked athletes in bottom 50% who are not allowed to be bid on.

Example embodiments of the tournament structure described herein can be further illustrated by various particular examples of the various formats described herein. These examples of various embodiments are described below.

I. Tournament #1—Bidding Gauntlet

This fantasy football tournament is specifically designed for all four weeks of the NFL™ playoffs. The intent is to have a large chain of casinos host a tournament on several of their sites during the first weekend of the NFL™ playoffs and then shift to one location for the remainder of the postseason. This chain of casinos can invite up to 6,250 of their highest rollers to partake in this six round tournament that spans four weeks. The number of contestants involved at any given time is as follows:

- Weekend #1 is wildcard weekend of the NFL™ playoffs. Up to 6,250 high rollers can be invited to play the first and second rounds at several sites. They would be invited to come to a casino site on a Friday night and participate in a selection process that lasts no more than 30 minutes (since the primary objective is for these high rollers to gamble on the casino premises for the weekend). All 6,250 high roller fantasy contestants then compete during Saturday in the first round of their tournament using the two scheduled NFL™ playoff games. By the end of Saturday night, 6,250 players are whittled down to 1,250. The remaining 1,250 are then invited to a new 30 minute selection process for the two Sunday NFL™ playoff games. Ideally they would draft Sunday morning, before the games, to keep them another night at the casino. By the end of Sunday's games, there will be 250 people left in the tournament.
- Weekend #2 follows the exact same pattern as weekend #1. The NFL™ playoff games would shift to the divisional playoff round, but the high rollers fantasy football tournament still follows the same format—only with less people. At this juncture of the tournament, the 250 players remaining are invited to one casino to compete. After the $3^{rd}$ and $4^{th}$ rounds are completed during the divisional round, only 10 high rollers are left by Sunday night.
- Weekend #3 is the conference championships for the NFL™. The ten remaining high rollers are invited to one casino. Each one of them is guaranteed prize money for finishing in the top 10. To keep them in the casino all weekend, they will select athletes on Friday night and pick up their prize money on Sunday night. They must be at the casino Sunday night to receive their prize money. The rationale for keeping them so long is that their images are needed for marketing purposes and they need to be present to receive their checks so that they can be photographed.

Weekend #4—The top 2 remaining players compete head-to-head, at the casino, on Super Bowl Sunday. Their selection of athletes will be different than how athletes were selected in the first 3 rounds.

II. Style of Play for the first 5 Rounds

Players compete in groups of 10

The top 2 players in each group advance to the next round

The bottom 8 players in each group are eliminated and out of the tournament

Rd 1 includes the 2 Saturday Wildcard Games, Round 2 includes the 2 Sunday Wildcard Games, Round 3 includes the 2 Saturday Divisional Playoff Games, Round 4 includes the 2 Sunday Divisional Playoff Games and Round 5 includes the 2 conference championship games played on Sunday Since each round has two NFL™ games, this means that there are four NFL™ teams competing per round. From each NFL™ team, contestants will have 1 QB, 1 RB, 2 WR's, 1 TE, 1K and 1 DEF in the pool of athletes available. This means there are 7 "athletes" from each NFL™ team—or 28 total from all four teams (since 4×7=28).

The best two available athletes from the four teams who are not part of the 28 will be added to the mix to give a grand total of 30 athletes to select from.

The 30 cards should be shown ahead of time to all contestants so that there is no doubt who all of the athletes are. This can be accomplished by giving them a list. The list should be removed from them once the blocs of 3 are introduced.

The fantasy football scoring system can be any popular format.

The key piece of this tournament is how contestants partake in a selection process.

Athletes are introduced three at a time which is called a "bloc".

Athletes can only be secured in blocs of three. This is accomplished through a bidding process.

There are multiple factors to consider as athletes are revealed in blocs of 3 for bidding purposes. These factors are:

1. Bids are made for the entire bloc of 3 athletes. The winning bidder gets all 3 athletes which will constitute their entire lineup.
2. Athletes are weighted according to the order in which they are revealed to the bidders. The first revealed athlete from a given bloc of 3 is worth 3× the fantasy points of the winning bid. The second revealed athlete from a given bloc of 3 is worth 2× the fantasy points of the winning bid and the third revealed athlete is worth 1× the fantasy points of the winning bid
3. Fantasy contestants must consider several factors when deciding whether to make a bid for a bloc. They must consider such things as a) the value of the positions (e.g., kickers aren't as valuable as quarterbacks), b) the weighted positions they fall into (a great player with a multiplier of 3× is much more desirable than if their multiplier is 1×) c) the potential bids their opponents might submit (this would be determined by the relative strength of the bloc of 3 athletes) and d) a key gaming aspect that automatically lowers the highest bid contestants can make for the next round by 5%. In other words, the highest possible bid for the next round will always be less than the possible highest bid for the current round (by 5% to be exact).

III. Selection Rules for First 5 Rounds

The process should take no more than 30 minutes per group

Ten fantasy contestants are seated at a table.

There is one deck of 30 cards with the pictures of the key 30 athletes competing in the 2 NFL™ playoff games for that round.

There are 9 rounds of bidding.

Since there are 10 contestants and only 9 rounds, the last remaining contestant gets what is left.

The cards are shuffled and the first 3 athletes are revealed for the first round of bidding. The first athlete revealed goes into the 3× multiplier slot, the second athlete revealed goes in the 2× multiplier slot and the third athlete revealed goes in the 1× multiplier slot.

For each round, the winning bid receives the entire bloc of 3 weighted athletes and this will constitute their entire lineup for their match. For this reason, contestants have to be certain that a given bloc is something that they actually want to bid on.

There are several factors that high roller contestants must consider when a) deciding whether to bid and b) how much to bid on a particular bloc of 3. They must simultaneously consider the following 1. They must gauge the overall value of this bloc of three athletes as a unit.
2. They must factor in the favorability/unfavorability of the multiplier slots individual athletes fell into.
3. They must keep in mind that with each successive round, the highest allowable bid keeps going down 5% which potentially diminishes the value of these later blocs of athletes.

Again, contestants can choose to bid on the entire lot of three athletes or choose not to bid.

If nobody bids on a given lot of athletes, the bloc is placed on the side and will not be available again until the end of the selection process. A new lot of athletes is then placed down for bid. Since nobody bid on the prior lot, the same round is still in effect (for purposes of what the highest maximum bid can be).

Bids are made as a percentage bid for the entire bloc of athletes. This percentage bid accomplishes two things. First it determines if a contestant wins the bloc or not. The person with the lowest bid receives the bloc of 3 athletes. Secondly, this percentage bid also reflects the portion of fantasy points a contestant will receive for each athlete in their bloc during the actual fantasy football competition. For example, if the bloc of athletes included Tom Brady, Frank Gore and Steve Decker and the lowest bid (i.e., winning bid) was 79%, then the contestant who made that bid would get all three athletes in their lineup for the upcoming match at 79% of their fantasy points they scored in the match. These means that each of the three athletes are individually worth 79% of their fantasy points they score in their upcoming game.

To clarify this point further. When a contestant wins a bloc of athletes during the bidding process, the percentage they won the bloc with also becomes the percentage of fantasy points each athlete in their bloc receives. This percentage translates to the portion of an athlete's actual fantasy points scored during their NFL™ playoff game that a contestant is eligible to receive. This creates a balancing act of opposing goals as contestants want to bid a low enough percentage to win a bloc they are interested in securing while at the same time coveting the highest percentage bid possible. Once again, this is because the winning bid will also equal the percentage of fantasy points each athlete in the bloc will be eligible to receive from their actual fantasy points scored in the game.

Bids must always be made as a whole percent—no fractions/decimals.

Once a fantasy player wins a bid, their lineup is set and they cannot bid again. If two or more fantasy contestants tie in their percentage bid—and it is the lowest bid of the group—the moderator will go from right to left and point to each fantasy player and ask for a lower bid. They can either give one or pass. If they pass, they are out of the bidding. The last one remaining gets the bloc of athletes at the percent they bid. If all pass on bidding, the bloc cannot be bid on again until all other blocs have been introduced.

Fantasy players must be very careful about being overly selective on what bloc they bid on because each new round automatically lowers the highest possible bid (by 5%) that can be made from the previous round.

The following are the highest possible bids allowed for each round in the bidding process in an example embodiment:

Round 1—100%
Round 2—95%
Round 3—90%
Round 4—85%
Round 5—80%
Round 6—75%
Round 7—70%
Round 8—65%
Round 9—60%

The last fantasy player without a bloc of three gets this group automatically at a highest possible bid of 55%.

If two or more blocs of 3 athletes have been passed on by the entire group, they will be reintroduced after all blocs have been revealed (i.e., the entire deck of cards has been revealed). The order that they are reintroduced is in the same order that they originally were introduced in the process.

At all times during this process, contestants have to make a snap decision based on four crucial factors. They are:

1. The value of the positions that come up—a potential bid will have to consider different scenarios such as 2 quarterbacks (a more valued position) turning over in a bloc vs. 2 kickers (a less valued position).
2. The value of the individual athletes—a potential bid will possibly change if the best quarterback (Peyton Manning) and the best running back (Marshawn Lynch) show up in a bloc vs. the worst quarterback (Alex Smith) and the worst running back (Danny Woodhead) show up together in a bloc.
3. The value of where the athletes are slotted—A star athlete like Calvin Johnson will be much more desirable if he falls in the 3× multiplier slot than the 1× multiplier slot.
4. The ongoing pressure of the maximum possible bid lowering with each successive round—A sense of urgency starts developing when a contestant is in the $4^{th}$ round and the highest bid they can now make has fallen from 100% in round 1 to currently 85% while keeping in mind that for the next round the highest allowable bid will fall further to 80%.

IV. Selection Rules for Round 6—Super Bowl Sunday

The final match is played between the last two standing during the Super Bowl. It is the only round not contested using group play. The match should implement the same fantasy scoring format that was used during the first five rounds. The number of athletes each contestant has in their lineup and the manner in which they are selected will change though. The Super Bowl selection format is as follows:

Fantasy players will select players on the night before the Super Bowl.

Fantasy players will select 1 QB, 2 RB, 2 WR, 1 TE, 1 DEF and 1 K

Submission rounds happen every 10 minutes.

There will be as many rounds as are needed so that both players have every lineup spot filled.

Fantasy players will submit an NFL™ athlete and a percentage for each open position of the 8 slots they have (they can submit any percentage from 1% to 100%). The percentage represents the percentage of fantasy points an NFL™ athlete earns that a contestant is willing to settle for in order to secure that athlete for their lineup. For example, if a fantasy player selects Tom Brady at 93% and they successfully win Brady for their lineup, they will only receive 93% of the fantasy points Brady scores for their game.

Football players submitted are compared. If a given athlete is submitted by only one of the contestants, this athlete is secured as one of the 8 for that contestant's lineup at the percentage of fantasy points they submitted them for.

If contestants select the same NFL™ athlete for a given position, then the person who submits the lower percentage for a given athlete will acquire that athlete for their lineup and their opponent loses out on them.

If fantasy players select the same athlete and submit the same percentage for that athlete, then neither contestant gets that athlete. Both contestants can either bid on another athlete or the same athlete during the next round for that position.

If a contestant has a position completely filled and their opponent still has an opening (or two) for that position, then the contestant with openings can select any available athlete, who plays that position, for 100% of their fantasy points.

It is possible that one contestant has their entire lineup filled and their opponent does not. When this happens, the contestant with a lineup position(s) to fill can submit an NFL™ athlete(s) that is currently not in any lineup to fill this opening(s). They automatically secure this athlete(s) for 100% of their fantasy value.

If a contestant does not submit their lineup for a roster position(s) within the time constraints for a given round of bidding (during this 10 minute decision interval), their opponent automatically receives, by default, all of their athlete(s) at 100% of their fantasy value—even if they submitted a lower percentage for them.

Once all lineup positions are filled by both contestants, the selection process is completed.

Contestants can make lineup changes up to 1 hour before kickoff of the Super Bowl.

They may select any NFL™ athlete that is not already in either contestant's lineup. If a contestant decides to make a lineup change, the percentage of fantasy points that the new athlete that they are substituting in will remain the same as the old athlete they are substituting out. The athlete that is pulled out of their lineup can be picked up by their opponent following the same guidelines of this rule.

- Multi-level tiebreakers will be created to determine which contestants advance in the event of ties for all six rounds of this tournament.

II. Tournament #2—Fantasy Eliminator

The third weekend of the NFL™ playoffs consists of the two conference championship games. By this point, the "Bidding Gauntlet" tournament has only ten contestants remaining. Since so few contestants remain, it creates the perfect opportunity to invite eliminated high rollers (as well as new invitees) back to play some more fantasy football. This new offering will occur at six different locations and will consist of a fast paced "Fantasy Eliminator" competition. This tournament can accommodate up to 7,776 contestants.

The tournament is broken into five rounds. For each of the five rounds, contestants are placed in groups of 6. The object is for contestants to win their group of 6 to advance to the next round. During the final round, which is played on Super Bowl Sunday, the six remaining players compete for cash prizes during the Big Game.

The five rounds can be scheduled in the following manner:

- Round 1—1$^{st}$ half of the first conference championship game (7,776 contestants)
- Round 2—2$^{nd}$ half of the first conf. championship game (1,296 remaining contestants)
- Round 3—1$^{st}$ half of the second conf. championship game (216 remaining contestants)
- Round 4—2$^{nd}$ half of the second conf. championship game (36 remaining contestants)
- Round 5—Super Bowl Sunday (6 remaining contestants)

I. Game Rules—Creating Lineups—All 5 Rounds

- Contestants are placed in groups of 6.
- Contestants can select from the following positions: QB, RB, WR, TE, DEF and Kicker.
- Contestants submit two lineups of 3 athletes—the second lineup is in case they advance far enough so that the second lineup is needed.
- Contestants submit exactly three athletes (can include defenses) for the NFC Championship game and they will also submit three athletes (can include defenses) for the AFC championship game.
- This submission process occurs on Friday night.
- Duplication is permitted, but the more duplication that occurs for a given athlete, the less they will be worth.
- There is a 20% penalty each time an athlete is duplicated. For example, if Tom Brady is selected by only one member of a group of 6, that contestant will receive Brady at 100% of his fantasy value. If two people in a group of 6 select Brady, both contestants will receive Brady in their respective lineups, but he will only be worth 80% of his fantasy points. If three people in a group of 6 select Brady, all three contestants will receive Brady in their respective lineups, but he will only be worth 60% of his fantasy points. This process continues all to way to the possible scenario where everyone in the group potentially selects Brady. In that particular case, he would appear in every lineup, but he would be worth nothing.
- Contestants can pick any combination of three athletes from either roster of NFL™ teams competing in a given conference title game. Contestants can have all of their athletes from the same NFL™ team or two from one team and one from the other.
- Contestants can have athletes who play the same position.
- Contestants can (and will) completely leave some positions vacant since there are more eligible football positions than athletes that they can start in their lineups.
- Contestants can strategically select key backup athletes (instead of known starters) so that they can potentially be obtained for 100% of their fantasy points.
- Each contestant will rank or slot their three selections. The top slotted athlete will be worth 3× the fantasy points they are eligible for (after duplication penalties are assessed). The second slotted athlete will be worth 2× the fantasy points they are eligible for (after duplication penalties are assessed). The third slotted athlete will be worth 1× the fantasy points they are eligible for (after duplication penalties are assessed).

II. Game Rules—Playing Out Rounds 1-4

- Contestants are brought into the casino ballroom and seated at a table with their group of 6.
- There is a running scoreboard of each high roller's group of 6 which also tells where they rank amongst the group.
- Televisions will be showing the conference championship games throughout the ballroom.
- A host will be walking around and monitoring the action at each table interviewing people—this is done in case the casino wants the event taped for a reality television opportunity. The reality television portion of this tournament can be given upon request to interested casinos.
- Every 10 minutes (there will be clocks counting down so everyone can see), a horn will go off. When the horn goes off, the lowest scoring high roller at each table is eliminated and told to leave the ballroom—this gets them back out and gambling.
- After 40 minutes, the top two remaining high rollers at each table are left and compete against one another without a clock until halftime.
- The top player of each group advances to the next round which begins during the second half
- The other 5 members of each group are eliminated.
- At halftime, advancing contestants are regrouped and placed in new groups of six. These new groups are not random and are instead predetermined via a bracket before the tournament started.
- For the new groups contestants keep their same athletes in their same slotted positions that they had for the first half. However, the duplication penalties are recalibrated. This recalibration follows the same guidelines for duplication penalties—20% loss of fantasy points for each time an athlete is duplicated.
- Statistics accumulated to score fantasy points do not start over again for the second half. The statistics and fantasy points corresponding to them are still in effect with the only difference being the recalibration for duplication potentially affecting them.
- The same format used for the first half is used again for the second half. The final two contestants of each group continue competing until the conference title game is finished (this could include an overtime).
- Advancing contestants move on to the 3$^{rd}$ round—which happens to be the first half of the next conference championship game. Contestants are reconfigured in groups of six based on a predetermined bracket.
- The athletes for the second game, whom contestants already selected on Friday night, are then revealed and duplication penalties are assessed.

The process remains the same for the 3rd and 4th rounds in the same manner that occurred during the first and second rounds.

By the end of the 4th round, there will be exactly one winner in each of the six casinos. These six winners are invited back to compete against each other on Super Bowl Sunday.

During Super Bowl weekend, the six remaining contestants select three athletes playing in the Super Bowl. The selection process, duplication penalties, weighted slots and fantasy scoring methodology is the exactly the same as the first four rounds.

Fantasy Eliminator is not used for the final round. The six contestants compete for the entire Super Bowl game against one another without anyone getting kicked out.

At the end of the Super Bowl, the fantasy points determine the final positions and each contestant receives some type of pre-determined payout.

Multi-level tiebreakers will be created to determine which contestants advance in the event of ties for all five rounds of this tournament.

III. Tournament #3—Super Bowl Scramble

For this example, let's assume 3,000 high roller contestants are invited to a casino for the Super Bowl.

Selection process for athletes happens on the Friday before the Super Bowl.

Contestants select 4 athletes that are slotted. The first slotted athlete is worth 4× their fantasy point value. The second slotted athlete is worth 3× their fantasy point value. The third slotted athlete is worth 2× their fantasy point value. The fourth slotted athlete is worth 1× their fantasy point value.

An athlete's fantasy point value is a percentage of the fantasy points they score for the Super Bowl. This is determined by subtracting the percentage of the 3,000 contestants that selected a given athlete from 100%. For example, if Russell Wilson is selected by 2,237 of the contestants, this means Wilson was selected by 74.6% of the contestants. All 2,237 contestants will have Wilson in their lineups in the exact slotted position they each selected him for, but Wilson is only worth 100%—74.6%=25.4% of his fantasy points he scores in the Super Bowl.

All 3,000 contestants are placed in groups of 10. There are 300 groups of 10 seated at tables throughout the casino.

Fantasy eliminator rules are in effect.

A clock is set using 2 minute intervals to eliminate contestants.

The clock does not run during commercials.

A horn blows when the clock hits zero and the lowest scoring contestant is told to leave their table (A scoreboard at each table ranks where the contestants are in relationship to their group).

The last two contestants sitting at each table compete against one another until the first quarter ends.

For the second quarter, the remaining 300 contestants are placed in new groups of 10 that are predetermined by table placement throughout the casino.

The same process occurs for the 2nd quarter of the Super Bowl.

By halftime, there are 30 contestants remaining.

These 30 contestants are placed in 10 groups of three for the third quarter.

There is no "eliminator" piece that removes contestants during the third quarter. Contestants battle it out until the quarter has been completed.

The top finisher of each group of three moves on to the 4th quarter.

By the 4th quarter, there are 10 contestants remaining.

Fantasy eliminator is back in place for the 4th quarter using the exact same rules for the first two quarters.

Last one standing is declared the winner. Cash prizes paid out to the 10 who made it to the 4th quarter.

Multi-level tiebreakers will be created to determine which contestants advance in the event of ties at any juncture of this tournament.

As described herein for various example embodiments, an embodiment can support the concept of playing multiple rounds in one day by submitting one lineup that will be used for two or more groups. Each group this lineup is submitted for will be considered a separate and distinct round. The rounds will be numerically sequenced and the lowest numbered round for which the contestant does not meet the criteria to advance will be considered the round in which they were eliminated.

As described herein for various example embodiments, an embodiment can support the concept of bidding on fantasy athletes in blocs of two or more by bidding for a percentage of their fantasy points that they score. For example, if three athletes are bid on at 94%, this means that if the bid is a winning bid, these three athletes are all secured for the contestant and the contestant will receive 94% of the fantasy points that each athlete scores for the round.

As described herein for various example embodiments, an embodiment can support the concept of decreasing (or increasing) the maximum allowable bid for an athlete's fantasy points for a given round of bidding. For example, for a seven round bidding format, the highest allowable bid might decrease in increments of 7% for each passing round.

As described herein for various example embodiments, an embodiment can support the concept of eliminating one or more contestants during a round for not having met a certain point threshold or for being ranked at or near the bottom of a grouping of contestants when the time period is up. This is called "Fantasy Eliminator".

As described herein for various example embodiments, an embodiment can support the concept where contestants can play in a daily fantasy sports group format structure for as many rounds as they desire (unless the tournament organizer establishes a maximum number of rounds). At the end of each round, the contestant can decide whether they want to collect their money or let it carry over to another round where they will get an even bigger prize if they finish in "winning" positions (for example finishing in the top 3 out of their group of 12 for a structure that declares the first three positions as winning spots).

As described herein for various example embodiments, an embodiment can support the concept of "Minimum Threshold" for a group of contestants. This means that contestants must meet a minimum threshold to advance to the next round and that the remaining contestants in the group or field are eliminated. The eliminated contestants must always exceed the number of advancing contestants. In other words, the eliminated participants must always represent more than 50% of the field of contestants at any given time. This implies that a group of contestants must finish in a predetermined position compared to the rest of the field to advance. For example, it could be determined that the top 30% of the scores advance (meaning that the bottom 70% do not advance). This method can involve a small group of less than 10 contestants all the way up to a large group totaling in the thousands or millions.

As described herein for various example embodiments, an embodiment can support the concept of "Slotting Positions with a Percentage Value". This is where a contestant submits a lineup and ranks the athletes in order of preference; because, the order in which they are ranked determines the fantasy point value for a given athlete. For example, the top slated athlete a contestant submits might be worth 100% of the fantasy points that they score, the second slotted athlete might receive 95% of their fantasy points that they score, the third slotted athlete 90% etc.

Figure 16:
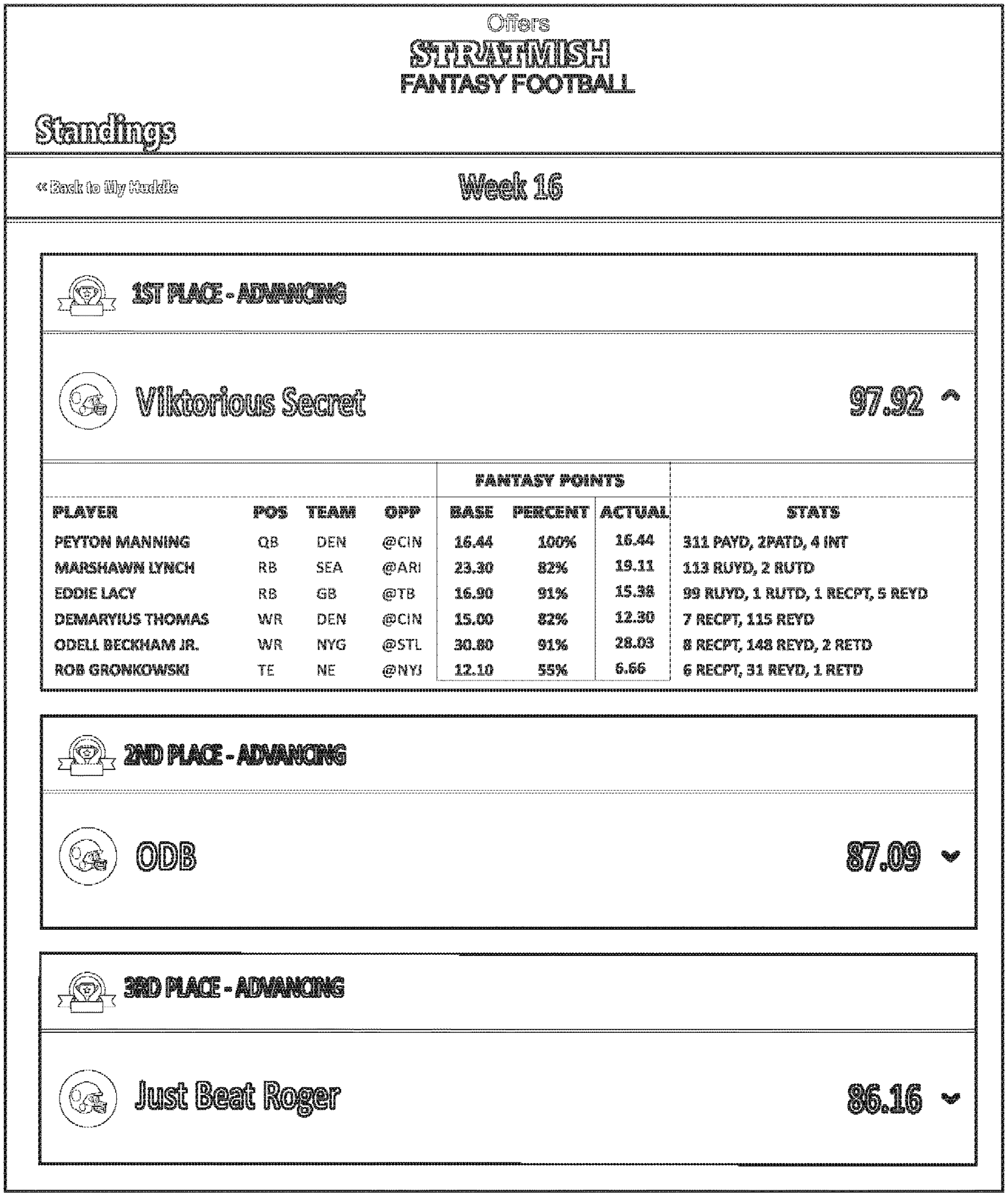

FIG. 16 through FIG. 19 illustrate an example embodiment, implemented as a web application (app), which shows the basic elements of the user interface as screenshots for implementing a fantasy sports tournament with multi-contestant small group rounds. Referring now to FIG. 16 and FIG. 17, screenshots of the user interface for an example embodiment show how a fantasy player's value decreases the more duplication that occurs for a given fantasy player selected by a plurality of contestants.

FIG. 16 in the illustrated example shows the standings for the top three contestants in a particular round of the sample fantasy football tournament. In this example, the top contestant is identified as "Vicktorious Secret." The second place contestant is identified as "ODB." The third place contestant is identified as "Just Beat Roger." It will be apparent to those of ordinary skill in the art that contestants can be identified by any unique name.

Referring now to FIG. 17, in the example embodiment, the fantasy player selections for contestant "Vicktorious Secret" are shown. In this example, each fantasy player's value is denoted by a percentage score shown in the "Percent" column illustrated in FIG. 17. The lower the percentage, the more duplication has occurred for the corresponding fantasy player and the less their fantasy points are worth. This is because the percentage shown literally represents the percentage of the fantasy points a contestant receives based on the actual fantasy points their athlete scores. For example, this percentage of points that the owner of the "Vicktorious Secret" team gets to keep for each one of their athletes in this example is denoted in the "Fantasy Points" display area under the heading of "Percent" as shown in FIG. 17. In that same "Fantasy Points" display area, the number of fantasy points allocated before an adjustment is made is denoted under the "Base" column. This column represents the number of points that a given athlete scored in their real life fantasy sports contest. The adjusted fantasy point total is denoted under the "Actual" column. These values are determined by multiplying the points a given athlete scored by the percentage that the fantasy player is worth for a given contestant.

Figure 18:
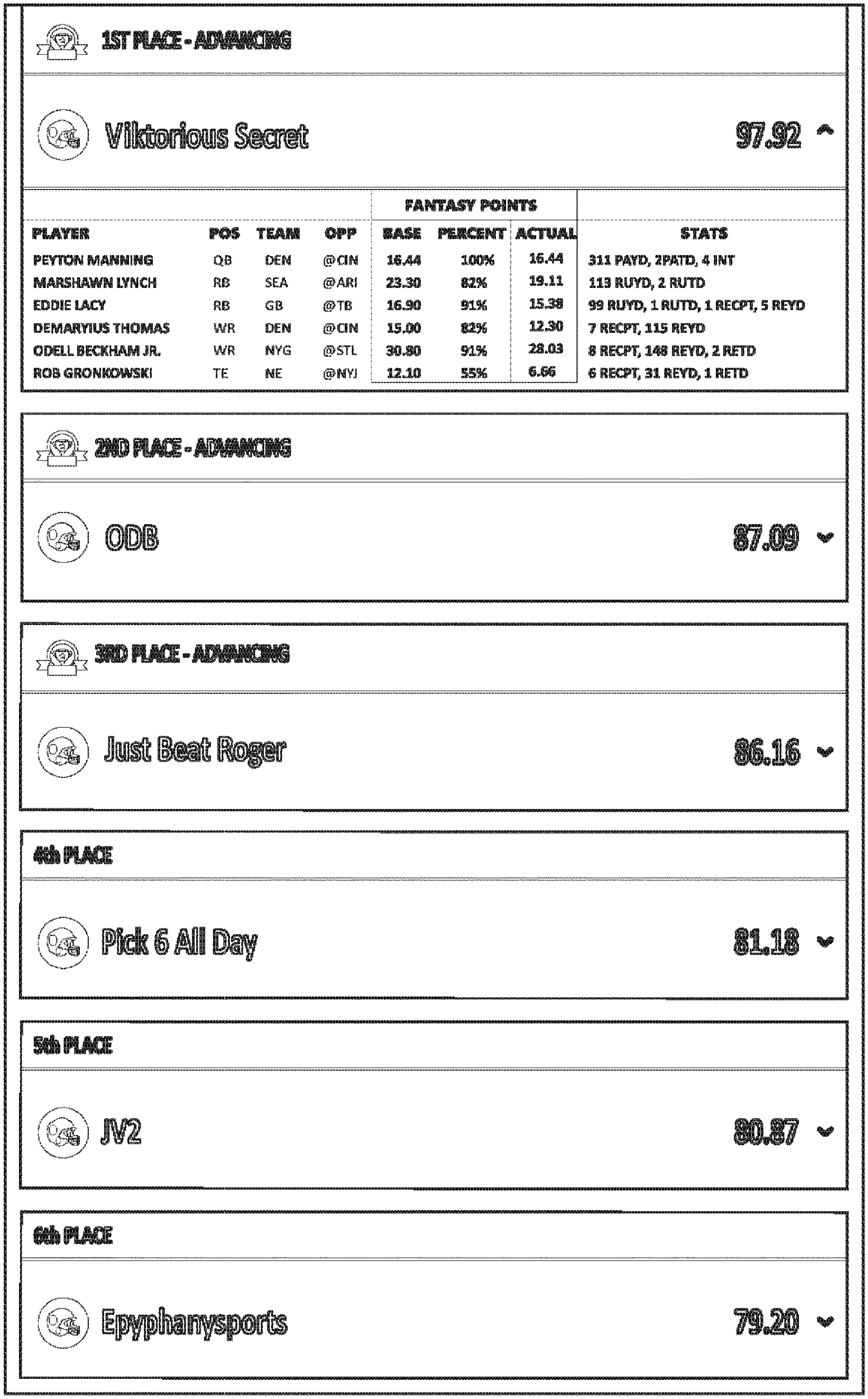
Figure 19:
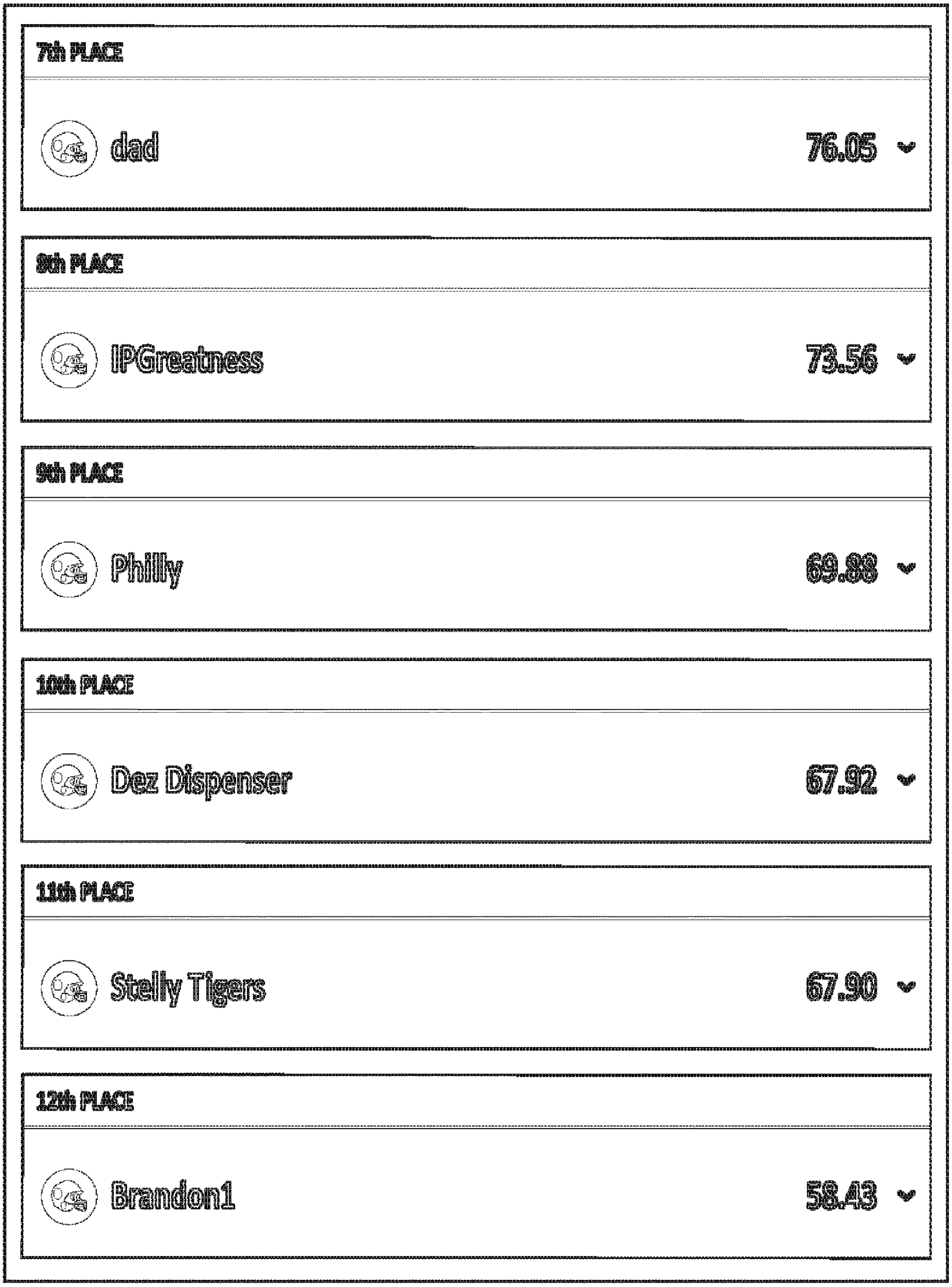

Referring now to FIG. 18 and FIG. 19, sample user interface screenshots depict how an example embodiment of the fantasy sports tournament as described herein can enable a plurality of contestants to compete in the same contest at the same time. In particular, the example embodiment can enable two or more contestants, three or more contestants, or many contestants to compete among each other in the same contest or round at the same time. The fantasy sports tournament contestants in an example embodiment can be placed together in a small group and allowed to compete in the same group among all members of the group at the same time. The gaming system of the example embodiment can run a plurality of small groups at the same time. Thus, the tournament can be partitioned into a plurality of small groups, wherein each small group can comprise a plurality (e.g., two or more or three or more, etc.) of contestants in each group where the contestants in each group play among all members of the same group at the same time. Conventional tournament systems do not provide this capability. As shown in FIG. 18 and FIG. 19, the sample screenshots illustrate an example round in the fantasy sports tournament of an example embodiment where more than two teams/contestants can compete among each other in the same contest at the same time. FIG. 18 and FIG. 19 illustrate an example where there are twelve contestants competing against one another in the current round of the tournament at the same time. The final scores for each contestant are tabulated to the nearest hundredth and shown to the right of the name of the corresponding contestant. In this sample case, the top three contestants advance to the next round of the tournament while the bottom nine contestants are eliminated. This sample competition shows that the top three finishers in this example contest were: "Vicktorious Secret", "ODB" and "Just Beat Roger." Thus, the gaming system of an example embodiment enables small group competitions among multiple contestants at the same time. These examples illustrate how the various embodiments disclosed herein run counter to the traditional thinking that contestants must be paired in one-on-one matches like they are in real life sports where one team plays against another team as they do in baseball, basketball, hockey, football, soccer, etc. This novel approach provided by the example embodiments disclosed herein enables multiple contestants to compete against each other in the same round at the same time and enables the top finishers in the round to advance to the next round. As such, the various embodiments described herein provide a fantasy sports tournament structure that has not existed before.

Figure 20:
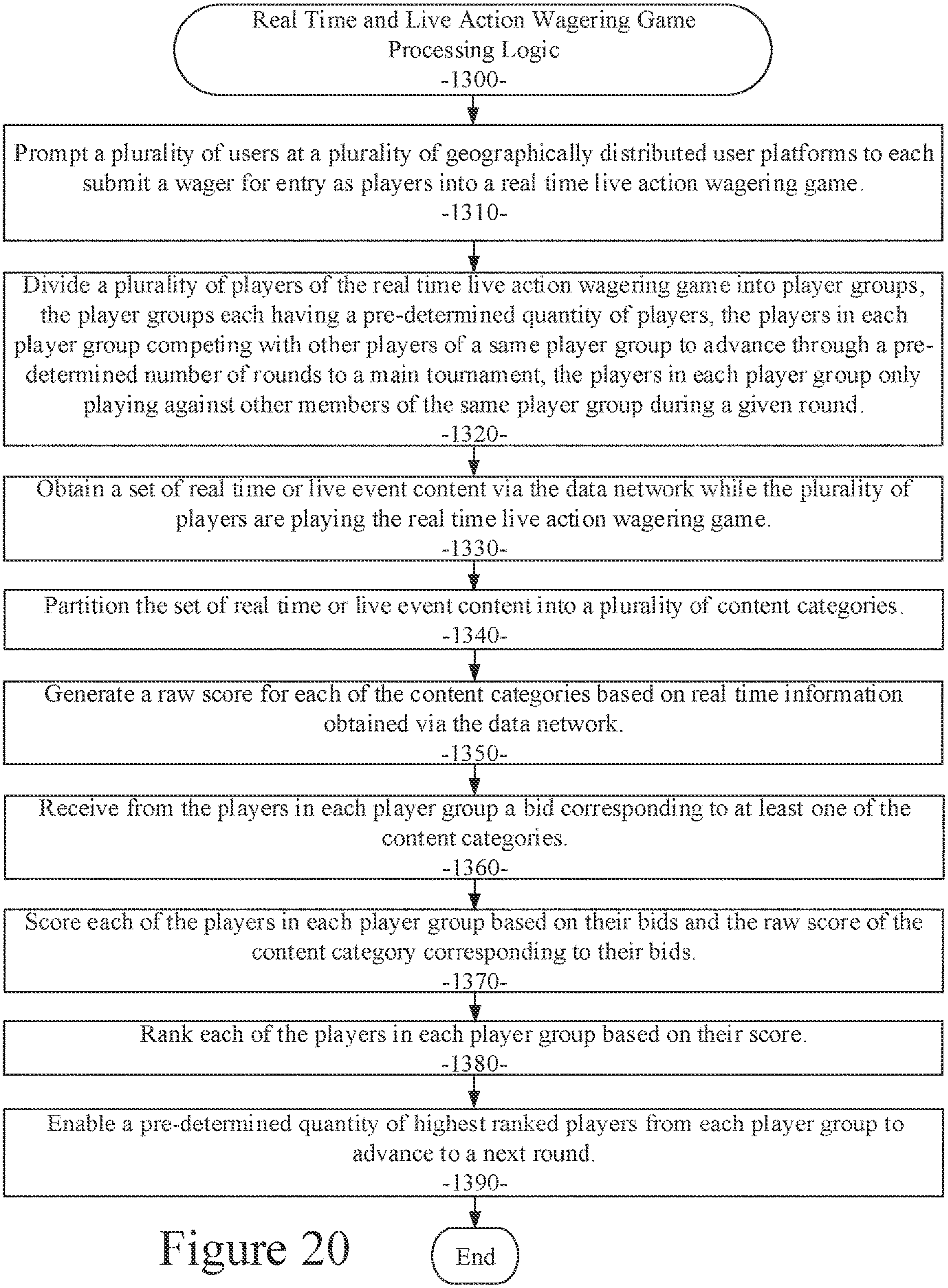
FIG. 20 is a processing flow chart illustrating an example embodiment of gaming processing logic for conducting wagering games using real time or live action event content.

FIG. 20 is a processing flow diagram illustrating an example embodiment of slot machine processing logic for conducting wagering games using real time or live action event content as described herein. The method of an example embodiment includes: prompting a plurality of users at a plurality of geographically distributed user platforms to each submit a wager for entry as players into a real time live action wagering game (processing block 1310); dividing a plurality of players of the real time live action wagering game into player groups, the player groups each having a pre-determined quantity of players, the players in each player group competing with other players of a same player group to advance through a pre-determined number of rounds to a main tournament, the players in each player group only playing against other members of the same player group during a given round (processing block 1320); obtaining a set of real time or live event content via the data network while the plurality of players are playing the real time live action wagering game (processing block 1330); partitioning the set of real time or live event content into a plurality of content categories (processing block 1340); generating a raw score for each of the content categories based on real time information obtained via the data network (processing block 1350); receiving from the players in each player group a bid corresponding to at least one of the content categories (processing block 1360); scoring each of the players in each player group based on their bids and the raw score of the content category corresponding to their bids (processing block 1370); ranking each of the players in each player group based on their score (processing block 1380); and enabling a pre-determined quantity of highest ranked players from each player group to advance to a next round (processing block 1390).

Figure 21:
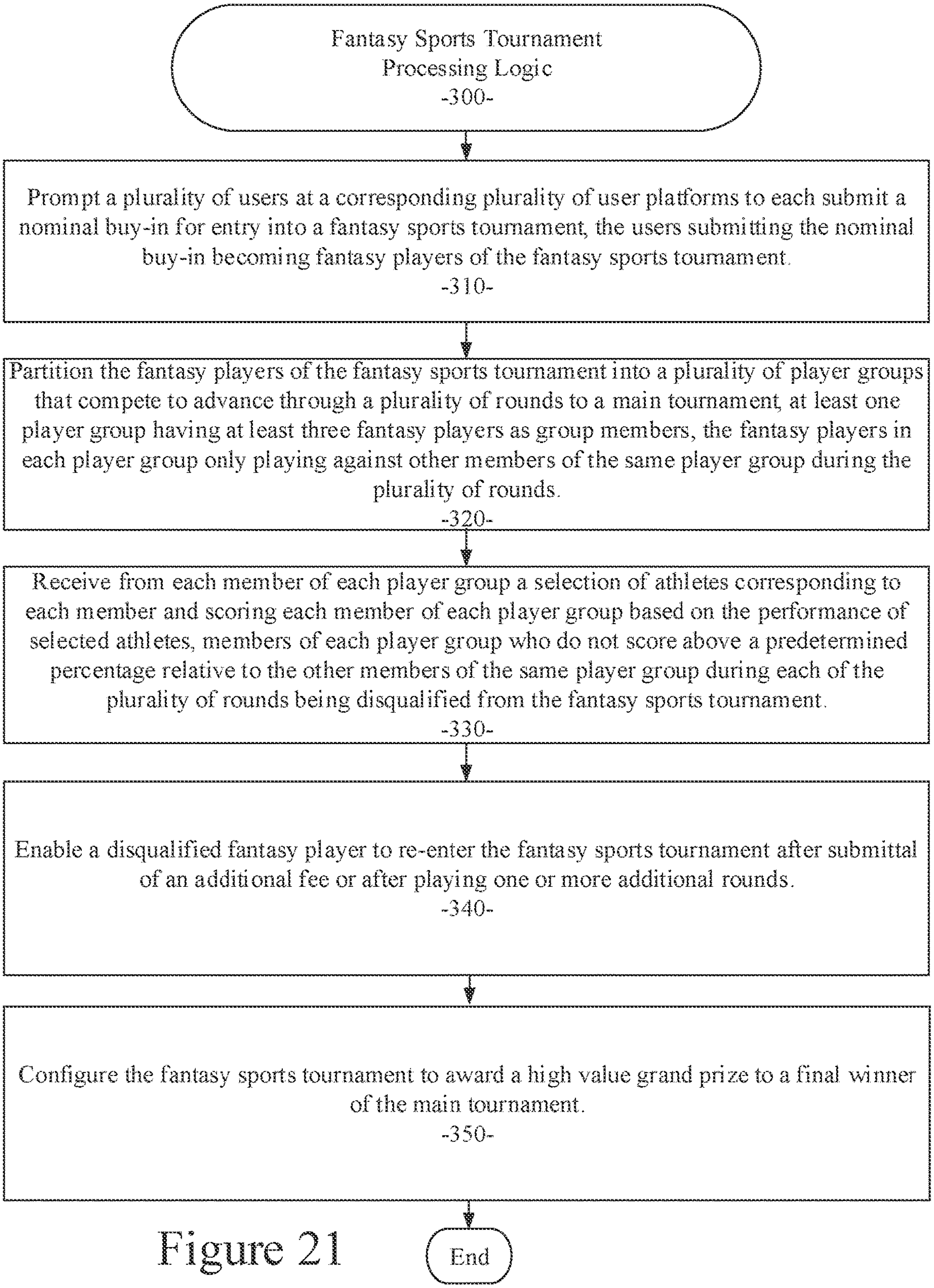
FIG. 21 is a processing flow chart illustrating an example embodiment of gaming processing logic for conducting a fantasy sports tournament.

FIG. 21 is a processing flow diagram illustrating an example embodiment of slot machine processing logic for conducting a fantasy sports tournament as described herein.

The method of an example embodiment includes: prompting a plurality of users at a corresponding plurality of user platforms to each submit a nominal buy-in for entry into a fantasy sports tournament, the users submitting the nominal buy-in becoming fantasy players of the fantasy sports tournament (processing block 310); partitioning, by execution of the data processor, the fantasy players of the fantasy sports tournament into a plurality of player groups that compete to advance through a plurality of rounds to a main tournament, at least one player group having at least three fantasy players as group members, the fantasy players in each player group only playing against other members of the same player group during the plurality of rounds (processing block 320); receiving from each member of each player group a selection of athletes corresponding to each member and scoring each member of each player group based on the performance of selected athletes, members of each player group who do not score above a predetermined percentage relative to the other members of the same player group during each of the plurality of rounds being disqualified from the fantasy sports tournament (processing block 330); enabling a disqualified fantasy player to re-enter the fantasy sports tournament after submittal of an additional fee or after playing one or more additional rounds (processing block 340); and configuring the fantasy sports tournament to award a high value grand prize to a final winner of the main tournament (processing block 350).

Figure 22:
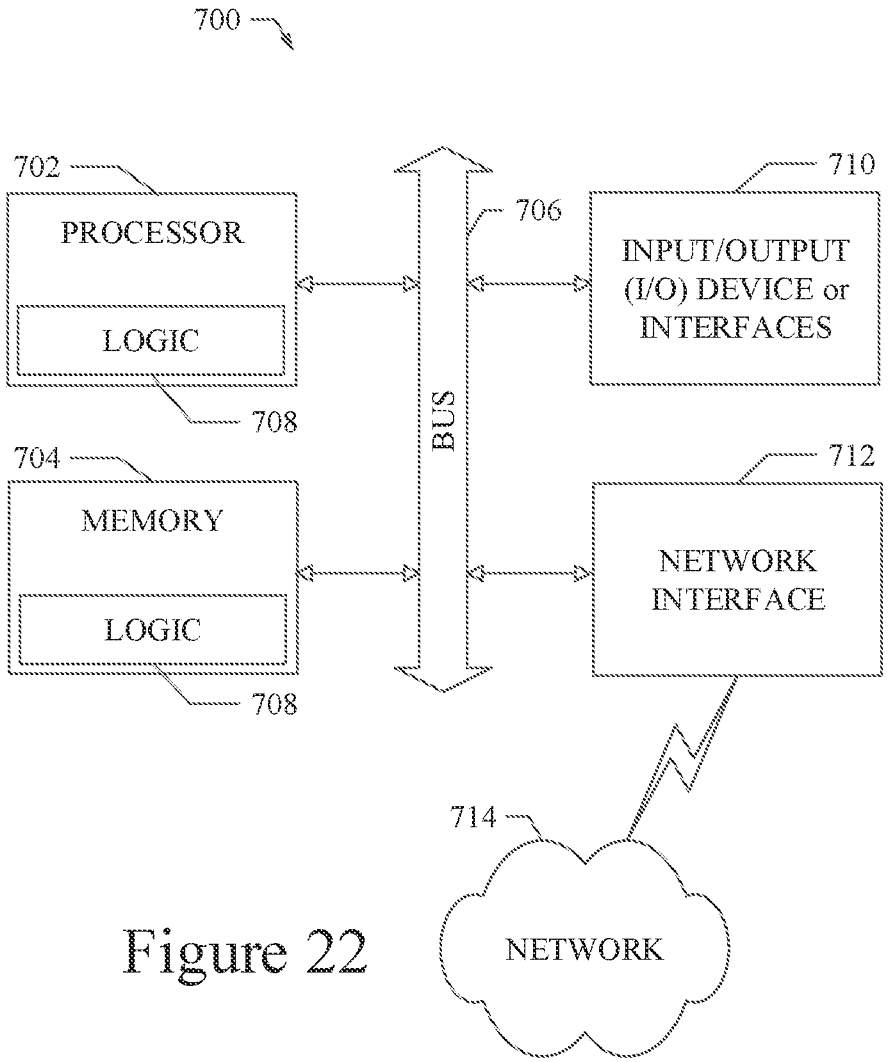
FIG. 22 shows a diagrammatic representation of a machine in the example form of a stationary or mobile computing and/or communication system within which a set of instructions when executed and/or processing logic when activated may cause the machine to perform any one or more of the methodologies described and/or claimed herein.

FIG. 22 shows a diagrammatic representation of a machine in the example form of a stationary or mobile computing and/or communication system 700 within which a set of instructions when executed and/or processing logic when activated may cause the machine to perform any one or more of the methodologies described and/or claimed herein. In alternative embodiments, the machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example stationary or mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The stationary or mobile computing and/or communication system 700 may further include various input/output (I/O) devices and/or interfaces 710, such as a monitor, touchscreen display, keyboard or keypad, cursor control device, voice interface, and optionally a network interface 712. In an example embodiment, the network interface 712 can include one or more network interface devices or radio transceivers configured for compatibility with any one or more standard wired network data communication protocols, wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, BLUETOOTH, IEEE 802.11x, and the like. In essence, network interface 712 may include or support virtually any wired and/or wireless communication mechanisms by which information may travel between the stationary or mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the stationary or mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

It will be apparent to one of ordinary skill in the art in view of the disclosure herein that other concepts described herein can also be implemented in particular embodiments. It will also be apparent to one of ordinary skill in the art in view of the disclosure herein that the various concepts and features described herein can be combined in various permutations in particular embodiments.

In various embodiments as described herein, example embodiments include at least the following examples.

A specialized slot machine comprising: a data processor; a network interface, in data communication with the data processor, for communication on a data network; and a gaming system, executable by the data processor, to: prompt a plurality of users at a plurality of user platforms to each submit a nominal buy-in for entry into a fantasy sports tournament, the users submitting the nominal buy-in becoming fantasy players of the fantasy sports tournament; partition the fantasy players of the fantasy sports tournament into player groups denoted rings, wherein players compete to advance through a pre-determined number of rounds to a main tournament, at least one player ring having at least three fantasy players as ring members, the fantasy players in each player ring only playing against other members of the same player ring during a given round; receive from each member of each player ring a selection of athletes corresponding to each member and scoring each member of each player ring based on the performance of selected athletes, members of each player ring who do not score within a predetermined number of advancing players for their given ring relative to the other members of the same player ring are disqualified from the fantasy sports tournament; enable a disqualified fantasy player to re-enter the fantasy sports tournament after submittal of an additional fee by either: a) paying the same fee again which requires playing one or more additional rounds to catch up to the number of rounds other players have played, or b) paying an additional fee to bypass rounds that have already been played; and configure the fantasy sports tournament to include rings.

A method comprising: prompting, by execution of a data processor, a plurality of users at a plurality of user platforms to each submit a nominal buy-in for entry into a fantasy sports tournament, the users submitting the nominal buy-in becoming fantasy players of the fantasy sports tournament; partitioning, by execution of the data processor, the fantasy players of the fantasy sports tournament into player groups denoted rings, wherein players compete to advance through a pre-determined number of rounds to a main tournament, at least one player ring having at least three fantasy players as ring members, the fantasy players in each player ring only playing against other members of the same player ring during a given round; receiving from each member of each player ring a selection of athletes corresponding to each member and scoring each member of each player ring based on the performance of selected athletes, members of each player ring who do not score within a predetermined number of advancing players for their given ring relative to the other members of the same player ring are disqualified from the fantasy sports tournament; enabling a disqualified fantasy player to re-enter the fantasy sports tournament after submittal of an additional fee by either: a) paying the same fee again which requires playing one or more additional rounds to catch up to the number of rounds other players have played, or b) paying an additional fee to bypass rounds that have already been played; enabling an advancing player to move on to the next round of the tournament, without having to pay an additional charge, as the advancing player is placed in a new ring of players who also have successfully advanced to the same stage of the tournament; and configuring the fantasy sports tournament to include rings.

A non-transitory machine-useable storage medium embodying instructions which, when executed by a machine, cause the machine to: prompt a plurality of users at a plurality of user platforms to each submit a nominal buy-in for entry into a fantasy sports tournament, the users submitting the nominal buy-in becoming fantasy players of the fantasy sports tournament; partition the fantasy players of the fantasy sports tournament into player groups denoted rings, wherein players compete to advance through a pre-determined number of rounds to a main tournament, at least one player ring having at least three fantasy players as ring members, the fantasy players in each player ring only playing against other members of the same player ring during a given round; receive from each member of each player ring a selection of athletes corresponding to each member and scoring each member of each player ring based on the performance of selected athletes, members of each player ring who do not score within a predetermined number of advancing players for their given ring relative to the other members of the same player ring are disqualified from the fantasy sports tournament; enable a disqualified fantasy player to re-enter the fantasy sports tournament after submittal of an additional fee by either: a) paying the same fee again which requires playing one or more additional rounds to catch up to the number of rounds other players have played, or b) paying an additional fee to bypass rounds that have already been played; and configure the fantasy sports tournament to include rings.

The non-transitory machine-useable storage medium as claimed above wherein the fantasy sports tournament is a player skill based tournament. A player skill based tournament requires that no more than ten people can compete for one advancing position at any given time.

The non-transitory machine-useable storage medium as claimed above wherein the fantasy sports tournament does not include a trap round. A trap round based tournament format always has stages in the tournament where at least 100 people compete in the same round against one another for only one advancing position.

The non-transitory machine-useable storage medium as claimed above wherein the fantasy sports tournament being further configured to include both regular season and post season play. Prior examples have featured regular season only tournaments or post season only tournaments. There has never been an example that has used both the regular season and post season in the same tournament.

The non-transitory machine-useable storage medium as claimed above wherein the fantasy sports tournament being further configured to include a scramble rounds format. This format requires a player to advance a certain number of predetermined consecutive rounds. The criteria for advancement is also predetermined and doesn't necessarily require a player to win the round to advance.

The non-transitory machine-useable storage medium as claimed above wherein the fantasy sports tournament being further configured to include a player certification system.

The non-transitory machine-useable storage medium as claimed above wherein the fantasy sports tournament being further configured to support the playing of multiple rounds in one day by submitting one lineup used for two or more groups, each group for which the lineup is submitted being considered a separate and distinct round, each round being numerically sequenced and the lowest numbered round for which a contestant does not meet pre-determined criteria to advance being considered the round in which the contestant is eliminated.

The non-transitory machine-useable storage medium as claimed above wherein the fantasy sports tournament being further configured to support bidding on fantasy athletes in blocs of two or more by bidding for a percentage of the fantasy points that the fantasy athletes score.

The non-transitory machine-useable storage medium as claimed above wherein the fantasy sports tournament being further configured to support decreasing or increasing the maximum allowable bid for an athlete's fantasy points for a given round of bidding.

The non-transitory machine-useable storage medium as claimed above wherein the fantasy sports tournament being further configured to support eliminating one or more contestants during a round for not having met a certain point threshold or for being ranked at or near the bottom of a grouping of contestants when a pre-determined time period expires.

The non-transitory machine-useable storage medium as claimed above wherein the fantasy sports tournament being further configured to support contestants playing in a daily fantasy sports group format structure for as many rounds as they desire.

If they have a score that meets the criteria for advancement (as opposed to one where they are eliminated), the have two options. They can either withdraw and claim their prize or they can advance to another round with a better prize at stake.

The non-transitory machine-useable storage medium as claimed above wherein the fantasy sports tournament being further configured to support a minimum threshold for a group of contestants (it can be a very large group of thousands or even millions), wherein contestants must meet the minimum threshold to advance to the next round and the remaining contestants in the group are eliminated. This minimum threshold has pre-determined benchmarks that competing players must meet in order to advance. This format requires that players must perform better than average for some or all of the rounds. Performing better than average is defined by requiring that more than half of the competitors are eliminated at one time. At the same time, it also requires that the skill based requirement is observed. This means that anytime players are grouped together in competition, there will be at least one advancing position available for every ten competitors. For example, a tournament might require players to finish in the top 30% of some rounds to advance to the next.

The non-transitory machine-useable storage medium as claimed above wherein the fantasy sports tournament being further configured to support slotting positions with a percentage value.

The non-transitory machine-useable storage medium as claimed above wherein the fantasy sports tournament being further configured to support additional rounds in a condensed period of time by either splitting different live action sports games into multiple rounds during the same day (wildcard format) or splitting the same live action sports game into multiple rounds (super wildcard format).

Alternative Example Embodiments for Eliminating Scripting and Implementing a REACT Format Clock—Timing Contestants Scripting is the scourge of Daily Fantasy Sports. As long as contestants are allowed to take their time to plot out lineups, they will use computer generated scripts to allow them to do so. The way to eliminate this practice is to put contestants on a clock. This contestant timer should be in terms of minutes or seconds. Contestants are then shown athlete cards for selection in combination with one another and are forced to make decisions about the athletes as a group. What this does is alter the dynamics of fantasy sports contests.

Contestants are now reacting to combinations of athletes they are SHOWN instead of taking all the time in the world to SUBMIT a lineup. Clocks can also be used to create a bonus point situation. If Contestant A selects their team with 17 seconds on the clock and Contestant B selects their team with 4 seconds on the clock, and points are awarded for every second a contestant leaves on the clock, then Contestant A has a 17 to 4 points advantage in the bonus category (in the case where one second=one point).

Eliminating Scripting—REACTING instead of SELECTING

The only way to eliminate scripting of lineups is to change the way fantasy sports contests are played. The wrong format was introduced to the market probably because it mimicked selecting teams like in a draft. The problem is it doesn't work for Daily Fantasy Sports. It doesn't work because selecting lineups leads to scripting and this practice allows people to cheat. Instead of allowing contestants to SELECT teams on their own with all the time in the world, the way forward is to force contestants to REACT to combinations of athletes against small groups of other competitors with a clock ticking down on them. This new Daily Fantasy Sports format can be designated the REACT format.

Color and Teammates Bonus

When the REACT format is the style of game play, bonuses become a possibility in ways that are impossible with the conventional SELECT model. We already explained the CLOCK BONUS above. Other bonuses can include the COLOR BONUS and the TEAMMATES BONUS. A color bonus allows athlete cards to be shown with a color background where some have the color yellow, some have red, some have blue, etc. This allows bonuses for having a higher concentration of the same color. For example, a first contestant with four blue athlete cards and one red athlete card has a stronger color combination relative to a second contestant with one yellow athlete card, one red athlete card, one green athlete card, one purple athlete card, and one blue athlete card. This higher concentration of blue athlete cards for the first contestant would give them more bonus points. A bonus can also be awarded for athletes who are teammates in real life sports.

Statistical Averages

When the conventional SELECT model is replaced by the new REACT format model as disclosed herein, a new type of game play becomes possible. For example, in the REACT format model, live action statistics can be replaced by statistical averages. This is NOT the same thing as simulated statistics. Statistical averages show the true measure of an athlete; because, the statistical average gives a complete picture of the athlete over the course of a season. The use of statistical averages of athlete performance also eliminates the chance occurrences of injury, suspensions, ejections, benchings, etc. The only way statistical averages can be used in game play is in the REACT format as disclosed herein where contestants are playing against a clock. If one were to use statistical averages in the conventional SELECT format, this would be nonsensical. It would be too easy to look up all the information and render the competition meaningless.

In various embodiments as described herein, example embodiments include at least the following examples.

A non-transitory machine-useable storage medium embodying instructions which, when executed by a machine, cause the machine to implement a REACT format model for a fantasy sports tournament where contestants are put on a clock against one another to view lineups of combinations of athletes that are shown to them, without allowing contestants to select these athletes ahead of time. Currently, all the other models use the SELECT model where contestants simply select who they want.

The non-transitory machine-useable storage medium as disclosed herein wherein the REACT format model for the fantasy sports tournament is further configured to implement BONUS points for clock play, colors on athlete cards, and athletes being teammates in real life. Bonus points can be awarded for the amount of time left on the clock after a contestant selects among the athletes shown to the contestant. Bonus points can also be awarded for having multiple athlete cards of the same color. Finally, bonus points can be awarded to a contestant for having selected athletes who are real life teammates.

The non-transitory machine-useable storage medium as disclosed herein wherein the REACT format model for the fantasy sports tournament is further configured to implement the use of statistical averages as a scoring system, instead of using live statistics or simulated statistics, for the REACT format model of the fantasy sports tournament where contestants are forced to make decisions with a clock ticking down on them.

The system, method, and non-transitory machine-useable storage as disclosed herein wherein a deck of cards (physical or virtual) displays a notable person's name from the world of sports, entertainment, politics, music, etc. and wherein each card can have the following features: a) a fantasy point total associated with each card that is calculated by either calculating statistical averages from past events or it is scored by a rubric that is defined by future events; b) there is a "tribe" that each card person on the cards is associated with. For example, with a sports athlete it might be the city or team they play for, for a rock and roll performer, it might be the name of their band, and for a politician it might be the name of the party or the state they are from; c) each card has a color associated with it that is prominently displayed. This color scheme can be used to award bonuses based on the combinations of the colors; and d) bonuses can also be awarded for multiple cards that display the same person. For example, a player has three cards displaying Frank Sinatra—bonuses can also be awarded for having people in the same tribe.

The system, method, and non-transitory machine-useable storage medium as disclosed herein wherein a deck of cards (physical or virtual) can be displayed in the forms of blocs. A bloc is one or more cards that a player can either take or bid on as a whole unit. Players can also accept parts of a bloc and reject other parts of it. Rejected parts of the bloc may or may not have an option to replace the rejected cards.

The system, method, and non-transitory machine-useable storage medium as disclosed herein wherein a deck of cards (physical or virtual) can be shared where two or more players desiring a shared card get a percentage of the value of the card instead of receiving full value. For example, two players might both want Steve Perry for their Rock and Roll Legends team. Instead of receiving 100% of his value, a sharing player might each receive 80% of the card's value.

The system, method, and non-transitory machine-useable storage medium as disclosed herein wherein a deck of cards (physical or virtual) can be configured with a point value of the cards wherein the point value might be positive points that helps a player or they might be scored in a negative way that hurts them. For example, if a bloc of 4 cards are worth 80 points, the color of the cards might determine whether the 80 points are either positive or negative.

The system, method, and non-transitory machine-useable storage medium as disclosed herein wherein a deck of cards (physical or virtual) can be configured with a visual sleeve or shading for the cards that indicates a card has been selected. This gives a shading contrast that alerts color-blind people that a card was selected.

The system, method, and non-transitory machine-useable storage medium as disclosed herein wherein a deck of cards (physical or virtual) can be configured with a readable marking on the card (e.g., the written word "blue" or a "b" or some other symbol or indicia) that indicates what color the card is. This helps color-blind people differentiate between certain cards in a definitive way that they are unable to do simply by looking at the color of the card.

The system, method, and non-transitory machine-useable storage medium as disclosed herein wherein a deck of cards (physical or virtual) can be configured with a technological visual aid for virtual decks of cards that tells the players whether they are playing a game based on events from the past or events from the future. This is critical information to know because it involves two different skill sets. The former requires a player to recall a statistical average while the later requires them to make a projection on what the value of a given card will be based on what happens in the future. For an event from the past, the deck that the cards are dealt from rotates counter-clockwise (the deck is literally spinning, very slowly, in front of the players competing against one another in a backwards direction) to denote it is going backwards into the past to use statistical averages. We call this version of the game REWIND. Conversely, for an event that takes place in the future, the deck that the cards are dealt from rotates clockwise to denote it is going forward into the future to use statistics that occur in real time. We call this version of the game FORWARD. Because players will know the terms REWIND and FORWARD and what they mean, they can quickly look at the deck of cards that is being dealt and gauge by the way it is spinning to know which variation of the game is being played—past or future.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

APPENDIX

TABLE 1

Qualifying Tournaments
Example Based on the 2012 NFL ™ Football Season

| Rounds | Qualifier #1 9 | Qualifier #2 8 | Qualifier #3 7 | Qualifier #4 6 | Qualifier #5 5 | Qualifier #6 4 | Qualifier #7 3 | Qualifier #8 2 | Qualifier #9 1 |
|---|---|---|---|---|---|---|---|---|---|
| Week 1 | Round 1 Sept 9 | — | — | — | — | — | — | — | — |
| Week 2 | Round 2 Sept 16 | Round 1 Sept 16 | — | — | — | — | — | — | — |
| Week 3 | Round 3 Sept 23 | Round 2 Sept 23 | Round 1 Sept 23 | — | — | — | — | — | — |

TABLE 1-continued

| Qualifying Tournaments<br>Example Based on the 2012 NFL ™ Football Season | | | | | | | | | |
|---|---|---|---|---|---|---|---|---|---|
| Rounds | Qualifier #1<br>9 | Qualifier #2<br>8 | Qualifier #3<br>7 | Qualifier #4<br>6 | Qualifier #5<br>5 | Qualifier #6<br>4 | Qualifier #7<br>3 | Qualifier #8<br>2 | Qualifier #9<br>1 |
| Week 4 | Round 4<br>Sept 30 | Round 3<br>Sept 30 | Round 2<br>Sept 30 | Round 1<br>Sept 30 | — | — | — | — | — |
| Week 5 | Round 5<br>Oct 7 | Round 4<br>Oct 7 | Round 3<br>Oct 7 | Round 2<br>Oct 7 | Round 1<br>Oct 7 | — | — | — | — |
| Week 6 | Round 6<br>Oct 14 | Round 5<br>Oct 14 | Round 4<br>Oct 14 | Round 3<br>Oct 14 | Round 2<br>Oct 14 | Round 1<br>Oct 14 | — | — | — |
| Week 7 | Round 7<br>Oct 21 | Round 6<br>Oct 21 | Round 5<br>Oct 21 | Round 4<br>Oct 21 | Round 3<br>Oct 21 | Round 2<br>Oct 21 | Round 1<br>Oct 21 | — | — |
| Week 8 | Round 8<br>Oct 28 | Round 7<br>Oct 28 | Round 6<br>Oct 28 | Round 5<br>Oct 28 | Round 4<br>Oct 28 | Round 3<br>Oct 28 | Round 2<br>Oct 28 | Round 1<br>Oct 28 | — |
| Week 9 | Round 9<br>Nov 4 | Round 8<br>Nov 4 | Round 7<br>Nov 4 | Round 6<br>Nov 4 | Round 5<br>Nov 4 | Round 4<br>Nov 4 | Round 3<br>Nov 4 | Round 2<br>Nov 4 | Round 1<br>Nov 4 |

TABLE 2

Qualifying Tournament Caps for Groups of 12
Top 3 in Each Group Advance per Round
Playing for 4,096 Available Main Event Seats

| | # of Rounds | Cap (# of entries allowed) | # of Main Event Seats |
|---|---|---|---|
| Qualifier #1 | 9 | 272,105,472** | 1,038 |
| Qualifier #2 | 8 | 53,477,376 | 816 |
| Qualifier #3 | 7 | 11,698,176 | 714 |
| Qualifier #4 | 6 | 2,088,960 | 510 |
| Qualifier #5 | 5 | 313,344 | 306 |
| Qualifier #6 | 4 | 52,224 | 204 |
| Qualifier #7 | 3 | 13,056 | 204 |
| Qualifier #8 | 2 | 1,632 | 102 |
| Qualifier #9 | 1 | 408 | 102 |
| Direct Entry to Main Event* | — | 100 | 100 |
| Totals | | 339,750,748 | 4,096 |

*Fantasy player does not have to qualify via a satellite tournament and goes directly into the Main Event.

**To calculate the cap for Qualifier #1, a decision must be made on how many of the 4,096 Main Event seats will be assigned to this particular qualifier. The number 1,038 has arbitrarily been selected. Because three of the twelve fantasy players advance from each group, this is a 4 to 1 ratio, which can be written as 4/1, which equals 4. Now raise this number 4 to the power of how many rounds the round has. In this case, satellite #1 has 9 rounds. The number 4 raised to the power of 9 equals 262,144. This means that 262,144 fantasy players compete over 9 rounds for one Main Event seat. Because there are 1,038 Main Event seats that we arbitrarily assigned to Qualifier #1, this means 262,144 times 1,038 is the number of fantasy players that can play in Qualifier #1. This number comes out to 272,105,472, which is why the cap was set on this number.

TABLE 3

| Percentage of Fantasy Points an Athlete Keeps based on Duplication | | | | | | | | | | |
|---|---|---|---|---|---|---|---|---|---|---|
| Number of players in the fantasy match | 1X* | 2X | 3X | 4X | 5X | 6X | 7X | 8X | 9X | 10X |
| 4 | 100% | 67% | 33% | 0% | NA | NA | NA | NA | NA | NA |
| 5 | 100% | 75% | 50% | 25% | 0% | NA | NA | NA | NA | NA |
| 6 | 100% | 80% | 60% | 40% | 20% | 0% | NA | NA | NA | NA |
| 7 | 100% | 83% | 67% | 50% | 33% | 17% | 0% | NA | NA | NA |
| 8 | 100% | 86% | 72% | 58% | 43% | 28% | 14% | 0% | NA | NA |
| 9 | 100% | 87% | 75% | 62% | 50% | 38% | 25% | 13% | 0% | NA |
| 10 | 100% | 89% | 78% | 67% | 56% | 45% | 34% | 23% | 12% | 0% |
| 11 | 100% | 90% | 80% | 70% | 60% | 50% | 40% | 30% | 20% | 10% |
| 12 | 100% | 91% | 82% | 73% | 64% | 55% | 46% | 37% | 28% | 19% |
| 13 | 100% | 92% | 84% | 75% | 67% | 59% | 50% | 42% | 34% | 25% |
| 14 | 100% | 92% | 84% | 77% | 69% | 61% | 54% | 46% | 38% | 31% |
| 15 | 100% | 93% | 86% | 79% | 72% | 65% | 58% | 51% | 44% | 36% |
| 16 | 100% | 93% | 86% | 80% | 73% | 66% | 60% | 53% | 46% | 40% |
| 17 | 100% | 94% | 88% | 82% | 75% | 69% | 63% | 57% | 50% | 44% |
| 18 | 100% | 94% | 88% | 82% | 76% | 70% | 64% | 58% | 53% | 47% |
| 19 | 100% | 94% | 89% | 83% | 78% | 72% | 67% | 61% | 56% | 50% |
| 20 | 100% | 95% | 90% | 85% | 79% | 74% | 69% | 64% | 58% | 53% |

TABLE 3-continued

| Percentage of Fantasy Points an Athlete Keeps based on Duplication | | | | | | | | | | |
|---|---|---|---|---|---|---|---|---|---|---|
| Number of players in the fantasy match | 11X | 12X | 13X | 14X | 15X | 16X | 17X | 18X | 19X | 20X |
| 4 | NA | NA | NA | NA | NA | NA | NA | NA | NA | NA |
| 5 | NA | NA | NA | NA | NA | NA | NA | NA | NA | NA |
| 6 | NA | NA | NA | NA | NA | NA | NA | NA | NA | NA |
| 7 | NA | NA | NA | NA | NA | NA | NA | NA | NA | NA |
| 8 | NA | NA | NA | NA | NA | NA | NA | NA | NA | NA |
| 9 | NA | NA | NA | NA | NA | NA | NA | NA | NA | NA |
| 10 | NA | NA | NA | NA | NA | NA | NA | NA | NA | NA |
| 11 | 0% | NA | NA | NA | NA | NA | NA | NA | NA | NA |
| 12 | 10% | 0% | NA | NA | NA | NA | NA | NA | NA | NA |
| 13 | 17% | 9% | 0% | NA | NA | NA | NA | NA | NA | NA |
| 14 | 23% | 15% | 8% | 0% | NA | NA | NA | NA | NA | NA |
| 15 | 29% | 22% | 15% | 8% | 0% | NA | NA | NA | NA | NA |
| 16 | 33% | 26% | 20% | 13% | 6% | 0% | NA | NA | NA | NA |
| 17 | 38% | 32% | 25% | 19% | 13% | 7% | 0% | NA | NA | NA |
| 18 | 41% | 35% | 29% | 23% | 17% | 11% | 6% | 0% | NA | NA |
| 19 | 45% | 39% | 34% | 28% | 23% | 17% | 12% | 6% | 0% | NA |
| 20 | 48% | 43% | 37% | 32% | 27% | 22% | 16% | 11% | 6% | 0% |

*Note:
1X is read as "one time" which means a given athlete was selected by exactly one of the 20 fantasy players. Percentages selected are arbitrary.

TABLE 4

| Adjusted Fantasy Points<br>Based on How Many Fantasy Players Selected a Given Athlete<br>Example from NFL ™ Football | | | | |
|---|---|---|---|---|
| Athlete | Actual Fantasy Points an Athlete Scored | Number of Times Selected by a Fantasy Player | Percentage of Fantasy Points Kept - Based on Duplication of Athletes | *Adjusted Fantasy Points |
| Vick, Phila | 31 | 2 | 91% | 28.21 |
| Brady, NE | 25 | 6 | 55% | 13.75 |
| P. Manning, Ind | 40 | 3 | 82% | 32.80 |
| Brees, NO | 28 | 1 | 100% | 28.00 |
| Gore, SF | 16 | 2 | 91% | 14.56 |
| Peterson, Min | 33 | 11 | 10% | 3.30 |
| Mendenhall, Pit | 15 | 1 | 100% | 15.00 |
| C. Johnson, Ten | 29 | 4 | 73% | 21.17 |
| Foster, Hou | 21 | 1 | 100% | 21.00 |
| Jones-Drew, Jax | 9 | 1 | 100% | 9.00 |
| Bradshaw, NYG | 13 | 1 | 100% | 13.00 |
| Turner, Atl | 31 | 1 | 100% | 31.00 |
| Rice, Balt | 17 | 1 | 100% | 17.00 |
| S. Jackson, STL | 24 | 1 | 100% | 24.00 |
| Welker, NE | 21 | 2 | 91% | 19.11 |
| C. Johnson, Det | 18 | 6 | 55% | 9.90 |
| A. Johnson, Hou | 27 | 5 | 64% | 17.28 |
| Bowe, KC | 11 | 1 | 100% | 11.00 |
| Austin, Dal | 15 | 1 | 100% | 15.00 |
| White, Atl | 13 | 1 | 100% | 13.00 |
| Wallace, Pitt | 25 | 1 | 100% | 25.00 |
| Jennings, GB | 17 | 1 | 100% | 17.00 |
| Marshall, Mia | 16 | 1 | 100% | 16.00 |
| Fitzgerald, Az | 22 | 3 | 82% | 18.04 |
| Wayne, Ind | 10 | 1 | 100% | 10.00 |
| D. Jackson, Phila | 12 | 1 | 100% | 12.00 |

TABLE 5

Final Scores for Hypothetical 12 Fantasy Player Football Group (Top 2 Fantasy Players Advancing)

| | NFL ™ Player #1 TRIPLE PTS | NFL ™ Player #2 DOUBLE PTS | NFL ™ Player #3 FACE VALUE | Totals |
|---|---|---|---|---|
| Fantasy Player 1 | Rodgers QB Green Bay 3.90 × 3 = 11.70 ** | Roethlisberger QB Pittsburgh 23.78 × 2 = 47.56 | Nelson WR Green Bay 19.20 | 78.46* 2nd Place |
| Fantasy Player 2 | Rodgers QB Green Bay 3.90 × 3 = 11.70 | Green Bay Defense 20.00 × 2 = 40.00 | Mendenhall Pitt 9.84 | 61.54 8th Place |
| Fantasy Player 3 | Randle El WR Pittsburgh 9.00 × 3 = 27.00 | Rodgers QB Green Bay 3.90 × 2 = 7.80 | Driver WR Green Bay 2.00 | 36.80 12th Place |
| Fantasy Player 4 | Wallace WR Pittsburgh 15.47 × 3 = 46.41 | Rodgers QB Green Bay 3.90 × 2 = 7.80 | Pittsburgh Defense 10.92 | 65.13 6th Place |
| Fantasy Player 5 | Crosby K GB 7.00 × 3 = 21.00 | Pittsburgh Defense 10.92 × 2 = 21.84 | Rodgers QB Green Bay 3.90 | 46.74 11th Place |
| Fantasy Player 6 | Roethlisberger QB Pittsburgh 23.78 × 3 = 71.34 | Jennings WR Green Bay 17.22 × 2 = 34.44 | Rodgers QB Green Bay 3.90 | 109.68 1st Place |
| Fantasy Player 7 | Ward WR Pittsburgh 13.00 × 3 = 39.00 | Mendenhall RB Pittsburgh 9.84 × 2 = 19.68 | Rodgers QB Green Bay 3.90 | 62.58 7th Place |
| Fantasy Player 8 | Jones WR Green Bay 5.00 × 3 = 15.00 | Wallace WR Pittsburgh 15.47 × 2 = 30.94 | Starks RB Green Bay 5.00 | 50.94 10th Place |
| Fantasy Player 9 | Rodgers QB Green Bay 3.90 × 3 = 11.70 | Roethlisberger QB Pittsburgh 23.78 × 2 = 47.56 | Nelson WR Green Bay 19.20 | 78.46* 3rd Place |
| Fantasy Player 10 | Rodgers QB Green Bay 3.90 × 3 = 11.70 | Nelson WR Green Bay 19.20 × 2 = 38.40 | Jennings WR Green Bay 17.22 | 67.32 4th place |
| Fantasy Player 11 | Rodgers QB Green Bay 3.90 × 3 = 11.70 | Jennings WR Green Bay 17.22 × 2 = 34.44 | Nelson WR Green Bay 19.20 | 65.34 5th Place |
| Fantasy Player 12 | Rodgers QB Green Bay 3.90 × 3 = 11.70 | Nelson WR Green Bay 19.20 × 2 = 38.40 | Mendenhall RB Pittsburgh 9.84 | 59.94 9th Place |

*Advances to next round or qualifies for Main Event.

** In the example above, athlete Rodgers adjusted fantasy score is 3.90. This score is tripled because he is slotted first.

I claim:

1. A specialized slot machine comprising:

a data processor;

a network interface, in data communication with the data processor, for communication on a data network;

a display device in data communication with the data processor, wherein the display device serves as a gaming surface; and a gaming system, executable by the data processor, to transform the data processor and network interface into a specialized slot machine configured to implement a client version of a game using a virtual deck of cards, the gaming system being further configured to:

provide, by use of the data processor, a virtual deck of cards, wherein a plurality of virtual cards in the deck have been selected from a virtual pool of cards, wherein each of the plurality of virtual cards comprise identifying information and real-life statistics related to an athlete's actions in real-life sporting events, wherein each of the plurality of virtual cards further comprise information indicative of: 1) an athlete's name, 2) a name of a team for which an athlete plays, 3) a value of the virtual card determined by fantasy points a corresponding athlete is worth, and 5) bonus points or multipliers corresponding to the virtual card, the plurality of virtual cards in the deck have been selected from the virtual pool of cards to maintain a probability of the virtual cards in the deck generating a winning total based on real-life statistics of selected virtual cards in the deck within a pre-determined range;

present, via the display device, the virtual card deck to a plurality of players with a visual aid indicative of whether the plurality of players are playing a game based on events from the past or events from the future, the visual aid including a placement or movement of the virtual card deck in a direction indicative of a game based on events from the past or events from the future;

deal, by use of the data processor, cards from the virtual card deck to the plurality of players;

prompt, by use of the data processor, the plurality of players to bid on the dealt virtual cards or fold and exit a current round;

accept percentage bids from the plurality of players; and award a bonus to a winning player of the plurality of players with a best percentage bid.

2. The specialized slot machine of claim 1 wherein the gaming system being further configured to display, by use of the display device, a virtual card table with one or more player positions.

3. The specialized slot machine of claim 1 wherein the gaming system being further configured to score the plurality of players based on values of virtual cards held by each player.

4. The specialized slot machine of claim 1 wherein colors for each of the plurality of virtual cards in the deck correspond to at least one trait corresponding to an athlete represented on a virtual card.

5. The specialized slot machine of claim 1 wherein at least one of the plurality of virtual cards in the deck has a particular color, a name corresponding to an athlete represented on the virtual card, and information identifying a position played by the athlete represented on the virtual card.

6. The specialized slot machine of claim 1 wherein the gaming system being further configured to receive, by use of the data processor, from the plurality of players credits corresponding to a player percentage bid via a value input mechanism of a handheld device, the value input mechanism including a reader and a touch key interface to enable a player to authorize access to a central account of the player and authorize transfer of credits of the player from the central account to the specialized slot machine, the reader being a card reader, a barcode scanner, or a QR code scanner.

7. The specialized slot machine of claim 1 wherein the gaming system being further configured to score, by use of the data processor, each of the players based on their percentage bids and a completed hand of virtual cards of each player.

8. The specialized slot machine of claim 1 wherein the gaming system being further configured to award bonus points to each of the players based on whether multiple virtual cards corresponding to a randomly dealt bloc of virtual cards identify a same athlete.

9. The specialized slot machine of claim 1 wherein the gaming system being further configured to enable a pre-determined quantity of highest ranked players from each of a plurality of player groups to remain for a next round and automatically increasing percentage bids of the highest ranked players.

10. The specialized slot machine of claim 1 wherein the gaming system being further configured to display, by use of the display device, an indication of a bidding status of each player in each of a plurality of player groups, the indication including a card displaying a bonus structure to assist players in assessing values of potential bonus combinations.

11. The specialized slot machine of claim 1 configured for a non-lottery tournament wherein each player group has at least three players, wherein no player group includes all of the plurality of players of the real time live action wagering tournament game.

12. The specialized slot machine of claim 1 configured to enable the plurality of players to opt to cash out their winnings and exit the current round or let their winnings ride and remain for a subsequent round.

13. A specialized slot machine comprising:
- a data processor;
- a network interface, in data communication with the data processor, for communication on a data network;
- a display device in data communication with the data processor, wherein the display device serves as a gaming surface; and
- a gaming system, executable by the data processor, to transform the data processor and network interface into a specialized slot machine configured to implement a client version of a game using a virtual deck of cards, the gaming system being further configured to:
  - provide, by use of the data processor, a virtual deck of cards, wherein a plurality of virtual cards in the deck have been selected from a virtual pool of cards, wherein each of the plurality of virtual cards comprise identifying information and real-life statistics related to notable person's actions in real-life events, wherein each of the plurality of virtual cards further comprise information indicative of: 1) a notable person's name or identifier, 2) a name of a team, group, or organization with which the notable person is associated, 3) a value of the virtual card determined by fantasy points a corresponding notable person is worth, and 5) bonus points or multipliers corresponding to the virtual card, the plurality of virtual cards in the deck have been selected from the virtual pool of cards to maintain a probability of the virtual cards in the deck generating a winning total based on real-life statistics of selected virtual cards in the deck within a pre-determined range;
  - present, via the display device, the virtual card deck to a plurality of players with a visual aid indicative of whether the plurality of players are playing a game based on events from the past or events from the future, the visual aid including a placement or movement of the virtual card deck in a direction indicative of a game based on events from the past or events from the future;
  - deal, by use of the data processor, cards from the virtual card deck to the plurality of players;
  - prompt, by use of the data processor, the plurality of players to bid on the dealt virtual cards or fold and exit a current round;
  - accept percentage bids from the plurality of players; and
  - award a bonus to a winning player of the plurality of players with a best percentage bid.

14. The specialized slot machine of claim 13 wherein each of the plurality of virtual cards in the deck is color coded.

15. The specialized slot machine of claim 13 wherein the gaming system is further configured to award bonus points to each of the players based on a same color of virtual cards.

16. The specialized slot machine of claim 13 wherein each of the plurality of virtual cards in the deck includes a visual sleeve or shading that indicates a card has been selected to assist color-blind players.

17. The specialized slot machine of claim 13 wherein each of the plurality of virtual cards in the deck includes a readable marking on the card that provides an additional visual prompt to help players identify the color of the card to assist color-blind players.

18. The specialized slot machine of claim 13 wherein the gaming system being further configured to display, by use of the display device, a virtual card table with one or more player positions.

19. The specialized slot machine of claim 13 wherein colors for each of the plurality of virtual cards in the deck correspond to at least one trait corresponding to a notable person represented on a virtual card.

20. The specialized slot machine of claim 13 wherein at least one of the plurality of virtual cards in the deck has a particular color, a name corresponding to a notable person represented on the virtual card, and information identifying a position, affiliation, or job title held by the notable person represented on the virtual card.

21. The specialized slot machine of claim 13 wherein the gaming system being further configured to enable a predetermined quantity of highest ranked players from each of a plurality of player groups to remain for a next round and automatically increasing percentage bids of the highest ranked players.

22. The specialized slot machine of claim 13 wherein the gaming system being further configured to display, by use of the display device, an indication of a bidding status of each player in each of a plurality of player groups.

* * * * *